United States Patent
Shimazaki et al.

(10) Patent No.: US 6,628,574 B1
(45) Date of Patent: Sep. 30, 2003

(54) REPRODUCING METHOD AND REPRODUCING APPARATUS USING PLURAL LIGHT BEAM POWERS FOR TRANSFERRING A MAGNETIC DOMAIN

(75) Inventors: Katsusuke Shimazaki, Toride (JP); Hitoshi Watanabe, Yuuki-gun (JP); Hiroyuki Awano, Noda (JP); Masahumi Yoshihiro, Kitasouma-gun (JP); Norio Ohta, Tsukuba-gun (JP)

(73) Assignee: Hitachi Maxell, Ltd., Ibaraki (JP)

(*) Notice: Subject to any disclaimer, the term of this patent is extended or adjusted under 35 U.S.C. 154(b) by 0 days.

(21) Appl. No.: 09/600,030
(22) PCT Filed: Jan. 12, 1999
(86) PCT No.: PCT/JP99/00065
§ 371 (c)(1), (2), (4) Date: Jul. 11, 2000
(87) PCT Pub. No.: WO99/35644
PCT Pub. Date: Jul. 15, 1999

(30) Foreign Application Priority Data

Jan. 12, 1998 (JP) .............................................. 10-14768

(51) Int. Cl.[7] .............................................. G11B 11/00
(52) U.S. Cl. .................. 369/13.09; 369/13.28
(58) Field of Search .................. 369/13.09, 13.08, 369/13.05, 13.06, 13.26, 13.24, 13.33, 13.32, 13.28; 428/694 ML, 694 MM

(56) References Cited

U.S. PATENT DOCUMENTS

| | | | | |
|---|---|---|---|---|
| 6,055,222 A | * | 4/2000 | Knight | 369/112 |
| 6,130,864 A | * | 10/2000 | Burroughs | 369/13 |
| 6,226,234 B1 | * | 5/2001 | Ohnuki et al. | 369/13 |
| 6,424,601 B1 | * | 7/2002 | Oonuki et al. | 369/13.08 |

FOREIGN PATENT DOCUMENTS

| | | |
|---|---|---|
| JP | U-1-78317 | 5/1989 |
| JP | A-3-203848 | 9/1991 |
| JP | A-3-280233 | 12/1991 |
| JP | A-5-54457 | 3/1993 |
| JP | A-5-73980 | 3/1993 |
| JP | A-6-295479 | 10/1994 |
| JP | A-8-7309 | 1/1996 |
| JP | A-8-7350 | 1/1996 |
| JP | A-8-249737 | 9/1996 |
| JP | A-9-212909 | 8/1997 |
| JP | A-9-245391 | 9/1997 |
| JP | A-10-289503 | 10/1998 |
| WO | WO97/22969 A1 | 6/1997 |
| WO | WO98/02877 | 1/1998 |
| WO | WO98/02878 | 1/1998 |

OTHER PUBLICATIONS

Murakami et al., *Super Resolution Readout of A Magneto–Optical Disk with an In–Plane Magnetization Layer*, The Magnetics Society of Japan, vol. 17, pp. 201–204.

Yamanaka et al., *High Density Optical Recording by Super-resolution*, Japanese Journal of Applied Physics, vol. 28, pp. 197–200.

* cited by examiner

*Primary Examiner*—Tan Dinh
(74) *Attorney, Agent, or Firm*—Oliff & Berridge PLC

(57) ABSTRACT

A reproducing apparatus for a magneto-optical recording medium has, at one end of a swing arm, a magneto-optical head provided with a slider and a solid immersion lens. A reproducing light beam-detecting system is installed to the other end of the swing arm. During reproduction on a magneto-optical recording medium, an alternating magnetic field is applied while radiating a reproducing light beam which is power-modulated to have a low power and a high power in synchronization with a reproducing clock. The reproducing light beam having the low power causes transfer of a magnetic domain in the information-recording layer to the reproducing layer and magnification thereof. The reproducing light beam having the high power extinguishes the magnified magnetic domain. Minute magnetic domains can be individually reproduced at high C/N.

13 Claims, 80 Drawing Sheets

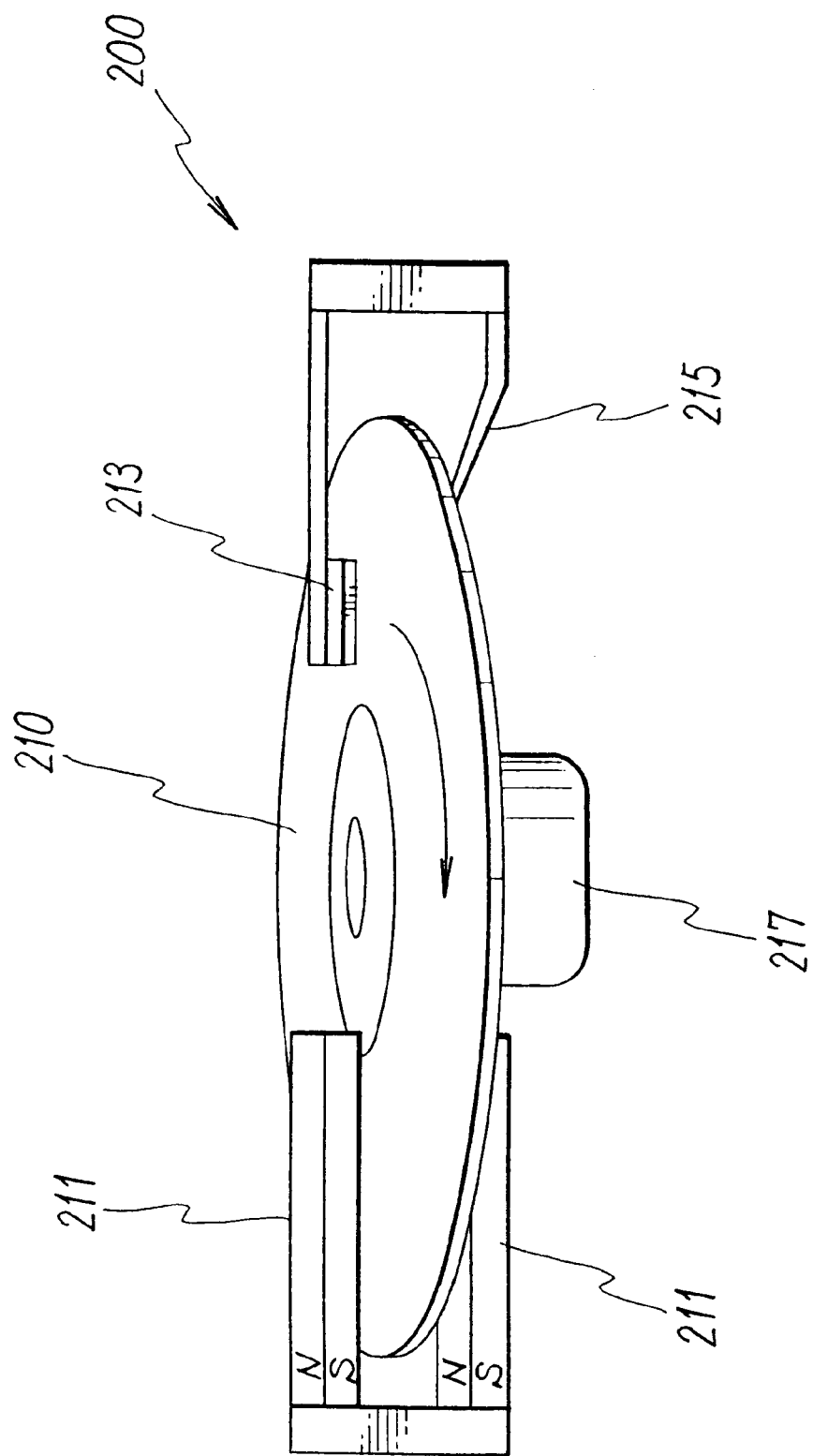

MAGNETIC DOMAIN-MAGNIFYING
REPRODUCING MAGNETIC FIELD (INITIAL MAGNETIZATION CURVE)

MAGNETIC DOMAIN-REDUCING
REPRODUCING MAGNETIC FIELD

6: (DIELECTRIC LAYER)
18: (INFORMATION-RECORDING LAYER)
17: (EXCHANGE COUPLING FORCE CONTROL LAYER)
16: (GATE LAYER)
4: (NON-MAGNETIC LAYER)
3: (MAGNIFYING AND REPRODUCING LAYER)
2: (DIELECTRIC LAYER)
1: (SUBSTRATE)

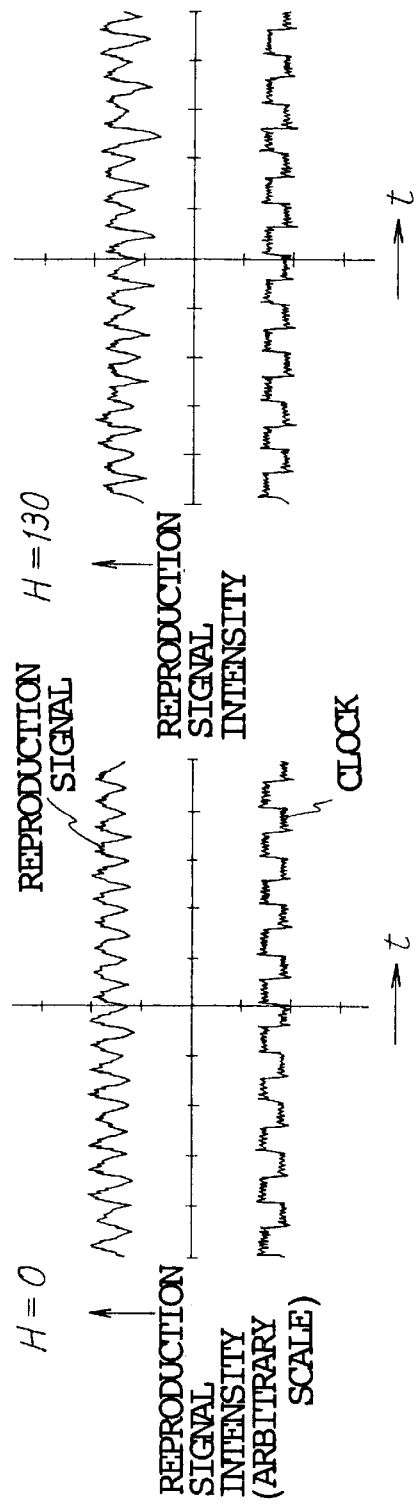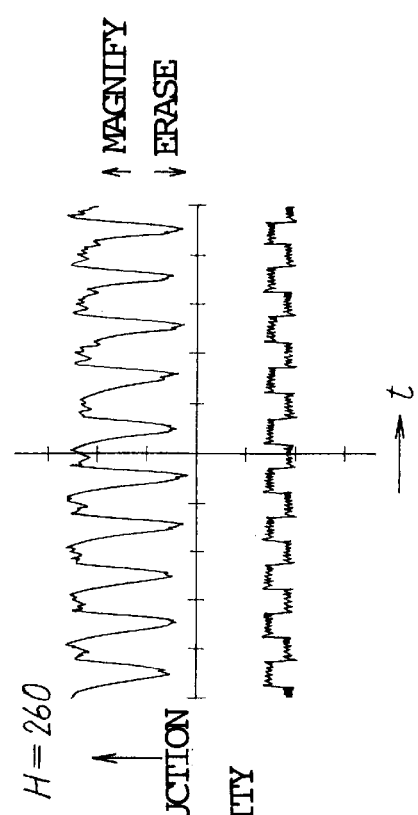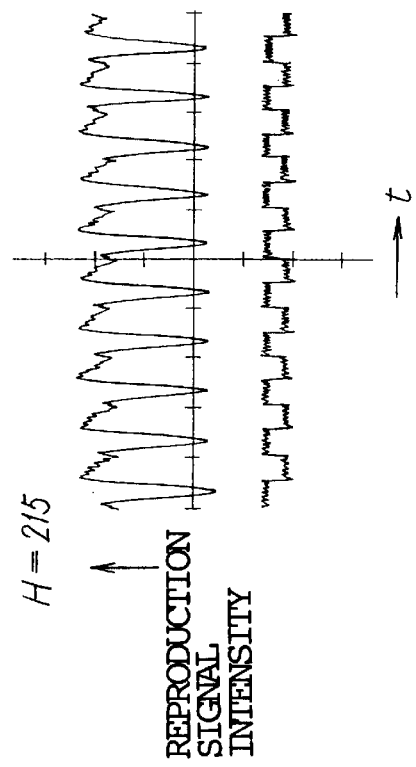

- 6: (DIELECTRIC LAYER)
- 99: (INFORMATION-RECORDING LAYER)
- 97: (SECOND EXCHANGE COUPLING FORCE CONTROL LAYER)
- 95: (FIRST EXCHANGE COUPLING FORCE CONTROL LAYER)
- 93: (GATE LAYER)
- 4: (NON-MAGNETIC LAYER)
- 3: (MAGNIFYING AND REPRODUCING LAYER)
- 2: (DIELECTRIC LAYER)
- 1: (SUBSTRATE)

(TEMPERATURE DISTRIBUTION CAUSED BY IRRADIATION WITH LASER)

CONSTANT SPACING DISTANCE $|Hep| < |Hsr|$ $0.15 \leq \dfrac{T_1}{T_1 + T_2} \leq 0.6$ Fig. 31
(MARK PITCH: 4 μm, 0.4 μm DOMAIN, 1.7 /sec, REPRODUCING POWER: DC 1.65 mW)
(a) H = 0 Oe
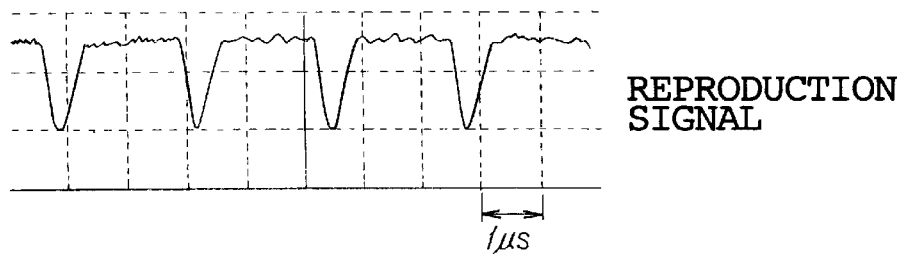
REPRODUCTION SIGNAL
(b) H = 130 Oe
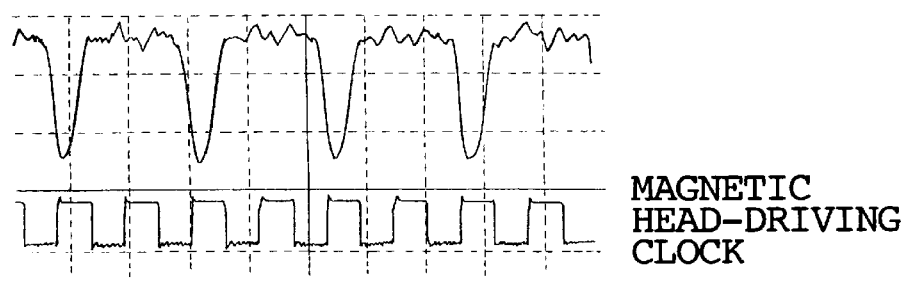
MAGNETIC HEAD-DRIVING CLOCK
(c) H = 215 Oe
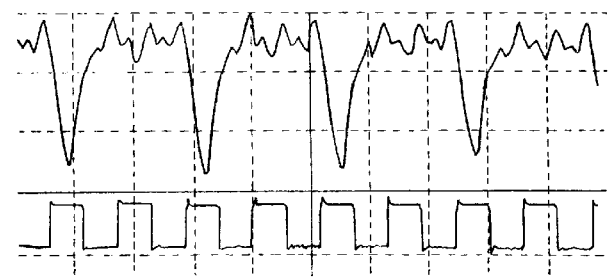
(d) H = 260 Oe
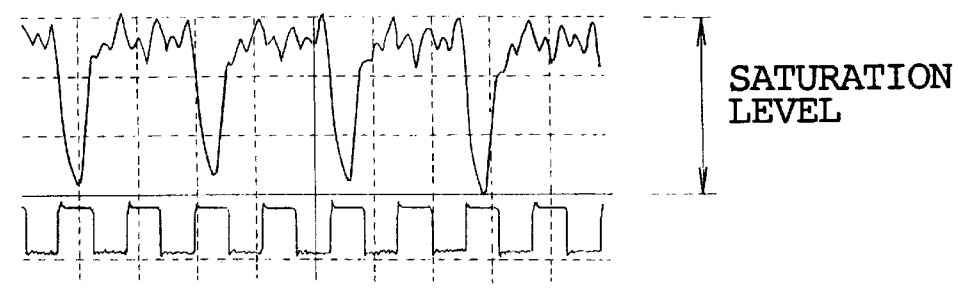
SATURATION LEVEL

1: SUBSTRATE

75: INFORMATION-RECORDING LAYER

4: NON-MAGNETIC LAYER

3: MAGNIFYING AND REPRODUCING LAYER

2: DIELECTRIC LAYER

76: PROTECTIVE LAYER

DISK-TRAVELING DIRECTION

TRACK — RECORDING MAGNETIC DOMAIN

TRACK   RECORDING MAGNETIC DOMAIN

POSITION IN REPRODUCING LIGHT SPOT

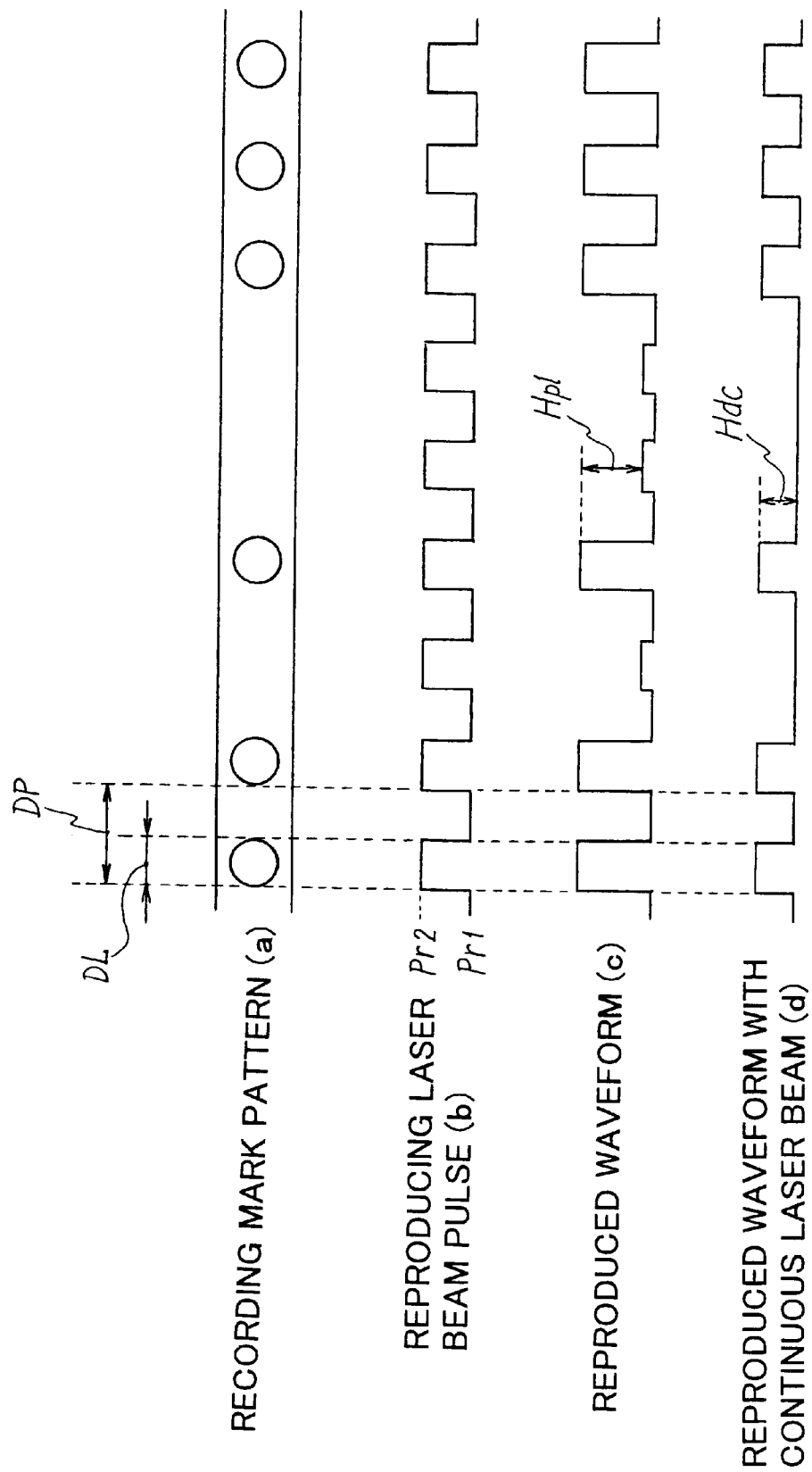

401: SUBSTRATE

403: SiN DIELECTRIC FILM

408: GdFeCo AUXILIARY MAGNETIC FILM

409: SiN NON-MAGNETIC FILM

406: TbFeCo MAGNETO-OPTICAL RECORDING FILM

407: SiN PROTECTIVE FILM

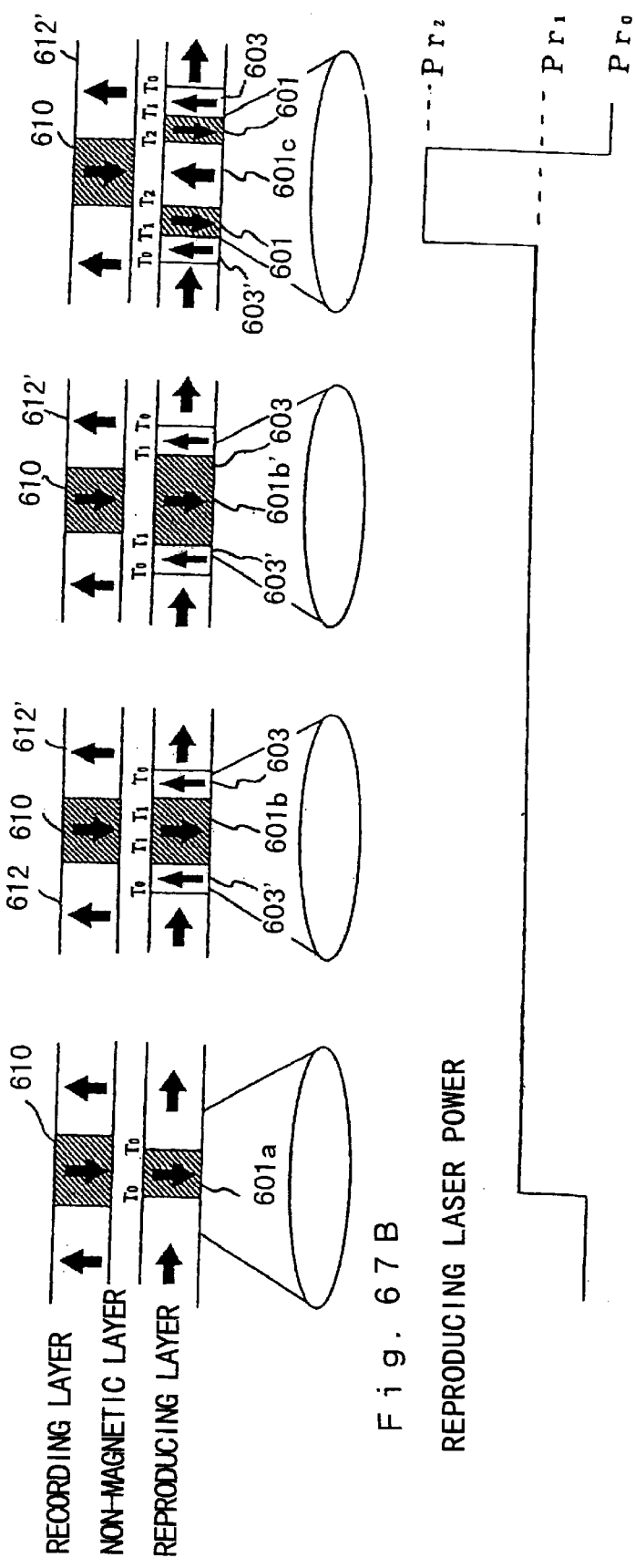

$T_1 < T < T_{comp}$ $T_{comp} < T < T_{CO}$

401: SUBSTRATE
403: DIELECTRIC FILM
404: SECOND AUXILIARY MAGNETIC FILM
409: NON-MAGNETIC LAYER
419: REFLECTIVE LAYER
408: FIRST AUXILIARY MAGNETIC FILM
406: MAGNETO-OPTICAL RECORDING FILM
407: PROTECTIVE FILM

Fig. 87
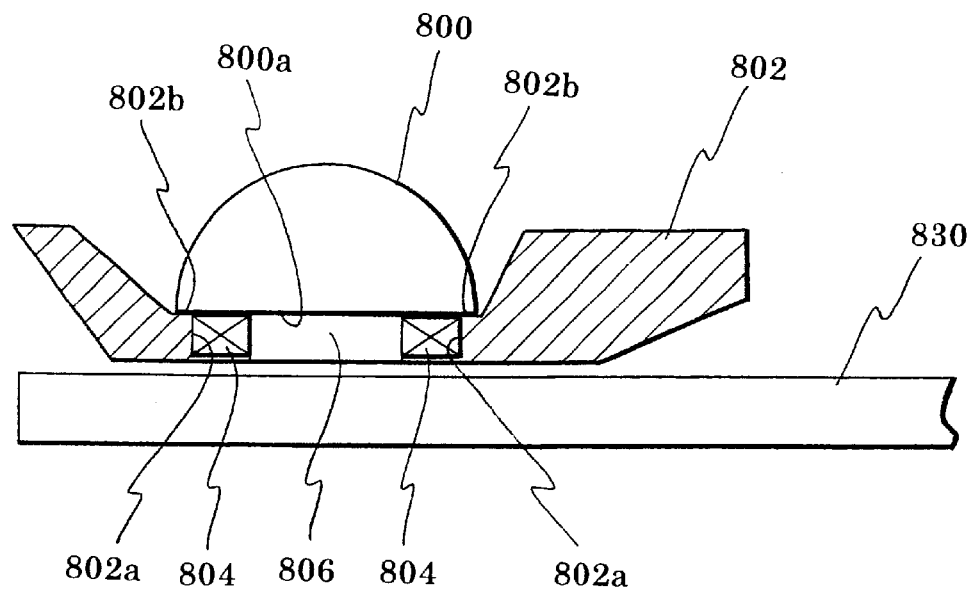
Fig. 88
(A)
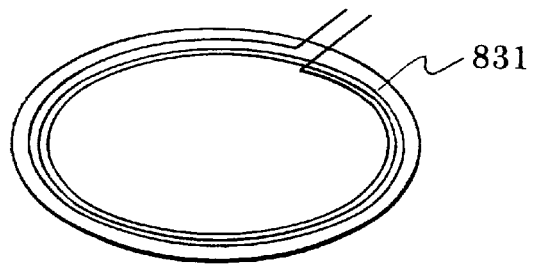
(B)
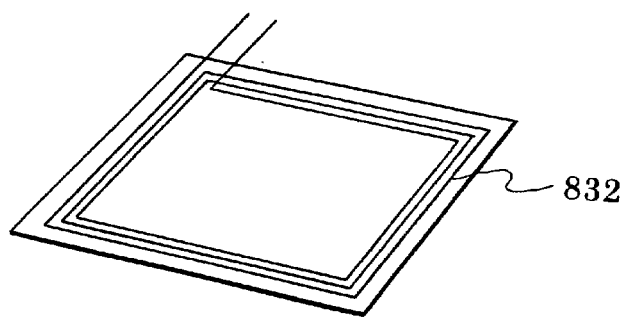

REPRODUCING METHOD AND REPRODUCING APPARATUS USING PLURAL LIGHT BEAM POWERS FOR TRANSFERRING A MAGNETIC DOMAIN

TECHNICAL FIELD

The present invention relates to a reproducing method and a reproducing apparatus for a magneto-optical recording medium which make it possible to detect minute magnetic domains formed on the magneto-optical recording medium, with high resolving power and high S/N ratio. In particular, the present invention relates to a reproducing method and a reproducing apparatus for a magneto-optical recording medium which make it possible to perform reproduction individually in a magnified manner from a plurality of minute magnetic domains existing within a reproducing laser spot when magnetization information is reproduced from minute magnetic domains recorded on the magneto-optical recording medium.

BACKGROUND ART

A technique for performing recording and reproduction at a higher density is demanded in view of the increase in amount of information and the advance of the apparatus to acquire a compact size. The magneto-optical recording medium such as a magneto-optical disk is known as an optical memory having a large storage capacity on which information is rewritable. In order to record information on the magneto-optical recording medium, the magnetic field modulation method is used, in which a magnetic field having a polarity corresponding to a recording signal is applied to a portion at which the temperature is raised, while irradiating the magneto-optical recording medium with a laser beam. This method makes it possible to perform overwrite recording, in which high density recording has been achieved. For example, recording has been achieved with a shortest mark length of 0.15 μm. The optical modulation recording system has been also practically used, in which recording is performed by radiating a power-modulated light beam corresponding to a recording signal while applying a constant magnetic field.

However, even when the minute magnetic domain is formed by using the recording system as described above, the following problems arise during reproduction.

(1) Since the spot radius of the reproducing light beam is too large as compared with the size of the recording magnetic domain (recording mark), it is impossible to individually detect a plurality of magnetic domains existing within the reproducing light beam spot. That is, the reproducing resolving power is insufficient. For this reason, it is impossible to reproduce information from individual recording magnetic domains.

(2) Each of recording magnetic domains has a small areal size, and hence the reproduction signal has a small output. For this reason, the reproduction signal has low S/N.

The magnetically induced super resolution (MSR) technique, which has been suggested, for example, in *Journal of Magnetic Society of Japan*, Vol. 17, Supplement, No. S1, p. 201 (1993), is one of methods to solve the foregoing problem (1). A magneto-optical recording medium used for the magnetically induced super resolution generally comprises a reproducing layer for magnetically induced super resolution, an exchange force control layer, and an information-recording layer. When minute magnetic domains are contained in a reproducing light spot during reproduction, one of the magnetic domains is masked by utilizing the temperature distribution in the reproducing layer so that the other magnetic domain may be individually subjected to reproduction. As described above, in the magnetically induced super resolution, the reproducing resolving power is improved by narrowing the effective field of the radius of the light spot. However, the foregoing problem (2) cannot be solved even by using the magnetically induced super resolution technique, because the intensity of the reproduction signal from each of the magnetic domains does not change.

A reproducing apparatus has been also contrived in order to perform reproduction from recording domains having been subjected to high density recording. Such an apparatus is exemplified by those based on the optical super resolution technique in which a shielding element is inserted into an optical path so that a light-collecting spot which exceeds the diffraction limit of the laser beam is obtained by means of optical super resolution. This technique is discussed in detail in Yamanaka et al., "High Density Optical Recording by Super Resolution", *Jan. J. Appl. Phys.*, 2, Supplement 28-3, 1989, pp. 197–200. Also in this technique, a magnetic mask is generated in the spot by utilizing the fact that the temperature distribution is generated in a magnetic film at the inside of the reproducing light beam spot when an magneto-optical recording medium is irradiated with a reflected light beam. Thus, the effective spot radius, which contributes to the reproduction of the signal, is reduced.

The present inventors have disclosed, in Japanese Patent Application Laid-Open No. 8-7350, a magneto-optical recording medium comprising, on a substrate, a reproducing layer and a recording layer, which makes it possible to magnify and reproduce a magnetic domain transferred to the reproducing layer, by transferring the magnetic domain in the recording layer to the reproducing layer, and applying a reproducing magnetic field during reproduction. An alternating magnetic field is used as the reproducing magnetic field. That is, a magnetic field in a direction to magnify the magnetic domain and a magnetic field in a direction opposite thereto are applied alternately to magnify and reduce respective magnetic domains. The use of the magneto-optical recording medium makes it possible to solve the foregoing problem (2) and amplify the reproduction signal obtained from the magnetic domain. However, it is not easy to control the reproducing magnetic field which is used to magnify the magnetic domain in the reproducing layer. In this viewpoint, this technique requires further improvement. When the magnetic domain is transferred by the aid of the exchange coupling force, the magnification for the magnetic domain effected in the reproducing layer for transferring the magnetic domain thereto is restricted by the size of the magnetic domain in the recording layer. That is, the size of the magnetic domain cannot be magnified to be larger than that of the magnetic domain in the recording layer, at a portion of the reproducing layer on the side of the recording layer. The size of the magnetic domain increases as the separating distance from the recording layer becomes large. Therefore, the following problem arises as well. That is, in an area of the reproducing layer located just over the magnetic domain in the recording layer intended to be reproduced, magnetization is in a direction identical with that in the recording layer in the depth direction for all concerning magnetic domains, however, in an area deviated in the in-plane direction from the magnetic domain intended to be reproduced, a state tends to occur, in which magnetic domain portions having a direction identical with that of magnetization in the recording layer in the depth direction and magnetic domain portions having a direction different therefrom co-exist in a mixed manner.

The present inventors have further disclosed a magneto-optical recording medium and a reproducing method achieved by further developing the technique disclosed in Japanese Patent Application Laid-Open No. 8-7350, in WO 98/02877 and WO 98/02878 disclosed after the priority date of this application. In the reproducing method disclosed in the International Publications, an alternating magnetic field, which is applied during reproduction, is effectively controlled to reliably magnify and reduce the magnetic domain transferred to a magnetic domain-magnifying reproducing layer.

The present inventors have also disclosed, in International Publication WO 97/22969, a method for reproducing information by radiating two types of power-modulated reproducing light beams onto a magneto-optical recording medium comprising a magneto-optical recording film, a first auxiliary magnetic film and a second auxiliary magnetic film composed of a magnetic material which causes transition from in-plane magnetization to perpendicular magnetization when the temperature exceeds a critical temperature. This method successfully reproduce information with an enhanced reproduced signal intensity by transferring a recording magnetic domain in the magneto-optical recording film to the second auxiliary magnetic film with the reproducing light beam having one type of powder and magnifying the transferred magnetic domain. However, the structure of the reproducing apparatus according to the present invention is not disclosed in WO 97/22969. Further, unlike the reproducing method according to the present invention, there is no disclosure concerning the modulation of the power of the reproducing light beam while applying the alternating magnetic field.

Japanese Patent Application Laid-Open No. 6-295479 discloses a magneto-optical recording medium comprising a first magnetic layer and a second magnetic layer (recording layer). The first magnetic layer is a magnetic layer which behaves as an in-plane magnetizable film at room temperature and which behaves as a perpendicularly magnetizable film when the temperature is raised, wherein the transition temperature is increased continuously or in a stepwise manner in the film thickness direction from the side of light incidence. The second magnetic layer is composed of a perpendicularly magnetizable film. The first magnetic layer of the magneto-optical recording medium is composed of a reproducing layer, a first intermediate layer, and a second intermediate layer which are set such that the temperature to cause transition from the in-plane magnetization to the perpendicular magnetization is increased in an order of the reproducing layer, the first intermediate layer, and the second intermediate layer. Therefore, when information is reproduced, the magnetic domain in the recording layer is magnified and transferred to the reproducing layer owing to the relationship concerning the temperature distribution in the reproducing light beam spot and the transition temperatures of the respective layers. However, in this patent document, the reproducing light power is not modulated during reproduction on the magneto-optical recording medium.

FIG. 72 shows an example of a head mechanism to be used for the conventional recording and reproducing apparatus for performing reproduction on the magneto-optical recording medium. An optical head 702 and a magnetic head 703 are arranged oppositely on both side of a recording disk 701 interposed therebetween. Each of the optical head 702 and the magnetic head 703 is relatively large in size and heavy. Therefore, they are supported by a support member 707 and a joint section 711. An engaging section 705, which is attached to the optical head 702 and the joint section 711, is moved on a screw rotary shaft 704 in accordance with rotation of the screw rotary shaft 704 of a driving motor 706. Accordingly, the optical head 702 and the magnetic head 703 can be moved to a desired position on the recording disk 701 to record and reproduce information at this position. In the case of this system, the reproducing apparatus is large and heavy in weight. This system has such drawbacks that it is impossible to respond to the request for the disk recording method and the reproducing apparatus, including, for example, the small size, the light weight, the large capacity, and the high speed of access during recording and reproduction.

On the other hand, a magneto-optical head mechanism 20 shown in FIG. 73 is known as a technique to respond to the realization of a small size of the recording and reproducing apparatus by integrating an optical head and a magnetic head into one unit. In this mechanism 20, a driving unit 713 for an objective lens 710 of an optical head system 712, and a magnetic head slider 714 for arranging a magnetic head coil 721 thereon are combined into one unit. That is, the optical head system 712 and the magnetic head coil 721 are provided on one side of the recording medium 726. A hole 743, through which a converging light beam 738 of a laser beam 709 radiated from the optical head is transmitted, is formed through the magnetic head slider 714. The recording and reproducing apparatus, which is based on the use of such a magneto-optical head, has a considerably small volume. However, such a recording and reproducing apparatus is insufficient to respond to the request for the small size, the light weight, the large capacity, and the high speed of access during recording and reproduction required for the recording and reproducing apparatus. On the other hand, a system is known, in which a head is attached to a tip of an arm, a supporting point for the arm is set to be in the vicinity of a recording medium, and the arm is allowed to swing in parallel to the plane of the disk recording medium so that information is recorded, reproduced, and erased on the disk recording medium. Japanese Patent Application Laid-Open No. 5-54457 suggests a driving system in which an optical head is moved in parallel to the plane of a disk recording medium by using a swing arm or a linear motor. A system for driving an optical head with a swing arm is suggested, for example, in Japanese Patent Application Laid-Open Nos. 8-7309 and 3-203848. A structure, in which a laser beam-reflecting surface is formed on a magnetic head, is suggested in Japanese Patent Application Laid-Open No. 3-280233.

Although these recording and reproducing apparatuses respond to the conventional magneto-optical recording media, they fail to conform with the method for reproducing information with enhanced signal intensity from a recording medium subjected to high density recording, and a magneto-optical recording medium used therefor, as disclosed in Japanese Patent Application Laid-Open No. 8-7350 and WO 97/22969. That is, it is necessary to develop a recording and reproducing apparatus as an apparatus which conforms to the magneto-optical recording medium as recently demanded to realize the small radius, the light weight, the high density, the high recording capacity, and the high speed of recording, reproduction, and erasing. In order to realize the high speed, it is necessary to design the movable direction of the recording and reproducing head to make access to the magneto-optical disk so that the movement is principally effected in parallel to the recording plane of the magneto-optical disk and the movement in the direction perpendicular to the recording plane of the magneto-optical disk is decreased to be as small as possible. In order to realize the small size, it is also demanded to reduce the capacity in the direction perpendicular to the recording plane of the magneto-optical disk. Further, in order to realize further quick access of the recording and reproducing head to the disk, it is necessary to use a head mechanism which is prompt in access and movement action. It is also necessary to make control so that no head crush occurs, for example, due to collision of the recording and reproducing head and the magneto-optical disk.

DISCLOSURE OF THE INVENTION

An object of the present invention is to provide a reproducing method and a reproducing apparatus which are preferably used to perform reproduction on a magneto-optical recording medium of the type in which a recording magnetic domain in an information-recording layer is reproduced by transferring and magnifying it to a reproducing layer, as disclosed, for example, in WO 97/22969. Especially, an object of the present invention is to provide a reproducing method and a reproducing apparatus for a magneto-optical recording medium, in which it is easy to control magnification and reduction of a magnetic domain with a reproducing magnetic field and a reproducing light beam.

Another object of the present invention is to provide a reproducing method and a reproducing apparatus for a magneto-optical recording medium, which make it possible to simultaneously solve the problems (1) and (2) described above and obtain a recorded minute magnetic domain with a high resolving power at a high sensitivity. Still another object of the present invention is to provide a reproducing method and a reproducing apparatus which make it possible to obtain a reproduced signal with sufficient C/N from a magneto-optical recording medium on which minute magnetic domains are recorded.

According to the present invention, there is provided a reproducing apparatus for performing reproduction on a magneto-optical recording medium having an information-recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at its one end;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information-recording layer to the reproducing layer and magnify the transferred magnetic domain so that information is reproduced from the magnified magnetic domain in the reproducing layer. The optical head control unit may be, for example, a circuit (RP-PPA) for adjusting the reproducing pulse width and the phase for feeding the control signal to a laser-driving circuit. The reproducing apparatus may further comprise a magnetic head control unit which controls the magnetic head so that an alternating magnetic field is applied on the basis of the reproducing clock. Alternatively, the reproducing apparatus may further comprise a magnetic head control unit which controls the magnetic head so that a DC magnetic field is applied on the basis of the reproducing clock. The magnetic head control unit may be, for example, a reproducing pulse width/phase-adjusting circuit (RP-PPA) for controlling a magnetic coil-driving circuit.

The reproducing method as disclosed in WO 97/22969 can be realized by using the reproducing apparatus according to the present invention. The reproducing apparatus of the present invention is a reproducing apparatus which is necessary when reproduction is performed on any one of magneto-optical recording media according to the first to tenth aspects (first to nineteenth embodiments) described below in order that a magnetic domain recorded in an information-recording layer of each of the magneto-optical recording media is transferred to a reproducing layer (magnetic domain-magnifying reproducing layer), and the transferred magnetic domain is magnified. In the reproducing apparatus of the present invention, the swing arm can be used to move the optical head or the magneto-optical head on the magneto-optical recording medium. Therefore, it is easy to make access to a predetermined recording area, and it is possible to realize a compact size and a light weight of the apparatus. When a solid immersion lens is used for an objective lens of the optical head, it is possible to perform super high density recording. When the present invention is combined with the MAMMOS reproduction and the reproducing light power modulation reproduction, it is possible to realize the super high density recording and reproduction.

The reproducing apparatus may be constructed as follows. That is, the optical head is installed to one end of the swing arm, a reproduced signal-detecting system is installed to the other end, and the swing shaft is provided therebetween. Thus, it is possible to realize a smaller size of the reproducing apparatus.

According to another aspect of the present invention, there is provided an apparatus for performing reproduction on a magneto-optical recording medium having an information-recording layer and a reproducing layer, the reproducing apparatus comprising:

a clock generator which generates a reproducing clock;

an optical head which radiates a reproducing light beam onto the magneto-optical recording medium;

a magnetic head which applies, as a reproducing magnetic field, an alternating magnetic field synchronized with the reproducing clock to the magneto-optical recording medium; and a swing arm which is rotatable about a swing shaft and which supports the optical head at its one end. The reproducing apparatus includes the magnetic head for applying the alternating magnetic field. Therefore, the reproducing apparatus is preferably used to perform reproduction on the high density magneto-optical recording medium of the type in which the recording magnetic domain in the information-recording medium is transferred to the reproducing layer, and the transferred magnetic domain is magnified to perform reproduction, as disclosed, for example, in WO 98/02877, WO 98/02878, and WO 97/22969. The magnetic field of the alternating magnetic field, which has the same polarity as that of the magnetization of the recording magnetic domain formed in the information-recording layer, may be used to magnify the magnetic domain transferred from the information-recording layer to the reproducing layer, and the magnetic field, which has the polarity opposite to the magnetization of the recording magnetic domain, may be used to reduce the magnified magnetic domain. The reproducing apparatus of the present invention is provided with the swing arm. Accordingly, it is possible to obtain quick access to a desired area. Therefore, the reproducing apparatus of the present invention makes it possible to perform reliable and quick reproduction on the high density magneto-optical recording medium. In order to successfully perform reproduction at a higher density, it is desirable that the optical head is provided with a solid immersion lens as an objective lens. Further, in order to realize a compact size of the reproducing apparatus, it is desirable to use a magneto-optical head in which the magnetic head is incorporated in the optical head.

According to still another aspect of the present invention, there is provided a reproducing method for performing reproduction on a magneto-optical recording medium comprising an information-recording layer and a magnetic domain-magnifying reproducing layer, the method comprising:

radiating a reproducing light beam which is power-modulated to have at least two types of light powers onto the magneto-optical recording medium while applying an alternating magnetic field to reproduce information recorded in the information-recording layer. The alternating magnetic field is applied to the magneto-optical recording medium during the reproduction of information, and the reproducing light beam, which is power-modulated to have at least two types of light powers, is radiated. By doing so, it is easy, as compared with the conventional technique, to set the best condition in order to reliably transfer the magnetic domain from the information-recording layer to the reproducing layer (magnetic domain-magnifying reproducing layer), magnify the magnetic domain, and reduce (extinguish) the magnetic domain. In WO 97/22969, a reproducing light beam, which power-modulated to have two types of light powers, is radiated while applying a DC magnetic field. However, the alternating magnetic field is used in place of the DC magnetic field, and the application timing of the alternating magnetic field and the modulation timing of the optical modulation are appropriately adjusted. Thus, it is easy to find the best reproducing condition which makes it possible to reliably transfer, magnify, and reduce (extinguish) the magnetic domain. When the alternating magnetic field is used, it is possible to reduce (extinguish) the magnified magnetic domain more reliably.

In the reproducing method of the present invention, the reproducing light beam is power-modulated to have the powers Pr1 and Pr2. One of the powers of Pr1 and Pr2 may be used to transfer the magnetic domain in the information-recording layer and magnify the transferred magnetic domain. The other of the powers of Pr1 and Pr2 may be used to reduce or extinguish the magnetic domain magnified in the magnifying reproducing layer. Further, it is possible to radiate the reproducing light beam which is power-modulated to have at least two types of light powers at the same cycle as that of the reproducing clock or at a cycle of integral multiple thereof. The reproducing method of the present invention is extremely useful to perform reproduction on the following magneto-optical recording media according to the first to tenth aspects described below.

Explanation will be made below for the structure and the principle of reproduction concerning the magneto-optical recording media according to the first to tenth aspects.

The magneto-optical recording medium according to the first aspect is a magneto-optical recording medium comprising, on a substrate, an information-recording layer, and a reproducing layer capable of magnifying and reproducing a magnetic domain transferred from the information-recording layer, by applying an external magnetic field having a polarity identical with that of magnetization of the magnetic domain, wherein the information-recording layer has a thickness h which satisfies h/d>0.5 for a radius d of a minimum magnetic domain subjected to recording. That is, when the magneto-optical recording medium of the present invention, which is constructed such that the thickness of the information-recording layer satisfies h/d>0.5, is used, it is possible to realize satisfactory magnification of the magnetic domain. Thus, it is possible to easily control the change in size of the magnetic domain in the reproducing layer with respect to the reproducing magnetic field.

In the magneto-optical recording medium according to the first aspect, the reproducing layer may be composed of a rare earth transition metal in which the compensation temperature is within a range of −100 to 50° C. Accordingly, when the magnetic domain, which is transferred from the information-recording layer to the reproducing layer, is magnified and reproduced, it is possible to obtain the magneto-optical recording medium having high resolution and high S/N.

The magneto-optical recording medium according to the second aspect is a magneto-optical recording medium having at least an information-recording layer on a substrate to reproduce information by radiating a reproducing light beam spot, the magneto-optical recording medium comprising, on the substrate, a magnetic layer to perform magnetic domain-magnifying reproduction, a magnetic layer to serve as a gate, and a magnetic layer for recording information in this order, wherein the magnetic layer to serve as the gate is such a layer that only one magnetic domain of a plurality of magnetic domains, subjected to recording in the magnetic layer for recording information and existing within the spot of the reproducing light beam, is transferred from the information-recording magnetic layer on the basis of a temperature distribution in the magnetic layer to serve as the gate generated within the reproducing light beam spot when the magneto-optical recording medium is irradiate with the reproducing light beam spot, and the magnetic layer to perform magnetic domain-magnifying reproduction enables the magnetic domain transferred from the magnetic layer to serve as the gate to be magnified by applying an external magnetic field having a polarity identical with that of magnetization of the magnetic domain.

In the magneto-optical recording medium according to the second aspect, one recording magnetic domain of the plurality of recording magnetic domains in the information-recording layer included in the radius of the reproducing light beam spot is transferred to the gate layer by utilizing the temperature distribution characteristic of the gate layer, the magnetic domain transferred to the gate magnetic layer is transferred to the reproducing layer, and the one domain transferred to the reproducing layer is magnified by using the reproducing magnetic field and detected. Accordingly, the reproducing resolving powder is improved by the gate magnetic layer, and the intensity of the reproduction signal is increased by means of the magnetic domain-magnifying and reproducing technique. Thus, it is possible to improve S/N.

At first, explanation will be made for the principle of the magneto-optical recording medium according to the second aspect of the present invention and a method for reproduction thereon, with reference to FIGS. 1 to 5. FIG. 1A illustratively shows a concept for recording information as minute magnetic domains on a magneto-optical recording medium 11 of the present invention by applying a recording magnetic field 15 while irradiating the magneto-optical recording medium 11 with a recording laser beam 13. The magneto-optical recording medium 11 comprises a magnetic domain-magnifying reproducing layer (reproducing layer) 3, an intermediate layer 4, a gate layer 16, an exchange coupling force control layer 17, and an information-recording layer 18. Information can be recorded on the magneto-optical recording medium 11 based on the use of the magneto-optical field modulation system, wherein the magneto-optical recording medium 11 is irradiated with a laser pulse synchronized with a recording clock while applying a magnetic field having a polarity corresponding to a recording signal. The magneto-optical recording medium 11 is moved in a traveling direction indicated by an arrow in FIG. 1A with respect to a recording laser beam 13. Therefore, an area 19, which is deviated backward from the spot center, is heated to a higher temperature. The magnetization-retaining force or the coercive force of the area 19 in the information-recording layer 18 is lowered due to the heating. Accordingly, a minute magnetic domain, which has a direction of magnetization directed in the direction of the recording magnetic field 15, is formed during its cooling process. It is assumed in the description of the principle that the magneto-optical recording medium is subjected to recording and reproduction by using, for example, a magneto-optical recording and reproducing apparatus 200 conceptually illustrated in FIG. 2. With reference to FIG. 2, the magneto-optical recording medium 210 is rotationally movable with respect to an optical head 213 and a flying magnetic head 215 by the aid of a spindle motor 217, and an initializing magnetic field is applied to the magneto-optical recording medium 210 by the aid of an initializing magnet 211 upon reproduction.

As shown in FIG. 1B, the initializing magnetic field 12 is applied to the magneto-optical recording medium 11, in a direction opposite to the direction of the recording magnetic field 15. The magnetization-retaining force of the gate layer 16 at room temperature is smaller than the initializing magnetic force. Therefore, the magnetic domains subjected to recording in the gate layer 16 are inverted, and all of them are directed in the direction of the initializing magnetic field 12. On the contrary, the magnetization-retaining force of the information-recording layer 18 is extremely larger than the magnetization-retaining force of the gate layer 16. Therefore, magnetization of a recording magnetic domain 313b in the information-recording layer 18 remains as it is. Magnetization of the gate layer 16 is antiparallel to that of the magnetic domain 313b in the information-recording layer 18. Therefore, an interface therebetween is in an unstable magnetization state.

After the gate layer 16 is initialized as described above, the magneto-optical recording medium 11 is subjected to reproduction under a reproducing light beam as shown in FIG. 3. During reproduction, the magneto-optical recording medium 11 is irradiated with the reproducing light beam having a power lower than that of the recording light beam. An area 314, which is deviated backward from the spot center, is heated to a higher temperature in the same manner as heated by the recording light beam. The magnetization-retaining force of the gate layer 16, which corresponds to the area 314 heated to the higher temperature, is lowered. The magnetic domain 313b in the information-recording layer 18 is transferred to the gate layer 16 via the exchange force control layer 17 by the aid of the exchange coupling force between the information-recording layer 18 and the gate layer 16, and it is further transferred to the magnetic domain-magnifying reproducing layer 3. On the other hand, another recording magnetic domain 313a in the information-recording layer 18 is not transferred to the gate layer 16, because an area in the gate layer 16 corresponding to the magnetic domain 313a has a relatively low temperature, and its magnetization-retaining force is not lowered. Therefore, as shown in a lower part of FIG. 3, when the magneto-optical recording medium 11 is enlarged and viewed from an upward position, only an area 315, which has arrived at a high temperature in the laser spot 311, undergoes decrease in magnetic energy. Accordingly, the recording magnetic domain 313b in the information-recording layer 18 appears as a recording mark 316 on the gate layer 16, and it appears on the magnetic domain-magnifying reproducing layer 3. On the other hand, the other magnetic domains 313 are prevented from transfer by the gate layer 16, in areas other than the area 315 in the spot 311. Therefore, the recording magnetic domain 313a in the information-recording layer 18 remains latent. Accordingly, it is possible to independently reproduce only one minute magnetic domain of a plurality of minute magnetic domains existing within the spot size, by irradiating the magneto-optical recording medium with the reproducing light beam in accordance with the principle as shown in FIG. 3.

According to the present invention, one minute magnetic domain, which is focused by using the gate layer 16 as described above, can be transferred to the magnetic domain-magnifying reproducing layer 3, and it can be magnified within the reproducing laser spot. This process is performed in the magnetic domain-magnifying reproducing layer 3 of the magneto-optical recording medium 11. This principle will be explained with reference to FIG. 4A. It is noted that the magnetic domain-magnifying reproducing layer 3 is a magnetic layer to which a minute magnetic domain is transferred from the gate layer 16, and on which the transferred magnetic domain can be magnified by the aid of the reproducing magnetic field. The magnetic domain-magnifying reproducing layer 3 is a perpendicularly magnetizable film having a magnetic force resistance of the magnetization wall which is smaller than the force of the reproducing magnetic field upon being irradiated with the reproducing light beam so that the magnetization wall is moved by application of the reproducing magnetic field to magnify the magnetic domain. When a magnifying reproducing magnetic field 411 is applied in a direction identical with that of magnetization of the minute magnetic domain 313b in the reproducing state shown in FIG. 3, i.e., in the state in which the minute magnetic domain 313b is transferred from the information-recording layer 18 to the gate layer 16 and the magnetic domain-magnifying reproducing layer 3, then the magnetization wall is moved in a direction to magnify the magnetic domain, because the magnetic force resistance of the magnetization wall is small in the magnetic domain-magnifying reproducing layer 3. Thus, a magnified magnetic domain 419 is formed. As a result, as shown in a lower part of FIG. 4A, it is possible to observe a magnified mark 413 (the magnetic domain 419 magnified in the magnetic domain-magnifying reproducing layer) magnified within the reproducing spot 311. As described above, the minute magnetic domain appears after being magnified on the surface of the magneto-optical recording medium.

Therefore, a reproduction signal having a sufficient intensity can be obtained from the magnified magnetic domain.

After the magnified magnetic domain 419 in the information-recording layer 18 is subjected to reproduction, a reducing reproducing magnetic field 415 is applied in a direction opposite to that of the magnifying reproducing magnetic field 411 as shown in FIG. 4B. Accordingly, the magnified magnetic domain 419 in the magnetic domain-magnifying reproducing layer 3 is reduced. As a result, areas having a direction of magnetization identical with the direction of the magnetic field of the reducing reproducing magnetic field 415 are predominant. The reducing reproducing magnetic field 415 and the magnifying reproducing magnetic field 411 as described above can be applied by using an alternating magnetic field. A reproduction signal with amplification for each of the minute magnetic domains can be obtained by synchronizing the period or the cycle of the alternating magnetic field with a recording clock.

Now, explanation will be made with reference to a hysteresis curve shown in FIG. 5A for the relationship among the magnitude of the magnifying reproducing magnetic field applied during reproduction, the applied magnetic field, and the size of the mark appearing on the magnetic domain-magnifying reproducing layer 3. The hysteresis curve shown in FIG. 5A illustrates the change in Kerr rotation angle $\theta k$ of the magnetic domain-magnifying reproducing layer 3 with respect to the magnetic field H. The Kerr rotation angle $\theta k$ is observed when various magnetic fields H are applied to the magneto-optical recording medium while irradiating the magneto-optical recording medium with a reproducing light beam having the same power as that used during reproduction. It is noted that the hysteresis curve shows a hysteresis curve of the magnetic domain-magnifying reproducing layer of the magneto-optical recording medium having the structure shown in FIGS. 3 to 6, to which the recording magnetic domain in the underlying information-recording layer is transferred by being irradiated with the reproducing light beam. A predetermined Kerr rotation angle $\theta$ is provided (point a in FIG. 5) even when the magnetic field H is zero, because the magnetic domain in the information-recording layer has been already transferred. When the magnetic field H having a polarity identical with the polarity of magnetization of the recording magnetic domain is gradually applied, the initial magnetization curve rises. The point b represents an initial rising point. The rise of the initial magnetization curve corresponds to magnification of the magnetic domain in the layer (the magnetic domain 419 in FIG. 4A) as a result of movement of the magnetization wall of the magnetic domain-magnifying reproducing layer 3 from the center of the magnetic domain toward the outside depending on the magnitude of the magnetic field H. In the initial magnetization curve, no more increase in Kerr rotation angle occurs when magnetization is saturated. In FIG. 5A, conceptual photomicrographs of magnetic domain patterns are shown, in which the magnetic domain-magnifying reproducing layer 3 is viewed from an upward position, at respective points including the points a and b on the initial magnetization curve of the hysteresis curve. The magnetic domain pattern (black circle pattern) at the point a concerns magnetic domains obtained when magnetic domains (seed magnetic domains) in the information-recording layer 18 are transferred via the gate layer 16 to the magnetic domain-magnifying reproducing layer 3 by the aid of irradiation with the reproducing light beam. The patterns at the respective points comprehensively suggest the situation in which the magnetic domains are magnified in accordance with the increase of the magnetic field on the initial magnetization curve starting from the state represented by the point a. When the Kerr rotation angle $\theta$ is saturated, the magnetic domains are inverted on the entire surface of the magnetic domain-magnifying reproducing layer 3.

In the hysteresis curve shown in FIG. 5A, the magnetic field at the rising point c of the major loop of the hysteresis curve (outer loop which represents a locus after the initial magnetization curves is once saturated), which has the same polarity as that of the magnetic field applied in the direction to magnify the magnetization of the magnetic domain-magnifying reproducing layer, is referred to as "nucleation magnetic field". The absolute value thereof is represented by Hn. The magnetic field at the initial rising point b of the initial magnetization curve, which is obtained by applying the magnetic field in the direction to expand the recording magnetic domain in the magnetic domain-magnifying reproducing layer 3 transferred from the information-recording layer 5 via the gate layer 16, is referred to as "magnetization wall-magnifying magnetic field". The absolute value thereof is represented by He. Assuming that the reproducing magnetic field has its absolute value Hr, it is desirable to apply the reproducing magnetic field within a range of He<Hr<Hn because of the following reason. That is, if Hr is smaller than He, the recording magnetic domain transferred to the magnetic domain-magnifying reproducing layer 3 is not magnified. If Hr is larger than Hn, even when no recording magnetic domain (seed magnetic domain) exists in the information-recording layer 18, then the magnetic domain in the magnetic domain-magnifying reproducing layer 3 disposed thereover is inverted, and it is read as a signal.

FIG. 5B shows an initial magnetization curve obtained when the magnetic field is applied in a direction to reduce the recording magnetic domain in the magnetic domain-magnifying reproducing layer 3 transferred via the gate layer 16 from the information-recording layer 18, in the hysteresis curve shown in FIG. 5A. The magnetic field at the initial dropping point c of the major loop (outer loop which represents a locus after the initial magnetization curve is once saturated) of the hysteresis curve, which is located on the side of the same polarity as that of the initial magnetization curve, is referred to as "nucleation magnetic field". The absolute value thereof is represented by Hn. The magnetic field at the dropping point d on the initial magnetization curve is referred to as "magnetization wall-reducing magnetic field". The absolute value thereof is represented by Hs. When the magnetic field is applied within a range of Hs<Hr, the magnetic domain having been subjected to magnification and reproduction can be reduced. In FIG. 5B, conceptual photomicrographs of magnetic domain patterns are also shown, in which the magnetic domain-magnifying reproducing layer is viewed from an upward position, at respective points including the points a and d on the initial magnetization curve of the hysteresis curve. Since the magnetic field in the reducing direction is too large at the point e, the recording magnetization transferred to the magnetic domain-magnifying reproducing layer completely disappears. Therefore, when it is intended to reliably erase the recording magnetization, it is appropriate to adjust the magnetic field to satisfy Hs<Hn<Hr. The hysteresis curves depicted in FIG. 5A and FIG. 5B and hysteresis curves referred to herein are hysteresis curves obtained under the condition in which magneto-optical reproduction is performed in accordance with the reproducing method for the magneto-optical recording medium of the present invention, and they represent characteristics of the Kerr rotation angle (or magnetization) with respect to various magnetic fields, obtained when the reproducing light beam is radiated and the temperature is raised by actually using the recording and reproducing apparatus for the magneto-optical recording medium. Therefore, the hysteresis curves, Hs, Hn, and Hr to be applied are observed by using a practical magneto-optical recording and reproducing apparatus while radiating the reproducing light beam having the power for reproduction.

According to the present invention, owing to the provision of the gate layer as described above, only one magnetic domain is allowed to emerge on the gate layer 16, or it can be transferred to the gate layer 16 even when a plurality of magnetic domains exist in the information-recording layer. Further, the one minute magnetic domain having been transferred to the gate layer 16 can be transferred to the magnetic domain-magnifying reproducing layer 3, and it can be magnified and detected (reproduced) by using the reproducing magnetic field. Therefore, the minute magnetic domain formed in accordance with the magneto-optical field modulation system can be subjected to reproduction at a high resolving power and at high S/N.

The principle has been explained above by illustrating the gate layer as the magnetic layer which undergoes temperature distribution of the gate layer generated in the reproducing light beam spot, in which the magnetic domain in the information-recording layer is transferred to the gate layer in a high temperature area having a temperature higher than a predetermined temperature. However, it is possible to use a magnetic layer which undergoes the temperature distribution in the gate layer generated in the reproducing light beam spot, in which the magnetic domain in the information-recording layer is transferred to the gate layer in a low temperature area having a temperature lower than a predetermined temperature. Alternatively, it is possible to use a magnetic layer which undergoes the temperature distribution in the gate layer generated in the reproducing light beam spot, in which the magnetic domain in the information-recording layer is transferred to the gate layer in a predetermined temperature range.

The magneto-optical recording medium according to the third aspect is a magneto-optical recording medium comprising a recording layer for recording information therein, a non-magnetic layer, and a reproducing layer, wherein:

magnetization is transferred from the recording layer to the reproducing layer in accordance with magnetostatic coupling by heating the magneto-optical recording medium to a predetermined temperature, and a magnetic domain having the transferred magnetization is magnified for reproduction to be larger than a magnetic domain subjected to recording in the recording layer under a reproducing external magnetic field.

In the magnetic domain-magnifying reproducing technique disclosed in Japanese Patent Application Laid-Open No. 8-7350, the recording layer, the intermediate magnetic layer, and the reproducing layer are magnetically coupled to one another by allowing the intermediate magnetic layer to intervene between the recording layer and the reproducing layer. However, in the magneto-optical recording medium according to the third aspect of the present invention, the recording layer and the reproducing layer are magnetostatically coupled to one another by allowing the non-magnetic layer to intervene between the recording layer and the reproducing layer.

The magneto-optical recording medium according to the fourth aspect is a magneto-optical recording medium comprising a recording layer for recording information therein, an intermediate layer, and a reproducing layer, for reproducing information by detecting a magnetization state of a magnetic domain transferred from the recording layer to the reproducing layer, wherein:

a minimum stable magnetic domain radius in the reproducing layer is larger than a size of a magnetic domain subjected to recording in the recording layer.

In the magneto-optical recording medium according to the fourth aspect, the minimum stable magnetic domain radius in the reproducing layer is larger than the size of the magnetic domain subjected to recording in the recording layer. Therefore, the magnetic domain transferred to the reproducing layer is magnified to be larger than the recording magnetic domain. Accordingly, a reproduction signal having high C/N is obtained by reading magnetization information from the magnified magnetic domain as described above. The magneto-optical recording medium according to this aspect is different from the magneto-optical recording media according to the first to third aspects, in which the magnetic domain transferred from the recording layer to the reproducing layer can be magnified even when no reproducing magnetic field is applied. Accordingly, reproduction can be performed by using a reproducing apparatus constructed in the same manner as the conventional technique.

The intermediate layer of the magneto-optical recording medium according to the fourth aspect may be a magnetic layer or a non-magnetic layer. That is, when the intermediate layer is a magnetic layer, the recording magnetic domain in the recording layer is transferred to the reproducing layer by the aid of the exchange coupling effected by the recording layer, the intermediate layer, and the reproducing layer. When the intermediate layer is a non-magnetic layer, the recording magnetic domain in the recording layer is transferred to the reproducing layer by the aid of the magnetostatic coupling effected between the recording layer and the reproducing layer.

In the magneto-optical recording media according to the first, second, and fourth aspects of the present invention, when the intermediate layer (the intermediate magnetic layer or the gate layer), which is inserted between the reproducing layer (the magnifying reproducing layer) and the recording layer (the information-recording layer), is a magnetic layer, it is desirable that the thickness of the intermediate layer is not less than the thickness of the magnetization wall of the magnetic domain in the intermediate layer, because of the following reason. That is, for example, when a magnetic film, which exhibits in-plane magnetization at room temperature and which makes transition from in-plane magnetization to perpendicular magnetization at a temperature not less than a predetermined temperature (critical temperature), is used for the intermediate layer, it is necessary that the magnetic spin is twisted by 90 degrees in the magnetization wall (hereinafter referred to as "magnetization wall of the intermediate layer") between the magnetic domain in which the transition occurs and the magnetic domain adjacent to the foregoing magnetic domain, in order to effect the transition. The thickness of the magnetization wall can be measured, for example, in accordance with the following operation based on the use of the Hall effect. The intermediate layer, the reproducing layer, and the recording layer are magnetized in one direction to measure the Hall voltage (V2) at this time. Assuming that the Hall resistances and the thicknesses of the films (layers) of the intermediate layer, the reproducing layer, and the recording layer are $\rho 1$, $\rho 2$, $\rho 3$, $t1$, $t2$, and $t3$ respectively, the Hall voltage V3 obtained when there is no interface magnetization wall is $V3 = I \times (t1\rho 1 + t2\rho 2 + t3\rho 3)/(t1+t2+t3)^2$, wherein I represents the current flowing into the film (layer). Therefore, the difference (V4) between the absolute value $|V1-V2|$ of the voltage including the interface magnetization wall and 2V3 represents the thickness of the interface magnetization wall. It is also possible to estimate the magnetic spin state which indicates the Hall voltage V4, by using the exchange stiffness constant, the perpendicular magnetization anisotropy energy constant, and the saturation magnetization of the respective layers. Such a method for calculating the interface magnetization wall is described in R. Malmhall, et al., *Proceedings of Optical Data Strange*, 1993, pp. 204–213. Reference may be made to this document. In the present invention, it is desirable that the thickness of the intermediate layer is not less than the thickness of the magnetization wall measured in accordance with the measuring method based on the use of the Hall effect as described above. For example, when the magnetic material of the intermediate layer is composed of a GdFeCo system such as $Gd_xFe_yCo_z$ ($20 \leq X$ 35, $50 \leq Y \leq 100$, $0 \leq Z \leq 50$), the thickness of the magnetization wall is calculated to be about 50 nm on the basis of the calculating method described above. Therefore, when the intermediate layer is composed of $Gd_xFe_yCo_z$ ($20 \leq X$ 35, $50 \leq Y \leq 100$, $0 \leq Z \leq 50$), the thickness of the magnetic layer is required to be not less than 50 nm.

As described above, the thickness of the magnetization wall differs depending on the type and the composition of the magnetic material for the intermediate layer (or the gate layer). However, in the case of the magnetic material to be used for a magnetic layer of the magneto-optical recording medium, the thickness is generally required to be 10 nm at minimum. Therefore, it is preferable that the thickness of the intermediate layer exceeds 10 nm. The upper limit of the thickness of the intermediate layer is preferably less than 100 nm, due to the limitation for the semiconductor laser power. Accordingly, it is preferable for the thickness t of the intermediate layer to satisfy $10 < t < 100$ nm.

In the magneto-optical recording media according to the first, second, and fourth aspects of the present invention, when the intermediate layer is the magnetic layer, it is preferable that the size of the magnetic domain magnetically transferred from the recording layer to the intermediate layer (gate layer) is smaller than the size of the recorded magnetic domain, in order to stabilize the magnetic domain transferred from the recording layer to the intermediate layer (gate layer).

When information, which is recorded on the magneto-optical recording medium according to the first aspect, is reproduced, the reproduction may be performed by transferring a magnetic domain subjected to recording in an information-recording layer to a magnetic domain-magnifying reproducing layer by irradiating the magneto-optical recording medium with a reproducing light beam, and magnifying the transferred magnetic domain to be larger than a size of the magnetic domain subjected to recording in the information-recording layer to perform the reproduction by applying a reproducing magnetic field having a polarity identical with that of magnetization of the transferred magnetic domain. In this aspect, it is preferable that an alternating magnetic field synchronized with a reproducing clock is used as the reproducing magnetic field, the transferred magnetic domain is magnified by using a magnetic field having a polarity identical with that of magnetization of the magnetic domain subjected to recording in the information-recording layer, and the magnified magnetic domain is reduced by using a magnetic field having a polarity opposite thereto.

In the method described above, a plurality of recording magnetic domains in the information-recording layer capable of being included in a spot of the reproducing light beam may be individually transferred to the magnetic domain-magnifying reproducing layer, and the transferred magnetic domain may be magnified to be larger than the size of the magnetic domain subjected to recording in the information-recording layer to perform the reproduction by applying a reproducing magnetic field having a polarity identical with that of magnetization of the transferred magnetic domain.

In the present invention, when information, which is recorded in a recording area of the magneto-optical recording medium according to the second aspect of the present invention, is reproduced, the reproduction may be performed by transferring a magnetic domain subjected to recording in an information-recording layer to a magnetic domain-magnifying reproducing layer via a gate magnetic layer by irradiating the magneto-optical recording medium with a reproducing light beam, and magnifying the transferred magnetic domain to be larger than a size of the magnetic domain subjected to recording in the information-recording layer to perform the reproduction by applying a reproducing magnetic field having a direction identical with that of magnetization of the transferred magnetic domain. According to this method, one magnetic domain is selected via the gate layer from a plurality of recording magnetic domains in the information-recording layer included in the spot of the reproducing light beam during the reproduction, the generated one magnetic domain is transferred to the magnetic domain-magnifying reproducing layer, and the transferred magnetic domain can be magnified to be larger than the size of the magnetic domain subjected to recording in the information-recording layer to perform the reproduction by applying the reproducing magnetic field in the same direction as that of the magnetization of the transferred magnetic domain.

According to the present invention, when information, which is recorded on the magneto-optical recording medium, is reproduced by the aid of the magneto-optical effect, the reproduction may be performed by using, as the magneto-optical recording medium, a magneto-optical recording medium comprising, on a substrate, an information-recording layer, and a magnetic domain-magnifying reproducing layer for transferring a magnetic domain in the information-recording layer thereto and magnifying the transferred magnetic domain by the aid of an external magnetic field, and magnifying the magnetic domain transferred from the information-recording layer to the magnetic domain-magnifying reproducing layer to be larger than a size of the magnetic domain subjected to recording in the information-recording layer to perform the reproduction by applying, during the reproduction, at least one of a reproducing magnetic field modulated on the basis of a reproducing clock and a reproducing light beam modulated on the basis of the reproducing clock, to the magneto-optical recording medium. The intensities of the reproducing magnetic field and the reproducing light beam are simultaneously modulated during the reproduction, and thus the error rate of a reproduction signal can be further lowered.

In the reproducing method according to the present invention, the reproducing magnetic field has its absolute value Hr which relates to an absolute value Hn of the nucleation magnetic field of the hysteresis curve of the magnetic domain-magnifying reproducing layer as explained with reference to FIG. 5, an absolute value He of the magnetization wall-magnifying magnetic field, and an absolute value Hs of the magnetization wall-reducing magnetic field, as measured by using a reproducing power of a recording and reproducing apparatus, such that the reproducing magnetic field is applied to satisfy He<Hr<Hn in a magnifying direction and Hs<Hr in an erasing direction. If a magnifying magnetic field having an intensity not less than Hn is applied, then the magnetization in the reproducing layer is inverted even at portions in which no information is recorded in the information-recording layer, and it is impossible to detect any recording signal, which is not preferred. When a reducing magnetic field having an intensity larger than Hs is applied, the magnetic domain in the reproducing layer is erased. In principle, the magnifying reproduction is not obstructed even when the magnetic domain in the reproducing layer is not completely erased. However, the signal efficiency is rather improved when the magnetic domain is completely erased.

The magneto-optical recording medium according to the fifth aspect is a magneto-optical recording medium comprising at least a magneto-optical recording layer for recording information thereon, a first auxiliary magnetic layer, and a second auxiliary magnetic layer, for magnifying and transferring a recording magnetic domain recorded in the magneto-optical recording layer via the first auxiliary magnetic layer to the second auxiliary magnetic layer when the magneto-optical recording medium is irradiated with a reproducing light beam, and reproducing information from the magnified and transferred magnetic domain in the second auxiliary magnetic layer, wherein the first auxiliary magnetic layer has a thickness which is not less than a thickness of a magnetic wall of the first auxiliary magnetic layer.

The magneto-optical recording medium according to the sixth aspect is a magneto-optical recording medium comprising at least a magneto-optical recording layer for recording information thereon, a first auxiliary magnetic layer, and a second auxiliary magnetic layer, for magnifying and transferring a recording magnetic domain recorded in the magneto-optical recording layer via the first auxiliary magnetic layer to the second auxiliary magnetic layer when the magneto-optical recording medium is irradiated with a reproducing light beam, and reproducing information from the magnified and transferred magnetic domain in the second auxiliary magnetic layer, wherein the first auxiliary magnetic layer has a thickness which exceeds 10 nm.

Main components of the magneto-optical recording media according to the fifth and sixth aspects are conceptually shown in FIGS. 41A and 41B by way of example. The magneto-optical recording medium has a structure in which a first auxiliary magnetic layer 405 and a second auxiliary magnetic layer 404 are stacked successively on a magneto-optical recording layer 406. Each of the first auxiliary magnetic layer 405 and the second auxiliary magnetic layer 404 has such a magnetic characteristic as shown in FIG. 42 that the layer behaves as an in-plane magnetizable layer at a temperature from room temperature to a certain temperature (critical temperature) TCR which is not less than room temperature, and the layer behaves as a perpendicularly magnetizable layer at a temperature which is not less than TCR. The magneto-optical recording layer 406 exhibits perpendicular magnetization in a wide temperature range including room temperature. Assuming that the Curie temperatures of the magneto-optical recording layer 406, the first auxiliary magnetic layer 405, and the second auxiliary magnetic layer 404 are TC0, TC1, and TC2 respectively, and the critical temperatures of the first auxiliary magnetic layer and the second auxiliary magnetic layer are TCR1 and TCR2 respectively, the magnetic characteristic of the magneto-optical recording medium satisfies the relationship of room temperature <TCR2<TCR2<TC0, TC1, TC2.

Explanation will be made below for the principle of reproduction on the magneto-optical recording medium having the structure shown in FIGS. 41A and 41B. FIG. 41A shows magnetization states of the respective layers before the reproduction. It is assumed that recording magnetic domains 422 are previously written in the magneto-optical recording layer 406 in accordance with the magnetic field modulation system or the optical modulation recording system. When the magneto-optical recording medium is irradiated with the reproducing light beam having an appropriate power so that the maximum arrival temperature of the magnetic layer is a desired temperature which is less than TC0, the recording magnetic domain 422 in the magneto-optical recording layer 406 is transferred as a magnetic domain 421 to an area in the first auxiliary magnetic layer 405 in which the temperature is not less than TCR1 as shown in FIG. 41B. In this process, as described later on, it is preferable that the size of the magnetic domain 421 is smaller than the size of the recording magnetic domain 422 of the magneto-optical recording layer 406, i.e., the recording magnetic domain 422 is reduced and transferred to the first auxiliary magnetic layer 405. Subsequently, the magnetic domain 421, which has been transferred to the first auxiliary magnetic layer 405, is transferred as a magnetic domain 423 to the second auxiliary magnetic layer 404.

FIG. 45 shows, in its upper part, a temperature distribution obtained when the magneto-optical recording medium having the structure shown in FIG. 41B is heated by the reproducing laser spot (LS). FIG. 45 shows, in its middle part, a temperature distribution of the magneto-optical recording medium with respect to the laser spot (LS) as viewed from a position over the second auxiliary magnetic layer. The magneto-optical recording medium is set so that the critical temperatures of the first and second auxiliary magnetic layers satisfy TCR2<TCR1. Therefore, the temperature area in which the temperature exceeds TCR2, i.e., the area of the second auxiliary magnetic layer capable of providing the perpendicular magnetization state is larger than the temperature area in which the temperature exceeds TCR1, i.e., the area in the first auxiliary magnetic layer capable of providing the perpendicular magnetization state. Therefore, the magnetic domain 423, which is transferred to the second auxiliary magnetic layer 404, is magnified to be larger than the size of the magnetic domain 421, owing to the perpendicular magnetic anisotropy of the second auxiliary magnetic layer and the exchange coupling force from the transferred magnetic domain of the first auxiliary magnetic layer 405. The magnified magnetic domain 423 is larger than the recording magnetic domain 422 in the magneto-optical recording layer 406. Therefore, the reproduced signal, which is detected in accordance with the magneto-optical effects (Kerr effect and Faraday effect), is amplified as compared with a case of detection from the magnetic domain having the same size as that of the recording magnetic domain 422. Thus, it is possible to perform the reproduction at high C/N. That is, the amplitude of the reproduced signal from the minute magnetic domain is extremely small in the case of production based on the use of the ordinary magnetically induced super resolution. However, when the magneto-optical recording medium referred to herein is used, it is possible to obtain the amplified amplitude of the reproduced signal even if the signal is reproduced from the minute magnetic domain.

In the magneto-optical recording medium according to the present invention, it is preferable that the size of the magnetic domain 421 transferred to the first auxiliary magnetic layer 405 is smaller than that of the recording magnetic domain 422 in the magneto-optical recording layer 406. That is, it is preferable that the magnetic domain is reduced when the recording magnetic domain 422 in the magneto-optical recording layer 406 is transferred as the magnetic domain 421 to the first auxiliary magnetic layer 405. The reason for the above will be explained below.

If the size of the magnetic domain 421 (magnetization in the direction ↑) transferred to the first auxiliary magnetic layer 405 is equivalent to or larger than the size of the recording magnetic domain 422, then the magnetic domain 421 is magnetically affected by the magnetic domain S having the magnetization in the direction ↓ adjacent to the recording magnetic domain 422, and the magnetic domain 421 becomes unstable. It is necessary that the magnetic domain 421, which is transferred to the first auxiliary magnetic layer 405, plays a role to transfer the magnetization information of the recording magnetic domain 422 to the second auxiliary magnetic layer 404 which functions to magnify the magnetic domain. Therefore, it is necessary that the magnetic domain 421 is magnetically stable. Accordingly, when the magnetic domain is reduced and transferred from the recording magnetic domain 422 to the first auxiliary magnetic layer 405, it is possible to reduce the influence from the magnetic domain S adjacent to the recording magnetic domain 422 on the magnetic domain 421 of the first auxiliary magnetic layer 405. Accordingly, the magnetization of the magnetic domain 421 of the first auxiliary magnetic layer 405 can be stabilized. Especially, the magneto-optical recording medium is subjected to the reproduction in a state of being rotated in ordinary cases. Therefore, as shown in FIGS. 41A and 41B, the magnetic domains in the magneto-optical recording layer 406 are successively moved with respect to the reproducing light beam spot in accordance with the rotation of the magneto-optical recording medium. On the other hand, the temperature area of the first auxiliary magnetic layer 405, in which the temperature exceeds TCR1, exists at the constant position with respect to the reproducing light beam spot. If the temperature area of the first auxiliary magnetic layer 405, in which the temperature exceeds TCR1, has the same size as that of the recording magnetic domain 422, only one recording magnetic domain 421 exists in the temperature area merely instantaneously during the movement. During the period of time other then the above, those which exist in the temperature area include a part of one magnetic domain 421 and a part of the recording magnetic domain having the in-plane magnetization adjacent thereto. Therefore, it is extremely difficult to read only the magnetization information of the single recording magnetic domain from the temperature area of the first auxiliary magnetic layer 405 in which the temperature exceeds TCR1. However, when the temperature area of the first auxiliary magnetic layer 405, in which the temperature exceeds TCR1, is smaller than the size of the recording magnetic domain 422, the temperature area exists over only the single recording magnetic domain for a relatively long period of time. The magnetic domain 421, to which the magnetization of the recording magnetic domain 422 is transferred owing to the fact that the temperature exceeds TCR1, is completely included in the upward area of the recording magnetic domain 422 in an instant shown in FIG. 51A and in an instant shown in FIG. 51B as well. Therefore, the magnetization information can be reliably transferred from the recording magnetic domain 422 to the first auxiliary magnetic layer 405. The foregoing reason holds true even when the first auxiliary magnetic layer behaves as a perpendicularly magnetizable film at a temperature of not less than room temperature. That is, it is effective to perform the transfer so that the magnetic domain, which is transferred from the magneto-optical recording layer to the first auxiliary magnetic layer, is reduced, even in the case of the use of a magnetic material as the first auxiliary magnetic layer which exhibits the perpendicular magnetization at a temperature of not less than room temperature.

The decrease in size of the magnetic domain 421 transferred to the first auxiliary magnetic layer 405 as compared with the recording magnetic domain 422 in the magneto-optical recording layer 406 is also effective because of the following reason. The recording magnetic domain S having the magnetization in the direction ↓ exists adjacent to the recording magnetic domain 422 having the magnetization in the direction ↑. However, the first auxiliary magnetic layer 405 has the in-plane magnetization in the ranges indicated by the areas W shown in FIG. 45. Therefore, the exchange coupling force, which is exerted on the second auxiliary magnetic layer 404 from the magnetic domain S of the magneto-optical recording layer 406 in the direction ↓, is intercepted by the in-plane magnetization. Accordingly, the in-plane magnetization of the first auxiliary magnetic layer 405 effectively acts to magnify the magnetic domain 423. When the size of the magnetic domain in the first auxiliary magnetic layer 405 is smaller than the size of the recording magnetic domain 422, it is possible to further increase the effect to intercept the exchange coupling force exerted by the in-plane magnetization of the first auxiliary magnetic layer 405 from the magnetic domain S in the direction ↓ to the second auxiliary magnetic layer 404. Accordingly, it is easier to perform the magnetization of the magnetic domain 422 (magnetization in the direction ↑).

In order to decrease the size of the magnetic domain in the first auxiliary magnetic layer 405 to be smaller than the size of the recording magnetic domain 422, it is preferable that the laser power and TCR1 of the first auxiliary magnetic layer 405 are adjusted so that the temperature area of the first auxiliary magnetic layer 405, in which the temperature exceeds TCR1, is smaller than the size (width) of the recording magnetic domain 422 in the magneto-optical recording layer 406 as shown in FIG. 45. In the example shown in FIG. 45, the laser power and TCR2 of the second auxiliary magnetic layer 404 are further adjusted so that the temperature area of the second auxiliary magnetic layer 404, in which the temperature exceeds TCR2, is larger than the size (width) of the recording magnetic domain 422. Therefore, during the reproduction, the recording magnetic domain 422 in the magneto-optical recording layer 406 is reduced and transferred as the magnetic domain 421 to the first auxiliary magnetic layer 405. The magnetic domain 421 is further magnified and transferred as the magnetic domain 423 to the second auxiliary magnetic layer 404.

The fact that the size of the magnetic domain 421 transferred to the first auxiliary magnetic layer 405 is smaller than the recording magnetic domain 422 in the magneto-optical recording layer 406 can be verified, for example, by means of the following method. The substrate 401 is removed from the magneto-optical recording medium shown in FIG. 40 on which information is recorded. The dielectric film 403 and the second auxiliary magnetic film 404 are removed, for example, by means of the sputtering etching. The surface of the first auxiliary magnetic film may be heated to a reproducing temperature to perform observation with an optical microscope or the like.

The effect of the amplification of the reproduced signal, which is brought about by the magnification of the magnetic domain 423 of the second auxiliary magnetic layer 404, is maximized when the transferred magnetic domain in the second auxiliary magnetic layer 404 is magnified up to the radius of the reproducing light beam spot. In this state, the magnitude of the reproduced signal depends on the reproducing light beam and the performance index such as the Kerr effect of the second auxiliary magnetic layer 404, irrelevant to the size and the shape of the recording magnetic domain 422 of the magneto-optical recording layer 406. The area of the magneto-optical recording medium, from which information is read, has a temperature lowered to be less than TCR2 after the spot of the reproducing light beam passes thereover. The perpendicular magnetization of the first and second auxiliary magnetic layers is returned to the in-plane magnetization, giving the state shown in FIG. 41A again. During the reproduction operation as described above, the power of the reproducing light beam is adjusted so that the maximum arrival temperature of the magneto-optical recording medium is lower than the Curie temperature TC0 of the magneto-optical recording layer 406. Therefore, the magnetization information, which is recorded in the magneto-optical recording layer 406, is not affected by the reproducing light beam.

It is necessary for the magneto-optical recording medium according to the fifth aspect that the thickness of the first auxiliary magnetic layer is not less than the thickness of the magnetic wall of the first auxiliary magnetic layer. As shown in FIGS. 41A, 41B, and 45, when the temperature exceeds the critical temperature TCR1, the magnetization of the first auxiliary magnetic layer 405 undergoes the transition from the in-plane magnetization to the perpendicular magnetization. In order to enable the transition, it is necessary that the magnetic spin is twisted by 90 degrees in the magnetic wall (hereinafter referred to as "magnetic wall of the first auxiliary magnetic layer") between the magnetic domain 421 in the first auxiliary magnetic layer 405 and the magnetic domain of the in-plane magnetization of the first auxiliary magnetic layer 405 adjacent to the magnetic domain 421. Further, it is necessary that only the first auxiliary magnetic layer behaves as the in-plane magnetizable film in the area W to mitigate the spin of the magneto-optical recording layer 406 and the second auxiliary magnetic layer. Therefore, in order to allow the transition between the in-plane magnetization and the perpendicular magnetization in the first auxiliary magnetic layer 405, it is required that the thickness of the first auxiliary magnetic layer 405 is, at the minimum, not less than the thickness of the magnetic wall of the first auxiliary magnetic layer 405. The thickness of the magnetic wall can be measured by using the Hall effect in the same manner as described above.

As described above, the thickness of the magnetic wall differs depending on the type and the composition of the magnetic material. However, the thickness of the magnetic wall is generally required to be 10 nm at the minimum for the magnetic material to be used for the magnetic layer of the magneto-optical recording medium. Therefore, according to the eleventh aspect of the present invention, it is preferable that the thickness of the first auxiliary magnetic layer is a thickness which exceeds 10 nm. The upper limit of the first auxiliary magnetic layer is preferably not more than 100 nm in view of the restriction of the power of the semiconductor laser as the reproducing light source. Therefore, the thickness t of the first auxiliary magnetic layer preferably satisfies $10 < t < 100$ nm.

The magneto-optical recording medium according to the seventh aspect is a magneto-optical recording medium comprising a magneto-optical recording film and an auxiliary magnetic film, for reproducing a signal by magnetically transferring a recording magnetic domain in the magneto-optical recording film to the auxiliary magnetic film when the magneto-optical recording medium is irradiated with a reproducing light beam, wherein the auxiliary magnetic film is a magnetic film composed of at least one layer for making transition from an in-plane magnetizable film to a perpendicularly magnetizable film when a temperature of the auxiliary magnetic film exceeds a critical temperature, the magneto-optical recording film is a perpendicularly magnetizable film at a temperature of not less than room temperature, and a magnetic characteristic of the auxiliary magnetic film is utilized to make it possible to transfer a magnetic domain larger than the recording magnetic domain of the magneto-optical recording film to the auxiliary magnetic film during reproduction.

One type of the magneto-optical recording medium according to the seventh aspect has the following magnetic characteristic. That is, as shown in FIG. 41A and FIG. 41B, the magneto-optical recording medium has a structure comprising a first auxiliary magnetic film 405 and a second auxiliary magnetic film 404 stacked successively on a magneto-optical recording film 406. The magneto-optical recording film 406, the first auxiliary magnetic film 405, and the second auxiliary magnetic film 404 satisfies a relationship of room temperature $< TCR2 < TCR1 < TC0$, TC1, TC2 provided that the Curie temperatures of the magneto-optical recording film 406, the first auxiliary magnetic film, and the second auxiliary magnetic film are TC0, TC1, and TC2 respectively, and the critical temperatures of the first auxiliary magnetic film and the second auxiliary magnetic film are TCR1 and TCR2 respectively. As shown in FIG. 42, the first auxiliary magnetic film 405 and the second auxiliary magnetic film 404 have the following magnetic characteristic. That is, each of them is an in-plane magnetizable film from room temperature to a certain critical temperature (TCR) which is not less than room temperature, and it behaves as a perpendicularly magnetizable film at a temperature which is not less than TCR. The magneto-optical recording film 406 is a perpendicularly magnetizable film at a temperature which is not less than room temperature.

The principle of the operation (reproduction) on the magneto-optical recording medium used in the seventh aspect will be explained below. FIG. 41A shows magnetization states of the respective layers before the reproduction, after the recording magnetic domains are written in the magneto-optical recording film 406, for example, in accordance with the optical modulation recording system. When the medium is irradiated with the reproducing light beam having an appropriate power so that the maximum arrival temperature of the magnetic film is a desired temperature, the magnetic domain 422 of the perpendicular magnetization in the magneto-optical recording film 406 is firstly transferred to an area in the first auxiliary magnetic film 405 in which the temperature is not less than TCR1. During this process, considering the temperature profile in the medium obtained when the reproducing light beam is radiated as shown in FIG. 54, the reproducing power and TCR1 are set so that the magnetic domain 422, which has the same size as that of the magnetic domain in the magneto-optical recording film 406 or which is smaller than the magnetic domain in the magneto-optical recording film 406, is transferred to the first auxiliary magnetic film 405.

Subsequently, the magnetic domain 422, which is transferred to the first auxiliary magnetic film 405, is transferred to the ,second auxiliary magnetic film 404. In the present invention, the first and second auxiliary magnetic films are set so that their critical temperatures satisfy $TCR2 < TCR1$. Therefore, as shown in the temperature profile in the medium in FIG. 54, the area in the second auxiliary magnetic film, which is able to be in the perpendicular magnetization state, has a radius larger than that in the first auxiliary magnetic film. Accordingly, as shown in FIG. 41B, the transferred magnetic domain 423 in the second auxiliary magnetic film 404 is magnified by the perpendicular magnetic anisotropy in the area in the second auxiliary magnetic film which is able to be in the perpendicular magnetization state and the exchange coupling force from the perpendicular magnetization in the first auxiliary magnetic film 405. It is also considered that the magnification of the magnetic domain is facilitated in view of the fact that the in-plane magnetization of the area indicated by W in FIG. 41 in the first auxiliary magnetic film 405 weakens the exchange coupling force from the magnetic domain S of the magneto-optical recording film 406 to the second auxiliary magnetic film 404. The magnification of the magnetic domain described above reduces the decrease in amount of light to contribute to the reproduction output effected by the magnetic mask of the in-plane magnetization. Thus, it is possible to perform the reproduction at a high C/N ratio.

The effect of the magnification of the magnetic domain 423 of the second auxiliary magnetic film 404 is maximized when the transferred magnetic domain in the second auxiliary magnetic film 404 is magnified to be not less than the radius of the reproducing light beam spot. In this state, it is possible to obtain an extremely large reproduction output which is determined by only the light of the reproducing beam and the performance index of the second auxiliary magnetic film 404, irrelevant to the size and the shape of the magnetic domain recorded in the magneto-optical recording film 406. After the reproduction, i.e., after the movement of the radiating section for the reproducing light beam, the reading section is cooled to be not more than TCR2. Each of the first and second auxiliary magnetic films is in the in-plane magnetization state, returning to the state shown in FIG. 41A. The coercive force of the magneto-optical recording film 406 is sufficiently large even at the temperature during the reproducing operation as described above. Therefore, the information recorded as the magnetization is completely held.

As shown in FIG. 53, the magneto-optical recording medium according to the eighth aspect comprises a non-magnetic film 409 disposed between an auxiliary magnetic film 408 and a magneto-optical recording film 406, wherein the magneto-optical recording film 406 and the auxiliary magnetic film 408 have such magnetic characteristics that a relationship of room temperature <TCR<TC0, TC is satisfied provided that Curie temperatures of the magneto-optical recording film 406 and the auxiliary magnetic film are TC0 and TC respectively, and a critical temperature of the auxiliary magnetic film is TCR.

Explanation will be made for the principle of reproduction on the magneto-optical recording medium used in the eighth aspect. FIG. 52A schematically shows the magnetization state of the auxiliary magnetic film 408, the non-magnetic film 409, and the magneto-optical recording film 406 before performing the reproduction after the magnetic domains are written into the magneto-optical recording film 406 of the medium shown in FIG. 53, for example, in accordance with the optical modulation recording system. When the magneto-optical recording medium is irradiated with a reproducing light beam having an appropriate power so that the maximum arrival temperature of the magnetic film is a desired temperature, an area appears in the auxiliary magnetic film 408, in which the temperature is not less than TCR, being capable of causing the perpendicular magnetization state. TCR and the reproducing power are set so that the size of the area is not less than the radius of the magnetic domain M recorded in the magneto-optical recording film 406, preferably not less than the radius of the reproducing light beam spot. The coercive force of the auxiliary magnetic film 408 is distributed as shown in FIG. 55 corresponding to the temperature distribution in the area in which the temperature is not less than TCR, having such a magnetic characteristic that the value is sufficiently small in the area in which the temperature arrives at the maximum arrival temperature and in the vicinity thereof.

The magneto-optical recording film 406 has its distribution of magnetization as shown in FIG. 55 corresponding to the temperature distribution in the area in which the temperature is not less than TCR, having such a magnetic characteristic that the value is sufficiently large in the area in which the temperature arrives at the maximum arrival temperature and in the vicinity thereof. The magnetic characteristics of the respective magnetic films are set as described above. Therefore, only the magnetic domain M in the magneto-optical recording film 406, which is located in the area in which the temperature is high and the magnetization is sufficiently large, is transferred to the area in the auxiliary magnetic film 408 in which the temperature is high and the coercive force is sufficiently small, by the aid of the large magnetostatic coupling force between the magneto-optical recording film 406 and the auxiliary magnetic film 408 acting in the area of the magnetic domain M. Accordingly, it is possible to certainly obtain sufficient reproducing resolution.

Subsequently, the magnetic domain 463, which is transferred to the auxiliary magnetic film 408, is considered to be magnified as shown in FIG. 52B, by the aid of perpendicular magnetic anisotropy in the area in which the temperature is not less than TCR and the exchange coupling force exerted by the transferred magnetic domain. Owing to the magnification of the magnetic domain, the reproduced signal is enhanced in the same manner as in the magneto-optical recording medium of the first type, and C/N is improved. After the reproduction, i.e., after the reproducing laser beam is moved, the reading section is cooled so that the temperature is not more than TCR, and the auxiliary magnetic film 408 behaves as the in-plane magnetizable film, returning to the state shown in FIG. 52A.

The principle of the light power-modulating reproducing method according to the present invention will be explained by using a schematic diagram concerning the reproducing method shown in FIG. 57. In this reproducing method, the magneto-optical recording medium of the second type shown in FIG. 52 is used. At first, a predetermined recording pattern as shown in FIG. 57($a$) is recorded on the second type magneto-optical recording medium as the magneto-optical recording medium by using, for example, the optical modulation recording system. In FIG. 57($a$), the recording mark is recorded at a shortest mark pitch DP, and the recording mark length DL is set to give DL=DP/2. Upon reproduction, a pulse laser beam, which is modulated to have two kinds of reproducing powers Pr2, Pr1, is used as the reproducing laser beam to be radiated so that the cycle which synchronized with the recording mark position is DP, and the light emission width of the high power Pr2 is DL as shown in FIG. 57($b$). The light beam having the low reproducing power Pr1 is always radiated in an erasing state (onto portions at which no recording mark exists), and the light beam having the high reproducing power Pr2 is radiated in a recording state (onto portions at which the recording mark exists) and in the erasing state.

FIG. 57($c$) illustrate a reproduced signal waveform obtained by radiating the reproducing pulse laser as shown in FIG. 57(b). On the other hand, FIG. 57(d) illustrates a reproduced signal waveform obtained when the same track is subjected to reproduction by using a continuous light beam having a constant reproducing light power. Pr2 and Pr1 are selected as follows. That is, Pr2 is a recording power to cause the magnification of the magnetic domain in the auxiliary magnetic film 408 as described later on. Pr1 is a power to extinguish the magnified magnetic domain. When the reproducing power is selected as described above, the amplitude Hpl, which is provided between the recording state and the erasing state observed during the reproduction with the pulse light beam, is allowed to satisfy Hpl>Hdc with respect to the amplitude Hdc obtained upon the reproduction with the constant laser beam. Further, the magnetization information, which is recorded in each of the magnetic domains of the magneto-optical recording film 406, can be independently magnified and reproduced without being affected by adjacent magnetic domains.

When the magneto-optical recording medium according to the eighth aspect is subjected to the reproduction, it is preferable that the light power Pr1 of the reproducing light beam is such a power that the auxiliary magnetic film is heated to a temperature of Tcr to Tcomp, the recording magnetic domain in the magneto-optical recording film 406 is transferred to the auxiliary magnetic film, and the magnetic domain is magnified, and the light power Pr2 of the reproducing light beam is such a power that the auxiliary magnetic film is heated to a temperature of Tcomp to Tco to reduce or extinguish the magnified magnetic domain.

The magneto-optical recording medium according to the ninth aspect is a magneto-optical recording medium having at least a magneto-optical recording film 406 on a substrate, the magneto-optical recording medium comprising the magneto-optical recording film 406 having perpendicular magnetization and an auxiliary magnetic film to cause transition from an in-plane magnetizable film to a perpendicularly magnetizable film when a temperature exceeds a critical temperature Tcr with a non-magnetic film intervening therebetween, wherein a relationship of room temperature <Tcr<Tcomp<Tco<Tc holds concerning a Curie temperature Tco of the magneto-optical recording film 406 and a Curie temperature Tc and a compensation temperature Tcomp of the auxiliary magnetic film, and wherein under a condition in which an external magnetic field Hex is applied to the magneto-optical recording medium, a temperature curve A of a transfer magnetic field which is generated by the external magnetic field Hex and the magneto-optical recording film 406, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film 406.

Explanation will be made for the principle of the reproducing method on the magneto-optical recording medium according to the ninth aspect. The reproducing method is based on the use of the magneto-optical recording medium comprising the magneto-optical recording film 406 having the perpendicular magnetization, and the auxiliary magnetic film which causes transition from the in-plane magnetizable film to the perpendicularly magnetizable film when the temperature exceeds the critical temperature Tcr, with the non-magnetic film interposed therebetween. FIG. 64 shows an illustrative structure of the magneto-optical recording medium of this type. A magneto-optical disk 490 shown in FIG. 64 comprises, in a stacked form on a substrate 401, a dielectric film 403, an auxiliary magnetic film 408, a non-magnetic film 409, a magneto-optical recording film 406, and a protective film 407. The auxiliary magnetic film 408 has a compensation temperature Tcomp between a critical temperature Tcr and its Curie temperature Tc. The magneto-optical recording medium 490 satisfies the relationship of room temperature <Tcr<Tcomp<Tco<Tc concerning the Curie temperature Tco of the magneto-optical recording film 406, the critical temperature Tcr, the Curie temperature Tc, and the compensation temperature Tcomp of the auxiliary magnetic film 408.

Reproduction is performed in accordance with the reproducing method of the present invention by radiating the light power-modulated reproducing light beam while applying the external DC magnetic field to the magneto-optical recording medium 490 having the magnetic characteristic as described above. FIG. 66 shows magnetic characteristics of the magneto-optical recording film 406 and the auxiliary magnetic film 408 of the magneto-optical disk 490 in a state in which the constant DC magnetic field Hex is applied to the magneto-optical recording medium 490 in the recording direction. The magnetic temperature curve A shown in FIG. 66 denotes a temperature-dependent change in transfer magnetic field (static magnetic field) generated by the magnetization of the recording layer from the magneto-optical recording film 406 (hereinafter simply referred to as "recording layer") to the auxiliary magnetic film 408 (hereinafter simply referred to as "reproducing layer"). The transfer magnetic field of the curve A represents the magnitude of the magnetic field obtained by adding an amount of offset of the external magnetic field Hex. Therefore, the magnetic filed having the magnitude of (Hex−Ht) and the magnetic field having the magnitude of (Hex+Ht) exist as the entire transfer magnetic field depending on the direction of the magnetic domain of the recording layer, with a boundary of the Curie temperature Tco of the recording layer. The two magnetic fields constitute the curve A. In FIG. 66, the downward direction is the recording direction. Hex is also applied in the downward direction. In this case, the external magnetic field Hex is adjusted to be small as compared with the magnitude of the static magnetic field Ht in the initializing direction generated from the magnetization of the recording layer at room temperature. Therefore, the entire transfer magnetic field includes those directed in the upward direction (negative) and in the downward direction (positive) depending on the magnetization direction of the recording magnetic domain in the recording layer as illustrated by the curve A.

The magnetic temperature curve B denotes the temperature-dependent change of the coercive force in the perpendicular direction of the reproducing layer in a state of having the perpendicular magnetization. The coercive force is represented by Hr+Hw as including the pure coercive force Hr of the magnetic domain in the reproducing layer in the perpendicular direction and the magnetic field Hw corresponding to a virtual magnetic field regarded to be applied by generation of the magnetic wall of the reproducing layer (in other words, the exchange coupling magnetic field in the in-plane direction of the reproducing layer). That is, Hr+Hw represents the magnetic field necessary to perform inversion of the magnetization in the direction perpendicular to the film surface of the reproducing layer. As shown in FIG. 66, the magnetization in the direction perpendicular to the film surface of the reproducing layer appears at a temperature which is not less than the critical temperature Tcr at which the reproducing layer behaves as a perpendicularly magnetizable film. The coercive force is maximal at the compensation temperature Tcomp because the magnetization of the reproducing layer is zero.

The temperature curves A and B shown in FIG. 66 are divided into those belonging to three areas (a) to (c) as shown in FIG. 66. The three areas (a) to (c) correspond to the three steps of i) magnetic domain transfer from the recording layer to the reproducing layer, ii) magnification of the transferred magnetic domain in the reproducing layer, and iii) extinguishment of the magnified magnetic domain, in the reproducing method of the present invention as shown in FIG. 67A respectively. Accordingly, explanation will be made with reference to FIG. 67 for the magnetic characteristics required for the recording layer and the reproducing layer in the areas (a) to (c) shown in FIG. 66. Arrows in the recording layer and the reproducing layer shown in FIG. 67A denote the direction of the magnetic moment of the rare earth metal included in each of the magnetic domains.

The area (a) is a temperature area in which the magnetic domain is transferred from the recording layer to the reproducing layer in the reproducing method of the present invention, which belongs to a temperature range of T0 to T1 in FIG. 67A. T0 means the critical temperature Tcr, and T1 is a temperature at which the magnetic temperature curve A on the side of Hex–Ht initially intersects the magnetic temperature curve B. The temperature range T0 to T1 can be achieved by adjusting the light power of the reproducing light beam to be a relatively low power as described later on. In order to actually perform the magnetic transfer as shown in FIG. 67A (1) in this temperature area, it is necessary that the magnitude of the transfer magnetic field in this temperature area exceeds the coercive force of the reproducing layer in the perpendicular direction. That is, when the magnetization recorded on the recording layer is in the direction ↓ (recording direction), it is necessary that the transfer magnetic field represented by Hex+Ht is larger than Hr+Hw or –(Hr+Hw) (requirement for magnetic domain transfer). When the magnetization recorded on the recording layer is in the direction ↑ (erasing direction), it is necessary that the negative transfer magnetic field represented by Hex–Ht is smaller than the coercive force Hr+Hw or –(Hr+Hw) of the reproducing layer in the perpendicular direction (requirement for magnetic domain transfer).

On the other hand, when the magnetic temperature curves A and B are compared with each other in the area (a) shown in FIG. 66, it is appreciated that the relationships of the following expressions (a1) to (a3) hold.

$$Hr<Hex+Ht-Hw \quad (a1)$$

$$-Hr>Hex+Ht+Hw \quad (a2)$$

$$Hr>Hex-Ht-Hw \quad (a3)$$

Therefore, the area (a) satisfies the magnetic domain transfer requirement described above, and the recording magnetic domain in the recording layer can be transferred to the reproducing layer regardless of the direction of magnetization thereof. FIG. 67A (1) shows a case in which the magnetization in the direction ↓ recorded in a magnetic domain 610 in the recording layer is transferred to an area of the reproducing layer at a temperature which exceeds the temperature T0 within the reproducing light spot so that a transferred magnetic domain 601a is formed.

Subsequently, in the area (b) shown in FIG. 66, the magnetic domain magnification is performed for the magnetic domain 601b transferred to the reproducing layer as shown in FIG. 67A (2) and (3). This temperature area resides in a range indicated by T1 to T2 in FIG. 66. The temperature T2 is a temperature at which the magnetic temperature curve A on the side of Hex–Ht intersects the magnetic temperature curve B on the high temperature side. The magneto-optical disk having the magnetic characteristic shown in FIG. 66 is adjusted such that T2 is approximately coincident with the compensation temperature Tcomp of the reproducing layer (the temperature exists between the compensation temperature Tcomp and the Curie temperature Tco of the recording layer, and the temperature is a temperature extremely close to the compensation temperature Tcomp) in relation to the external magnetic field Hex. In this temperature area, as shown in FIG. 67A (2), magnetic domains 603, 603', which are subjected to magnetic transfer from magnetic domains 612, 612' in the recording layer in the upward direction, exist on both sides of the magnetic domain 601b transferred to the reproducing layer, as a result of being heated to T0 to T1 within the reproducing light spot. In order to allow the magnetic domain 601b transferred to the reproducing layer to start magnification in the in-plane direction, it is necessary that the directions of the magnetic domains 603, 603' disposed on the both sides are directed to the recording direction (direction ↓) in the same manner as the magnetic domain 601b. The magnetic domains 603, 603' receive the transfer magnetic field (Hex–Ht) (totally in the direction ↑) obtained by adding, to the external magnetic field Hex, the static magnetic field Ht in the upward direction from magnetic domains 622 in the recording layer existing just thereover. On the other hand, the magnetic domains 603, 603' have the coercive force in the perpendicular direction including the exchange coupling magnetic field Hw (in the downward direction) exerted by the magnetic domain 601b and the coercive force Hr to invert the magnetization of the magnetic domains 603, 603' themselves. Therefore, when the coercive force in the perpendicular direction (Hr+Hw) is made larger than the transfer magnetic field (Hex–Ht) of the magnetic domains 603, 603', the magnetic domains 603, 603' are inverted (requirement for magnetic domain inversion).

It is appreciated that the following relational expressions hold in the area (b) according to the relative magnitude between the magnetic temperature curves A and B.

$$Hr<Hex+Ht-Hw \quad (b1)$$

$$-Hr<Hex-Ht+Hw \quad (b2)$$

$$Hr>Hex-Ht-Hw \quad (b3)$$

The foregoing expression (b2) is the condition of magnetic domain inversion itself under which the coercive force (Hr+Hw) in the perpendicular direction is larger than the transfer magnetic field Hex–Ht (in the upward direction) of the magnetic domains 603, 603'. Therefore, the magnetic domain magnification occurs in the area (b) for the magnetic domain 601b' in the reproducing layer as shown in FIG. 66A (3). According to the relationship of (b2), it is demonstrated that no magnetic domain in the downward direction appears in the reproducing layer when there is no magnetic domain in the recording direction in the reproducing layer, in the temperature area (b). In FIG. 66A (3), the both sides of the magnified magnetic domain 601b' are the temperature area of T0 to T1. Therefore, the magnetic domains 603, 603' in the direction ↑, which are subjected to the magnetic domain transfer from the magnetic domains 612, 612' in the recording layer, exist therein.

Subsequently, in the area (c), the transferred and magnified magnetic domain is inverted (extinguished), and a magnetic domain 601c in the erasing direction is formed as shown in FIG. 67A (4). This temperature area exists in a range from T2 which slightly exceeds the compensation temperature of the reproducing layer, to the Curie temperature Tco of the recording layer. The magnified and reproduced magnetic domain can be extinguished or reduced by applying the reproducing magnetic field in the erasing direction, i.e., by using the alternating magnetic field as the reproducing magnetic field. However, in the reproducing method of the present invention, the DC magnetic field is used to extinguish the magnified magnetic domain by power-modulating the reproducing light beam to have the power higher than the reproducing light power used to perform the magnetic transfer and the magnification. The reproducing light power may be modulated to be further small in order to extinguish the magnified magnetic domain, as described in the seventeenth embodiment of the reproducing method on the magneto-optical recording medium according to the present invention as described later on.

Explanation will be made with reference to FIG. 68 for the principle to invert (extinguish) the magnified magnetic domain in the area (c). FIG. 68 illustrates the temperature-dependent change of the direction and the magnitude of sub-lattice magnetization of the rare earth metal and the transition metal of the magnetic domain 620 in the recording layer composed of the rare earth-transition metal (TbFeCo alloy) and the magnetic domain 601b in the reproducing layer composed of the rare earth-transition metal (GdFeCo alloy) subjected to the magnetic domain transfer therefrom shown in FIG. 67 (2). As shown in FIG. 68A, when the temperature of the reproducing layer is less than the compensation temperature Tcomp, then the magnetization of the rare earth metal in the reproducing layer is dominant, and it is parallel to the magnetization direction of the recording layer of the transfer source (the magnetization of the transition metal is dominant). Subsequently, when the temperature of the reproducing layer exceeds the compensation temperature Tcomp by radiating the high power laser in accordance with the reproducing method of the present invention, the magnetic moment of the transition metal in the reproducing layer is dominant. It is appreciated that the following expressions (c1) and (c2) hold according to the relative magnitude of the magnetic temperature curves A and B of the reproducing layer and the recording layer in the area (c) shown in FIG. 66.

$$Hr<Hex+Ht-Hw \quad (c1)$$

$$Hr<Hex-Ht-Hw \quad (c2)$$

That is, the coercive force Hr of the magnetic domain 601b is smaller than the entire magnetic field (Hex+Ht−Hw or Hex−Ht−Hw) in the recording direction acting on the magnetic domain 601b. As a result, when the temperature of the reproducing layer is not less than the compensation temperature Tcomp (exactly, when it is not less than T2), the dominant magnetic moment of the transition metal is inverted to be directed in the recording direction as shown in FIG. 68B. Therefore, the magnetic moment of the rare earth metal in the downward direction of the magnified magnetic domain 601b shown in FIG. 68A (3) is inverted in the area which is heated to the temperature not less than the temperature of the area (c), i.e., not less than the compensation temperature Tcomp. Thus, the inverted magnetic domain 601c is generated (FIG. 68A (4)). The magnetic domains 601, 601', which are disposed on the both sides of the inverted magnetic domain 601c, have their temperatures ranging from T1 to T2. Therefore, the magnetic domains 601, 601' have the same magnetization direction as that of the magnified magnetic domain 601b.

In the reproducing method described above, the three temperature areas (a) to (c) can be achieved by modulating the reproducing light power to have at least the two power levels Pr1 and Pr2 as shown in FIG. 67B. That is, the light power Pr1 of the reproducing light beam may be the power for heating the auxiliary magnetic layer to the temperature of Tcr to Tcomp and making it possible to transfer the recording magnetic domain in the magneto-optical recording film 406 to the reproducing layer and magnify the magnetic domain. The light power Pr2 of the reproducing light beam may be the power for heating the auxiliary magnetic layer to the temperature of Tcomp to Tco and reducing or extinguishing the magnified magnetic domain as described above. The Pr1/Pr2 power-modulated reproducing light beam is used as the reproducing light beam in synchronization with the reproducing clock. Thus, the recording magnetic domain in the recording layer can be subjected to reproduction through the steps of i) transfer to the reproducing layer, ii) magnification of the transferred magnetic domain, and iii) extinguishment of the magnified magnetic domain.

As shown in FIG. 69, the magneto-optical recording medium according to the tenth aspect has a structure comprising a first auxiliary magnetic film 408, a non-magnetic film 409, and a second auxiliary magnetic film 404 which are successively stacked on a magneto-optical recording film 406, wherein the magneto-optical recording film 406, the first auxiliary magnetic film 408, and the second auxiliary magnetic film 404 have such magnetic characteristics that a relationship of room temperature <TCR12<TCR11<TC0, TC1, TC2 is satisfied provided that Curie temperatures of the magneto-optical recording film 406, the first auxiliary magnetic film, and the second auxiliary magnetic film are TC0, TC11, and TC12 respectively, and critical temperatures of the first auxiliary magnetic film and the second auxiliary magnetic film are TCR11 and RCR12 respectively. The critical temperature represents the temperature represented by TCR at which the state of magnetization of the magnetic film is subjected to the state change from the in-plane magnetization to the perpendicular magnetization or from the perpendicular magnetization to the in-plane magnetization. As shown in FIG. 70, the second auxiliary magnetic film 404 behaves as an in-plane magnetizable film from room temperature to the certain critical temperature (TCR12) of not less than room temperature, and it behaves as a perpendicularly magnetizable film at a temperature of not less than TCR12. As shown in FIG. 70, the first auxiliary magnetic film 408 has such a magnetic characteristic that it behaves as a perpendicularly magnetizable film from room temperature to the certain critical temperature (TCR11) of not less than room temperature, and it behaves as an in-plane magnetizable film at a temperature of not less than TCR11. The magneto-optical recording film 406 is a perpendicularly magnetizable film at a temperature of not less than room temperature.

The principle of the operation (reproduction) on the magneto-optical recording medium according to the tenth aspect will be explained below. FIG. 71A shows magnetization states of the respective layers before the reproduction, after the recording magnetic domains are written in the magneto-optical recording film 406, for example, in accordance with the optical magnetic field modulation recording system. When the medium is irradiated with the reproducing light beam having an appropriate power so that the maximum arrival temperature of the magnetic film is a desired temperature, the magnetic domain 422 of the perpendicular magnetization in the magneto-optical recording film 406 is firstly transferred to an area in the second auxiliary magnetic film 404 in which the temperature is not less than TC12. During this process, considering the temperature profile in the medium obtained when the reproducing light beam is radiated as shown in FIG. 54, the reproducing power and TCR1 are set so that the magnetic domain 621, which has the same size as that of the magnetic domain in the magneto-optical recording film 406 or which is smaller than the magnetic domain in the magneto-optical recording film 406, is transferred to the second auxiliary magnetic film 404.

Subsequently, when the first auxiliary magnetic film 408 arrives at a temperature of not less than TCR1, the first auxiliary magnetic film 408 is changed to have the in-plane magnetization to intercept the leak magnetic field and the magnetic field of the magnetic domain signal of the magneto-optical recording film 406. Accordingly, the influence of the leak magnetic field is avoided for the signal of the magnetic domain 422 transferred to the second auxiliary magnetic film 404. Therefore, it is possible to obtain a reproduced signal having high C/N. In the present invention, the first and second auxiliary magnetic films are designed so that their critical temperatures satisfy TCR12<TCR11. Therefore, as shown by the temperature profile in the medium in FIG. 54, the radius is increased in the area in the second auxiliary magnetic film in which the perpendicular magnetization state can be provided. When the magneto-optical recording medium is irradiated with the reproducing light beam having an appropriate power so that the maximum arrival temperature of the magnetic film is a desired temperature, an area arises in the second auxiliary magnetic film 404 (reproducing layer) in which the temperature is not less than TCR12 and the perpendicular magnetization state can be provided. TCR12 and the reproducing power are set and used so that the size of the concerning area is not less than the radius of the magnetic domain M recorded in the magneto-optical recording film 406, preferably not less than the radius of the reproducing light beam spot. The second auxiliary magnetic film 404 (reproducing layer) has such a magnetic characteristic that the coercive force has a distribution as shown in FIG. 55 corresponding to the temperature distribution in the area in which the temperature is not less than TCR12, and the value is sufficiently small in the area in which the temperature arrives at the maximum arrival temperature and in the vicinity thereof. At the point of time at which the perpendicular magnetization state occurs while the temperature is not less than TCR12 in the second auxiliary magnetic film 404 (reproducing layer) by irradiating the magneto-optical recording medium with the reproducing light beam, the magnetization state of the first auxiliary magnetic film 408 is changed from the perpendicular magnetization to the in-plane magnetization at the portion in the first auxiliary magnetic film 408 in which the temperature arrives at a temperature of not less than TCR11. During this process, the transferred magnetic domain (domain) in the second auxiliary magnetic film 404 (reproducing layer) is magnified as shown in FIG. 69C. However, the following condition is required. That is, the magnification is effected to give a size in which the reading can be performed with the reproducing light beam, for example, to be larger than the radius of the reproducing light beam spot. Simultaneously, the state of the magnetization of the first auxiliary magnetic film 408 maintains the state of in-plane magnetization to obtain a necessary temperature difference ΔT between the critical temperatures TCR12 and TCR11 so that the reproduced signal from the second auxiliary magnetic film 404 is not contaminated with any noise signal such as the leak magnetic field, and the leak magnetic field or the like may be intercepted. It is necessary to select and use a combination of materials for the first auxiliary magnetic film 408 and the second auxiliary magnetic film 404 so that the temperature difference ΔT as described above may be obtained.

The magneto-optical recording film 406 has its distribution of magnetization as shown in FIGS. 71B and 71C corresponding to the temperature distribution in the area in which the temperature is not less than TCR12, having such a magnetic characteristic that the value is sufficiently large in the area in which the temperature arrives at the maximum arrival temperature and in the vicinity thereof. The magnetic characteristics of the respective magnetic films are set as described above. Therefore, only the magnetic domain M in the magneto-optical recording film 406, which is located in the area in which the temperature is sufficiently high and the magnetization is sufficiently large, is transferred to the area in the auxiliary magnetic film 406 in which the temperature is high and the coercive force is sufficiently small, by the aid of the large magnetostatic coupling force between the magneto-optical recording film 406 and the auxiliary magnetic film 408 acting in the area of the magnetic domain M. Accordingly, it is possible to certainly obtain sufficient reproducing resolution.

Subsequently, the magnetic domain, which is transferred to the second auxiliary magnetic film 404, is considered to be magnified as shown in FIG. 71C, by the aid of the perpendicular magnetic anisotropy in the area in which the temperature is not less than TCR12 and the exchange coupling force exerted by the transferred magnetic domain. Owing to the magnification of the magnetic domain, the reproduced signal is enhanced in the same manner as in the magneto-optical recording medium of the first type, and C/N is improved. After the reproduction, i.e., after the reproducing laser beam is moved, the reading section is cooled to be not more than TCR12, and the second auxiliary magnetic film 404 behaves as the in-plane magnetizable film, returning to the state shown in FIG. 71A.

The effect of magnification of the magnetic domain of the second auxiliary magnetic film 404 is maximized when the transferred magnetic domain in the second auxiliary magnetic film 404 is magnified to be not less than the spot radius of the reproducing light beam. In this state, it is possible to obtain an extremely large reproduction output which is determined by only the reproducing light beam and the performance index of the second auxiliary magnetic film 404, irrelevant to the size and the shape of the magnetic domain recorded in the magneto-optical recording film 406. After the reproduction, i.e., after the section for radiating the reproducing light beam is moved, the reading section is cooled to be not more than TCR12, and the second auxiliary magnetic film is in the in-plane magnetization state, returning to the state shown in FIG. 71A. The coercive force of the magneto-optical recording film 406 is sufficiently large even at the temperature during the reproducing operation as described above. Therefore, the information, which is recorded as magnetization, is completely retained.

An optical element composed of a solid immersion lens can be used as an objective lens for the optical head of the reproducing apparatus of the present invention. Such an optical element is made of a material having a refractive index larger than 1. FIG. 83 shows an example of such an optical element 801. FIG. 83 conceptually illustrates the principle of image formation for the optical element 801. Explanation will be made for the condition to improve the recording density by decreasing the spot radius of the laser beam radiated onto the recording medium 803 to be a smaller spot radius. In general, the spot radius S is defined by the following expression (1).

$$S=\lambda/(2NA)=\lambda/(2n\cdot\sin\theta max) \quad (1)$$

It is assumed that λ represents the wavelength of the laser beam coming into the optical element 801, NA represents the numerical aperture of the optical element 801, n represents the refractive index of the optical element 801, and θmax represents the angle (angle of incidence) formed by the optical axis and the light beam (solid lines in FIG. 83) disposed at the outermost side of the incoming light flux. When the wavelength > of the laser beam is constant, it is understood that NA may be increased in order to decrease the spot radius S according to the foregoing expression (1). NA is defined by NA=nsinθmax. Therefore, in order to obtain large NA, it is necessary to increase the refractive index n and the angle θmax. Accordingly, when a material having a high refractive index is used for the optical element 801, the wavelength of the incoming light beam is shortened at the inside of the optical element 801. When the incoming light beam is refracted at the surface of the optical element 801, and it is collected at the inside of the optical element 801, then the angle θmax, which is formed by the optical axis and the incoming light beam, can be increased in the optical element 801 as compared with one which is obtained before the light beam comes into the optical element 801.

The optical element 801 is a hemispherical type lens formed by cutting a part of a sphere having a radius r. The cut plane of the optical element 801, i.e., the outgoing plane 801a of the optical element 801 is obtained by the cutting perpendicular to the optical axis of the incoming light beam. The cut position of the optical element 801 is located at r/n from the center of the sphere. The outgoing plane 801a of the optical element 101 is made parallel to the surface 803a of the recording medium 803 when the magneto-optical head, which carries the optical element 801, is allowed to float. When the incoming light beam indicated by the solid lines in FIG. 83 is reflected by the cut plane of the spherical lens of the optical element 801 to converge the incoming light beam toward the point on the outgoing plane 801a, then the optical element 801 functions such that the spot is radiated onto the recording medium 703 arranged on the side of the outgoing plane 801a of the optical element 801 via the evanescent field (air gap). Therefore, it is necessary that the distance between the optical element 801 and the recording medium 803 is within the attenuation distance of the evanescent light. The optical element 801 effects the image formation at the position (on the surface 803a of the recording medium 803) of intersection of broken lines obtained by extending the incoming light beam in the optical element 801 indicated by the solid lines. As described above, as for the optical element 801, NA can be increased to a multiple of square of n by shortening the wavelength λ of the incoming light beam in the optical element 801 and increasing the angle θmax by the refraction at the spherical surface of the optical element 801. In other words, the spot radius of the laser beam can be theoretically decreased up to $1/n^2$. Accordingly, the optical element 801 functions such that the spot formed on the recording medium 803 is decreased to be smaller than the minimum spot obtained in vacuum.

In the magneto-optical head of the present invention, when the magnetic coil is contained in the slider, the apparatus can be allowed to have a more compact size as compared with the conventional one. When the magnetic coil is arranged at the outer circumference of the optical element 801, then the spacing distance between the recording medium and the magnetic coil is narrowed, and it is enough to use a small current flowing through the magnetic coil when the magnetic field is applied. The optical path of the radiated laser beam is not intercepted. Accordingly, the laser beam can be efficiently radiated onto the recording medium. When the magnetic coil is provided at the position closely to the recording medium as compared with the light-outgoing plane of the optical element 801, the spacing distance between the magnetic coil and the recording medium is decreased. It is possible to suppress the electric power consumption of the recording and reproducing apparatus based on the use of the magneto-optical head constructed as described above. It is desirable to use a film-shaped coil for the magnetic coil. When the magnetic coil is composed of a film-shaped coil, the spacing distance between the recording medium and the magnetic coil can be narrowed. As for the magnetic coil, when the inner diameter of the magnetic coil is decreased to be smaller than the outer diameter of the optical element 801, the external magnetic field can be applied to the recording medium more stably.

It is preferable for the magnetic core to use a magnetic material which transmits the light. Accordingly, the optical path of the laser beam radiated toward the recording medium is not intercepted. Therefore, it is possible to efficiently radiate the laser beam onto the recording medium. The magnetic material includes, for example, transparent ferrite. In the magneto-optical head of the present invention, it is preferable that at least a part of the optical element is made of a magnetic material which transmits the laser beam. When such an arrangement is adopted, it is possible to decrease the number of parts used for the magneto-optical head, and it is possible to realize a compact size of the magneto-optical head. Further, the magnetic material, which transmits the laser beam, may be arranged only at a portion in the vicinity of the center perpendicular to the laser beam-outgoing plane of the optical element. Accordingly, it is possible to improve the positioning accuracy for the external magnetic field.

BRIEF DESCRIPTION OF THE DRAWINGS

FIGS. 1A and 1B explain the principle of recording and reproduction on the magneto-optical recording medium of the present invention, wherein FIG. 1A illustrates the principle of information recording, and FIG. 1B illustrates the principle of initialization for a magnifying reproducing layer.

FIG. 2 shows a schematic arrangement of a recording and reproducing apparatus used for recording and reproduction on the magneto-optical recording medium of the present invention.

FIGS. 4A and 4B explain the principle of magnification and reproduction for a minute magnetic domain during reproduction on the magneto-optical recording medium of the present invention, wherein FIG. 4A illustrates a situation in which the magnetic domain is magnified by using a magnifying reproducing magnetic field, and FIG. 4B illustrates a situation in which the magnetic domain is reduced by using a reducing reproducing magnetic field.

FIGS. 5A and 5B show graphs illustrating hysteresis curves of a magnifying reproducing layer of the magneto-optical recording medium of the present invention, wherein FIG. 5A illustrates an initial magnetization curve upon application of the magnifying magnetic field, and FIG. 5B illustrates an initial magnification curve upon application of the reducing magnetic field.

FIGS. 8A to 8D shows graphs illustrating reproduction signals obtained from the magneto-optical recording medium according to the first embodiment, wherein FIGS. 8A, 8B, 8C, and 8D illustrate those obtained for intensities of the reproducing magnetic field H=0 (Oe), H=130 (Oe), H=215 (Qe), and H=260 (Oe) respectively.

FIGS. 18A and 18B explain the principle of reproduction on the magneto-optical recording medium according to the second embodiment, wherein FIG. 18A illustrates transfer of magnetization from the recording layer to the reproducing layer, and FIG. 18B illustrates a situation in which a transferred magnetic domain is magnified.

FIGS. 28A and 28B show the applicable cycle of a pulsed laser beam or a pulsed magnetic field, wherein FIG. 28A illustrates a relationship between the cycles of magnifying and reducing magnetic fields, and FIG. 28B illustrates the cycle of the laser beam pulse with respect to the alternating magnetic field.

FIG. 31 shows reproduction signals obtained when magnifying and reducing magnetic fields having various intensities are applied to the magneto-optical recording medium according to the second embodiment.

FIG. 57 shows a timing chart for explaining the principle of the reproducing method on the magneto-optical recording medium of the present invention.

FIG. 67 explains the process for reproducing the recording magnetic domain in the magneto-optical recording layer from the magneto-optical reproducing layer by irradiating the magneto-optical recording medium according to the ninth aspect with the optically modulated reproducing light beam, wherein FIG. 67A illustrates the directions of the magnetic domains in the recording layer and the reproducing layer, and FIG. 67B shows the optically modulated reproducing light power.

FIG. 68 illustrates the principle of the extinguishment of the magnetic domain, wherein

FIG. 87 shows a sectional view illustrating a magneto-optical head concerning the magneto-optical head shown in FIG. 85, in which the magnetic coil joined to an light-outgoing plane of the solid immersion lens is arranged between the solid immersion lens and the magneto-optical recording medium.

FIG. 88 shows a perspective view illustrating an appearance of a film-shaped magnetic coil used for the magneto-optical head.

BEST MODE FOR CARRYING OUT THE INVENTION

Figure 6:
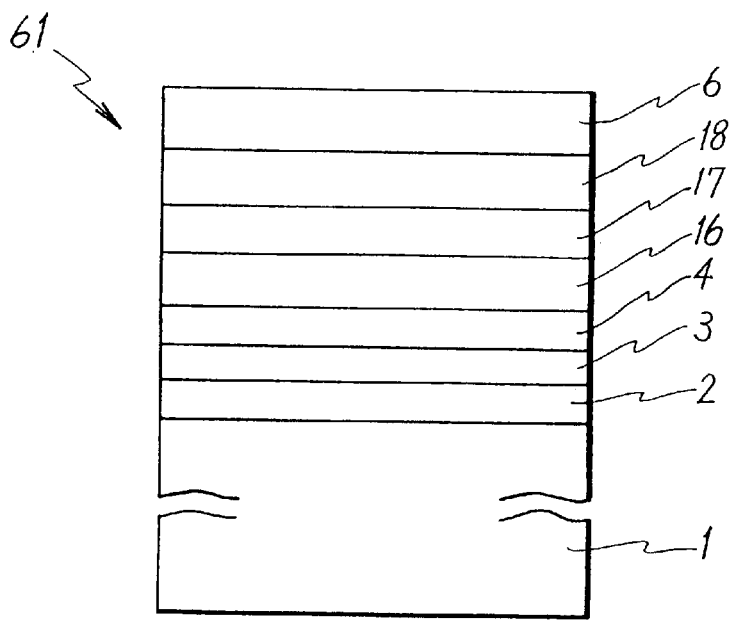
FIG. 6 shows a cross-sectional view illustrating a specified embodiment of a magneto-optical recording medium according to the second aspect of the present invention.

Embodiments of the magneto-optical recording media according to the first to tenth aspects of the present invention will be explained with reference to the drawings. FIG. 6 shows an example of the structure of the magneto-optical recording medium according to the second aspect of the present invention. The magneto-optical recording medium according to the first aspect of the present invention is obtained, with reference to FIG. 6, by replacing the gate layer 16, the exchange coupling force control layer 17, and the information-recording layer 18 with the information recording layer (information recording layer 75 shown in FIG. 7), and limiting the thickness of the information-recording layer in accordance with the present invention. Therefore, the following description for the medium structure basically relates to the construction of the magneto-optical recording medium according to the second aspect of the present invention. However, the following description is also applied to the magneto-optical recording medium according to the first aspect provided that the information-recording layer is not limited to the stacked structure composed of the gate layer 16, the exchange coupling force control layer 17, and the information-recording layer 18.

The magneto-optical recording medium 61 is provided as a recording medium which makes it possible to transfer only one of a plurality of minute magnetic domains in the information-recording layer to the magnetic domain-magnifying reproducing layer 3, and simultaneously magnify and reproduce the transferred magnetic domain in accordance with the principle as described above. The magneto-optical recording medium 61 comprises a dielectric layer 2, a magnetic domain-magnifying reproducing layer 3, a non-magnetic layer 4, a gate layer 16, an exchange coupling force control layer 17, an information-recording layer 18, and a transparent dielectric layer 6, the layers being successively stacked on a transparent substrate 1. A perpendicularly magnetizable film, in which the magnetic force resistance of the magnetization wall is smaller than the reproducing magnetic field upon irradiation with the reproducing light beam, can be used for the magnifying reproducing layer 3 as described above. It is possible to use, for example, a rare earth transition metal alloy such as GdFe, GdFeCo, and GdCo; an alloy or an alternately stacked material of a Pd or Pt layer and a Co layer; or a magnetic material of garnet-based oxide.

Preferably, the magnetic domain-magnifying reproducing layer 3 is constructed to have its compensation temperature of −100 to 50° C. When the compensation temperature is in the foregoing range, the saturation magnetization (Ms) is small in the vicinity of room temperature, and Ms is large only at a high temperature portion (the magnetization-retaining force or the coercive force is increased in the vicinity of room temperature, and the magnetization-retaining force is lowered at a high temperature). That is, the magnetization-retaining force Hc is lowered in an area of the magnetic domain-magnifying reproducing layer 3 in which the temperature is high at the central portion within the laser spot, because Ms is increased. Accordingly, only one recording magnetic domain, which is located in the information-recording layer existing under the high temperature area of the magnetic domain-magnifying reproducing layer 3, is transferred to the reproducing layer. Thus, only the transferred magnetic domain in the magnetic domain-magnifying reproducing layer 3 can be magnified by using the reproducing magnetic field. Therefore, the magnification and reproduction for the magnetic domain can be realized by using the simple structure by setting the compensation temperature of the magnetic domain-magnifying reproducing layer 3 to be −100 to 50° C.

Several methods are available to transfer, to the gate layer 16, only one magnetic domain of a plurality of magnetic domains in the information-recording layer irradiated with the reproducing laser beam spot. That is, there are (1) a method in which a magnetic domain in the information-recording layer 18 is transferred to the gate layer 16, the magnetic domain being in an area having a temperature higher than a predetermined temperature in a temperature distribution in the gate layer 16 and the information-recording layer 18 within the reproducing laser beam spot, (2) a method in which a magnetic domain in the information-recording layer 18 is transferred to the gate layer 16, the magnetic domain being in an area having a temperature lower than a predetermined temperature in a temperature distribution in the gate layer 16 and the information-recording layer 18 within the reproducing laser beam spot, and (3) a method in which a magnetic domain in the information-recording layer 18 is transferred to the gate layer 16, the magnetic domain being in an area within a predetermined temperature range in a temperature distribution in the gate layer 16 and the information-recording layer 18 within the reproducing laser beam spot.

Figure 1A:
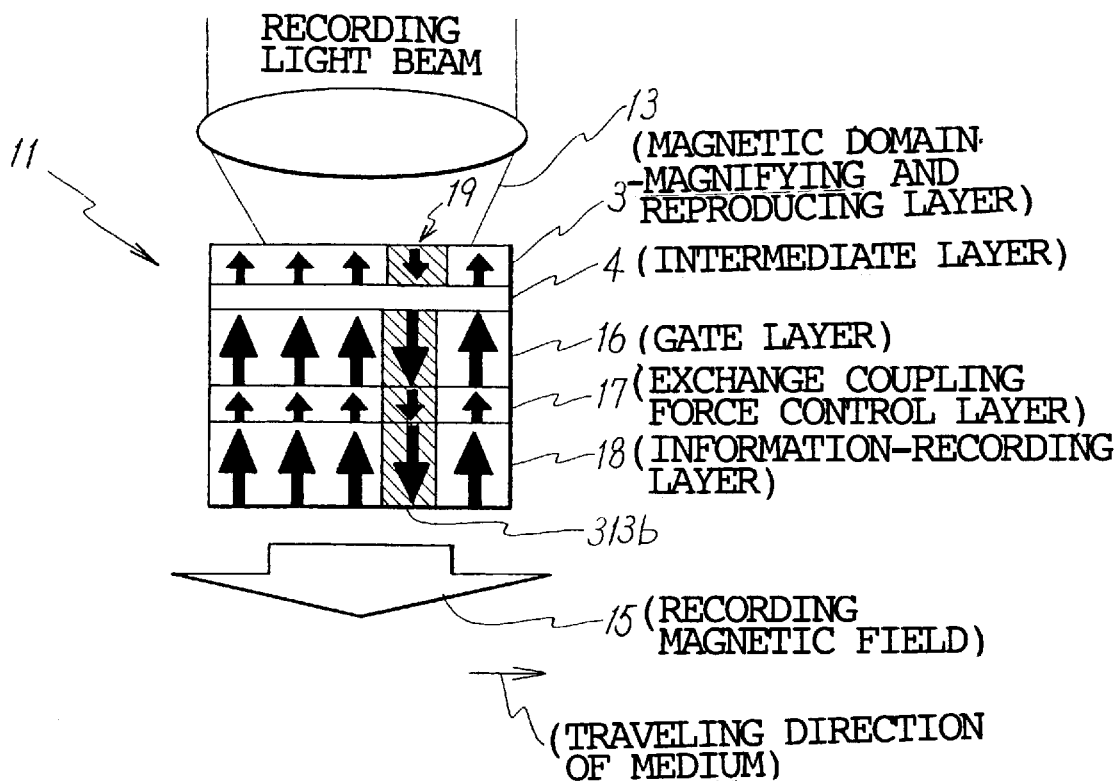
Figure 1B:
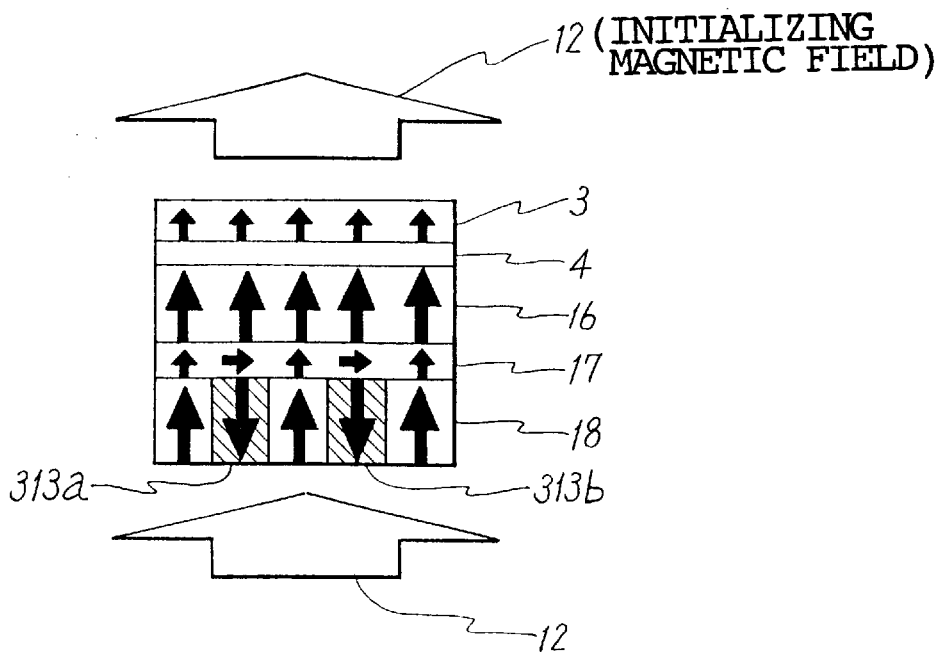
Figure 3:
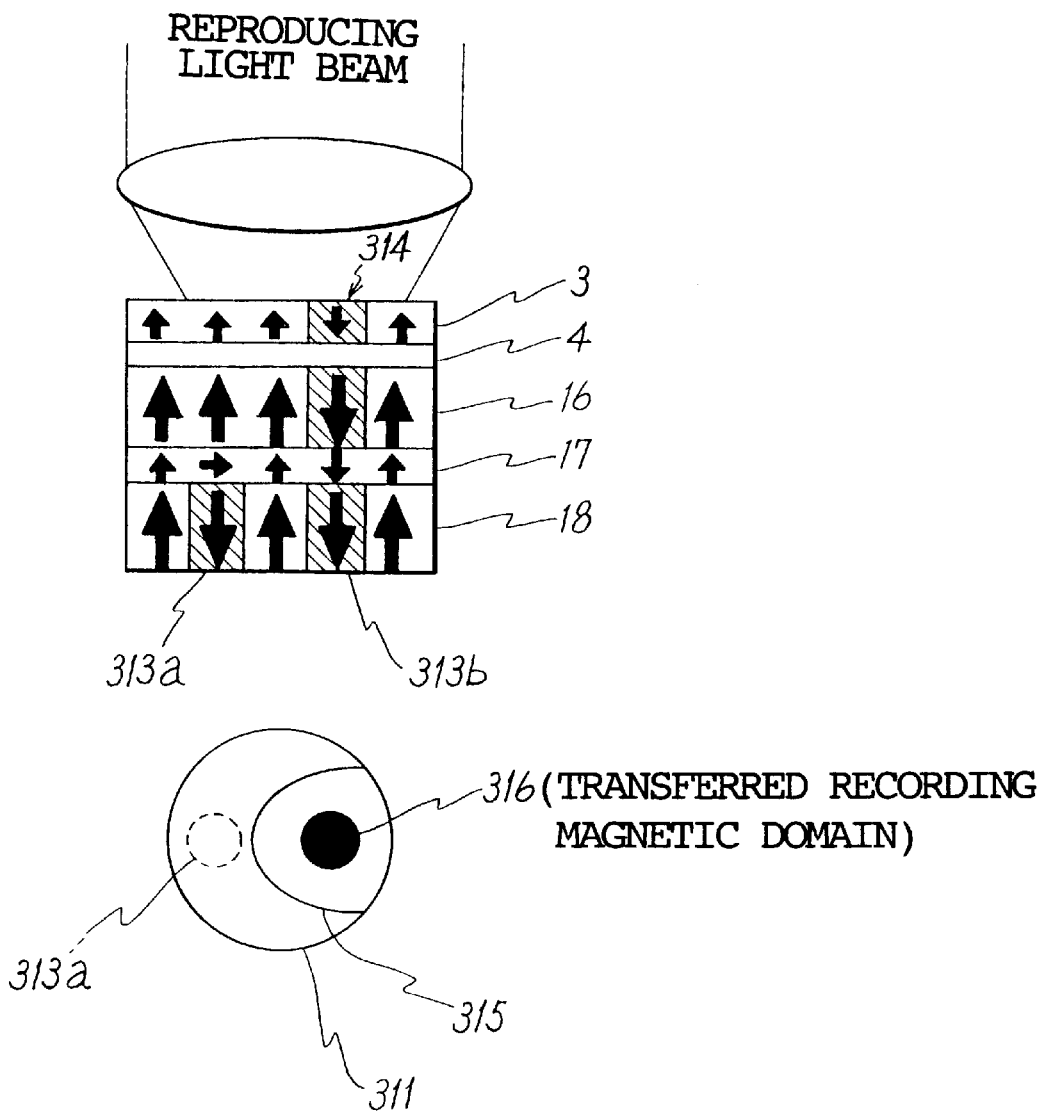
FIG. 3 explains the principle of magnetic transfer in which only one magnetic domain of a plurality of recording magnetic domains in an information-recording layer existing within a reproducing light beam spot is selected by the aid of a gate layer during reproduction on the magneto-optical recording medium of the present invention.

The method (1) has been described in the explanation for the principle of the present invention with reference to FIG. 3, which is based on the fact that the magnetization-retaining force is decreased in only the high temperature area in the gate layer irradiated with the reproducing laser beam spot, and only that portion undergoes the exchange coupling force exerted from the information-recording layer. That is, the magnetic domain is transferred from the information-recording layer to the gate layer only in the temperature area in which the magnetization-retaining force of the gate layer is smaller than the exchange coupling force exerted from the information-recording layer. In the method (2), the magnetization-retaining force of the high temperature portion of the gate layer irradiated with the reproducing laser beam spot is lowered in the same manner as in the method (1), and all of the magnetization of the high temperature portion is aligned to the external magnetic field when the external magnetic field is applied for magnification and reproduction. On the other hand, the magnetic domain in the information-recording layer 18 is transferred to the gate layer 16 at the low temperature portion by the aid of the exchange coupling force of the information-recording layer 18 and the gate layer 16. The film of this type preferably has a structure provided with an intermediate layer between the gate layer and the information-recording layer. It is possible to use, for example, Gd—Fe—Co (gate layer)/Tb—Fe—Co—Al (intermediate layer )/Tb—Fe—Co (information—recording layer). In the method (3), it is convenient to stack the gate layers exhibiting the characteristics as described in the foregoing (1) and (2). For example, a magnetic layer is provided as an upper layer in which the magnetic domain in the information-recording layer is transferred only in a high temperature area, and a magnetic layer is provided as a lower layer in which the magnetic domain in the information-recording layer is transferred only in a low temperature area. Without adopting the stacked structure, a single magnetic layer may be used to construct a magnetic layer in which the magnetic domain in the information-recording layer is transferred only in a predetermined temperature range as well. For example, in the case of the use of a magnetic material in which the compensation temperature Tcom exists in the vicinity of room temperature, and the magnetization-easy axis is directed in the in-plane direction in the film at a predetermined temperature TCR, transfer from the information-recording layer occurs only at a temperature of (Tcom+ΔT) to TCR which is higher to some extent than the compensation temperature depending on the magnetic material.

In general, the Curie temperature of the information-recording layer is usually about 250° C., considering the power of semiconductor lasers available as products. Therefore, the upper limit of the recording film subjected to the increase in temperature caused by the reproducing light beam spot is about 170° C., because of the following reason. That is, if the temperature is higher than the above, the magnetization-retaining force of the information-recording layer is decreased, and hence the recording magnetic domain possibly changes. Therefore, in the method (2) described above, it is preferable to design the respective magnetic layers so that magnetic domains in the information-recording layer 18 in an area at a temperature lower than 170° C. are transferred to the gate layer 16. In general, the temperature in the magneto-optical recording and reproducing apparatus is about 50° C. Accordingly, in order to make a difference from the critical temperature in the method (1) so that only one magnetic domain in the information-recording layer 18 is distinguished by using the gate layer 16, a margin of 30° C. is necessary at the minimum. Therefore, it is preferable to design the respective magnetic layers in the method (1) so that magnetic domains in the information-recording layer 18 in a high temperature area of not less than 80° C. are transferred to the gate layer 16. Because of the same reason, it is preferable to design the respective magnetic layers of the magneto-optical recording medium in the method (3) so that magnetic domains in the information-recording layer 18 in a temperature range of 80° C. to 170° C. are transferred to the gate layer 16.

In general, the information-recording layer is required to have such a characteristic that the magnetization-retaining force Hc is several times larger than the reproducing magnetic field even at the temperature of the center of the light beam spot during reproduction. Those usable for the information-recording layer include, for example, rare earth transition metal alloys such as TbFeCo, GdTbFeCo, DyFeCo, GdDyFeCo, GdDyTbFeCo, and/or those added with non-magnetic elements such as Cr and T1 as added elements; Pt—Co alloys; Pt/Co two-layered films; and garnet materials. In general, it is necessary for the gate layer that the magnetization-retaining force Hc is considerably smaller than that of the information-recording layer. Those usable as the gate layer include, for example, rare earth transition metal alloys such as GdFeCo, GdFe, and GdW; Pd—Co alloys; Pt—Co alloys; Pd/Co two-layered films; Pt/Co two-layered films; and garnet. In order to facilitate the control for magnification and reduction of the magnetic domain in the magnetic domain-magnifying reproducing layer, the thickness (h) of the gate layer+the exchange coupling force control layer+the information-recording layer preferably satisfies $(h/r) \geqq 0.5$ for the radius (r) of the minimum magnetic domain subjected to recording in the information-recording layer. According to this limitation, the magnetic domain can be reliably transferred by the aid of the leak magnetic field or the magnetic field leakage directed from the information-recording layer toward the magnetic domain-magnifying reproducing layer. Further, it is possible to obtain a relatively flat distribution of the leak magnetic field in the in-plane direction in the layer. Therefore, it is easy to control magnification and reduction of magnetic domains in the magnetic domain-magnifying reproducing layer.

In the magneto-optical recording medium of the present invention, as shown in FIG. 6, the non-magnetic layer 4 can be inserted between the magnetic domain-magnifying reproducing layer 3 and the gate layer 16 (the information-recording layer in the magneto-optical recording medium according to the first aspect). Those usable as a material for the non-magnetic layer include dielectrics such as $SiO_2$, AlN, and SiN; metals such as Al, AlTi, Au, Ag, Cu, AuAl, and AgAl; and structural materials in which metals and dielectrics are stacked. When the non-magnetic layer 4 exists between the magnetic domain-magnifying reproducing layer 3 and the gate layer or the information-recording layer 18, an advantage is obtained in that the magnetic domain transferred to the magnetic domain-magnifying reproducing layer 3 is smoothly magnified and reduced by the aid of the reproducing magnetic field. The magnetic domain in the information-recording layer 18 is magnetostatically transferred via the gate layer to the magnetic domain-magnifying reproducing layer 3 by the aid of the leak magnetic field from the gate layer+the exchange coupling force control layer+the information-recording layer (or simply the information-recording layer). The non-magnetic layer 4 may be constructed by a single layer or a multi-layered film. When the non-magnetic layer 4 exists between the magnetic domain-magnifying reproducing layer 3 and the gate layer 16 in the magneto-optical recording medium of the present invention, the magnetic domain is transferred in accordance with the magnetostatic coupling between the magnetic domain-magnifying reproducing layer 3 and the combined magnetic field of the leak magnetic field concerning the magnetic domain transferred to the gate layer 16 and the magnetic domain written in the information-recording layer 18. When the non-magnetic layer 4 does not exist, the magnetic domain transferred from the information-recording layer 18 to the gate layer 16 is magnetically transferred to the magnetic domain-magnifying reproducing layer 3 by the aid of the exchange coupling magnetic filed of the gate layer 16 and the magnetic domain-magnifying reproducing layer 3.

In the magneto-optical recording medium 61 shown in FIG. 6, the dielectric layers 2, 6 can be composed of, for example, nitrides and oxides. The interference effect of the reproducing light beam in the dielectric layer makes it possible to increase the apparent Kerr rotation angle. In addition to the layers shown in FIG. 6, it is allowable to form a metal reflective layer composed of, for example, Al alloy, Au alloy, silver alloy, or copper alloy on the non-magnetic layer 4 on the side of the magnetic domain-magnifying reproducing layer 3 (or as a part of the non-magnetic layer) in order to obtain a uniform temperature distribution in the magnetic domain-magnifying reproducing layer 3. When the track center of the magnetic domain-magnifying reproducing layer 3 has a temperature higher than those of outer portions upon application of the reproducing magnetic field, those included in an area not corresponding to the magnetic domain subjected to recording in the information-recording layer tend to be inverted by the reproducing magnetic field. For this reason, it is avoided that only the track center has a high temperature, by allowing the heat to escape owing to the provision of the metal reflective layer. Thus, it is possible to avoid inversion of magnetic domains at unnecessary portions in the reproducing layer when the reproducing magnetic field is applied.

As described above, the portion of (the gate layer 16+the exchange coupling force control layer 17+the information-recording layer 18) shown in FIG. 6 may be replaced with the information-recording layer. In this arrangement, the compensation temperature of the magnetic domain-magnifying reproducing layer 3 or the information-recording layer may be adjusted to be −100 to 50° C. For example, a rare earth transition metal is used as a magnetic material for the information-recording layer, and the compensation temperature is set to be −100 to 50° C. in the same manner as the magnetic domain-magnifying reproducing layer so that the leak magnetic field is increased only at a high temperature portion. Thus, it is possible to perform reproduction while magnifying a magnetic domain of 0.3 micron three times.

When the portion of (the gate layer 16+the exchange coupling force control layer 17+the information-recording layer 18) is simply replaced with the information-recording layer, it is possible to provide, between the magnetic domain-magnifying reproducing layer 3 and the gate layer 16, a magnetic layer or an intermediate layer which behaves as an in-plane magnetizable film at room temperature, which makes transition from the in-plane magnetizable film to a perpendicularly magnetizable film within a temperature range of 80 to 150° C., and which behaves as the perpendicularly magnetizable film at a temperature higher than the above. Owing to the intermediate layer, even when a plurality of magnetic domains exist in the reproducing light beam spot, the focusing effect of the gate layer makes it possible to allow only one minute magnetic domain smaller than the reproducing light beam spot to emerge (or to be transferred) onto the magnetic domain-magnifying reproducing layer.

Explanation will be made below more specifically for embodiments of the magneto-optical recording media according to the first to tenth aspects with reference to the drawings.

First Embodiment

Figure 7A:
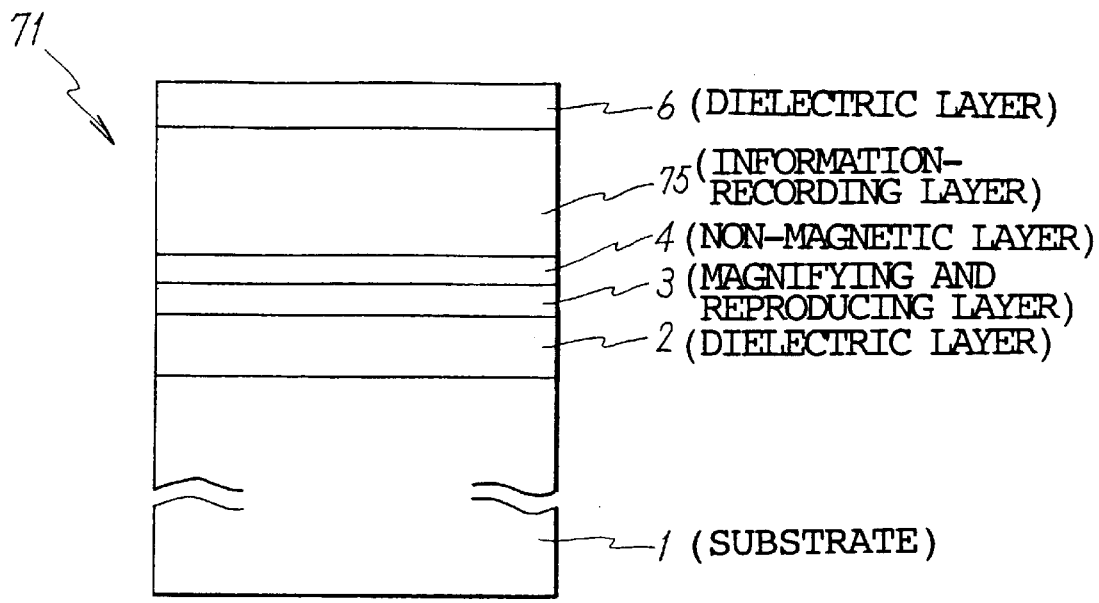
FIGS. 7A and 7B show cross-sectional views illustrating specified embodiments of the magneto-optical recording medium according to the first embodiment and the second embodiment respectively.

FIG. 7A shows an example of a cross-sectional structure of a magneto-optical recording medium 71 according to the present invention. The magneto-optical recording medium 71 comprises a dielectric layer 2, a magnifying reproducing layer 3, a non-magnetic layer 4, an information-recording layer 75, and a dielectric layer, the layers being successively stacked on a transparent substrate 1. A polycarbonate substrate having a thickness of 1.2 mm was used as the transparent substrate 1. A silicon nitride material having a film thickness of 70 nm was used as the dielectric layers 2, 6. A GdFeCo alloy having a film thickness of 20 nm, a compensation temperature of −10° C., and a Curie temperature of 350° C. was used as the magnifying reproducing layer 3. A silicon nitride material having a film thickness of 15 nm and an Al alloy having a film thickness of 10 nm were used as the non-magnetic layer 4. A TbFeCo alloy having a film thickness of 200 nm, a compensation temperature of −50° C., and a Curie temperature of 270°C. was used as the information-recording layer 75. Films of these layers were formed by means of sputtering by using a magnetron sputtering apparatus respectively.

Predetermined data was recorded on the magneto-optical recording medium 71 shown in FIG. 7A by using the recording and reproducing apparatus shown in FIG. 2 in accordance with the magneto-optical field modulation system. Details of recording and reproduction based on the magneto-optical field modulation system will be explained, for example, in the fourth embodiment described later on. Alternatively, as explained in another embodiment, the magnetic field modulation system may be used to form recording magnetic domains in the information-recording layer so that the magnetic domain length of the minimum magnetic domain in the widthwise direction of the track is shorter than the length in the linear direction. The optical head shown in FIG. 2 had a laser wavelength of 680 nm, and an optical system having a numerical aperture of 0.55 was used. The effective spot radius was 1.2 micron. Therefore, when continuous magnetic domains each having a size of 0.4 micron are recorded on the magneto-optical recording medium 71, two magnetic domains simultaneously exist within the reproducing light beam spot. In the present invention, the two magnetic domains can be separated and reproduced by using the gate layer included in the magneto-optical recording medium.

At first, the reproducing power was set to be 1.0 mV to perform reproduction. However, the recording magnetic domain was not transferred to the magnifying reproducing layer 3, and no reproduction signal appeared, because of the following reason. That is, the compensation temperature of the magnifying reproducing layer 3 of the magneto-optical recording medium 71 was not more than room temperature, and it was impossible to heat the magnifying reproducing layer 3 up to a temperature sufficient to transfer the recording magnetic domain to the magnifying reproducing layer 3 by using the reproducing power of 1.0 mW. No reproduction waveform appeared as well even when the reproducing power was 1.8 mW.

Subsequently, when the reproducing power was increased to 2.0 mW, an area having a diameter of about 0.7 micron in the vicinity of the center of the spot on the magnifying reproducing layer 3 was heated to be not less than 80 ° C. Only one magnetic domain having a size of 0.4 micron was transferred to the heated area on the magnifying reproducing layer 3. That is, the two magnetic domains in the information-recording layer 5 existing in the spot were successfully distinguished from each other to perform reproduction, because of the following reason. The saturation magnetization at room temperature is smaller than 100 emu/cc in any of the information-recording layer 5 and the magnifying reproducing layer 3, and hence no magnetic domain in the information-recording layer 5 was transferred to low temperature portions at 80° C. or less in the light beam spot. That is, the recording magnetic domain of 0.4 micron was successfully transferred only to the area of the magnifying reproducing layer 3 heated to the temperature higher than 80° C. A reproduction waveform obtained in this procedure is shown in FIG. 8A. No reproducing magnetic field was applied (H=0) during the reproduction. A signal of an alternating magnetic field is simultaneously shown in a lower part of FIG. 8A.

Subsequently, the recording data was reproduced from the magneto-optical recording medium 71 under the same condition as described above by applying, to the magnetic head, an alternating magnetic field as the reproducing magnetic field of H=±215 (Oe) with modulation in synchronization with a recording clock. As a result, a reproduction waveform was obtained as shown in FIG. 8C. In the reproduction signal shown in FIG. 8C, the amplitude of the reproduction signal is increased threefold as compared with the signal obtained with no reproducing magnetic field (FIG. 8A). The amplitude should not be increased if the transferable area for the magnetic domain was merely increased by the aid of the reproducing magnetic field. However, in fact, the amplitude was increased threefold, indicating the occurrence of magnification (and reduction) of the magnetic domain transferred to the magnifying reproducing layer 3. FIG. 8B shows a waveform obtained when an alternating magnetic field of H=±130 (Oe) was applied in synchronization with the recording clock. It is understood that the amplitude of the reproduction signal was also increased in this case as compared with the case in which no reproducing magnetic field was applied. FIG. 8D shows a waveform obtained when an alternating magnetic field of H=±260 (Oe) was applied in synchronization with the recording clock. In this case, the amplitude of the reproduction signal was slightly decreased as compared with the case of H=±215 (Oe), probably because of the following reason. That is, magnetic domains in the magnifying reproducing layer 5 corresponding to an area including no recording magnetic domain were also inverted due to the too large reproducing magnetic field, and the reducing reproducing magnetic field failed to erase the inverted magnetic domains. That is, the signal amplitude was apparently decreased since the base line of the signal level was raised when the reducing magnetic field was applied.

Reproduction was performed while changing the film thickness from 200 nm to 70 nm for the information-recording layer 5 composed of TbFeCo of the magneto-optical recording medium 71, under the same reproducing condition as that used when the alternating magnetic field of H=±215 (Oe) was applied. In this case, the reproduction waveform was instantaneously increased by the alternating reproducing magnetic field, however, magnetic domains were immediately linked with adjacent magnetic domains, and it was impossible to detect individual magnetic domains, probably because of the following reason. That is, the film thickness of TbFeCo of the information-recording layer 3 was thin as compared with the size of the recording magnetic domain, and hence the leak magnetic field thereof was insufficient. According to experiments performed by the present inventors, the following fact has been revealed. That is, the information-recording layer has its film thickness which is required to be at least 100 nm or more in order to magnify and reproduce the magnetic domain of 0.4 micron. Therefore, it is preferable that the ratio (h/r) of the thickness (h) of the recording layer to the length (r) in the linear direction (the track direction) of the minimum recording magnetic domain is not less than 0.5.

Second Embodiment

Figure 7B:
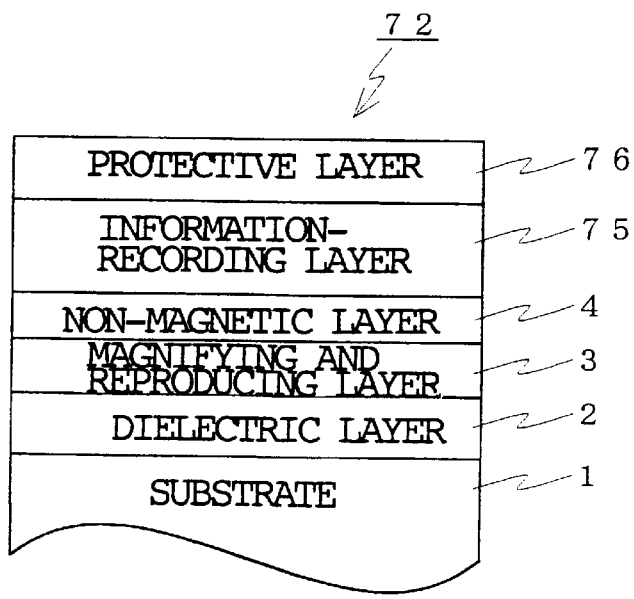

This embodiment illustrates another specified embodiment of the magneto-optical recording medium having a structure equivalent to that of the magneto-optical recording medium shown in FIG. 7A. This specified embodiment of the magneto-optical recording medium corresponds to the second aspect of the present invention. With reference to FIG. 7B, the magneto-optical recording medium 72 has a structure comprising a dielectric layer 2 composed of SiN, a magnifying reproducing layer (hereinafter abbreviated as "magnifying layer") 3 composed of GdFeCo, a non-magnetic layer 4 composed of SiN/AlTi, an information-recording layer (hereinafter abbreviated as "recording layer") 75 composed of TbFeCo, and a protective layer 76 composed of SiN, the layers being successively stacked on a light-transmissive substrate 1 made of, for example, glass or polycarbonate. The film thickness of the dielectric layer 2 may be adjusted to be 600 to 800 angstroms (hereinafter indicated by "A"). The film thickness of the reproducing layer 3 may be adjusted to be 50 to 1000 A. The film thickness of the non-magnetic layer 4 may be adjusted to be 50 to 300 A. The film thickness of the recording layer 75 may be adjusted to be 500 to 3000 A. The film thickness of the protective layer 1 may be adjusted to be 500 to 1000 A. The respective layers can be formed by means of the magnetron sputtering method by using Ar as a sputtering gas.

In the stacked structure shown in FIG. 7A, the reproducing layer 3 is not limited to GdFeCo, which may be GdFe, GdCo, or TbCo, or a magnetic film composed of one element selected from Ho, Gd, Tb, and Dy, and one element selected from Fe, Co, and Ni. In place of SiN/AlTi, the non-magnetic layer 4 may be composed of AlN, TiN, $SiO_2$, $Al_2O_3$, SiC, TiC, ZnO, SiAlON, ITO, or $SnO_2$. The recording layer 75 is not limited to the TbFeCo alloy, which may be a single-layered magnetic film or a multi-layered magnetic film composed of an element selected from Tb, Dy, and Nd, and an element selected from Fe, Co, and Ni. The recording layer 75 may be a single-layered magnetic film or a multi-layered magnetic film composed of an element selected from Pt and Pd, and an element selected from Fe, Co, and Ni. Further, it is also possible to use other materials which can be used for the reproducing layer, the recording layer, and the non-magnetic layer as disclosed herein.

Figure 17:
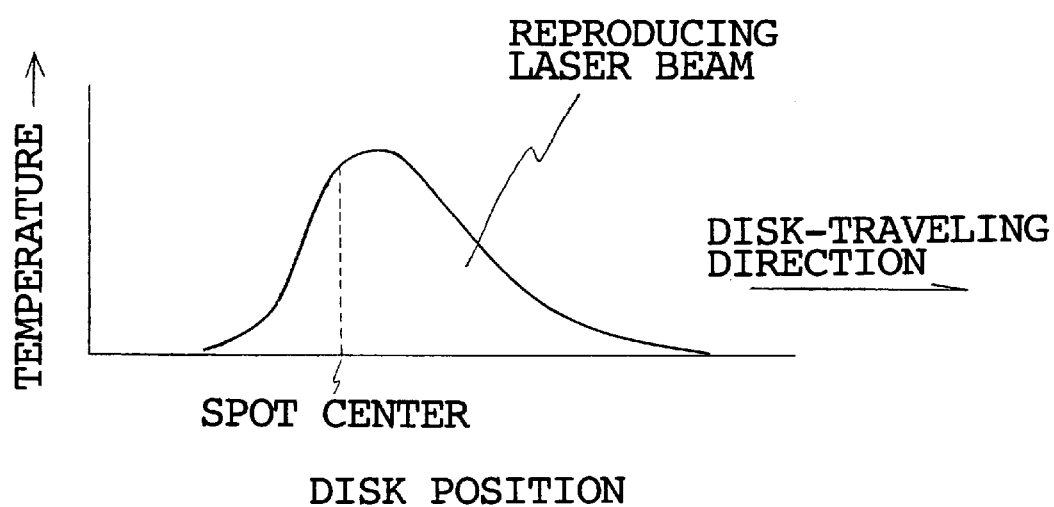
FIG. 17 shows a temperature distribution depending on the position on the disk, of a reproducing laser light beam spot.

The principle of the magneto-optical recording medium of the present invention will be explained with reference to FIG. 17 and FIGS. 18A and 18B. In the case of the magneto-optical recording medium 72 of this specified embodiment, a minute magnetic domain 7 in the recording layer 75 is firstly transferred to the reproducing layer 3 in accordance with magnetostatic coupling by radiating the reproducing laser beam, and then the transferred magnetic domain is magnified and reproduced. When the magneto-optical recording medium is irradiated with the reproducing laser beam, the temperature distribution usually occurs on the medium as shown in FIG. 17. FIG. 17 shows a graph illustrating the relationship of the temperature with respect to the position in the track direction, obtained when the magneto-optical disk is irradiated with the reproducing light beam in a spot form. A high temperature area exists at the backward position from the spot center of the reproducing light beam. This temperature distribution can be utilized to transfer only magnetization of the recording layer 75 in a specified temperature area to the reproducing layer 3.

Figure 18A:
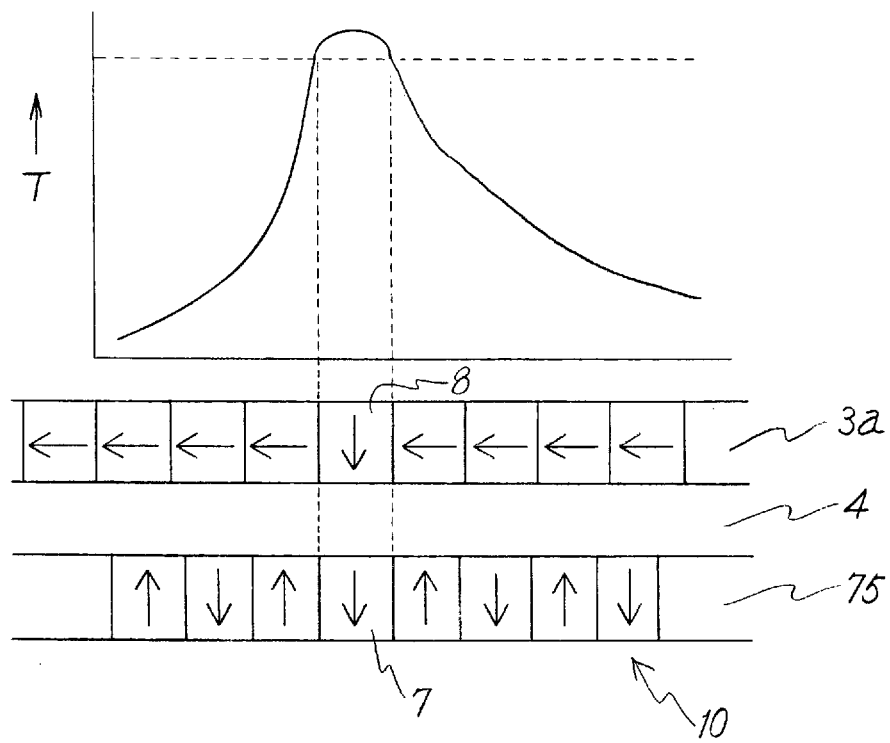

With reference to FIG. 18A, explanation will be made for the process in which magnetization of the recording layer 75 is transferred to the reproducing layer 3a only at the central portion (high temperature portion) of the reproducing light beam spot. For convenience of explanation, only the recording layer 75, the non-magnetic layer 4, and the reproducing layer 3a are shown in FIG. 18A, over which the temperature distribution, obtained when the magneto-optical recording medium is irradiated with the reproducing light beam spot, is simultaneously shown. When the magneto-optical recording medium is irradiated with the reproducing light beam spot, only a magnetic domain 7 in the recording layer 75 in the high temperature area having a temperature not less than a predetermined temperature is transferred to the reproducing layer 3 via the non-magnetic layer 4. A magnetic domain 8, which has the same magnetization as that of the magnetic domain 7 in the recording layer 75, appears in the reproducing layer 3a. In this case, the magnetic domain is transferred from the recording layer 75 to the reproducing layer 3a via the non-magnetic layer 4. Accordingly, the transfer is effected by the magnetostatic coupling rather than by the exchange coupling force. In order to perform this type of transfer, it is preferable to use, as the reproducing layer 3a, a magnetic film which behaves as an in-plane magnetizable film at room temperature, and which behaves as a perpendicularly magnetizable film at a temperature not less than a predetermined temperature (critical temperature). The critical temperature is usually within a range of 100 to 170° C. It is preferable to use a magnetic film which quickly changes from an in-plane magnetizable film to a perpendicularly magnetizable film when it arrives at a temperature within the foregoing range. An index to indicate the degree of quick change from the in-plane magnetizable film to the perpendicularly magnetizable film is exemplified by the temperature coefficient C of the Kerr rotation angle. The magneto-optical recording medium according to this embodiment uses a magnetic film having a temperature coefficient C of not less than 8.0. When the magnetic film, which behaves as an in-plane magnetizable film at room temperature, and which behaves as a perpendicularly magnetizable film at a temperature not less than the critical temperature, is used as the reproducing layer in the magneto-optical recording media according to the various aspects (the first to twenty-second aspects) of the present invention, it is preferable to use the magnetic film having a temperature coefficient C of not less than 8.0. For details of the calculating method for the temperature coefficient C, reference may be made to "Washimi et al, Proceedings of 43th Lecture Meeting of Applied Physics Society Association, 27p-PD-26 (1996)".

In order to carry out the transfer of the type shown in FIG. 18A, it is appropriate to use GdFeCo, GdFe, and GdCo for the magnetic film to be used for the reproducing layer 3a. The materials described in this embodiment can be used as materials for constructing the non-magnetic layer 4 and the recording layer 75.

Figure 18B:
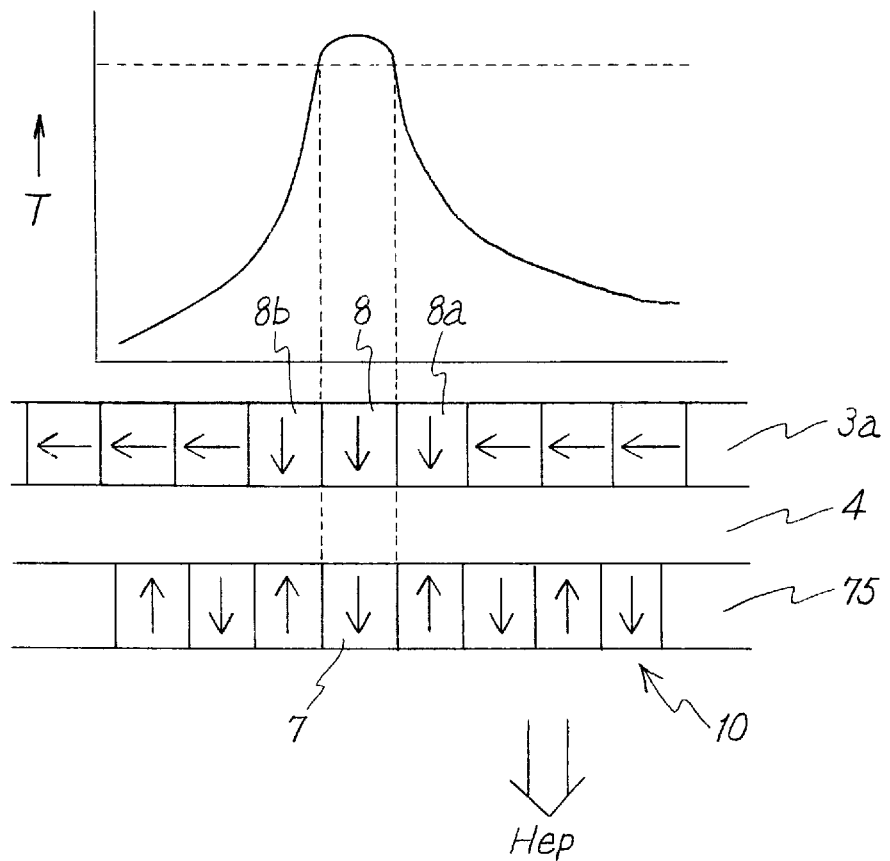

After the magnetization of the magnetic domain 7 is transferred as the magnetic domain 8 to the reproducing layer 3a, an external magnetic field Hep is applied to magnify the magnetic domain 8 as shown in FIG. 18B. An alternating magnetic field is used as the external magnetic field Hep to be applied. When the polarity of the alternating magnetic field is identical with that of the magnetization of the magnetic domain 8 transferred to the reproducing layer 3a, magnetic domains 8a, 8b having the same direction as that of the magnetization of the magnetic domain 8 appear in both areas adjacent to the magnetic domain 8. Thus, the transferred magnetic domain 8 is magnified. The moment the transferred magnetic domain 8 is magnified, it is detected as a reproduction signal by the reproducing apparatus described later on.

Figure 5A:
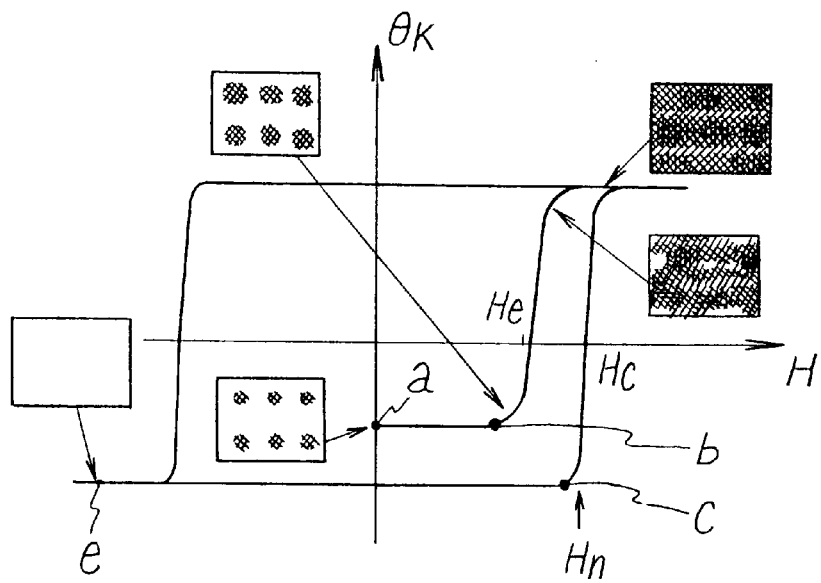

The magnitude Hep of the magnifying reproducing magnetic field applied upon the reproduction, and the relationship between the foregoing magnetic field and the size of the mark (magnetic domain) appearing on the reproducing layer 3a have been exactly explained in the foregoing section of the explanation for the principle with reference to the hysteresis curve shown in FIG. 5A.

Figure 19:
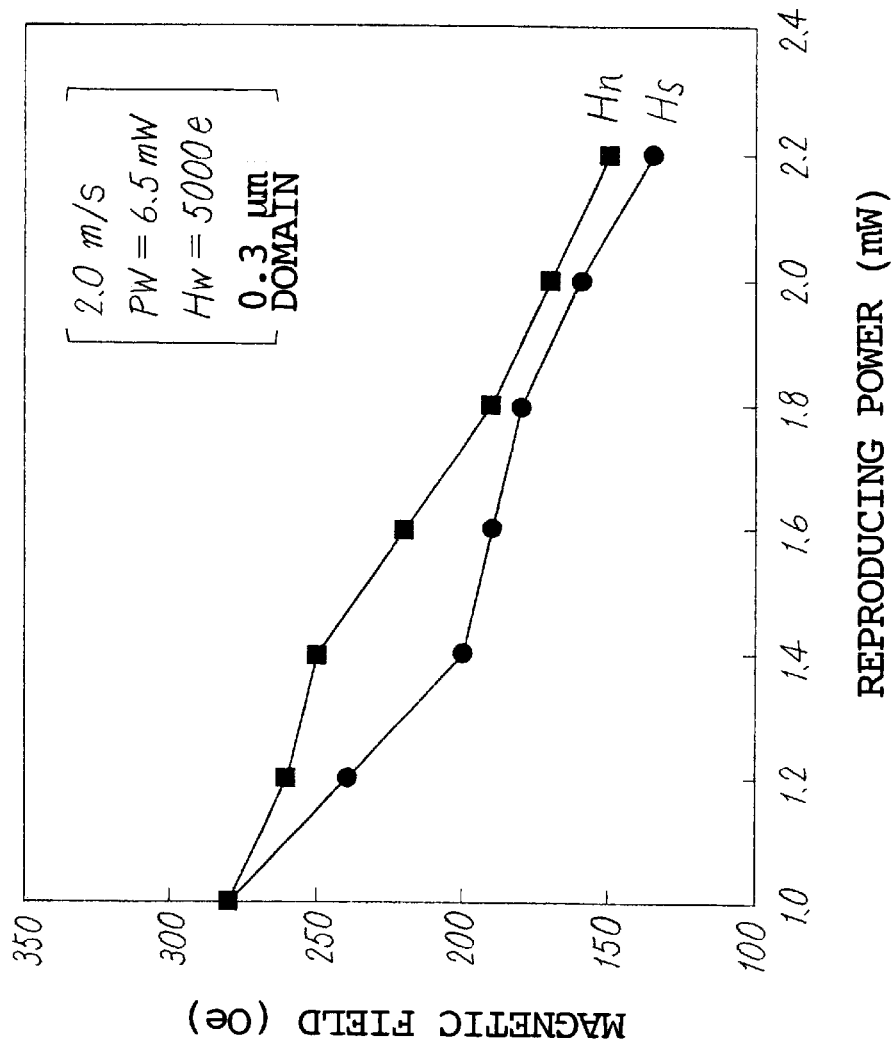
FIG. 19 shows a graph illustrating dependency of Hs and Hn on the power of the reproducing light beam, measured by using the magneto-optical recording medium according to the second embodiment.

FIG. 19 shows dependency of Hn and He measured by using the magneto-optical recording medium 72 shown in FIG. 7B, on the reproducing power. The reproducing laser beam had a wavelength of 830 nm. When the reproducing laser beam power is in a range of 1.0 to 2.2 mW, a distinct difference exists between He and Hn. Therefore, the external magnetic field Hep may be determined between Hs and Hn determined depending on the respective reproducing powers. For example, when the reproducing laser beam power is 1.4 mW, the external magnetic field Hep may be set between 200 and 250 (Oe). According to FIG. 19, the external magnetic field Hep can be decreased in accordance with increase in the reproducing laser beam power. The frequency of the alternating magnetic field can be within a range of 0.5 to 2 MHz.

Figure 20:
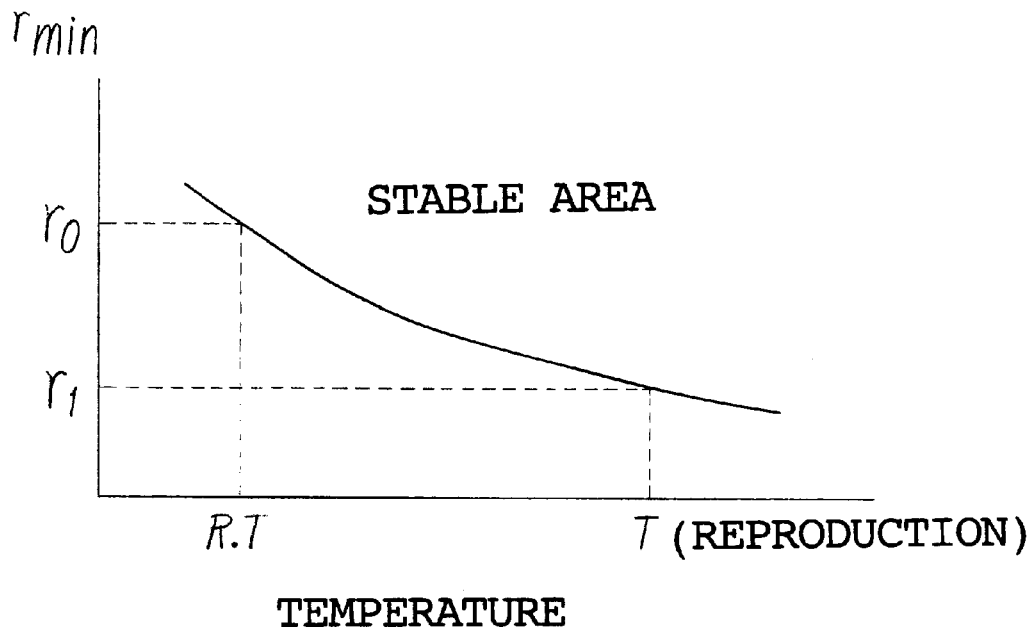
FIG. 20 shows a graph illustrating the minimum stable magnetic domain radius ran of the magnetic domain which can stably exist, with respect to the temperature.

After transferring the magnetic domain to the reproducing layer 3a and magnifying and reproducing the magnetic domain by the aid of the external magnetic field, it is necessary to once erase the magnified magnetic domain in order to transfer, magnify, and reproduce the next magnetic domain. Two methods are available to erase the magnetic domain. One of the methods is based on the use of the minimum stable magnetic domain radius determined depending on the type of the magnetic film. The size of the recorded magnetic domain provides different stabilities depending on the atmospheric temperature, and it is difficult for minute magnetic domains to stably exist at a low temperature. FIG. 20 shows the minimum stable magnetic domain radius $r_{min}$ of the magnetic domain which can be stably exist as defined in the expression (1) described above, with respect to the temperature. The minimum stable magnetic domain radius $r_{min}$ decreases as the temperature of the magnetic film increases. In the case of GdFeCo used for the reproducing layer 3, $r_{min}$ at room temperature is 0.5 to 0.6 μm, and $r_{min}$ at 120° C. is 0.1 μm. That is, magnetic domains of not less than 0.1 μm can stably exist at 120° C. However, magnetic domains having a size of 0.1 μm cannot stably exist no longer, and such magnetic domains disappear. Therefore, the magnetic domain behaves as follows on the basis of this principle. That is, the magnetic domain in the recording layer is transferred to the reproducing layer at the central portion (high temperature area) within the reproducing light beam spot, and it is magnified by the aid of the magnifying reproducing magnetic field. After that, when the magnetic domain enters the low temperature portion within the reproducing light beam spot, the minimum stable magnetic domain radius becomes large with respect to the transferred and magnified magnetic domain. Accordingly, the magnetic domain spontaneously disappears. The method for erasing the magnified magnetic domain is not limited to this embodiment, which is applicable to the magneto-optical recording media and the reproducing methods therefor according to all of the aspects of the present invention.

Figure 4A:
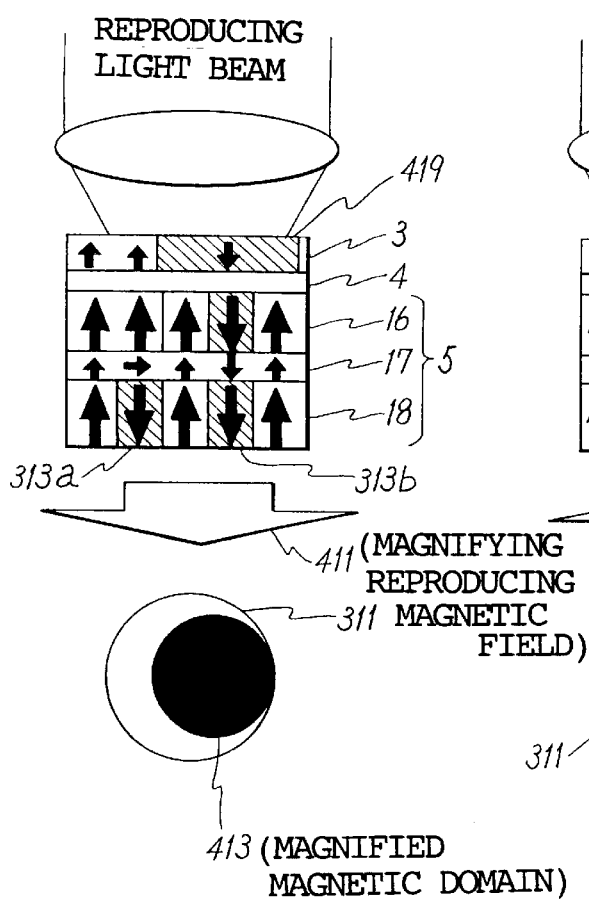
Figure 4B:
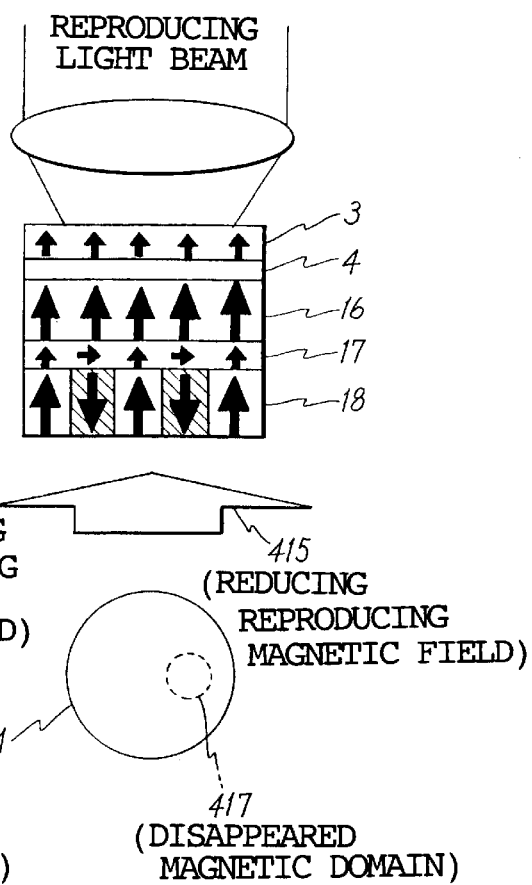
Figure 5B:
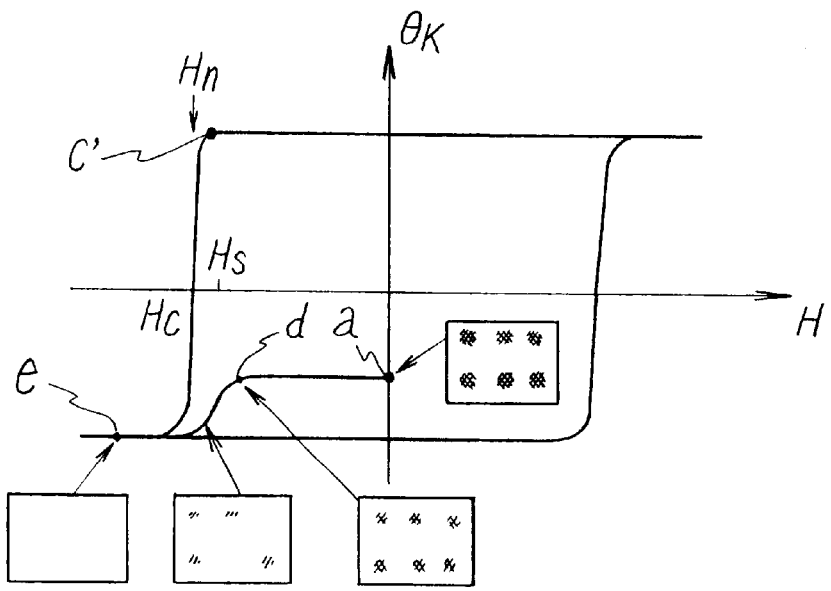
Figure 21:
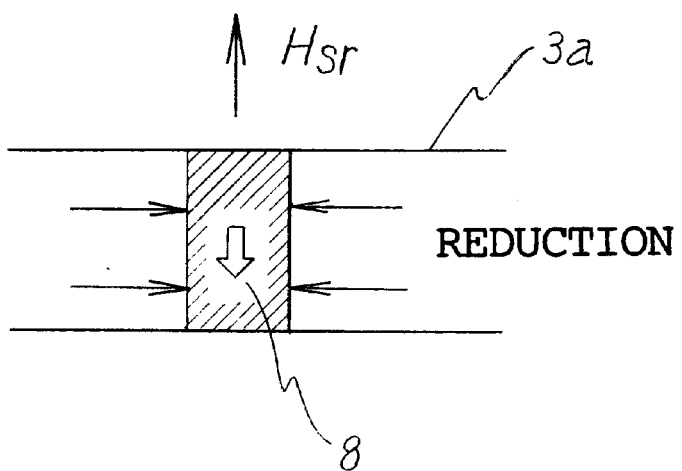
FIG. 21 explains the principle to disappear the magnetic domain magnified on the magneto-optical recording medium according to the second embodiment by applying the reducing magnetic field.

The other method for erasing the magnetic domain transferred to the reproducing layer 3 and magnified therein is based on the application of a magnetic field Hsr having a direction opposite to that of the external magnetic field Hep applied when the magnetic domain is magnified, as explained in relation to FIG. 5B in the foregoing explanation for the principle. FIG. 21 conceptually shows, in a magnified manner, the neighborhood of the magnetic domain 8 in the reproducing layer 3a shown in FIG. 18B, illustrating a situation in which the magnified magnetic domains 8a, 8b are reduced by applying the magnetic field Hsr in the direction opposite to that of the external magnetic field Hep. The magnetic field Hsr used to reduce the magnetic domain can be determined on the basis of the hysteresis curve shown in FIG. 4B. The principle of reducing the magnetic domain has been already explained in relation to FIG. 5B, which will not be described again.

The wavelength of the laser beam used to transfer and magnify the magnetic domain, i.e., used for reproduction is preferably 300 to 830 nm. The objective lens for collecting the laser beam may have a numerical aperture of 0.55 (allowable error:±0.05). The spot radius of the laser beam may be 1.0 μm (allowable error:±0.1).

In this specified embodiment, explanation has been made for the case in which the minute magnetic domain in the recording layer 75 existing in the high temperature area at the central portion within the reproducing light beam spot is transferred to the reproducing layer 3. Besides, it is allowable to use a method for transferring a magnetic domain existing in a backward high temperature area or in a frontward low temperature area within the reproducing light beam spot. In the case of the magneto-optical recording medium of the former type, a perpendicularly magnetizable film is used for the reproducing layer, and it is necessary to apply an initializing magnetic field in order to align the magnetization direction of the reproducing layer 3 before being irradiated with the reproducing laser beam. When the medium is irradiated with the laser beam, magnetization of a magnetic domain having a temperature raised to a predetermined temperature or higher is transferred from the recording layer 75 to a magnetic domain in the reproducing layer 3 via the non-magnetic layer 4 in accordance with magnetostatic coupling. After that, the operation is performed for magnifying (and erasing) the magnetic domain as shown in FIG. 18B. Those preferably used for the reproducing layer appropriate for the system to perform transfer by using the high temperature area at the backward portion within the reproducing light beam spot include a magnetic film composed of an alloy containing one or more rare earth metals such as Tb, Dy, and Gd, and one or more transition metals such as Fe, Co, and Ni. It is preferable to use, for example, GdFeCo, GdFe, GdCo, and TbCo. Those used for the non-magnetic layer 4 and the recording layer 75 may be selected from those described above.

In the method for transferring the magnetic domain existing in the frontward low temperature area within the reproducing light beam spot, a perpendicularly magnetizable film is used for the reproducing layer. The perpendicularly magnetizable film is based on the use of a magnetic layer having such a property that magnetization is erased when it is irradiated with the reproducing laser beam to raise the temperature to be not less than a predetermined temperature (Curie temperature). In this case, the direction of magnetization of the recording layer 75 is coincident with that of the reproducing layer 3 when the signal is recorded. When the reproducing laser beam is radiated, and the temperature of the reproducing layer 3 is raised to be not less than a predetermined temperature, then the magnetization in such an area is erased. Therefore, the area having the temperature not less than the predetermined temperature is in a state in which no signal is recorded. Transfer is performed only at the frontward portion having a lower temperature within the laser beam, and the signal is reproduced. After that, the operation for magnifying (erasing) the magnetic domain is performed as shown in FIG. 18A. Those appropriately used as the reproducing layer 3 based on this method include a magnetic film composed of TbCo, Dy, and an element selected from Fe, Co, and Ni. Those usable for the non-magnetic layer 4 and the recording layer 75 may be selected from the materials described above.

Figure 22:
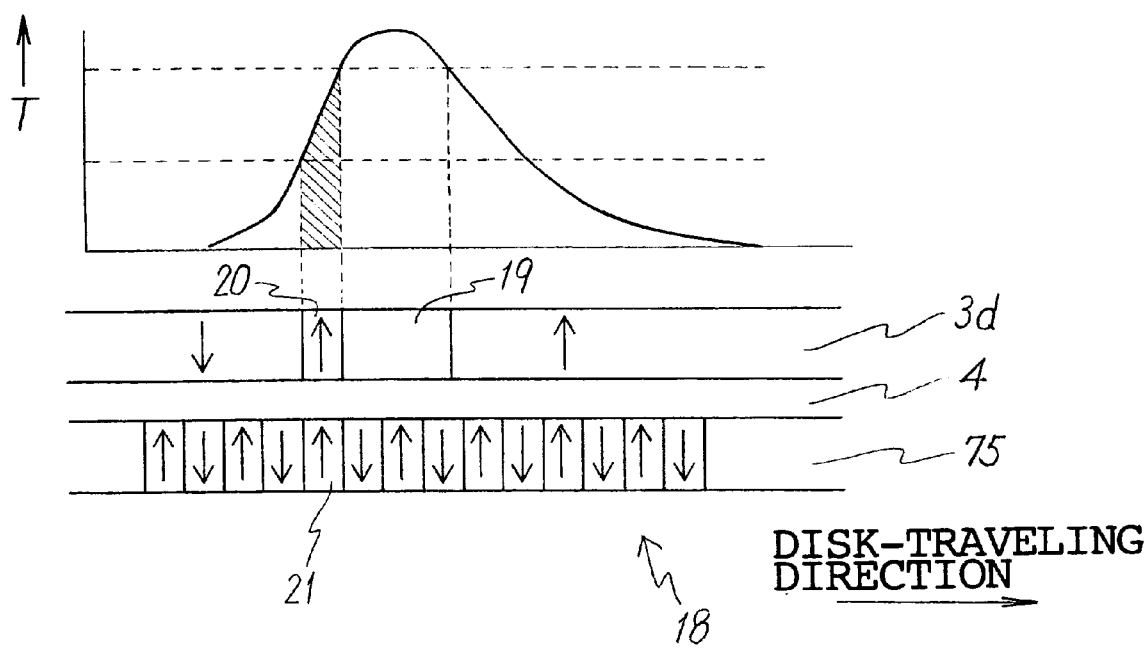
FIG. 22 explains a reproducing system in which a system to cause transfer in a high temperature area at a backward portion in the reproducing light beam spot is combined with a system to cause transfer in a low temperature area at a frontward portion in the reproducing light beam spot.

With reference to FIG. 22, it is possible to combine the system for causing transfer at the backward high temperature area within the reproducing light beam spot and the system for causing transfer at the frontward low temperature area within the reproducing light beam spot. FIG. 22 shows a recording layer 75, a non-magnetic layer 4, and a reproducing layer 3d of a magneto-optical recording medium of this type, and a temperature distribution thereof. In the case of the magneto-optical recording medium of this type, the reproducing layer 3d is magnetized in a certain direction by using an initializing magnetic field (not shown) before being subjected to reproduction. After that, when the magneto-optical recording medium is irradiated with the laser beam, the magnetization is erased at a high temperature portion 19 in the reproducing layer 3d. A magnetic domain 20, which is located frontward from the high temperature portion 19 (at a frontward position in the disk-traveling direction), is magnetized in the same direction as that of a magnetic domain 21 in the recording layer 75, and hence it can be reproduced by magnifying the magnetic domain 20. A magnetic film used for the reproducing layer 3d has the following characteristics, assuming that it undergoes a temperature at which magnetization is transferred from the recording layer 75 and a temperature at which or higher than which magnetization is erased. That is, the temperature for transferring magnetization is preferably within a range of 80 to 120° C., and the temperature for erasing magnetization is preferably within a range of 130 to 170° C. The initializing magnetic field, which is used before beginning the reproducing operation, preferably has a magnitude of not more than 1 k (Oe). Those appropriately used as the reproducing layer 3d include a magnetic film composed of TbCo, Dy, and an element selected from Fe, Co, and Ni. Those usable for the non-magnetic layer 4 and the recording layer 75 may be selected from the materials described above.

Third Embodiment

In the first embodiment, the simple structure comprising the magnifying reproducing layer 3 and the information-recording layer is successfully used to transfer the minute magnetic domain from the information-recording layer to the magnetic domain-magnifying reproducing layer and magnify and reduce the transferred magnetic domain. This embodiment illustrates a magneto-optical recording medium provided with a gate layer which makes it possible to select only one of a plurality of magnetic domains in the information-recording layer existing within the reproducing light beam spot. This magneto-optical recording medium corresponds to the magneto-optical recording medium according to the second aspect of the present invention.

Figure 9:
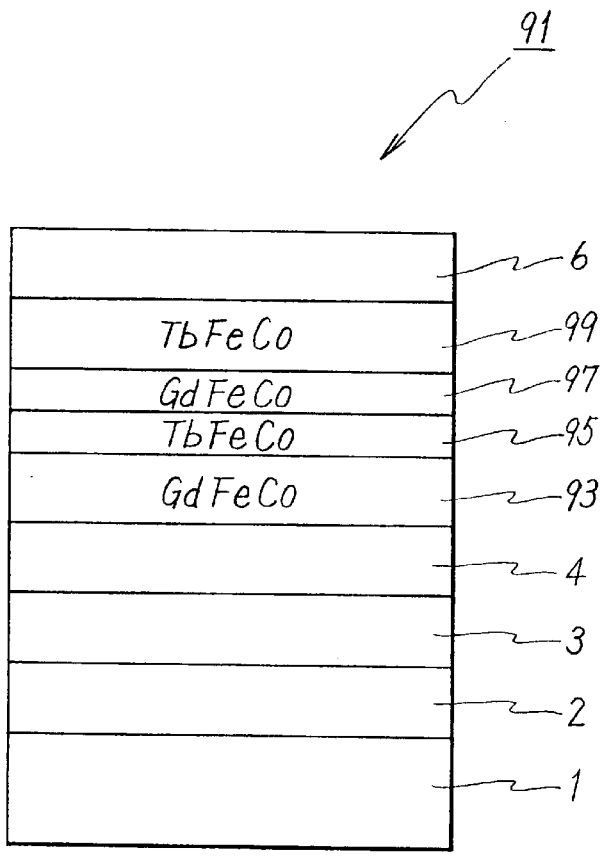
FIG. 9 shows a cross-sectional view of a specified embodiment of a magneto-optical recording medium according to a third embodiment.

As shown in FIG. 9, the magneto-optical recording medium 91 of this embodiment has a structure in which the information-recording layer 5 of the magneto-optical recording medium 71 of the first embodiment is replaced with a gate layer 93+exchange coupling force control layers 95, 97+an information-recording layer 99. A magnetic layer composed of GdFeCo having a compensation temperature of −50° C., a Curie temperature of 350° C., and a film thickness of 100 nm was used as the gate layer 93. A magnetic layer composed of TbFeCo having a compensation temperature of −80° C., a Curie temperature of 160° C., and a film thickness of 20 nm was used as the first exchange coupling force control layer 95. A magnetic layer composed of GdFeCo having a compensation temperature of 90° C., a Curie temperature of 200 ° C., and a film thickness of 10 nm was used as the second exchange coupling force control layer 97. A magnetic layer composed of TbFeCo having a compensation temperature of −50° C., a Curie temperature of 270° C., and a film thickness of 70 nm was used as the information-recording layer 99. The first exchange coupling force control layer 95 is a layer to control transfer of magnetic domains in the information-recording layer 99 in an area having a temperature of not less than 70° C. to the gate layer 93. The second exchange coupling force control layer 97 is a layer to control transfer of magnetic domains in the information-recording layer 99 in an area having a temperature of not more than 160° C. to the gate layer 93. The arrangement as described above makes it possible to transfer, to the magnifying reproducing layer 3, the recording magnetic domain in the information-recording layer 99 within a temperature range of not less than 70° C. and not more than 160° C. Films of these layers were formed by using the magnetron sputtering apparatus in the same manner as described in the first embodiment.

The magneto-optical recording medium 91 was subjected to recording and reproduction under the same condition as that used in the first embodiment. The magnetic domain transferred to the magnifying reproducing layer 3 was magnified by using a reproducing magnetic field (alternating magnetic field) H=±200 (Oe). It was confirmed that the amplitude of the reproduction signal was increased fourfold. It was found that the magnetic domain of 0.3 micron was reliably transferred by using the magneto-optical recording medium 91.

The magnetic layer composed of GdFeCo having the thickness of 100 nm is used as the gate layer 93, which is thicker than the thickness of the magnetization wall of the magnetic domain formed in the GdFeCo magnetic layer. Accordingly, twisting of magnetic spin in the magnetization wall is permitted upon inversion of the magnetization transferred from the information-recording layer 99 to the gate layer 93.

Fourth Embodiment

This embodiment explains an illustrative arrangement of an apparatus, and a recording and reproducing method preferably used for recording and reproduction on the magneto-optical recording media specifically explained in the first and second embodiments. The apparatus 101 shown in FIG. 10 principally comprises a laser beam-radiating unit for irradiating the magneto-optical disk 100 with a light beam pulsed at a constant cycle synchronized with code data, a magnetic field-applying unit for applying a controlled magnetic field to the magneto-optical disk 100 during recording and reproduction, and a signal-processing system for detecting and processing a signal supplied from the magneto-optical disk 100. In the laser beam-radiating unit, a laser 22 is connected to a laser-driving circuit 32 and a recording pulse width/phase-adjusting circuit 51 (RC-PPA). The laser-driving circuit 32 receives a signal from the recording pulse width/phase-adjusting circuit 51 and controls the laser pulse width and the phase of the laser 22. The recording pulse width/phase-adjusting circuit 51 receives a clock signal described later on from a PLL circuit 39, and it generates a first synchronization signal to adjust the phase and the pulse width of the recording light beam.

In the magnetic field-applying unit, a magnetic coil 29 for applying the magnetic field is connected to a magnetic coil-driving circuit (M-DRIVE) 34. During recording, the magnetic coil-driving circuit 34 receives input data from an encoder 30 into which data is inputted, via a phase-adjusting circuit (RE-PA) 31 to control the magnetic coil 29. On the other hand, during reproduction, the magnetic coil-driving circuit 34 receives a clock signal described later on from a PLL circuit 39 to generate a second synchronization signal for adjusting the phase and the pulse width, via a reproducing pulse width/phase-adjusting circuit (RP-PPA) 131. The magnetic coil 29 is controlled on the basis of the second synchronization signal. In order to switch the signal to be inputted into the magnetic coil-driving circuit 34 between the recording and reproduction operations, a recording/reproduction changeover switch (RC/RP SW) 134 is connected to the magnetic coil-driving circuit 34.

In the signal-processing system, a first deflecting prism 25 is arranged between the laser 22 and the magneto-optical disk 100. A second deflecting prism 251 and detectors 28, 281 are arranged on a side of the first deflecting prism 25. Both of the detectors 28, 281 are connected to a subtracter 302 and an adder 301 via I/V converters 311, 312 respectively. The adder 301 is connected to the PLL circuit 39 via a clock extraction circuit (CSS) 37. The subtracter 302 is connected to a decoder 38 via a sample/hold (S/H) circuit 41 for holding the signal in synchronization with the clock, an A/D conversion circuit 42 for performing analog-digital conversion in synchronization with the clock in the same manner as described above, and a binary signal-processing circuit (BSC) 43.

In the apparatus constructed as described above, the light beam emitted from the laser 22 is converted into a parallel light beam by the aid of a collimator lens 23. The light beam passes through the deflecting prism 25, and it is condensed onto the magneto-optical disk 100 by the aid of an objective lens 24. A reflected light beam from the disk 100 is directed toward a direction to arrive at the deflecting prism 251 by the aid of the deflecting prism 25. The light beam passes through a half-wavelength plate 26, and then it is divided into those directed to two directions by the aid of the deflecting prism 251. The divided light beams are collected by detector lenses 27 respectively, and they are introduced into photodetectors 28, 281. Now, pits for generating a tracking error signal and for generating a clock signal are formed beforehand on the magneto-optical disk 100. A signal, which represents a reflected light beam from the pits for generating the clock signal, is detected by the detectors 28, 281, and then it is extracted by the clock extraction circuit 37. After that, a data channel clock is generated by the PLL circuit 39 connected to the clock extraction circuit 37.

Upon data recording, the laser 22 is modulated with a constant frequency by the aid of the laser-driving circuit 32 to make synchronization with the data channel clock. The laser 22 radiates a continuous pulse beam having a narrow width so that the data-recording area of the rotating magneto-optical disk 100 is locally heated at equal intervals. The data channel clock is used to control the encoder 30 in the magnetic field-applying unit so that a data signal having a reference clock cycle is generated. The data signal is supplied to the magnetic coil-driving unit 34 via the phase-adjusting circuit 31. The magnetic coil-driving unit 34 controls the magnetic coil 29 so that the magnetic field having a polarity corresponding to the data signal is applied to a heated portion in the data-recording area on the magneto-optical disk 100.

Figure 11:
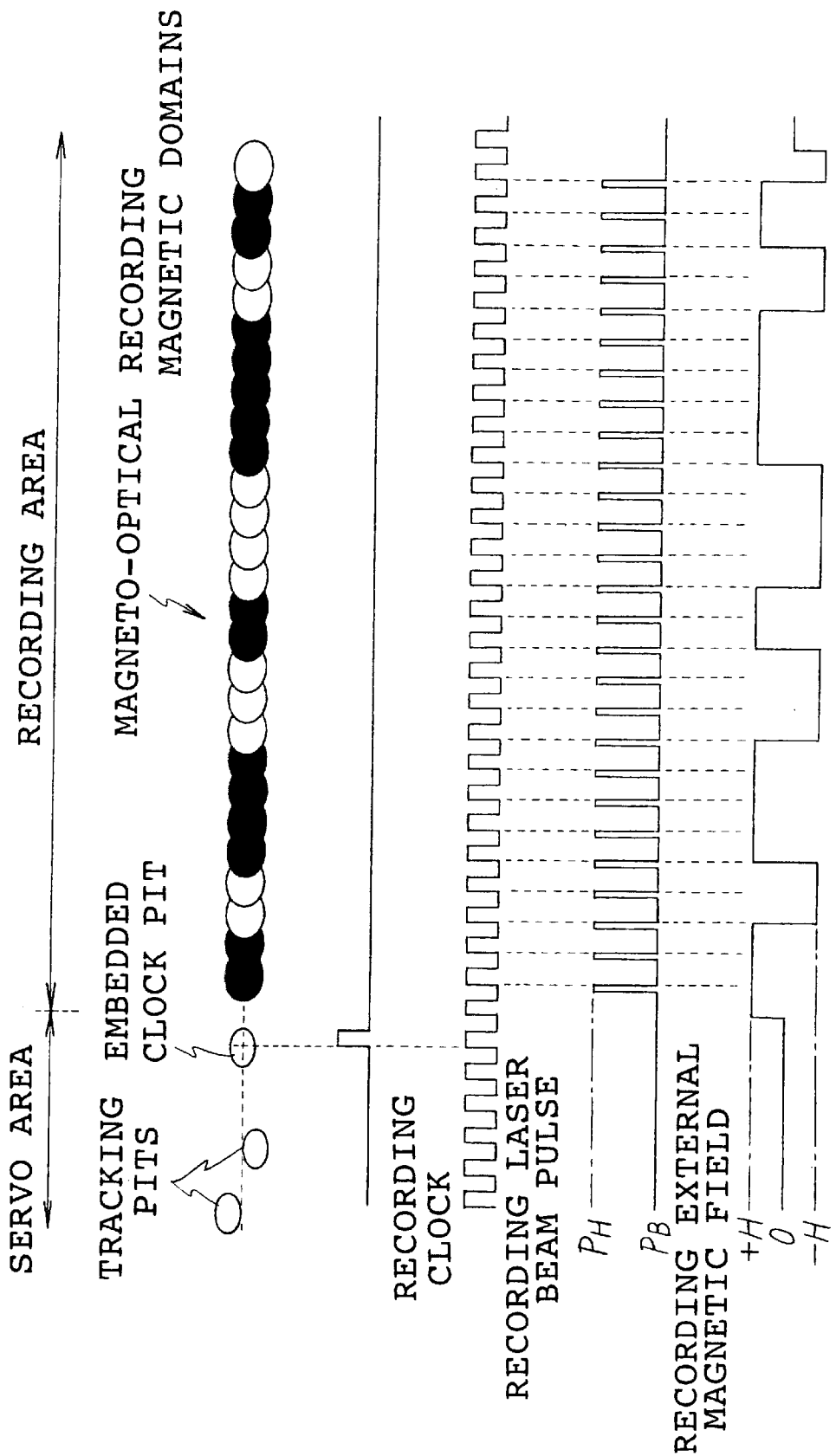
FIG. 11 shows a timing chart illustrating a relationship between a recording laser pulse, a recording external magnetic field, and recording magnetic domains concerning an magneto-optical field modulation recording method referred to in fourth and fifth embodiments of the present invention.

The recording and reproducing characteristic of the magneto-optical recording medium prepared in the third embodiment was measured by using the magneto-optical recording and reproducing apparatus 101. The optical head of the apparatus 101 had a laser wavelength of 685 nm, and the objective lens had a numerical aperture NA of 0.55. Data were recorded by using the magneto-optical field modulation system to perform recording at a linear velocity of 5.0 m/sec by modulating the external magnetic field at ±300 (Oe) while radiating the laser beam in a pulsed manner at a constant cycle, in which the laser beam pulse had a duty ratio of 50%. FIG. 11 shows a timing chart illustrating the recording laser beam pulse and the recording external magnetic field with respect to the recording clock. FIG. 11 shows, at its upper part, a pattern of minute magnetic domains formed by the recording performed as described above. The minute magnetic domains were formed with a radius of 0.4 micron.

Figure 12:
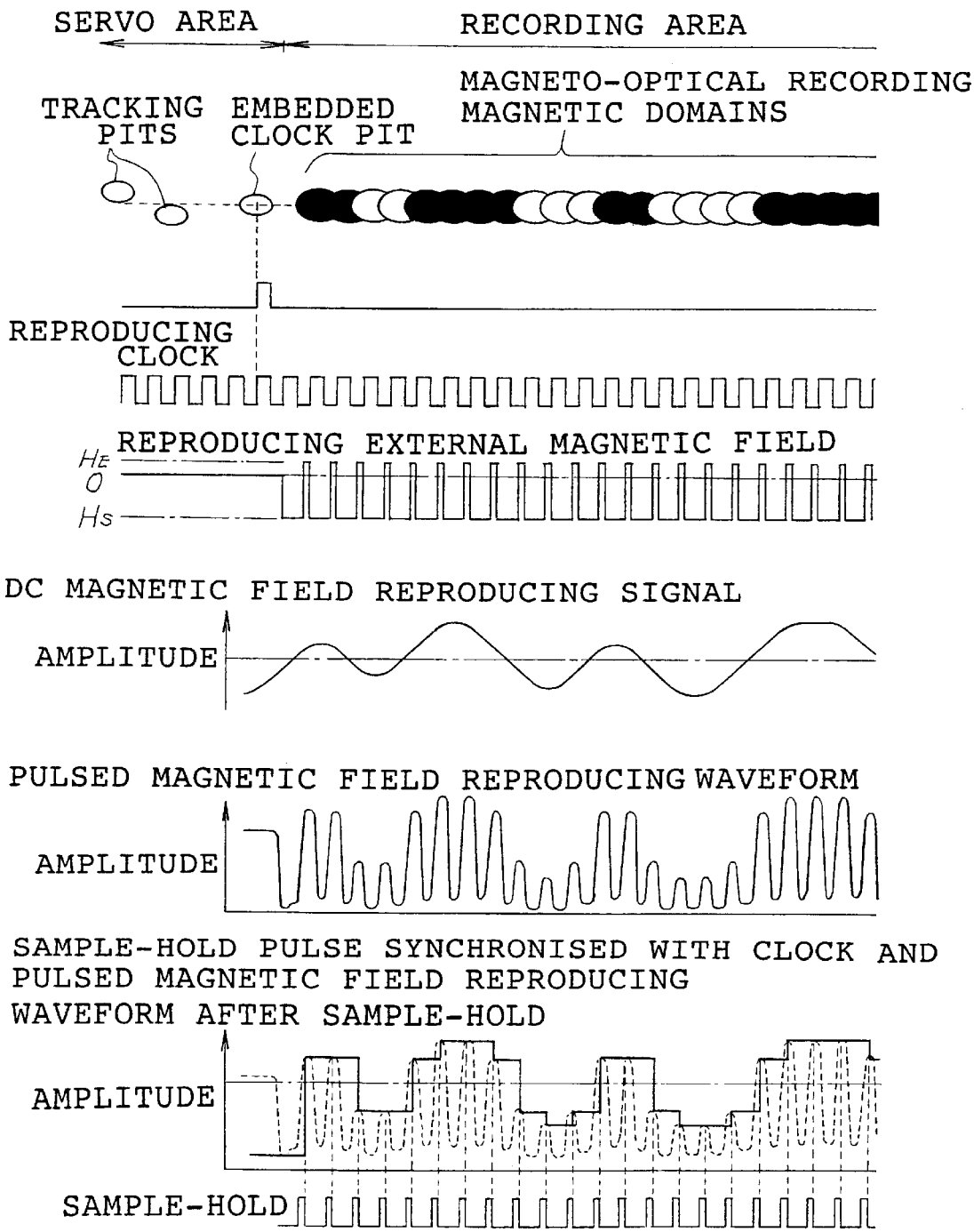
FIG. 12 shows a timing chart illustrating a reproducing clock, a reproducing external magnetic field, a reproduction signal waveform obtained by using the pulsed magnetic field, and a reproduction signal waveform after sampling and holding in the reproducing method according to the fourth embodiment.

Subsequently, the magneto-optical recording medium, on which the minute magnetic domains had been recorded, was subjected to reproduction as follows by using the apparatus shown in FIG. 10. The power of the reproducing laser beam was set to be 2.0 mW. The reproducing clock was synchronized with the recorded magnetic domains one by one. The magnetic field was modulated into a pulsed form and applied so that it was synchronized with the reproducing clock. FIG. 12 shows a timing chart illustrating the reproducing external magnetic field and the reproduced signal with respect to the reproducing clock. The pulsed magnetic field had an intensity of 150 (Oe) (HE) in the recording direction and an intensity of 250 (Oe) (HS) in the erasing direction, in the vicinity of the center of the magnetic domain. The duty ratio of the magnetic field in the recording direction was 25%. The sample-hold timing for the reproduction signal was coincident with the modulation timing for the magnetic field.

Figure 13:
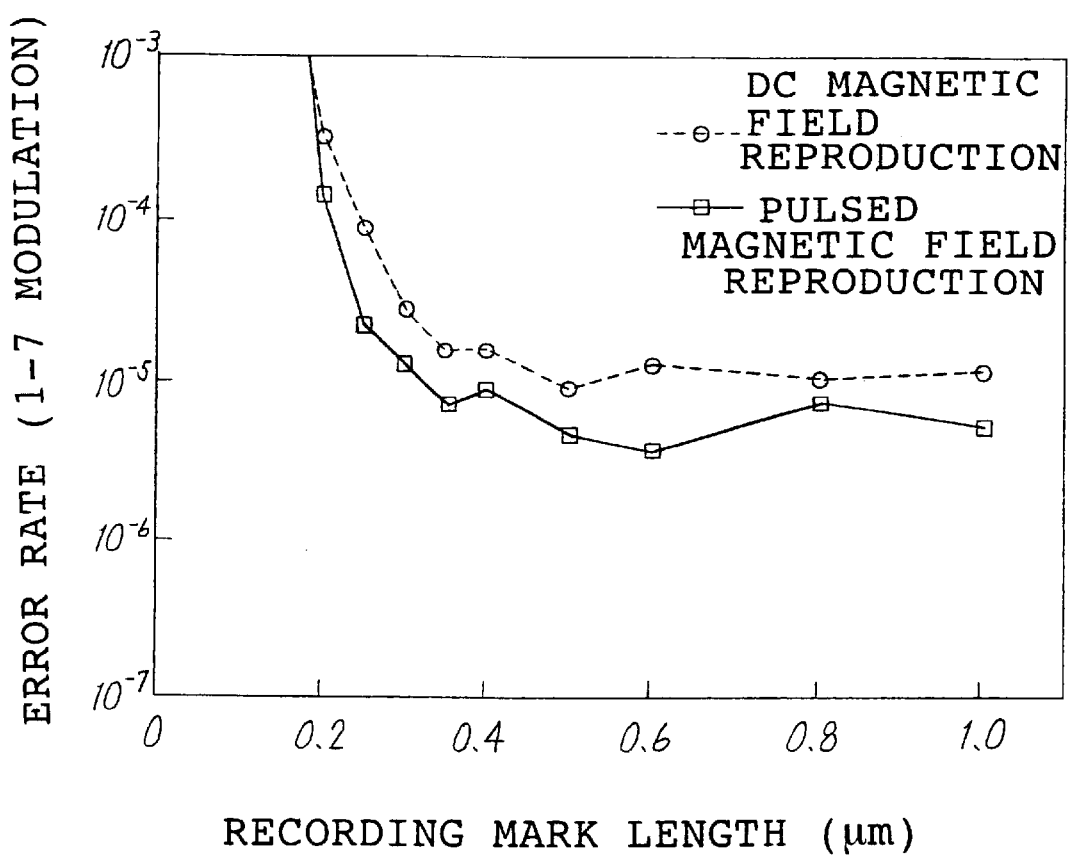
FIG. 13 shows a graph illustrating a relationship between the error rate and the recording mark length in 1–7 modulation in the reproducing method according to the fourth embodiment.

As clarified from the reproduction waveform (waveform reproduced with the pulsed magnetic field) shown in FIG. 12, independent reproduction signals were obtained from the respective minute magnetic domains. For the purpose of comparison, FIG. 12 also shows a reproduction signal (signal reproduced with DC magnetic field) obtained when the magnetic field was not modulated, i.e., when the signal was reproduced in the same manner as described above by applying a DC magnetic field of 200 (Oe) in the recording direction. In the case of the DC magnetic field, reproduction signal waveforms obtained from adjacent magnetic domains are joined with each other, and it was impossible to separately reproduce each of the minute magnetic domains. FIG. 12 shows, at its lowest part, a sample-hold pulse in synchronization with the clock, and a reproduction signal obtained with the pulsed magnetic field after sample-hold. It was revealed that the amplitude of the analog reproduction signal after the sample-hold was greatly increased as compared with that obtained without applying any reproducing magnetic field. FIG. 13 shows a relationship between the recording mark length and the error rate, obtained by 1–7 modulation recording, while comparing a result obtained when the pulsed magnetic field was used as the reproducing magnetic field with a result obtained when the DC magnetic field was used. According to the result shown in FIG. 13, it is understood that when reproduction is performed by using the pulsed magnetic field, then the error rate is improved, and it is sufficiently possible to reproduce data even with a recording mark length of 0.25 μm. Therefore, it is possible to realize high density recording and reproduction therefrom by performing reproduction by applying the pulsed magnetic field to the magneto-optical recording medium according to the present invention.

In this embodiment, the duty ratio of the magnetic field is 25% in the recording direction, concerning the reproducing magnetic field used for the reproducing operation. However, the duty ratio can be appropriately changed within a range of 15% to 90%, preferably within a range of 15% to 60%. That is, it is desirable to adjust the duty ratio of the magnetic field in the recording direction for the reproducing magnetic field so that the magnetic domain is most appropriately magnified in the reproducing layer.

Fifth Embodiment

This embodiment illustrates a modified embodiment of the recording and reproducing apparatus described in the fourth embodiment. A recording and reproducing apparatus 103 shown in FIG. 14 includes the components of the apparatus shown in FIG. 10, and it further comprises a reproducing pulse width/phase-adjusting circuit (RP-PPA) 53 for pulse-modulating the reproducing light beam in synchronization with the PLL clock, and a recording/reproduction changeover switch (RC/RP SW) 55 for switching the recording pulse and the reproducing pulse during recording and reproduction. The other respective components are the same as those of the recording and reproducing apparatus 101 explained in the fourth embodiment. Accordingly, corresponding components are designated by the same reference numerals, explanation of which will be omitted.

The recording and reproducing characteristic of the magneto-optical recording medium prepared in the fourth embodiment was measured by using the recording and reproducing apparatus 103. The laser 22 of the recording and reproducing apparatus 103 had a wavelength of 685 nm, and the objective lens 24 had a numerical aperture NA of 0.55. Data was recorded by using the magneto-optical field modulation system to perform recording at a linear velocity of 5.0 m/sec by modulating the external magnetic field at ±300 (Oe) while radiating the laser beam in a pulsed manner at a constant cycle, in which the laser beam pulse had a duty ratio of 50%. The timing of the recording laser beam pulse and of the recording external magnetic field with respect to the recording clock was the same as that illustrated in the timing chart shown in FIG. 11. The minute magnetic domains were formed with a radius of 0.4 micron.

The magneto-optical recording medium, on which the minute magnetic domains had been recorded as described above, was subjected to reproduction as follows by using the apparatus shown in FIG. 14. The intensity of the reproducing laser beam was modulated at a constant cycle in synchronization with the recording clock. The reproducing laser beam had a peak power (Pr) of 4.5 mW and a bottom power (PB) of 0.5 mW. The peak duty ratio was set to be 33%. The reproducing magnetic field was modulated in synchronization with the reproducing clock with respect to the recorded magnetic domains one by one, in the same manner as described in the fourth embodiment. The pulsed magnetic field had an intensity of 150 (Oe) (HE) in the recording direction and an intensity of 250 (Oe) (HS) in the erasing direction, in the vicinity of the center of the magnetic domain. The duty ratio in the recording direction was 25%. The sample-hold timing for the reproduction signal was coincident with the modulation timing for the magnetic field. FIG. 15 shows a timing chart illustrating the reproducing external magnetic field and the reproduced signal with respect to the reproducing clock. As shown in FIG. 15, reproduction was performed while allowing the dropping or fall of the reproducing laser beam pulse to coincide with the dropping or fall of the reproducing magnetic field pulse.

Figure 15:
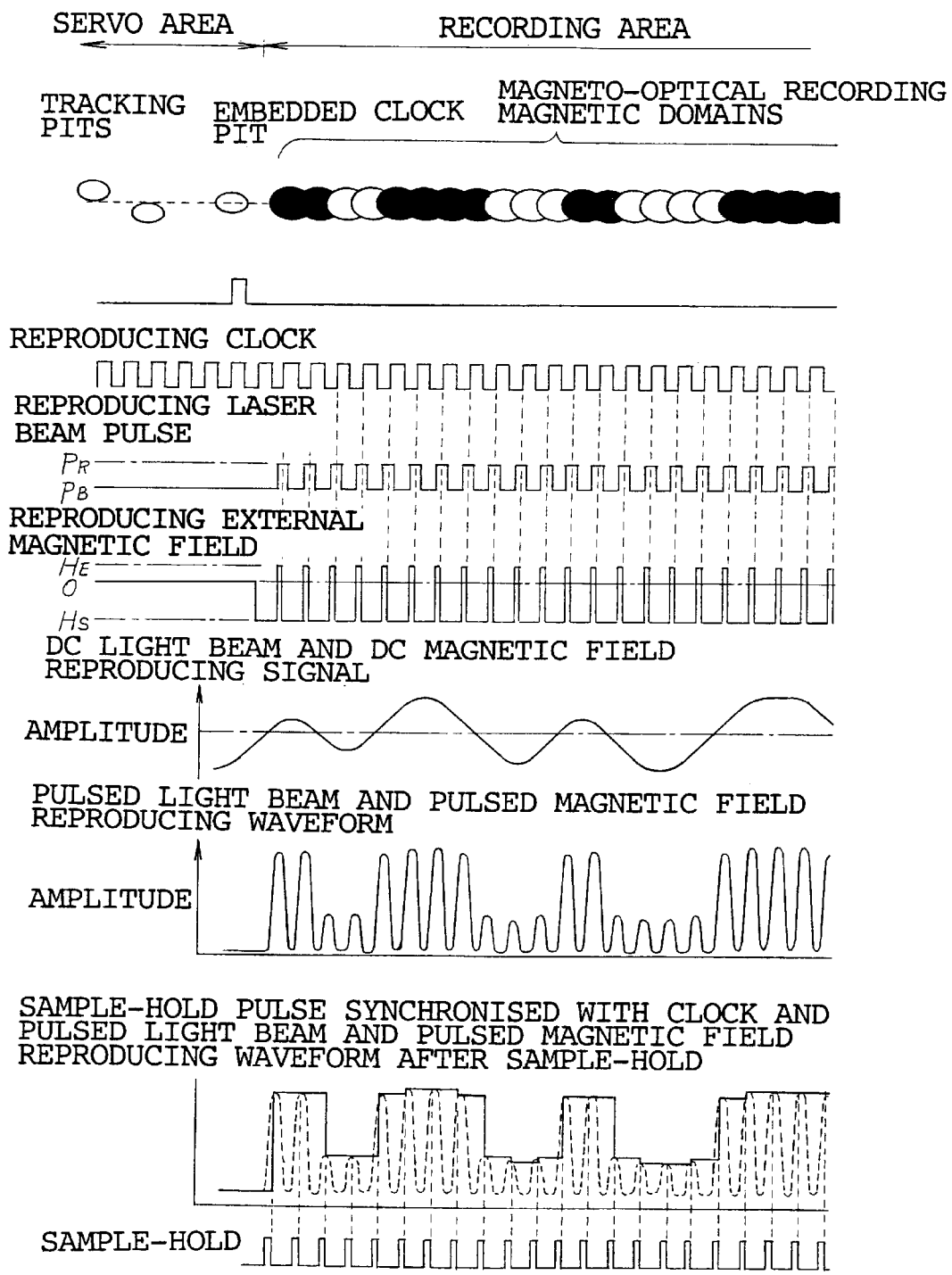
FIG. 15 shows a timing chart illustrating a reproducing clock, a reproducing external magnetic field, a reproduction signal waveform obtained by using the pulsed light beam/pulsed magnetic field, and a reproduction signal waveform after sampling and holding in the reproducing method according to the fifth embodiment of the present invention.
Figure 16:
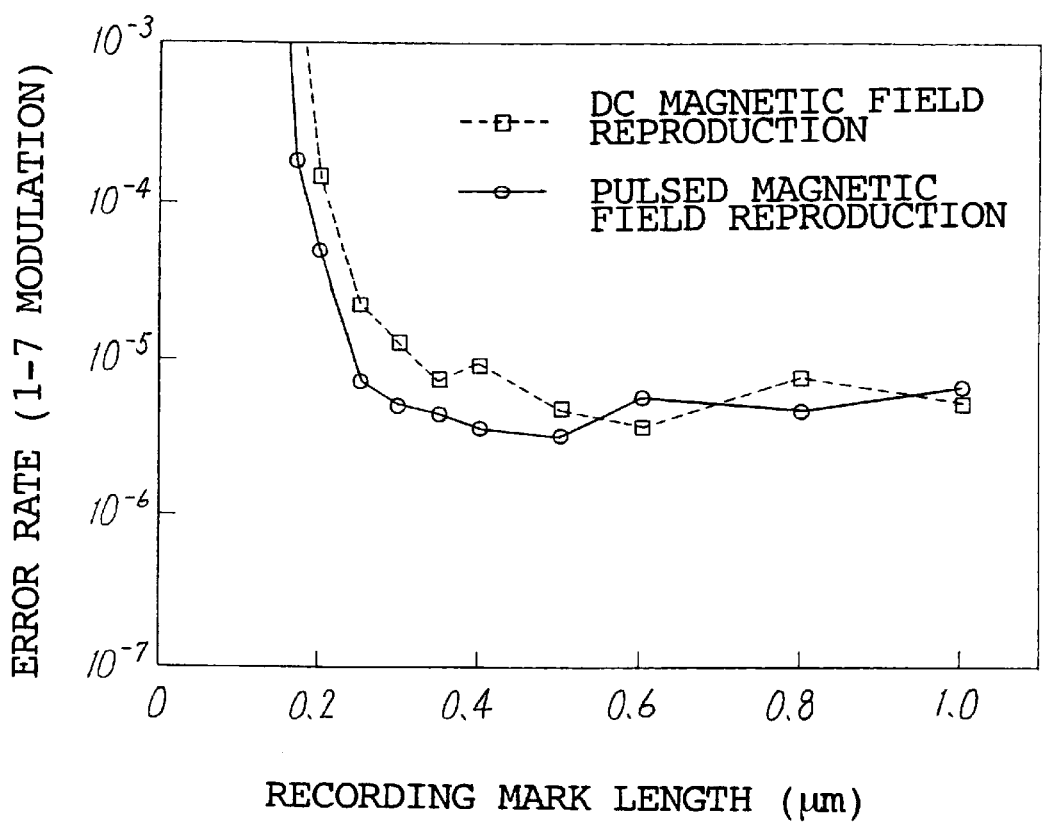
FIG. 16 shows a graph illustrating a relationship between the error rate and the recording mark length in 1–7 modulation in the reproducing method according to the fifth embodiment of the present invention.

As clarified from the reproduction waveform (waveform reproduced with the pulsed light beam and the pulsed magnetic field) shown in FIG. 15, independent reproduction signals were obtained from the respective minute magnetic domains. For the purpose of comparison, FIG. 15 also shows a reproduction signal (signal reproduced with DC light beam and DC magnetic field) obtained when the signal was reproduced in the same manner as described above by applying a DC light beam having a laser power of 1.5 mW and a DC magnetic field of 200 (Oe) in the recording direction. In the case of the DC light beam and the DC magnetic field, reproduction signal waveforms obtained from adjacent magnetic domains are joined with each other, and it was impossible to separately reproduce each of the minute magnetic domains. FIG. 15 shows, at its lowest part, a sample-hold pulse in synchronization with the clock, and a reproduction signal obtained with the pulsed magnetic field after sample-hold. In this embodiment, the magnetization at the portion of the magnetic domain-magnifying reproducing layer in which no magnetic domain to be transferred exists can be effectively prevented from inversion by modulating the reproducing light beam. FIG. 16 shows a relationship between the recording mark length and the error rate, obtained when 1–7 modulation recording was performed, while comparing a result obtained when the pulsed laser beam was used as the reproducing light beam with a result obtained when the continuous light beam (DC light beam) was used. According to the result shown in FIG. 16, it is understood that when reproduction is performed by using the pulsed light beam, the error rate is improved.

It is noted that the timing and the duty ratio of the reproducing light beam pulse, the timing and the duty ratio of the reproducing magnetic field pulse, and the polarity of the reproducing magnetic field pulse may be changed depending on the structure and the composition of the medium. For example, as explained in embodiments described later on, when the reproducing alternating magnetic field is used, the duty ratio of the magnetic field in the recording direction may be controlled to be within a range of 15% to 90%.

Sixth Embodiment

In the fourth embodiment, the clock signal is outputted from the PLL circuit 39 to the phase-adjusting circuit 31 and the reproducing pulse width/phase-adjusting circuit 131 for driving the magnetic coil, as well as to the recording pulse width/phase-adjusting circuit 51 for driving the laser. The clock signal in the fourth embodiment is generated by the embedded clock extraction circuit 37 by detecting the reflected light beam from the pits formed on the substrate of the magneto-optical recording medium 10 (100). In the fifth embodiment, the clock signal is outputted from the PLL circuit 39 to the phase-adjusting circuit 31 and the reproducing pulse width/phase-adjusting circuit 131 for driving the magnetic coil, as well as to the recording pulse width/phase-adjusting circuit 51 and the reproducing pulse width/phase-adjusting circuit 53 for driving the laser. The clock signal in the fifth embodiment is generated by the embedded clock extraction circuit 37 (external clock) by detecting the reflected light beam from the pits formed on the substrate of the magneto-optical recording medium. This embodiment illustrates various methods for generating the clock, which are especially effective to pulse-modulate the reproducing external magnetic field and the reproducing light beam in the reproducing apparatus (the recording and reproducing apparatus) according to the present invention.

The method for generating the reproducing clock includes the following three methods. The first method is based on self PLL synchronization, the second method is based on external PLL synchronization, and the third method is based on two-cycle sampling. As for the construction of the apparatus, in order to realize the first and third methods, it is preferable to use a signal-processing system in which the embedded clock extraction circuit 37 is omitted in the apparatuses shown in FIGS. 10 and 14. On the other hand, in order to realize the second method, the signal-processing system of the apparatuses shown in FIGS. 10 and 14 may be used as it is.

Figure 23:
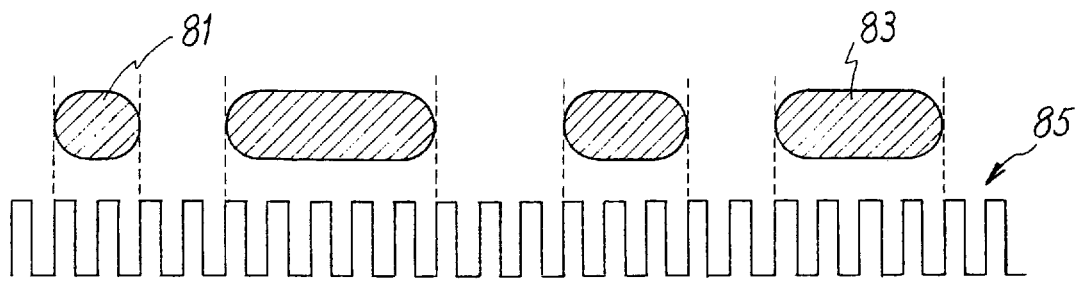
FIG. 23 explains self-synchronization to generate a clock signal which may be used for the apparatuses according to the fourth and fifth embodiments.

FIG. 23 explains the concept of the self PLL synchronization as the first method. In FIG. 23, recorded magnetic domains (magnetic marks) 81, 83 are detected, followed by being processed by the adder 301 and PLL 29 shown in FIG. 10 (or FIG. 14). Thus, a clock 85 is generated.

Figure 24:
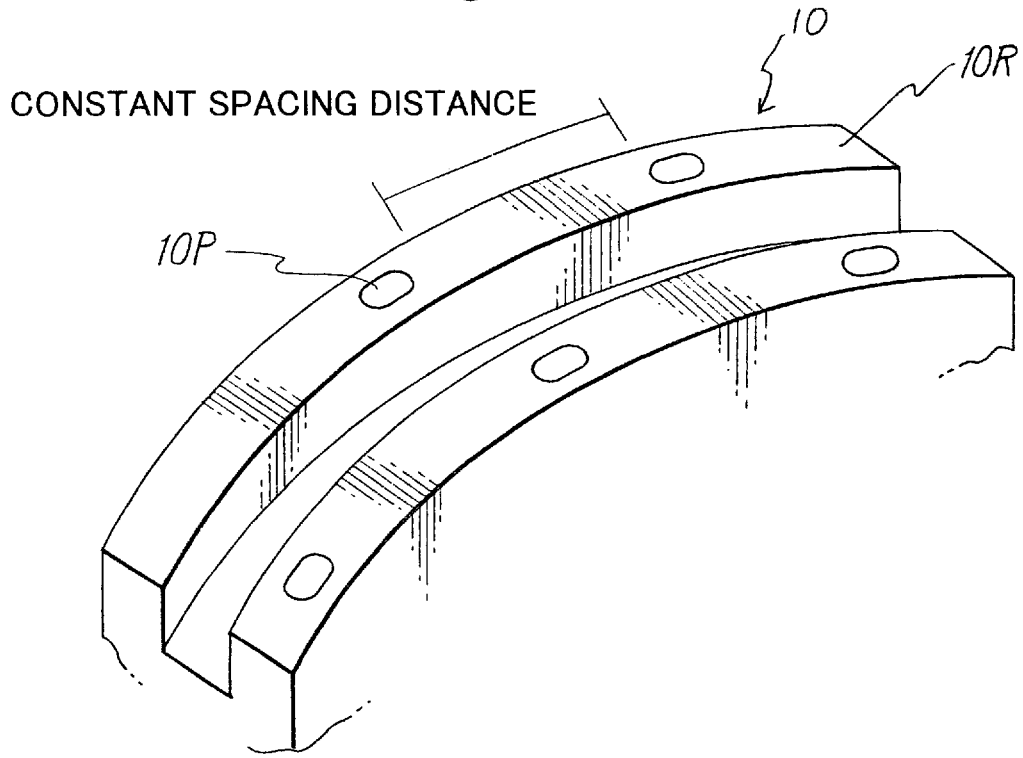
FIG. 24 explains external synchronization to generate a clock signal which may be used by employing a land-groove type magneto-optical recording medium in the apparatuses according to the fourth and fifth embodiments.
Figure 25:
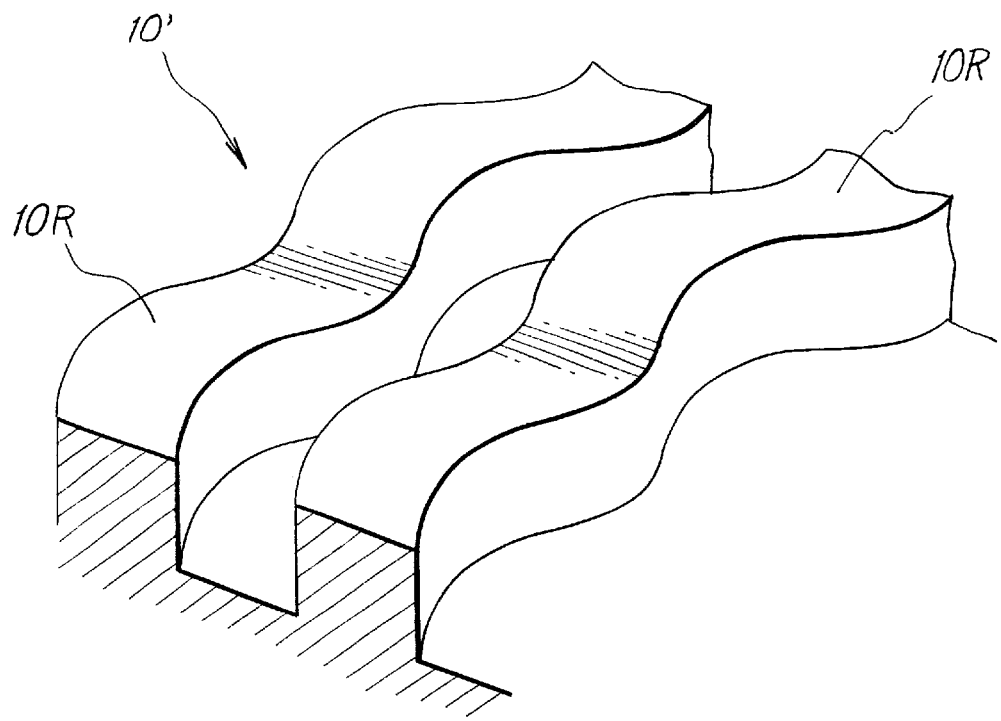
FIG. 25 explains external synchronization to generate a clock signal which may be used by employing a wobble-shaped land-groove type magneto-optical recording medium in the apparatuses according to the fourth and fifth embodiments.

The external PLL synchronization method as the second method will be explained with reference to FIGS. 24 to 26. FIG. 24 shows a partial enlarged view of a magneto-optical recording medium 10 obtained when the magneto-optical recording medium is designed to have a land-groove structure. Pits 10P are provided at a constant cycle at a land 10R (or at a groove) of the magneto-optical recording medium 10. The pits 10P are optically detected to generate a clock in conformity with the detected cycle. In this embodiment, those provided at the land 10R at a constant cycle are not limited to the pits 10P, which may be those optically detected such as projections and any change in material quality such as crystal states. FIG. 25 shows a partial enlarged view of a magneto-optical recording medium 10' obtained when the magneto-optical recording medium is designed to have a wobble-type land-groove structure. In the case of the wobble-type land-groove structure, a cycle of the wobble is detected, and thus a reproducing clock signal can be generated on the basis of the detected cycle.

Figure 26:
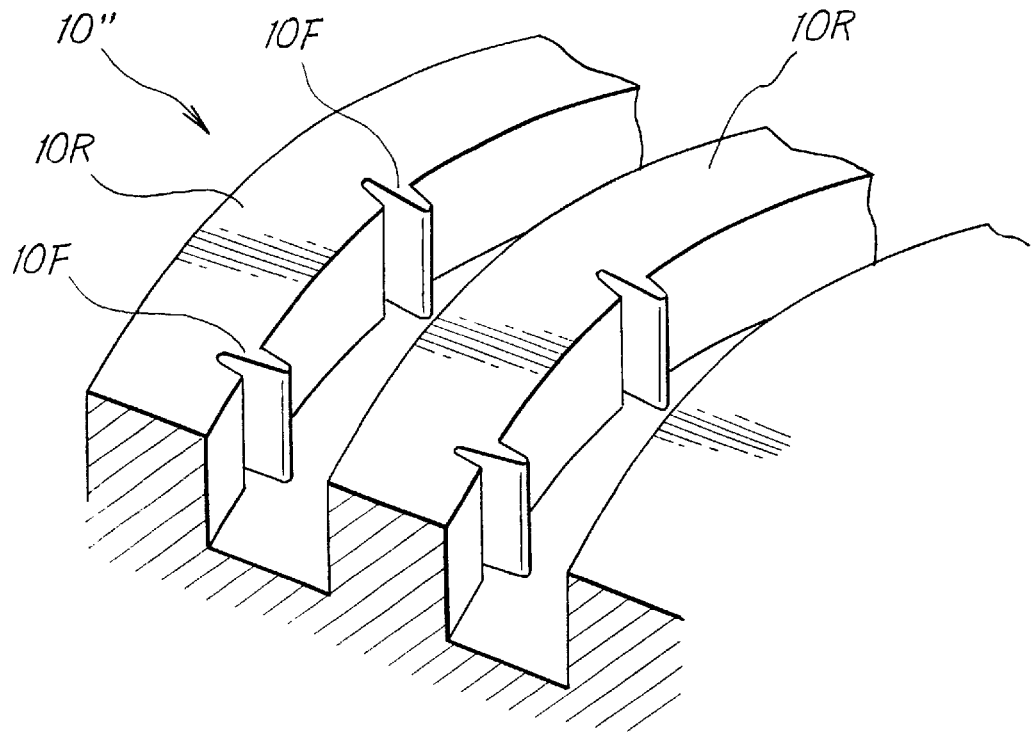
FIG. 26 explains external synchronization to generate a clock signal which may be used by employing a land-groove type magneto-optical recording medium having fine clock marks in the apparatuses according to the fourth and fifth embodiments.

FIG. 26 shows a partial enlarged view of a magneto-optical recording medium 10" provided with fine clock marks 10F in place of the pits, in which the magneto-optical recording medium is designed to have a land-groove type structure. The fine clock marks 10F can be provided at a spacing distance which is approximately the same as the spacing distance with which the pits 10P shown in FIG. 24 are formed. When one fine clock mark 10F is regarded as a single waveform, the wavelength (length in the track direction) may be adjusted to be 1/300 to 1/50 of the spacing distance between the fine clock marks 10F, and the amplitude (amount of variation in the widthwise direction of the track) may be adjusted to be 100 to 300 nm. FIG. 26 shows the structure in which the fine clock marks 10F are formed on the wall on only one side of the land 10R. However, the fine clock marks 10F may be formed on walls on both sides of the land 10R. The fine clock marks 10F may be detected by using a photodetector whose detection area is divided into four, in which when a sum signal from each divided detection area is observed, a waveform is obtained, resembling the shape of the fine clock mark 10F shown in FIG. 26. The reproduction waveform thus obtained may be compared with a predetermined reference value to obtain a binary signal. A clock signal for external synchronization can be generated by making synchronization with the rise timing of the binary signal. The magneto-optical recording medium having the wobble-type land-groove structure as shown in FIG. 25 may be provided with the fine clock marks 10F as shown in FIG. 26. A clock signal for modulating the reproducing external magnetic field and/or the reproducing light beam may be extracted from the fine clock marks 10F, and a data channel clock for recording may be detected from the wobbling period.

Figure 27:
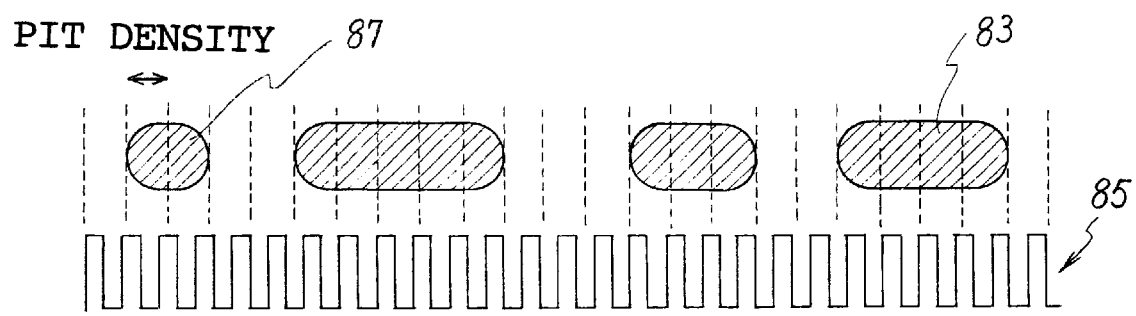
FIG. 27 explains two-cycle sampling to generate a clock signal which may be used in the apparatuses according to the fourth and fifth embodiment.

FIG. 27 explains the concept of the two-cycle sampling which is the third method. In FIG. 27, a recorded unit recording magnetic domain (a shortest recording domain or a unit bit) 87 is subjected to reproduction, followed by being processed by the adder 301 and PLL 39 shown in FIG. 10 (or FIG. 14) to generate a clock 85. During this process, the PLL circuit 39 is designed to produce the clock 85 of one cycle or more for the unit recording magnetic domain 87. It is possible to generate the clock having a frequency higher than that obtained from a repeating cycle of the unit recording magnetic domain 87.

In the present invention, when the reproducing light beam and/or the reproducing external applying magnetic field is pulse-modulated, it is allowable to generate a first synchronization signal and/or a second synchronization signal on the basis of a reproducing clock generated by using any one of the foregoing three methods. When the recording external applying magnetic field and/or the recording light beam is pulse-modulated, it is also allowable to use a reproducing clock generated by using any one of the foregoing three methods.

Seventh Embodiment

Figure 10:
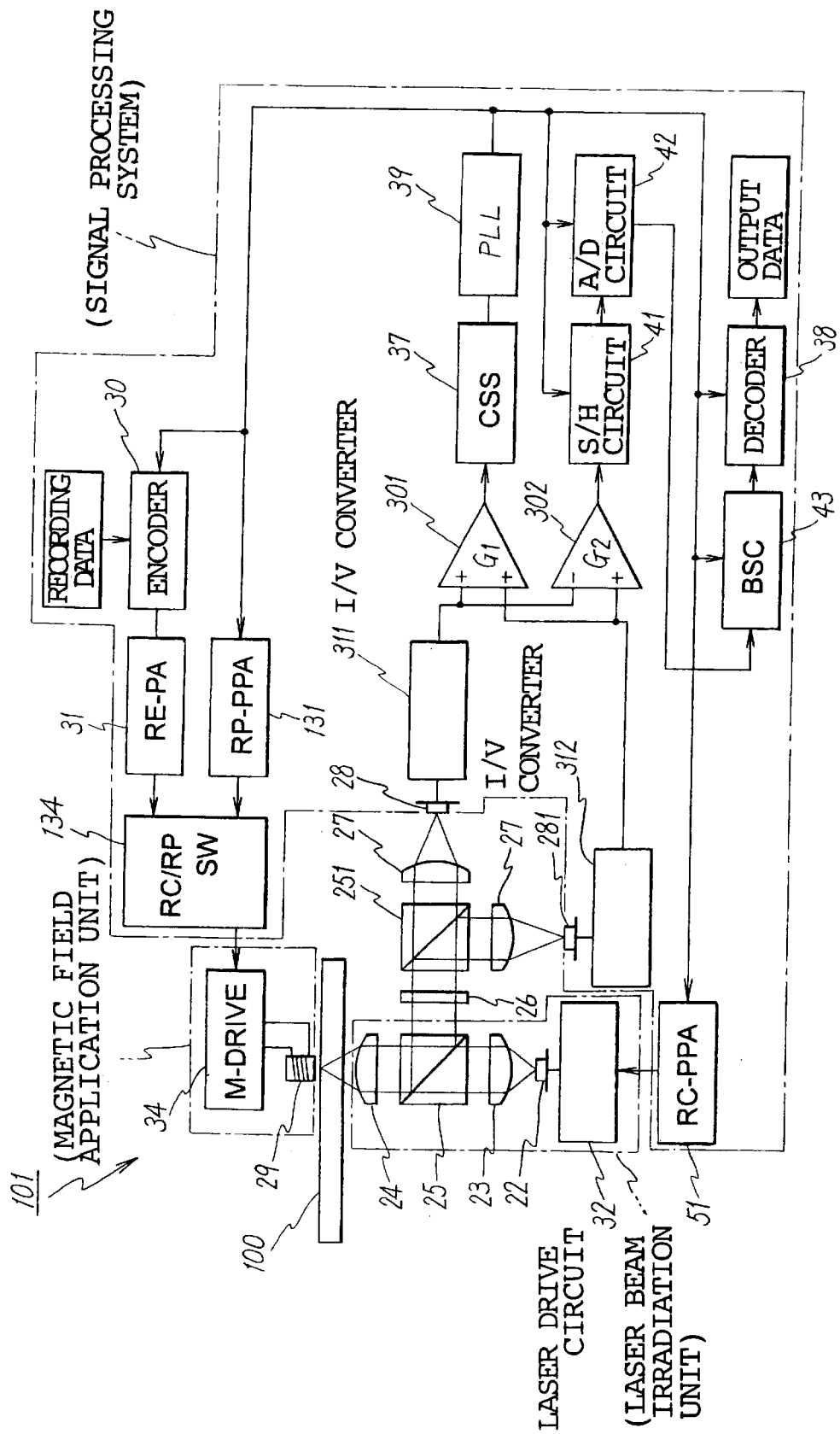
FIG. 10 shows a schematic arrangement of a magneto-optical recording and reproducing apparatus according to a fourth embodiment.
Figure 14:
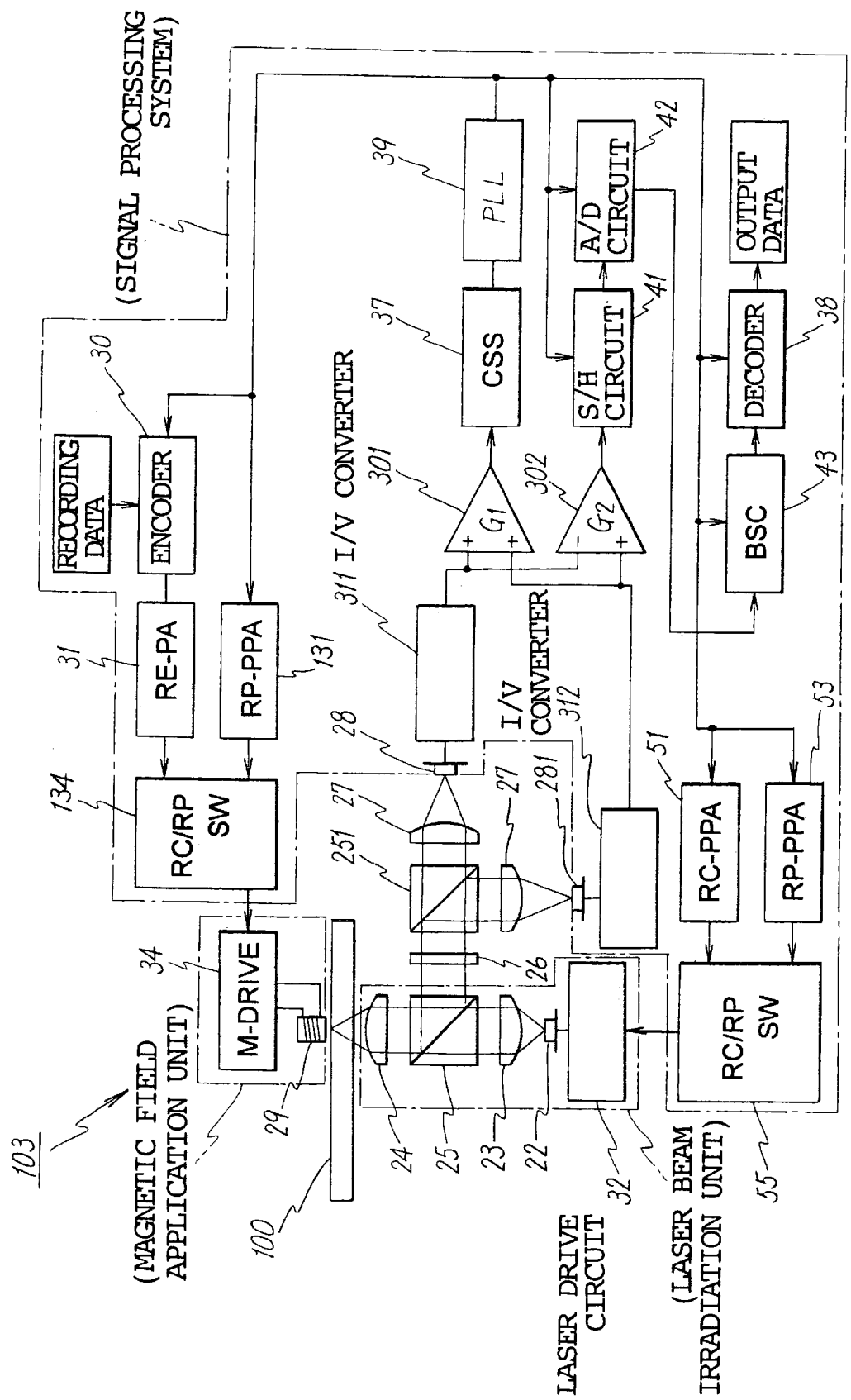
FIG. 14 shows a schematic arrangement of a magneto-optical recording and reproducing apparatus according to a fifth embodiment.

As explained in the embodiments described above, when the magneto-optical recording medium 10 (100, 101) is subjected to reproduction, the external magnetic field is applied, and the reproducing laser beam is radiated by using the apparatus shown in FIG. 10 or 14. This embodiment illustrates investigations on the condition for applying the magnetic field most preferable for reproduction based on magnification of the magnetic domain.

In the reproducing method for the magneto-optical recording medium according to the present invention, any one of the "continuous (DC)" and the "pulsed" can be selected for the magnetic field and the laser beam respectively. Therefore, the following four combinations are considered.

(1) laser beam: continuous light beam, magnetic field: continuous magnetic field;
(2) laser beam: continuous light beam, magnetic field: pulsed magnetic field;
(3) laser beam: pulsed light beam, magnetic field: continuous magnetic field; and
(4) laser beam: pulsed light beam, magnetic field: pulsed magnetic field.

Of the foregoing four combinations, it is necessary for the combinations (2) to (4) to adjust the magnitude of the pulsed laser beam or the pulsed magnetic field or of the both and the timing to be applied. In the case of the combination (2), reference is made to FIG. 28A, in which the external magnetic field Hep applied during the process to magnify the magnetic domain has a magnitude which is different from that of the external magnetic field Hsr applied during the process to erase the magnetic domain. It is assumed that the magnetic domain-magnifying reproducing layer has a magnetization-retaining force of Hc1, and the leak magnetic field exerted on the reproducing layer by the recording magnetic domain in the recording layer is Hst. A magnetic field H=Hc1+Hst is required to erase the transferred magnetic domain. On the other hand, it is sufficient to use the magnetic field Hc1 in order to magnify the transferred magnetic domain. On the other hand, it is desirable that no influence of magnification and reproduction remains when adjacent magnetic domains are subjected to reproduction. For this reason, the time T1 (the duty of the magnetic field in the recording direction) required to magnify the magnetic domain is shorter than the time T2 required to erase the magnetic domain, which is preferably within a range of $0.15 \leq T1/(T1+T2) \leq 0.9$. This range is also preferred from a viewpoint to avoid overshoot in the waveform of the reproducing magnetic field as described later on. More preferably, $0.15 \leq T1/(T1+T2) \leq 0.6$ is satisfied. An optimum value is selected for the time T1 on the basis of various factors such as magnetization characteristics of the magnetic layers for constructing the magneto-optical recording medium.

In the case of the combination (3), it takes a long time to adjust the condition under which the magnetic domain is magnified by transferring the magnetic domain in the recording layer to the reproducing layer to give a wide temperature distribution. Accordingly, the duty of the pulse of the laser beam is preferably within a range of 20 to 70%. In the case of the combination (4), reference is made to FIG. 28B which shows a relationship between the applied magnetic fields Hex and the period of the laser pulse. As shown in FIG. 28B, the laser beam (the laser power is represented by Pr in FIG. 28B) is preferably radiated such that the laser beam is turned ON/OFF once during the time T1 to magnify the magnetic domain and during the time T2 to erase the magnetic domain respectively. In the present invention, it is possible to use any one of the methods based on the combinations (1) to (4) described above. However, in order to most reliably magnify the magnetic domain, it is necessary not to cause any change of magnetic domain magnification at the portion of the reproducing layer located just over the portion of the recording layer in which no recording magnetic domain is recorded. For this purpose, it is necessary to locally lower the film temperature of the reproducing layer at such a position. Considering such a demand, it is preferable to use pulsed beam irradiation. Further, it is preferable to perform reproduction with the pulsed magnetic field which enables reliable magnification and reduction of the magnetic domain. According to the foregoing facts, it is most appropriate to perform reproduction under the condition of (4).

Figure 28A:
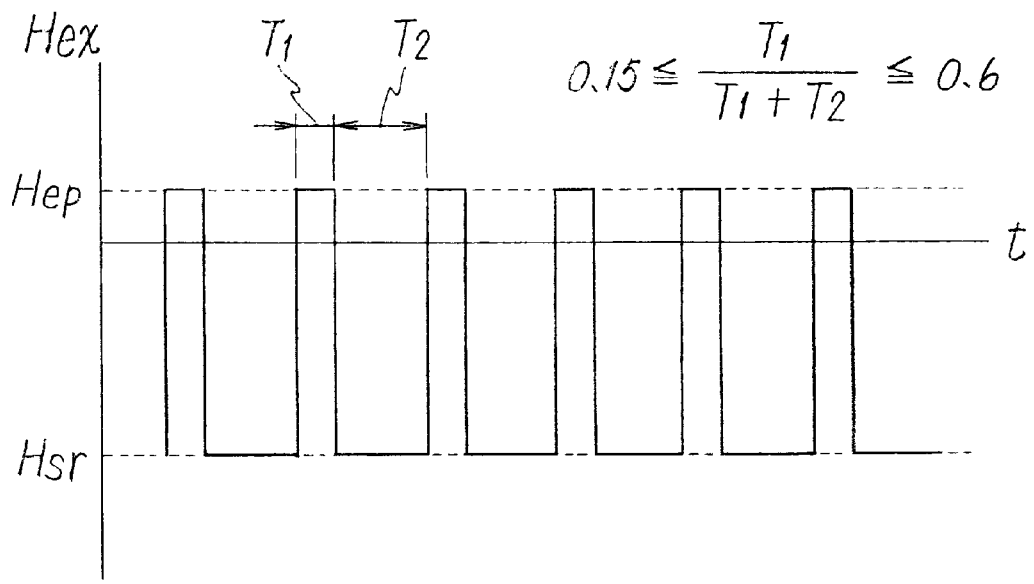
Figure 28B:
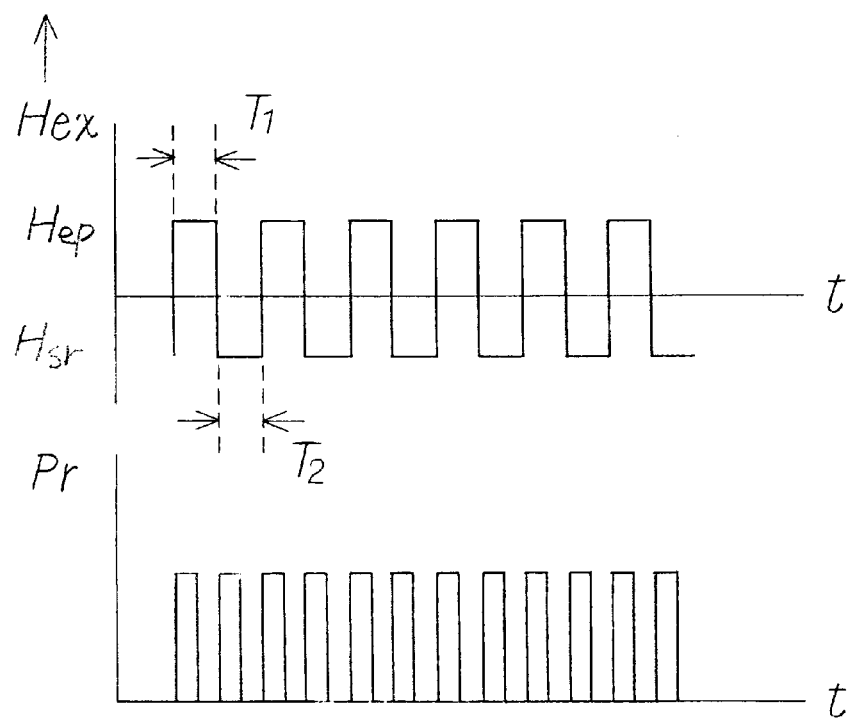
Figure 29:
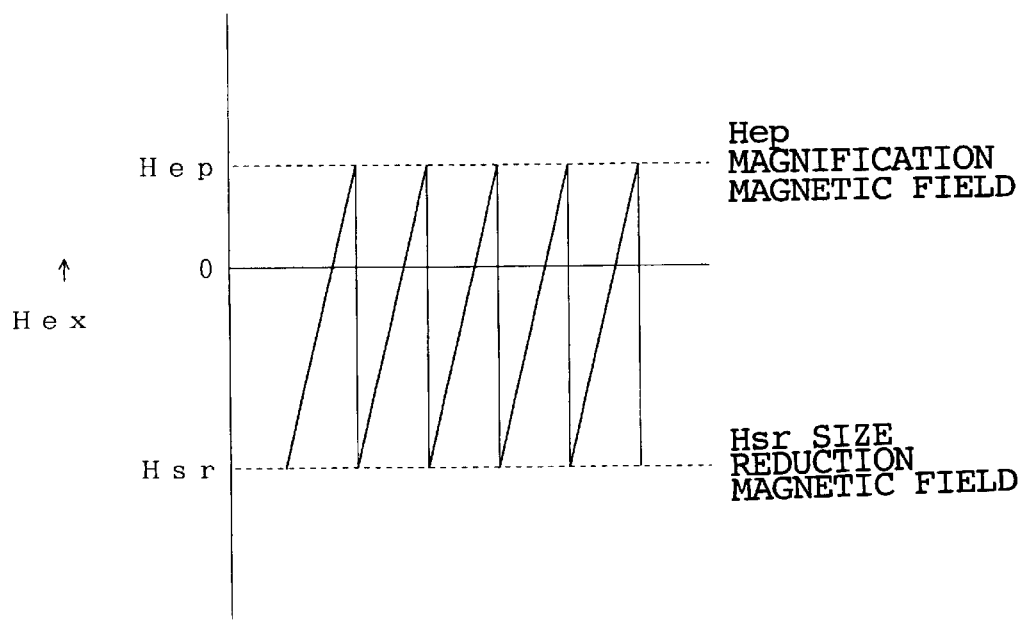
FIG. 29 shows an example of a magnetic field having a triangular waveform which may be used as a magnetic field for magnifying and reducing the magnetic domain.
Figure 30:
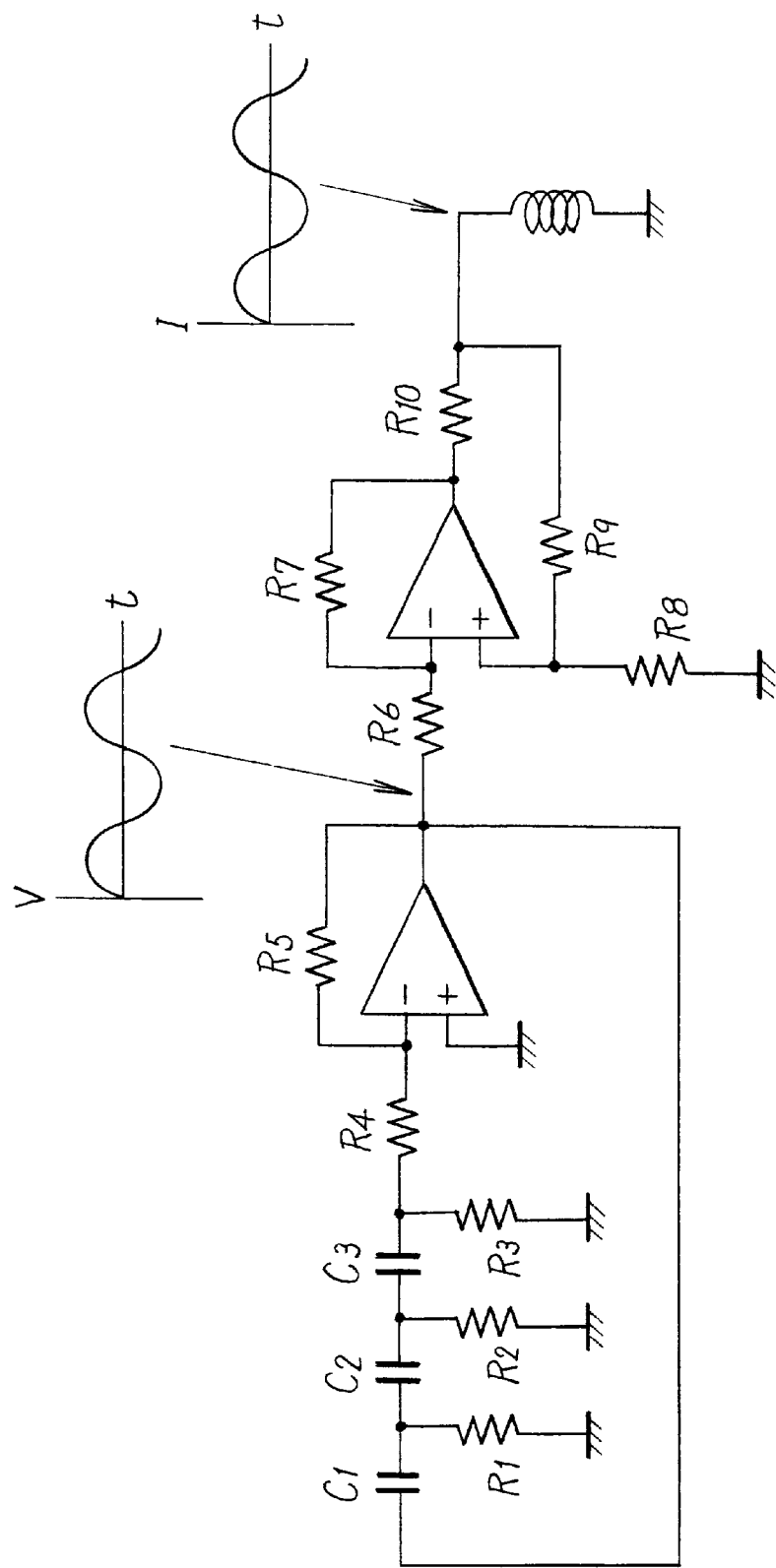
FIG. 30 shows an example of a circuit to generate a sine-wave or sinusoidal waveform which may be used as a magnetic field for magnifying and reducing the magnetic domain.

In FIGS. 28A and 28B, the magnetic field having the rectangular or square waveform is used as the alternating magnetic field to be applied. However, any magnetic field having any arbitrary waveform may be used provided that the waveform does not substantially cause overshoot, because of the following reason. That is, if there is overshoot in the waveform of the magnetic field, i.e., if there is a steep rise in the waveform of the magnetic field, and the maximum (peak) magnetic field intensity of the rise has a value exceeding, for example, Hn in the hysteresis curve shown in FIG. 5A, then the magnetic domain in the reproducing layer, which is located over a portion of the information-recording layer, is inverted, and it is read as a signal, even when the portion of the information-recording layer contains no recording magnetic domain. In order to avoid the overshoot, it is possible to use a waveform of a triangular wave as shown in FIG. 29. The use of a magnetic field having such a waveform makes it possible to mitigate the change in magnetic field during magnification and facilitate magnification of the magnetic domain. The waveform is not limited to the triangular wave. It is possible to use arbitrary waveforms provided that the magnetic field is gradually increased by using the waveform such as a sine wave or sinusoidal waveform. Rectangular or square waves may be used on condition that the overshoot does not occur. FIG. 30 shows an example of a circuit for generating a sinusoidal or sine wave appropriate to be used as the waveform of the reproducing magnetic field. A reproducing magnetic field having a sine-wave or sinusoidal waveform can be generated by incorporating the circuit as shown in FIG. 30 into the magnetic coil-driving circuit 34 of the recording and reproducing apparatus 101 (103) shown in FIG. 10 (FIG. 14).

FIGS. 31A to 31D shows the dependency, on the applied magnetic field, of the reproduction signal (amplitude) obtained when the foregoing condition (2) was used, namely when reproduction was performed with the continuous laser light beam and with the pulsed magnetic field. The magneto-optical recording medium shown in FIG. 7B was used. The laser beam had a wavelength of 830 nm and a power of 1.65 mW. The linear velocity was 1.7 m/sec. Recording was performed for domains of 0.4 μm at equal intervals. The external magnetic field was H=0 in FIG. 31A, H=130 (Oe) in FIG. 31B, H=215 (Oe) in FIG. 31C, and H=260 (Oe) in FIG. 31D. The duty of the magnetic field pulse was T1/T2=1. As for the waveform of the magnetic field, an alternating magnetic field having a waveform similar to the sinusoidal or sine wave was used. The detected signal intensity was increased as the external applying magnetic field was increased. The intensity arrived at a saturation level at H=260 (Oe). The increase in the reproduction signal caused by applying the external magnetic field indicates that the magnetic domain transferred from the recording layer to the reproducing layer is magnified.

Eighth Embodiment

Figure 32:
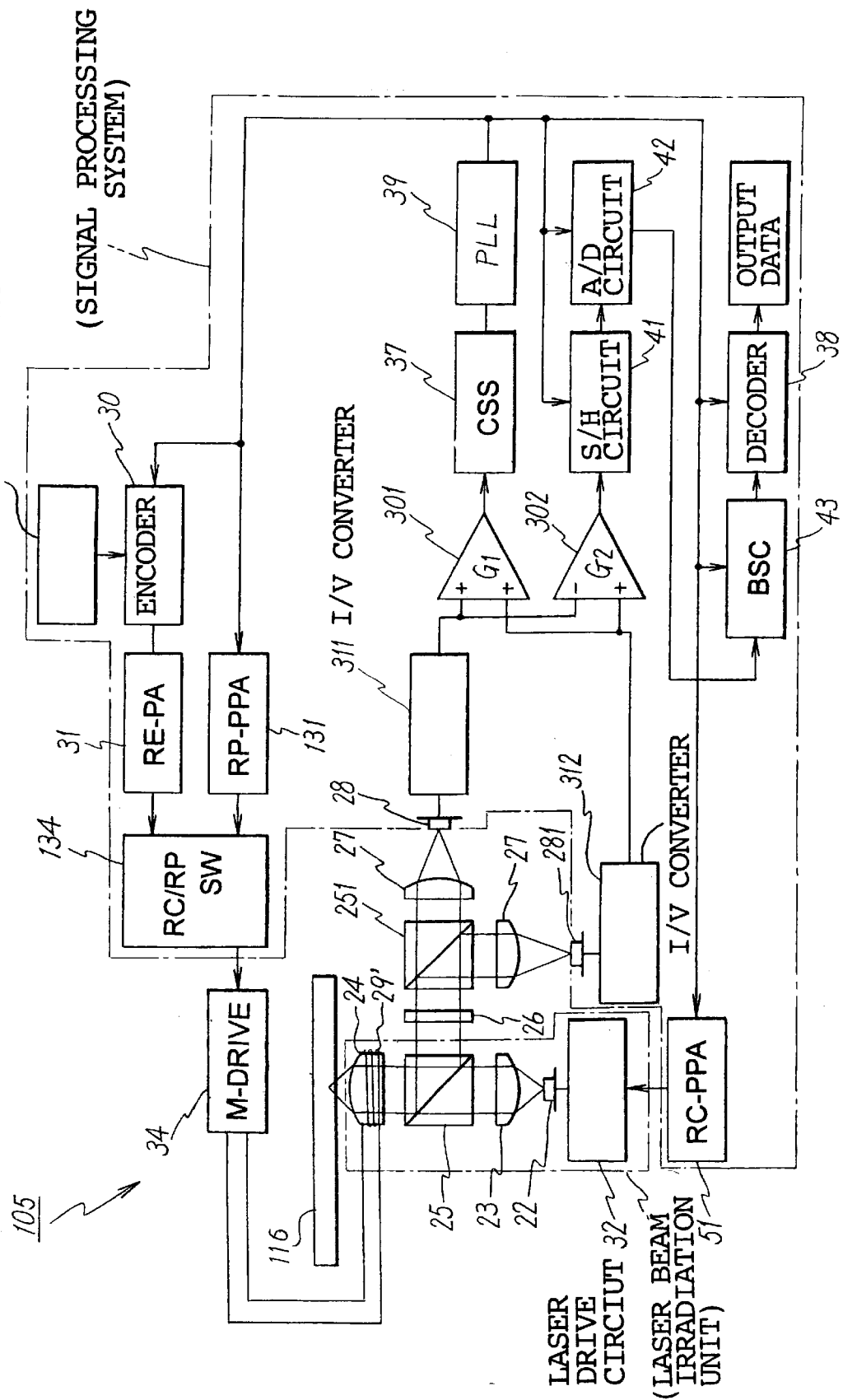
FIG. 32 shows a schematic arrangement illustrating a modified embodiment of the magneto-optical recording and reproducing apparatus shown in FIG. 10.

FIG. 32 shows a modified embodiment of the recording and reproducing apparatus 101 shown in FIG. 10. In the recording and reproducing apparatus 101 shown in FIG. 10, the external magnetic field is applied from the position over the magneto-optical recording medium 100, and the recording light beam and the reproducing light beam are radiated from the position under the magneto-optical recording medium 100, i.e., from the side of the substrate. In a recording and reproducing apparatus 105 for the magneto-optical recording medium shown in FIG. 32, it is possible to apply the external magnetic field and the recording and reproducing light beams from an identical direction. In order to realize such an arrangement, the recording and reproducing apparatus 105 comprises a magnetic coil wound around an objective lens 24 for collecting the reproducing light beam.

Figure 33:
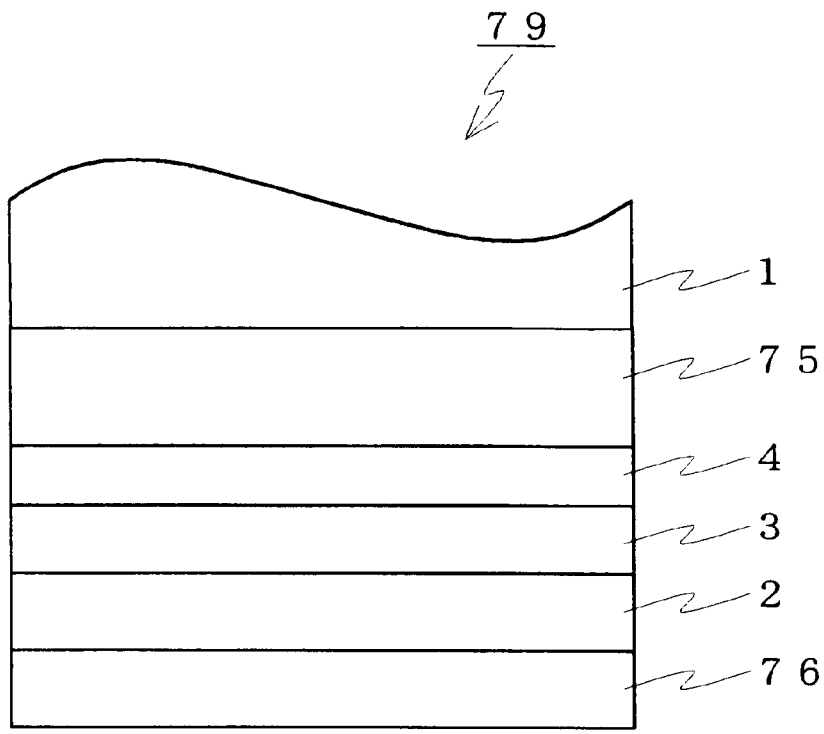
FIG. 33 shows a stacked structure of a magneto-optical recording medium preferably used to perform recording and reproduction by using the magneto-optical recording and reproducing apparatus shown in FIG. 32.

FIG. 33 shows a medium structure of a magneto-optical recording medium 79 preferably used for the recording and reproducing apparatus 105. The magneto-optical recording medium 79 has a medium structure different from the structure shown in FIG. 7B. That is, the magneto-optical recording medium 79 has a structure comprising an information-recording layer 75, a non-magnetic layer 4, a magnifying reproducing layer 3, a dielectric layer 2, and a protective layer 76, the layers being stacked on a substrate 1. When the magneto-optical recording medium 79 is subjected to recording and reproduction, the light beam is radiated and the magnetic field is applied not from the side of the substrate 1 but from the side of the protective layer 76 (from the side of the magnifying reproducing layer 3). Accordingly, it is not necessary for the substrate 1 to use a transparent material. The substrate 1 may be composed of an opaque material including, for example, metal materials such as aluminum. Further, a magneto-optical recording medium capable of double-sided recording, i.e., recording on both sides may be designed by stacking, outside the substrate 1, one more stacking structure on the stacking structure shown in FIG. 33 so that the two structures are symmetrical in relation to the substrate. The magneto-optical recording medium capable of double-sided recording has a twofold recording density as compared with the conventional magneto-optical recording medium. Especially, when the magneto-optical recording medium capable of double-sided recording is subjected to recording and reproduction by using the recording and reproducing apparatus having the structure shown in FIG. 32, the magneto-optical recording medium may be turned upside down every time when recording or reproduction is completed for one side. Therefore, the recording and reproducing apparatus 105 makes it possible to increase the recording capacity of the magneto-optical recording medium. It is noted that the design of the magneto-optical head for applying the magnetic field and the light beam from an identical direction is also applicable to the recording and reproducing apparatus shown in FIG. 14.

Ninth Embodiment

Figure 34A:
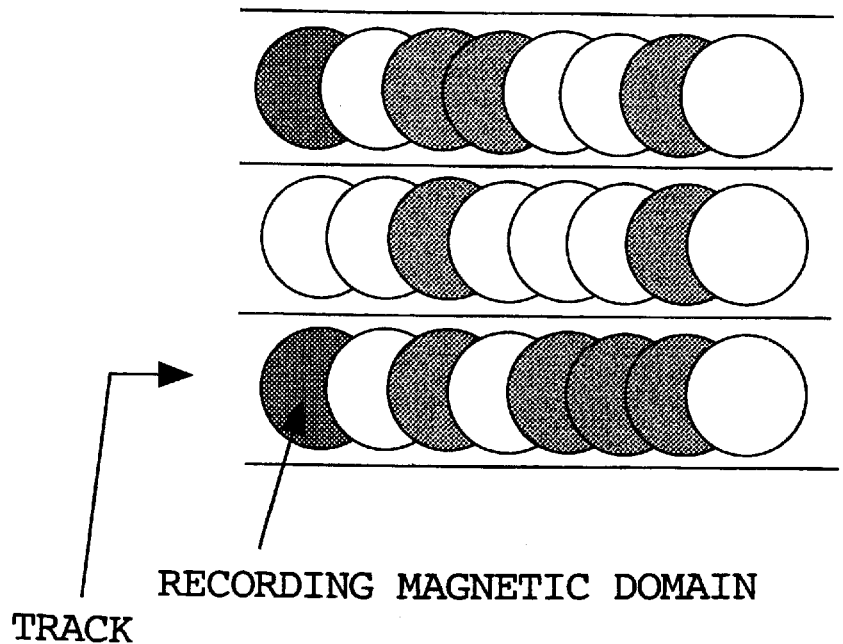
FIGS. 34A and 34B show shortest magnetic domain configurations of recording magnetic domains preferably used for magnification and reproduction of the magnetic domains.
Figure 34B:
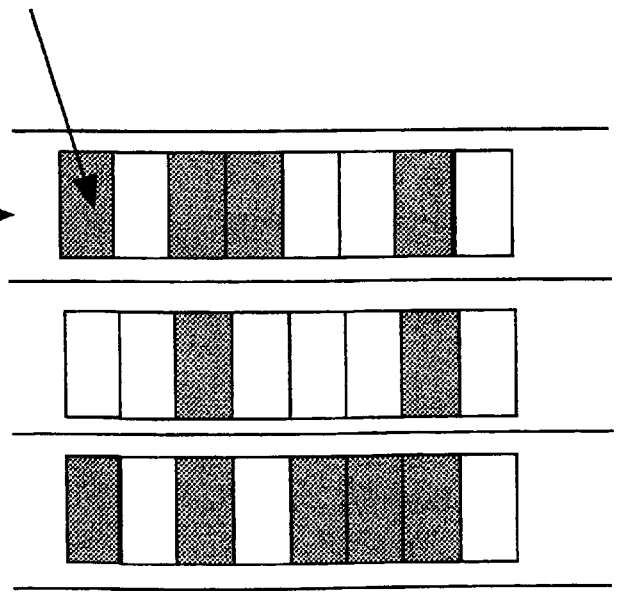

In the embodiments described above, the recording signal is recorded on the magneto-optical recording medium by using the magneto-optical field modulation system or the optical magnetic field modulation system. However, it is possible to perform recording by using the magnetic field modulation system. When recording is performed in accordance with any one of the systems, it is preferable that the recording magnetic domain has a shape of the shortest magnetic domain (the magnetic domain or magnetic mark having the shortest length in the linear direction) so that the length of the magnetic domain in the widthwise direction of the track is longer than the length in the linear direction. More preferably, a configuration is desirable, in which the rear part of the magnetic domain is concave toward the inside of the magnetic domain. The shortest magnetic domain as described above is preferably exemplified by crescent-shaped magnetic domains as shown in FIG. 34A and rectangular magnetic domains as shown in FIG. 34B. Besides, arrow-shaped or arrow wing-shaped magnetic domains (the arrow is directed in a direction opposite to the disk rotation direction) are also preferred as the shape of the shortest magnetic domain. When recording is performed with the magnetic domain formed such that the length of the magnetic domain in the widthwise direction of the track is longer than the length in the linear direction (the track direction), it is effective to use the magnetic field modulation recording system. The configuration of, for example, the arrow wing-shaped magnetic domain can be adjusted by changing the configuration of the groove and the land of the substrate.

The shape of the magnetic domain as described above facilitates magnification of the magnetic domain transferred from the reproducing layer because of the following reason. For example, it is assumed that the crescent-shaped magnetic domains shown in FIG. 34A are subjected to recording in the recording layer of the magneto-optical recording medium of the present invention. When the magneto-optical recording medium is subjected to reproduction, the magneto-optical recording medium is heated by the reproducing light beam, and the crescent-shaped magnetic domains are transferred to the reproducing layer by the aid of magnetostatic coupling or exchange coupling. In the reproducing layer, the portion corresponding to the center of the reproducing light beam spot (or its backward portion) has a high temperature. Thermodynamically, the magnetization wall is stable at a high temperature. Therefore, a stable state is given when the concave portion of the crescent-shaped magnetic domain is moved toward its backward high temperature portion (the central portion of the circle having the common circular arc with the crescent). The magnetization wall is stable when its length is short. Therefore, a stable state is given when a half moon-shaped or semicircular magnetic domain is provided as if the concave portion of the crescent-shaped magnetic domain is expanded, because the magnetization wall is short. Therefore, the magnetic domain is easily magnified on the reproducing layer, in accordance with the temperature distribution and the configuration of the magnetic domain as described above. Further, the crescent-shaped magnetic domain or similar is preferred because of the following reason. Considering the leak magnetic field or the magnetic field leakage directed from the recording magnetic domain toward the reproducing layer, the leak magnetic field from the crescent-shaped recording magnetic domain is maximized at the portion corresponding to the center of the crescent (the central portion of the circle having the common circular arc with the crescent), in the reproducing layer located over the crescent-shaped magnetic domain. Therefore, the magnetic domain transferred to the reproducing layer can be easily magnified by the aid of the leak magnetic field.

Tenth Embodiment

This embodiment illustrates a magneto-optical recording medium according to the fourth aspect of the present invention. In the first and second embodiments, the magneto-optical recording medium has been illustrated, in which the magnetic domain transferred from the recording layer to the reproducing layer is magnified and reproduced by applying the external magnetic field. However, this embodiment illustrates an example of the magneto-optical recording medium in which the magnetic domain transferred from the recording layer to the reproducing layer can be magnified and reproduced without applying any external magnetic field.

Figure 35:
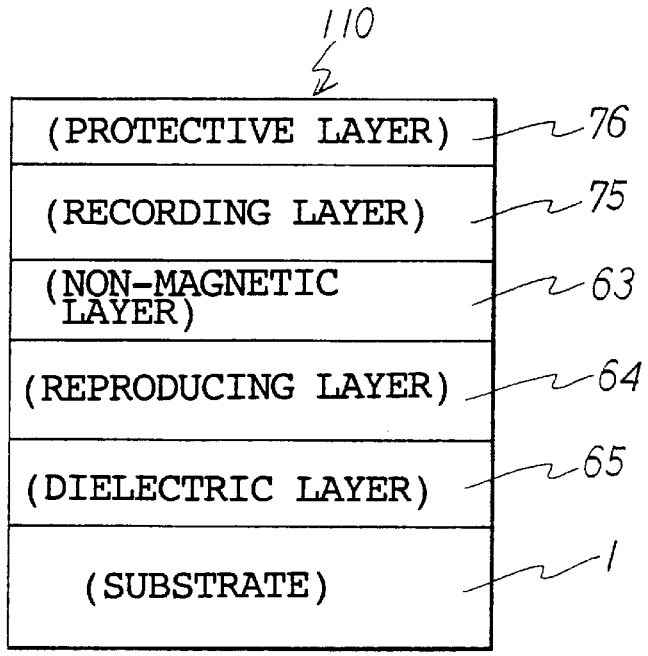
FIG. 35 shows a stacked structure of a magneto-optical recording medium according to a tenth embodiment.

FIG. 35 shows a stacked structure of the magneto-optical recording medium according to this embodiment. The magneto-optical recording medium 110 has a structure comprising a dielectric layer 65 composed of SiN, a reproducing layer 64 composed of GdCo, a non-magnetic layer 63 composed of SiN, a recording layer 75 composed of TbFeCo, and a protective layer 76 composed of SiN, the layers being successively stacked on a light-transmissive substrate 1 composed of, for example, glass or polycarbonate. A magnetic film used for the reproducing layer 64 is made of a material in which the minimum stable magnetic domain radius defined in the foregoing expression (1) is larger than the magnetic domain subjected to recording in the recording layer 75. Therefore, when the magnetization in the recording layer 75 is transferred to the reproducing layer 64 via the non-magnetic layer 64, the magnetic domain in the recording layer 75 can be reproduced as a large magnetic domain even when the magnetic domain is not magnified by applying any external magnetic field. Alternatively, the magneto-optical recording medium according to this embodiment may have a structure in which an intermediate magnetic layer composed of GdFeCo is inserted between the non-magnetic layer 63 and the reproducing layer 64. The respective layers are formed by means of the magnetron sputtering method by using Ar as a sputtering gas.

Figure 36:
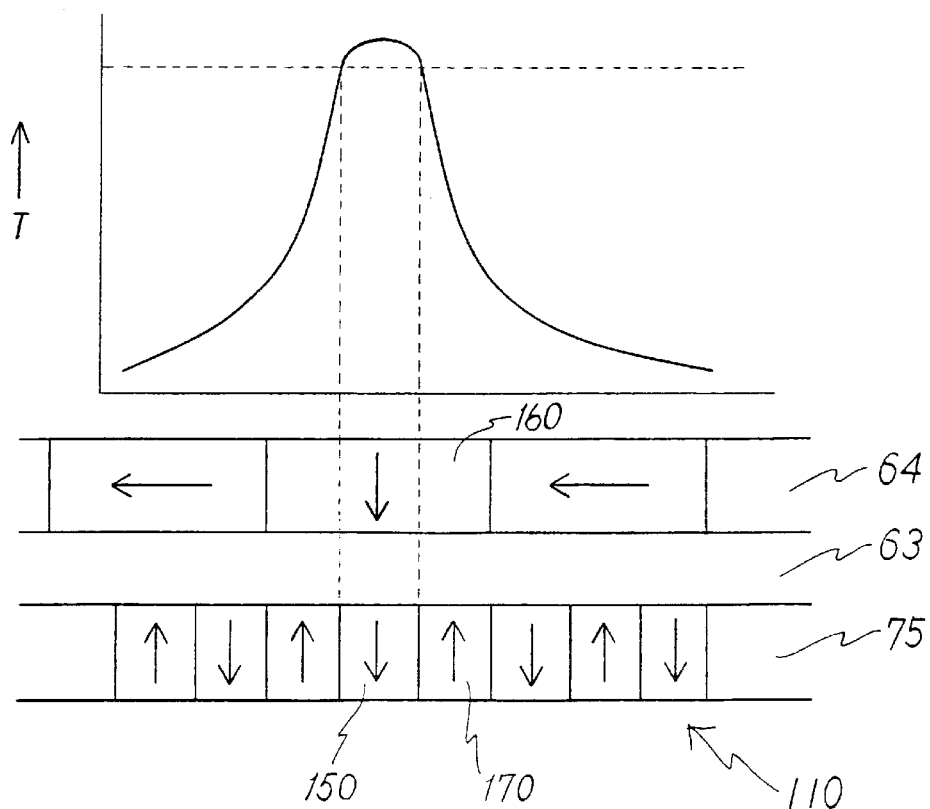
FIG. 36 explains the principle to perform reproduction on the magneto-optical recording medium according to the tenth embodiment.

With reference to FIG. 36, explanation will be made for the principle of reproduction based on the use of the magneto-optical recording medium 110. In FIG. 36, the magneto-optical recording medium 110 comprises the recording layer 75 in which a signal is recorded, the non-magnetic layer 63, and the reproducing layer 64 which behaves as an in-plane magnetizable film at room temperature and which behaves as a perpendicularly magnetizable film at a temperature not less than a predetermined temperature (critical temperature). When the magneto-optical recording medium 110 is irradiated with the laser beam, magnetization of a magnetic domain 150 subjected to recording in an area at a temperature raised to be not less than the predetermined temperature is transferred to a magnetic domain 160 in the reproducing layer 64 via the non-magnetic layer 63. In this case, transfer from the magnetic domain 150 to the magnetic domain 160 is performed in accordance with magnetostatic coupling. As a result, the entire magnetic domain 160 in the reproducing layer 64 is magnetized in the downward direction. Therefore, the magnetic domain is transferred from the recording layer 75 to the reproducing layer 64, and the magnetic domain larger than the magnetic domain in the recording layer can be transferred to the reproducing layer, without involving the process to magnify the magnetic domain by applying any external magnetic field. After the magnetic domain 150 is reproduced, the radiating position of the laser beam is moved to a position of a magnetic domain 170 to be subsequently reproduced. At this time, the effective perpendicular magnetic anisotropy of the magnetic domain 160 is decreased, and the magnetization of the magnetic domain 160 is directed in the in-plane direction. When the magnetic domain 170 to be subsequently reproduced and an area in the magnetic domain 160 located over the magnetic domain 170 arrive at a temperature not less than the predetermined temperature, the effective perpendicular magnetic anisotropy of the magnetic domain 160 is increased. Thus, magnetization directed upward is transferred, and a signal of the magnetic domain 170 is reproduced. After the reproduction, the temperature is lowered, and magnetization of the magnetic domain 160 is directed in the in-plane direction. This process is repeated, and thus the respective magnetic domains subjected to recording in the recording layer 75 are reproduced.

A magnetic film used for the reproducing layer 64 may be composed of a material which behaves as an in-plane magnetizable film at room temperature, and which behaves as a perpendicularly magnetizable film at a temperature not less than a predetermined temperature, wherein the minimum stable magnetic domain radius is larger than the magnetic domain subjected to recording in the recording layer 75. It is appropriate to use a magnetic film composed of Gd and an element selected from Fe, Co, and Ni. The recording layer 75 may be a single-layered magnetic film or a multi-layered magnetic film composed of TbFeCo, an element selected from Tb, Dy, and Nd, and an element selected from Fe, Co, and Ni. The recording layer 75 may be a single-layered magnetic film or a multi-layered magnetic film composed of an element of Pt or Pd and an element selected from Fe, Co, and Ni.

The predetermined temperature, at which the reproducing layer 64 changes from the in-plane magnetizable film to the perpendicularly magnetizable film, is within a range of 140 to 180° C. Preferably, the temperature coefficient C, which represents steepness or quickness of the change from the in-plane magnetizable film to the perpendicularly magnetizable film, is not less than 8.0 in the same manner as described in the second embodiment.

Figure 37:
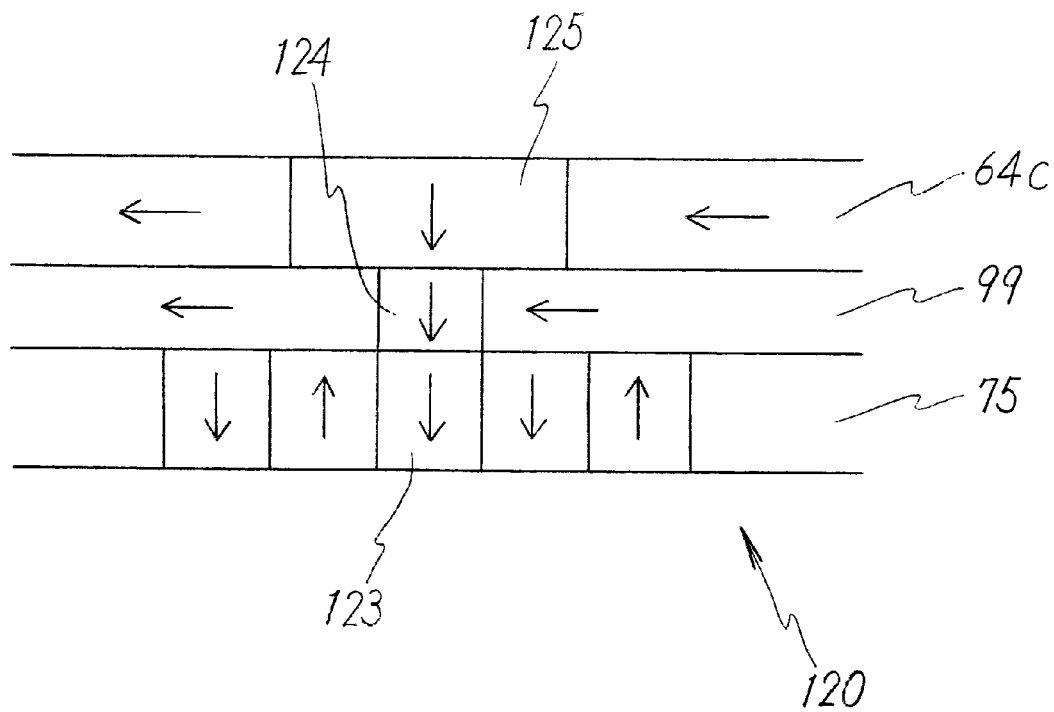
FIG. 37 explains a magnetic domain structure of another magneto-optical recording medium according to the tenth embodiment.

The magneto-optical recording medium 110 is not limited to the structure shown in FIG. 36, which may have a structure inserted with a magnetic film which behaves as an in-plane magnetizable film at room temperature, and which behaves as a perpendicularly magnetizable film at a temperature not less than a predetermined temperature, in place of the non-magnetic layer 63. FIG. 37 conceptually shows a structure which uses, in place of the non-magnetic layer 63 of the magneto-optical recording medium shown in FIG. 36, an intermediate magnetic film 99 which behaves as an in-plane magnetizable film at room temperature, and which changes from the in-plane magnetizable film to a perpendicularly magnetizable film at a critical temperature TCR1. The reproducing layer is indicated as 64C. The intermediate magnetic layer 99 has a minimum stable magnetic domain radius which is in the same degree as that of the recording layer 75. GdFeCo, GdFe, and GdCo are appropriate for the intermediate magnetic film 99. The reproducing layer 64C also changes from an in-plane magnetizable film to a perpendicularly magnetizable film at a temperature not less than a critical temperature TCR2. However, its temperature region is within a range of 100 to 170° C. In the magneto-optical recording medium having this structure, the steep or quick change of the intermediate magnetic layer 99 from the in-plane magnetizable film to the perpendicularly magnetizable film determines the reproducing characteristic. Therefore, the magnetic film used for the intermediate magnetic layer 99 preferably has a temperature coefficient C of not less than 8.0. It is desirable that the intermediate layer 99 has a thickness which is not less than a thickness of the magnetization wall formed between a magnetic domain 124 in the intermediate magnetic layer 99 and magnetic domains of in-plane magnetization adjacent thereto, in order to enable magnetization of the intermediate layer 99 to make rotation.

When the magneto-optical recording medium 125 shown in FIG. 37 is irradiated with a laser beam, and the temperature of an area corresponding to the magnetic domain 123 in the recording layer 75 is raised, then the magnetization of the magnetic domain 123 is transferred to the magnetic domain 124 in the intermediate magnetic layer 99 by the aid of exchange coupling force, which is further transferred to the magnetic domain 125 in the reproducing layer 64C. Accordingly, the minute magnetic domain 123 in the recording layer 75 is reproduced as the large magnetic domain 125 in the reproducing layer 64C. The use of the intermediate magnetic layer 99 makes it unnecessary to apply any external magnetic field, when either an in-plane magnetizable film or a perpendicularly magnetizable film is used for the reproducing layer.

In order to perform reproduction on the magneto-optical recording medium shown in this embodiment, it is sufficient to radiate only the laser beam. Methods for radiating the laser beam include a method for radiating a continuous light beam and a method for radiating a pulsed light beam. In the case of the pulsed light beam, the duty is within a range of 20 to 70%.

Figure 38:
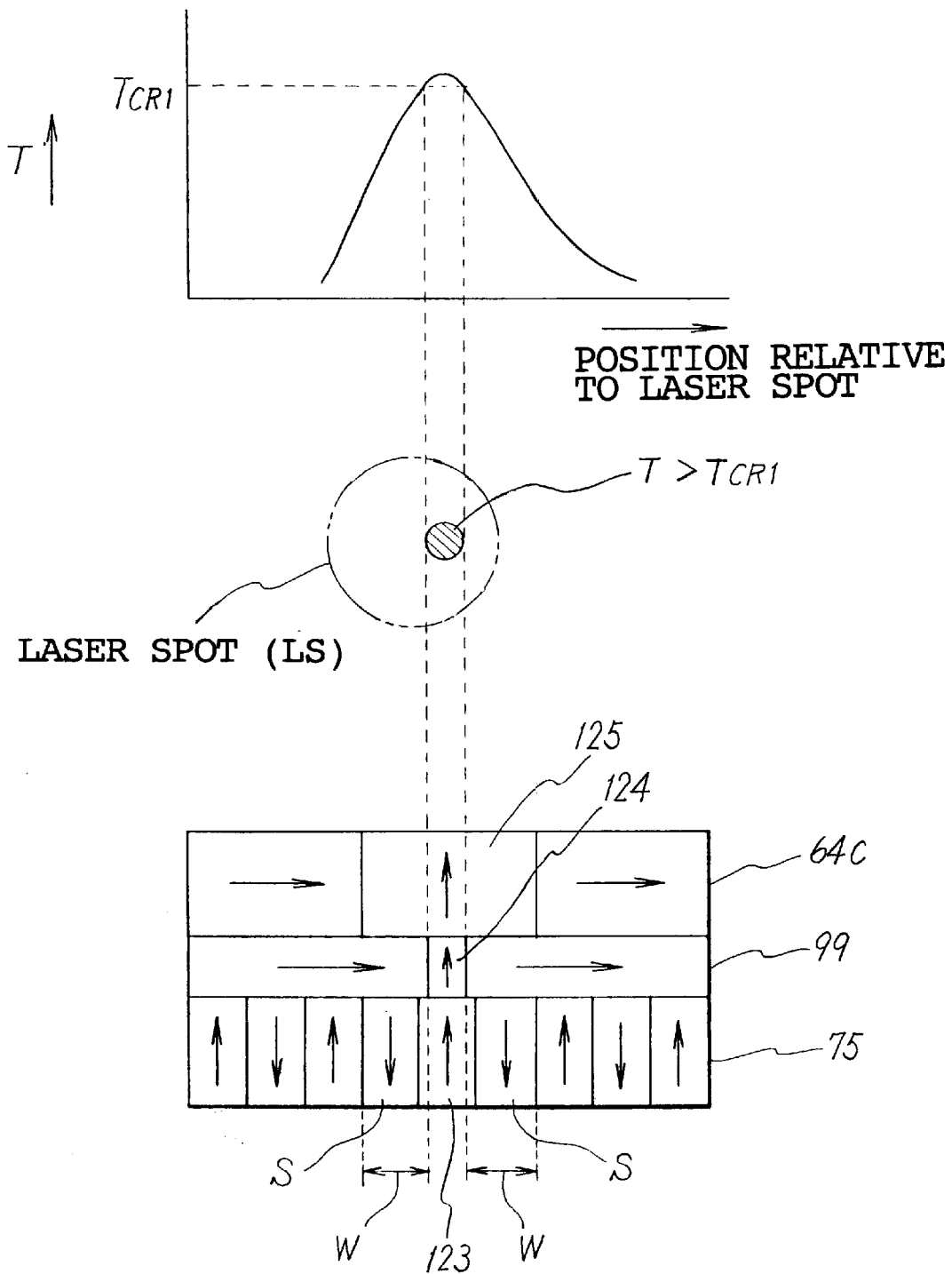
FIG. 38 explains the principle of reproduction on the medium having the magnetic domain structure shown in FIG. 37.
Figure 39A:
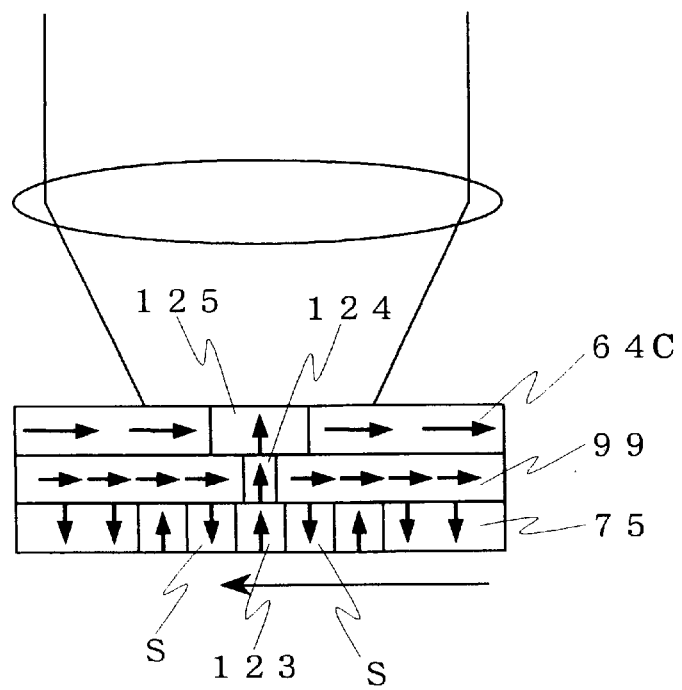
FIGS. 39A and 39B explain an advantage obtained when a magnetic domain transferred to an intermediate magnetic layer or a gate layer is smaller than a magnetic domain subjected to recording in a recording layer.
Figure 39B:
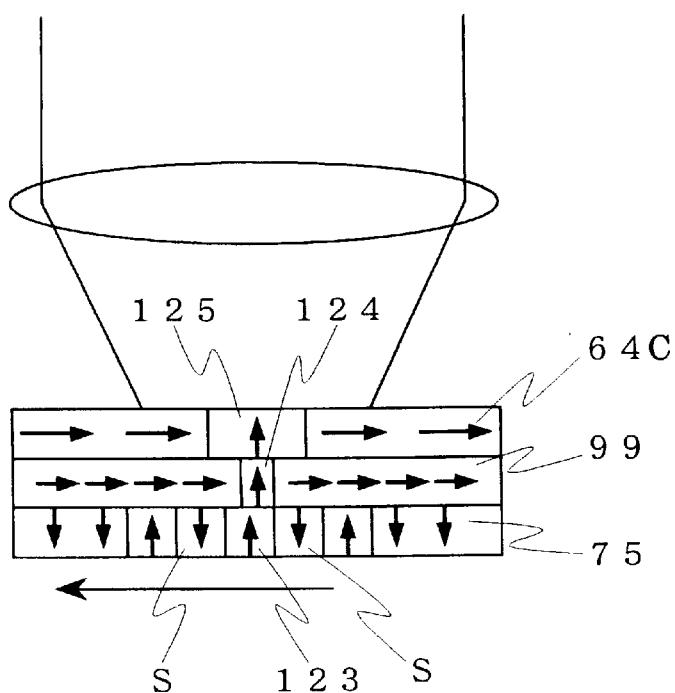

In FIG. 37, it is preferable that the recording magnetic domain 123 in the recording layer 75 is transferred to the intermediate magnetic layer 99 while being reduced as shown in a lower part of FIG. 38. The reason thereof will be explained with reference to FIG. 38. FIG. 38 shows, in its upper part, a temperature distribution obtained when the magneto-optical recording medium having the structure shown in FIG. 37 is heated by a reproducing laser spot (LS). FIG. 38 also shows, in its middle part, a temperature distribution in relation to the laser spot (LS) on the magneto-optical recording medium as viewed from a position over the reproducing layer 64C. If the size or magnitude of the magnetic domain 124 (magnetization in the direction ↑) transferred to the intermediate magnetic layer 99 is equivalent to or larger than the size or magnitude of the recording magnetic domain 123, then the magnetic domain 124 in the intermediate magnetic layer 99 is magnetically affected by magnetic domains S having magnetization in the direction ↓ adjacent to the recording magnetic domain 123, and the magnetic domain 124 becomes unstable. It is necessary for the magnetic domain 124 transferred to the intermediate magnetic domain 99 to play a role to transmit magnetization information of the recording magnetic domain 124 to the reproducing layer 64C having the function to magnify the magnetic domain. Therefore, the magnetic domain 124 is required to be magnetically stable. Accordingly, the influence exerted by the magnetic domains S adjacent to the recording magnetic domain 123 on the magnetic domain 124 in the intermediate magnetic layer 99 can be decreased by reducing and transferring the magnetic domain from the recording magnetic domain 123 to the intermediate magnetic layer 99. Thus, it is possible to stabilize the magnetization of the magnetic domain 124 in the intermediate magnetic layer 99. Especially, since the magneto-optical recording medium is usually subjected to reproduction in a state of rotation, the magnetic domains in the recording layer 75 of the magneto-optical recording medium are moved one after another with respect to the reproducing light beam spot as shown in FIGS. 39A and 39B. On the other hand, the temperature area at a temperature exceeding TCR1 in the intermediate layer 99 exists at a constant position relative to the reproducing light beam spot. When the temperature area at the temperature exceeding TCR1 in the intermediate layer 99 has the same size as that of the recording magnetic domain 123, only one recording magnetic domain in movement exists only instantaneously in the temperature area. During the other period of time, a part of one recording magnetic domain and a part of another magnetic domain adjacent thereto exist in the temperature area. Therefore, it is extremely difficult to read only magnetization information of a single recording magnetic domain from the temperature area at the temperature exceeding TCR1 in the intermediate layer 99. However, when the temperature area at the temperature exceeding TCR1 in the intermediate layer 99 has a size smaller than the size of the recording magnetic domain 123, the period of time during which the temperature area exists over only one single recording magnetic domain is relatively long. Accordingly, it is possible to reliably transfer magnetization information from the only one single recording magnetic domain to the intermediate magnetic layer 99. The foregoing reason is appropriate when the intermediate layer behaves as a perpendicularly magnetizable film at a temperature not lower than room temperature. That is, when a magnetic material, which exhibits perpendicular magnetization at a temperature not lower than room temperature, is used for the intermediate magnetic layer, it is also effective to perform transfer so that the magnetic domain transferred from the recording layer to the intermediate magnetic layer is reduced.

In order to make the size of the magnetic domain in the intermediate magnetic layer 99 to be smaller than the size of the recording magnetic domain 123, the laser power and TCR1 of the intermediate magnetic layer 99 may be adjusted so that the temperature area at a temperature exceeding TCR1 of the intermediate magnetic layer 99 is smaller than the size (width) of the recording magnetic domain 123 in the recording layer 75 as shown in FIG. 38. The fact that the size of the magnetic domain 124 transferred to the intermediate magnetic layer 99 is smaller than the recording magnetic domain 123 in the recording layer 75 can be verified, for example, in accordance with the following method. The substrate 1 is removed from the magneto-optical recording medium on which information has been recorded. The dielectric film 65 and the reproducing layer 64 are eliminated, for example, by means of sputtering etching. After that, the surface of the intermediate magnetic layer 99 is heated to the reproducing temperature, and it may be observed by using a light-optic microscope or the like.

In the case of the illustrative arrangement shown in FIG. 38, the recording magnetic domain 123 in the recording layer 75 is reduced and transferred as the magnetic domain 124 to the intermediate magnetic layer 99 during reproduction. The magnetic domain 124 is magnified and transferred as the magnetic domain 125 to the reproducing layer 64C.

It is unnecessary to apply any magnetic field to the magneto-optical recording medium described in this embodiment during reproduction of information. Therefore, reproduction may be executed without applying any reproducing magnetic field by using the reproducing method and the recording and reproducing apparatus explained in the fourth or fifth embodiment. That is, an apparatus for performing reproduction on the magneto-optical recording medium explained in this embodiment may be constructed by omitting the magnetic field-applying unit and a part of the signal-processing system relating thereto, from the apparatus shown in FIG. 10 or 14. Alternatively, it is also available that the magnetic field-applying unit of the apparatus shown in FIG. 10 or 14 is not operated during reproduction on the magneto-optical recording medium explained in this embodiment. When the light beam is pulse-modulated, it is possible to apply the clock-generating method explained in the sixth embodiment. The method for recording with the shortest magnetic domain configuration explained in the ninth embodiment is also effective in the magneto-optical recording medium of this embodiment (the magneto-optical recording medium according to the twenty-second aspect of the present invention).

Eleventh Embodiment

The magneto-optical recording medium of the present invention can be applied as a magneto-optical recording medium of the land-groove type. Especially, the present invention is effectively used for constructing a magneto-optical recording medium of the land-groove type in which the land width is narrower than the groove width, and information is recorded on the land. That is, even when minute recording magnetic domains are formed at the narrow land, then the recording magnetic domains are magnified, and information is read via the reproducing layer. Accordingly, a reproduction signal with excellent C/N is obtained even from the minute magnetic domains recorded at the narrow land. The present invention makes it possible to design and use the medium having the novel structure as described above.

The magneto-optical recording media according to the first to fourth aspects have been specifically explained with reference to the embodiments. However, the present invention is not limited thereto, which may include modifications and improvements thereof. For example, as for the materials for constructing the magneto-optical recording medium, various materials can be used provided that they realize the present invention. An arbitrary intermediate layer is allowed to intervene at arbitrary positions such as over or under the magnetic domain-magnifying reproducing layer and over and under the information-recording layer or the gate layer. Alternatively, it is also possible to process the surface of the layer. For example, in the case of production of the magneto-optical recording media shown in the second embodiment and in the ninth embodiment, the reproducing layer is formed after forming the dielectric layer composed of SiN on the substrate. However, the surface of the dielectric layer may be made flat by means of etching before forming the reproducing layer, and then the reproducing layer may be formed. As for the etching condition, the power may be adjusted within a range of 0.05 to 0.20 W/cm$^2$, and the sputtering time may be adjusted within a range of 15 to 30 minutes in the magnetron sputtering method based on the use of Ar gas. By doing so, it is possible to form a magnetic film having large anisotropy, and it is possible to further improve the reproducing characteristic of the magneto-optical recording medium.

In the magneto-optical recording medium according to any one of the first to fourth aspects, the reproducing layer of the magneto-optical recording medium may be either a magnetic layer having perpendicular magnetization or a magnetic layer in which a predetermined area undergoes transition from in-plane magnetization to perpendicular magnetization upon being irradiated with the reproducing light beam. In the fourth embodiment, information is recorded in accordance with the optical magnetic field recording system. However, the present invention is not limited thereto. It is also possible to use the optical modulation system and the magnetic field modulation system.

Twelfth Embodiment

Figure 40:
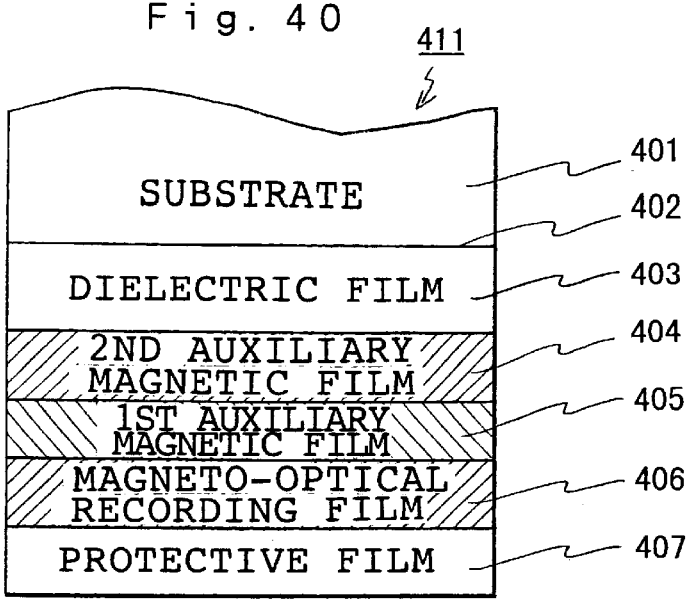
FIG. 40 shows a sectional view conceptually illustrating a stacked structure of a magneto-optical recording medium according to the present invention.
Figure 41A:
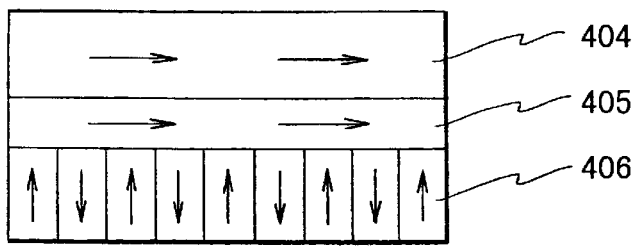
FIG. 41A conceptually illustrates the magnetization states of respective layers before reproduction of the magneto-optical recording medium of the present invention, and FIG. 41B conceptually illustrates magnetization states of the respective layers during reproduction of the magneto-optical recording medium shown in FIG. 41A.
Figure 41B:
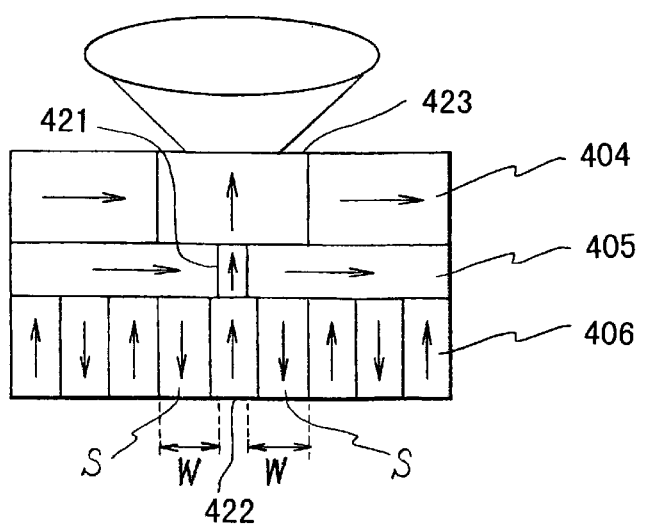

An example of the structure of a magneto-optical recording medium, which belongs to the fifth to seventh aspects of the present invention, will be explained with reference to FIG. 40. As shown in FIG. 40, the magneto-optical recording medium 411 belonging to the first type comprises a transparent substrate 401 having a desired preformat pattern 402 formed on one side, a dielectric film 403 formed on the preformat pattern 402, a second auxiliary magnetic film 404 formed on the dielectric film 403, a first auxiliary magnetic film 405 formed on the second auxiliary magnetic film 404, a magneto-optical recording film 406 formed on the first auxiliary magnetic film 405, and a protective film 407 formed on the magneto-optical recording film 406.

In the structure shown in FIG. 40, arbitrary substrates having light-transmitting property may be used as the transparent substrate 404, including, for example, those in which a transparent resin material such as polycarbonate and amorphous polyolefine is molded to have a desired shape, and those in which a transparent resin film transferred with a desired preformat pattern 402 is tightly secured to one surface of a glass plate formed to have a desired shape. The dielectric film 403 is provided in order that the reproducing light beam is multiply interfered in the film to increase the apparent Kerr rotation angle, and it can be formed with an inorganic dielectric composed of, for example, SiN having a refractive index larger than that of the transparent substrate 401. The protective film 407 is provided in order that the films 403 to 406, which are stacked between the substrate 401 and the protective film 407, are protected from harmful chemical influences such as corrosion, and it is composed of, for example, an SiN film. The magneto-optical recording film 406 is a perpendicularly magnetizable film which exhibits the perpendicular magnetic anisotropy in a wide temperature range including room temperature, for which it is preferable to use, for example, amorphous alloy composed of transition metal and rare earth metal such as TbFeCo, DyFeCo, and TbDyFeCo. However, it is also possible to use other known magneto-optical recording materials such as an alternate stack composed of Pt film and Co film and a garnet-based oxide magnetic material.

Figure 42:
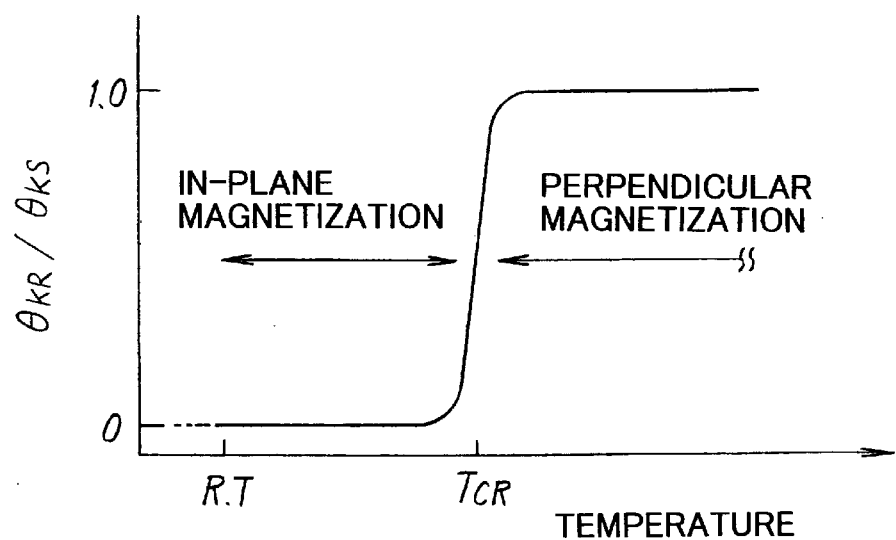
FIG. 42 shows a magnetic characteristic of an auxiliary magnetic film for constructing the magneto-optical recording medium of the present invention.

As shown in FIG. 42, the first auxiliary magnetic film 405 and the second auxiliary magnetic film 404 have such magnetic characteristic that they behave as an in-plane magnetizable film at a temperature from room temperature (R.T) to a certain critical temperature (TCR) of not less than room temperature, and they cause transition to a perpendicularly magnetizable film at a temperature of not less than TCR. FIG. 42 depicts, with respect to the temperature, θKR/θKS (θKR: remaining Kerr rotation angle, θKS: saturated Kerr rotation angle) determined from the hysteresis loop of the Kerr effect obtained when the external magnetic field is applied in the direction perpendicular to the film surface of the auxiliary magnetic film, in order to illustrate the magnetization direction. In this specification, the term "room temperature" indicates the atmospheric temperature at which the magneto-optical recording medium is used, wherein the room temperature slightly differs depending on the place of use, however, it is generally 15° C. to 25° C. Those preferably used for the material for the auxiliary magnetic films 404, 405 include, for example, amorphous alloy composed of transition metal and rare earth metal, such as GdFeCo, GdFe, GdTbFeCo, and GdDyFeCo. The components and the compositions of the first and second auxiliary magnetic layers are determined considering the condition of Tcr2<Tcr1 and/or the relationship between the temperature area in which the temperature exceeds TCR1 during the radiation of the reproducing light beam and the size of the magnetic domain in the magneto-optical recording layer.

The dielectric film 403, the second auxiliary magnetic film 404, the first auxiliary magnetic film 405, the magneto-optical recording film 406, and the protective film 407 can be formed, for example, by means of the dry process including, for example, the continuous sputtering based on the use of the magnetron sputtering apparatus.

Examples to produce samples of the magneto-optical disk will be described below, as examples of the magneto-optical recording medium shown in FIG. 40. Each of the samples of the magneto-optical disk was manufactured by successively stacking, by means of the sputtering method, a dielectric film composed of an SiN film, a second auxiliary magnetic film composed of a $Gd_{25}Fe_{56}Co_{19}$ film (II), a first auxiliary magnetic film composed of a $Gd_{28}Fe_{53}Co_{19}$ film (I), a magneto-optical recording film composed of a $Tb_{21}Fe_{66}Co_{13}$ film, and a protective film composed of an SiN film on a glass substrate having a preformat pattern. Table 1 shows the thicknesses and the magnetic characteristics of the respective auxiliary magnetic films and the magneto-optical recording film in this case. In the table, Tc represents the Curie temperature, and TCR represents the critical temperature at which the in-plane magnetizable film of the auxiliary magnetic film is changed to the perpendicularly magnetizable film.

TABLE 1

| Material | Film thickness (nm) | TC (° C.) | TCR (° C.) |
|---|---|---|---|
| Magneto-optical recording film TbFeCo | 50 | 270 | — |
| First auxiliary magnetic film GdFeCo(I) | 60 | >300 | 200 |
| Second auxiliary magnetic film GdFeCo(II) | 50 | >300 | 90 |

A test signal was recorded in a data-recording area of the sample disk manufactured as described above by modulating the external magnetic field corresponding to the recording signal while radiating the laser beam in a pulse form at a constant cycle, i.e., by using the magneto-optical modulation system. The duty ratio of the recording light pulse was 50%. The test signal was used so that recording marks having a variety of recording mark lengths were formed.

Subsequently, the recording mark having the various lengths were reproduced by using the optical pick-up with a numerical aperture NA=0.55 of the objective lens and the laser wavelength of 780 nm at a linear velocity of 7.5 m/sec with the reproducing power of 2.5 mW, while applying no external magnetic field during the reproduction. The compositions of the magneto-optical recording film, the first auxiliary magnetic film, and the second auxiliary magnetic film of the sample disk and the reproducing power were adjusted as described above. Thus, it has been revealed by the verification method as described above that the size (radius) of the magnetic domain of the perpendicular magnetization transferred to the first auxiliary magnetic film is smaller than the size (radius) of the recording magnetic domain of the magneto-optical recording film.

Figure 43:
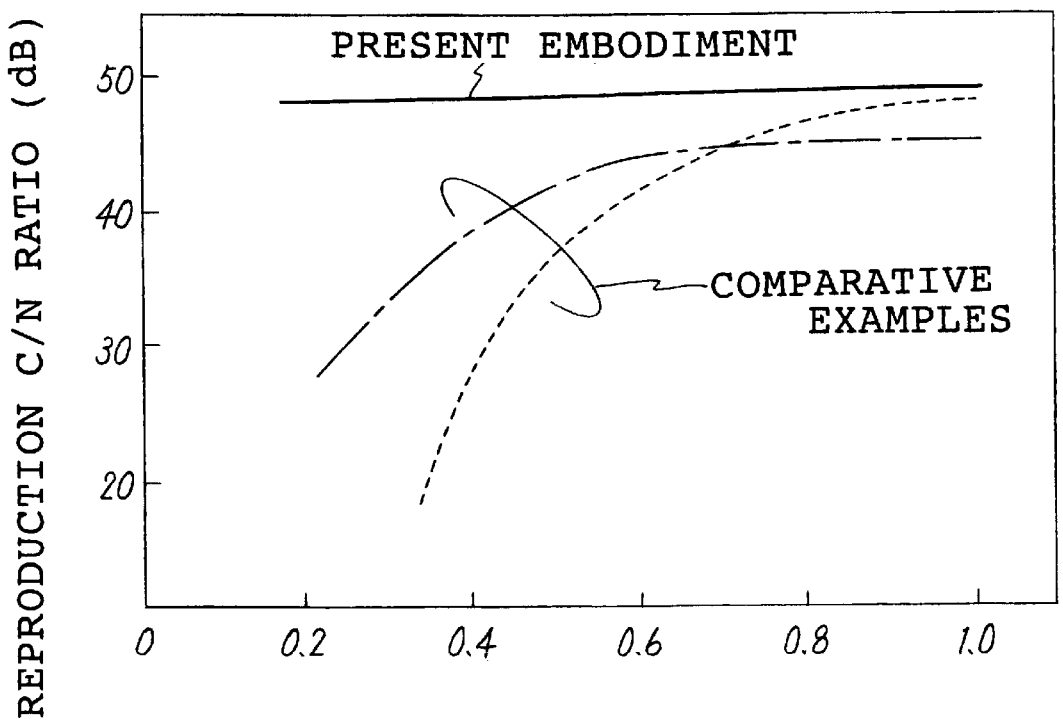
FIG. 43 shows a graph illustrating the relationship between reproducing C/N and the recording mark length for the magneto-optical recording medium produced in the twelfth embodiment of the present invention and the conventional type magneto-optical recording medium.
Figure 44A:
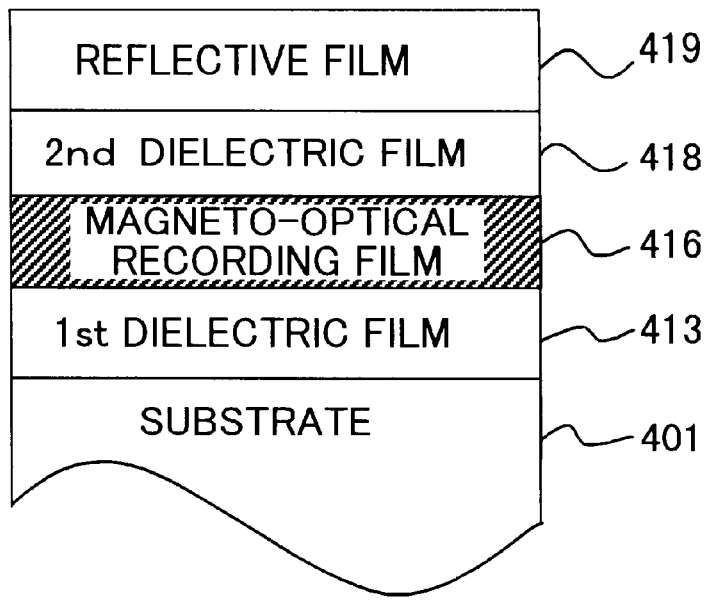
FIG. 44A shows a sectional view illustrating a stacked structure of the conventional type magneto-optical recording medium.
Figure 44B:
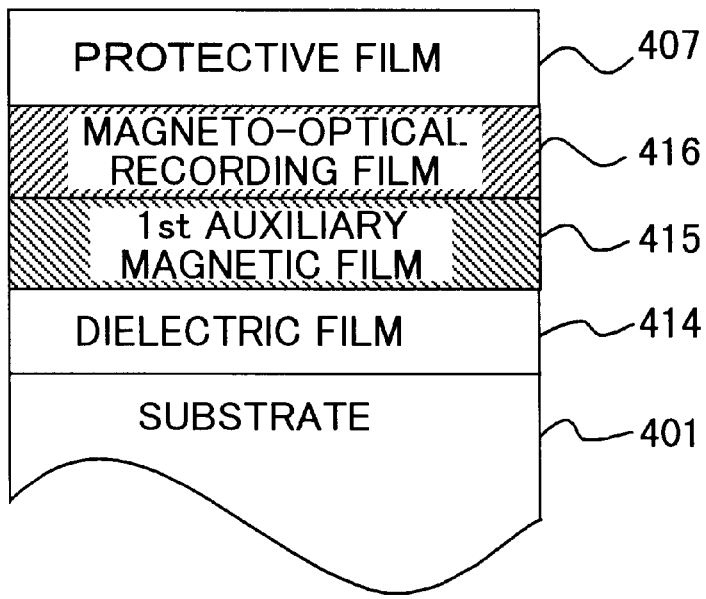
FIG. 44B shows a sectional view illustrating a stacked structure of the magneto-optical recording medium of the magnetically induced super resolution type.
Figure 45:
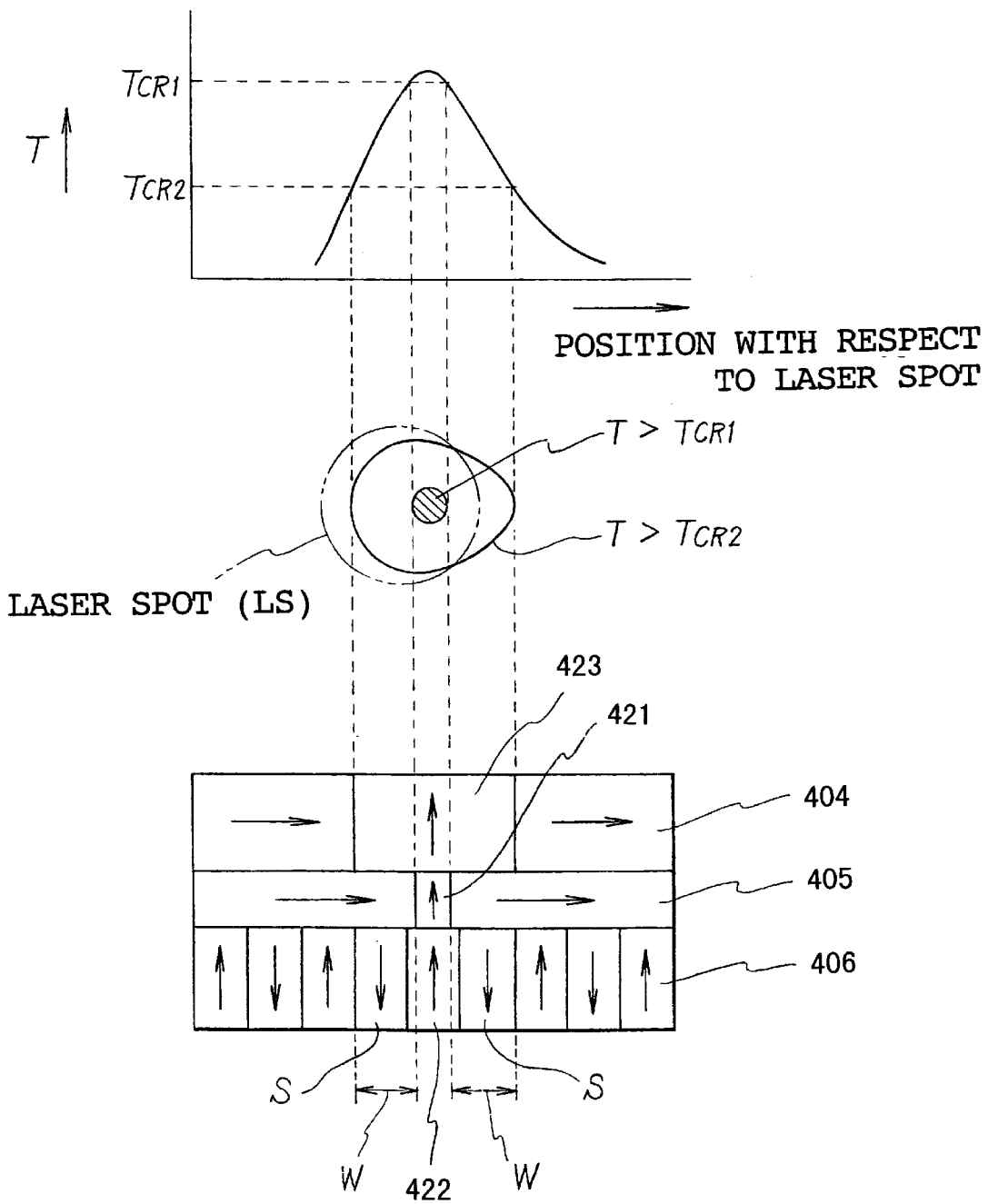
FIG. 45 explains the principle of reproduction on the magneto-optical recording medium shown in FIGS. 41A and 41B, based on the use of the temperature distribution.

FIG. 43 shows the result of the measurement of the dependency of the reproducing CN ratio (C: carrier level, N: noise level) on the recording magnetic domain length. For the purpose of comparison, FIG. 43 also shows the data of two types of conventional magneto-optical recording media. The data indicated by a dotted line is the reproduction data of the conventional type magneto-optical recording medium shown in FIG. 44A, in which TbFeCo is used as a single-layered magneto-optical recording film 416. The data indicated by a dashed line is the result of the magnetically induced super resolution (MSR) disk constructed by two-layered magnetic films of a magneto-optical recording film 416 composed of TbFeCo and a first auxiliary magnetic film 415 composed of GdFeCo as shown in FIG. 44B. According to the result shown in FIG. 43, it is understood that in the case of the sample disk according to the embodiment of the present invention (data is indicated by a solid line), the remarkably high reproducing C/N is obtained as compared with the two type of the conventional disks even at a recording mark length of 0.2 µm. Therefore, when the present invention is used, it is possible to reproduce the extremely minute recording mark exceeding the conventional reproduction limit, making it possible to improve the recording density.

The thickness of the magnetic wall of the $Gd_{28}Fe_{53}Co_{19}$ film as the first auxiliary magnetic layer used in this embodiment is approximately 50 nm by being calculated by using the calculation method described above. Considering the fact that the film thickness of the first auxiliary magnetic film is 60 nm, the condition for the film thickness of the first auxiliary magnetic layer of the present invention is satisfied. It has been revealed that the thickness of the magnetic wall is smaller than 60 nm when the measurement is performed by using the Hall effect.

In the embodiment of the present invention, the three magnetic films of the magneto-optical recording film 406, the first auxiliary magnetic film 405, and the second auxiliary magnetic film 404 are stacked while making the contact between the films so that the respective films are subjected to the exchange coupling to one another. However, it is also preferable that a non-magnetic film is inserted between the magneto-optical recording film 406 and the first auxiliary magnetic film 405, between the first auxiliary magnetic film 405 and the second auxiliary magnetic film 404, or for the both cases to effect the magnetostatic coupling between the magnetic films. In the embodiment of the present invention, the two layers of the auxiliary magnetic layers 404, 405 are used. However, it is also preferable to successively stack and use n (n≧3) layers of auxiliary magnetic films on condition that Tcr's of the respective layers (critical temperatures to make change from the in-plane magnetizable film to the perpendicularly magnetizable film) are set to satisfy Tcr1>Tcr2>. . . >TCRn> room temperature (provided that TCRi represents Tcr of the i-th auxiliary magnetic film). However, in this case, the first auxiliary magnetic film is provided on the side of the magneto-optical recording film 406, and the n-th auxiliary magnetic film is provided on the side of the dielectric film 403.

In order that the temperature profile of the medium has the desired shape when the medium is irradiated with the reproducing light beam, or in order that the dependency of the temperature profile on the linear velocity is decreased, it is also preferable that a heat control film having an appropriate coefficient of thermal conductivity is provided on the protective film 407 of the magneto-optical recording medium 411 or between the protective film 407 and the magneto-optical recording medium 411. In the embodiment of the present invention, the reproduction is performed by using the ordinary DC laser beam. However, as in the thirteenth embodiment described later on, it is also possible to perform the reproduction with a pulse laser beam having a frequency corresponding to the shortest mark length so that more satisfactory reproducing C/N is obtained.

In order to obtain a more satisfactory reproducing C/N ratio, it is also preferable to add, between the dielectric film 403 and the second auxiliary magnetic film 404, a reproducing magnetic film which has its Kerr rotation angle θk that is not less than θk of the second auxiliary magnetic film 404 at the maximum arrival temperature of the medium when the reproducing light beam is radiated and which behaves as a perpendicularly magnetizable film at a temperature that is not less than room temperature. Those usable as the material for such a reproducing magnetic film include, for example, GdFeCo.

Thirteenth Embodiment

In this embodiment, information was recorded and reproduced on the magneto-optical recording medium produced in the twelfth embodiment by using the recording and reproducing apparatus shown in FIG. 10.

Figure 46:
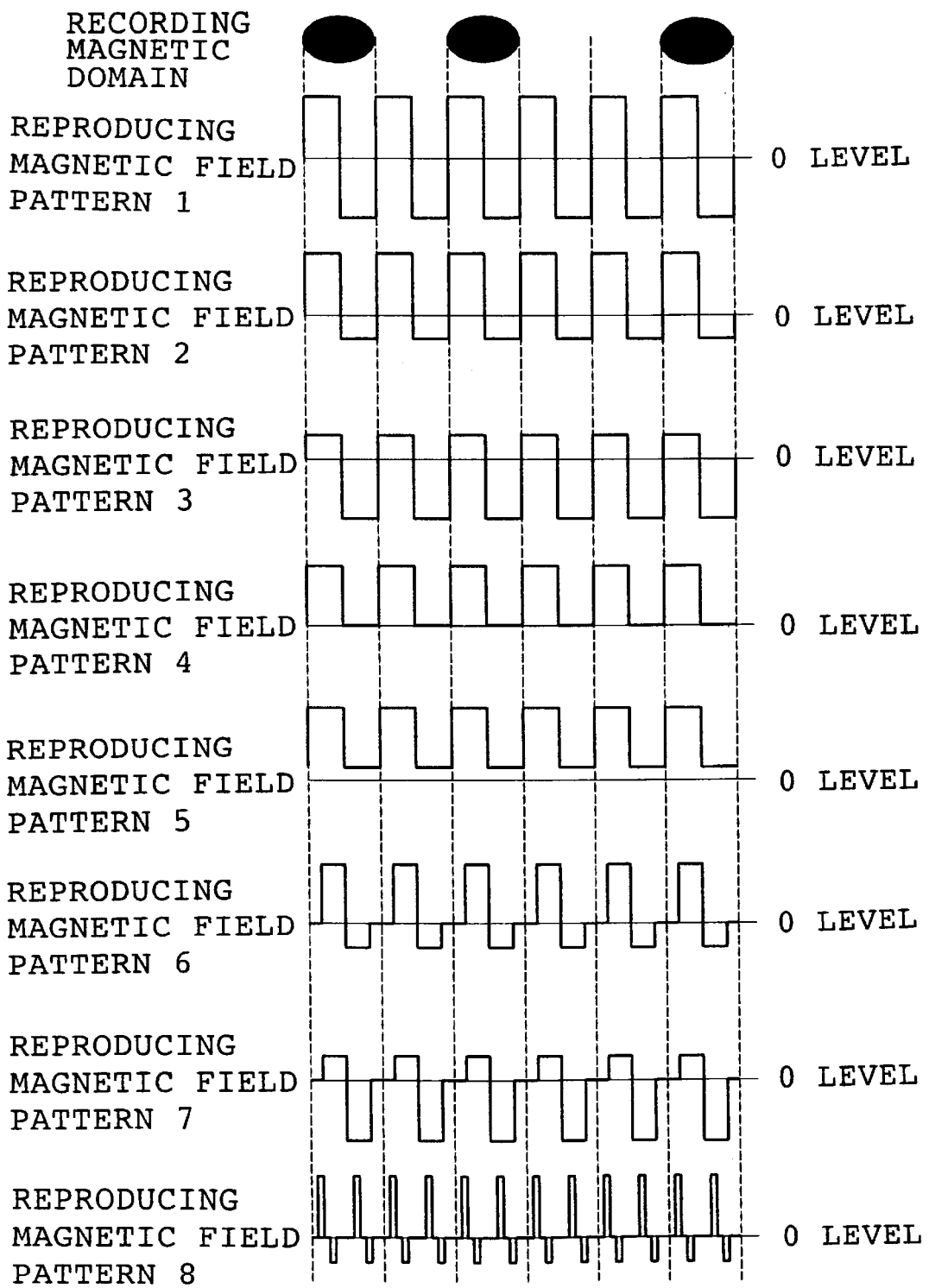
FIG. 46 shows various reproducing magnetic field patterns capable of being used for a reproducing method according to a thirteenth embodiment of the present invention.

Various patterns shown in FIG. 46 can be used for the shape and the timing of the recording magnetic domain and the reproducing magnetic field pulse in the embodiment of the present invention. The effect of magnification of the recording magnetic domain, i.e., the result of amplification of the reproduced signal was obtained when the duty ratio of HE, HS had the optimum value of 20 to 80% in any of the cases, i.e., in the case of HE=−HS as in the reproducing magnetic field pattern 1, in the case of HE≠−HS as in the reproducing magnetic field patterns 2, 3, in the case of HS=0 or HE=0 as in the reproducing magnetic field pattern 4, in the case of the same polarity of HE and HS as in the reproducing magnetic field pattern 5, and in the case of the presence of interval of H=0 between HE, HS as in the reproducing magnetic field patterns 6 to 8.

Fourteenth Embodiment

In this embodiment, the recording and reproducing characteristic of the magneto-optical recording medium 11 produced in the twelfth embodiment was measured by using the recording and reproducing apparatus 103 shown in FIG. 14. The recording and reproducing apparatus 103 has a wavelength of the laser 22 of 685 nm, and the numerical aperture NA of the objective lens 24 is 0.55. The data was recorded at a duty ratio of 50% of the laser beam by using the magneto-optical modulation recording system to perform the recording by modulating the external magnetic field at ±300 (Oe) while radiating the laser beam in a pulse form having a constant cycle at a linear velocity of 5.0 m/sec. The timing of the recording external magnetic field and the recording laser beam pulse with respect to the recording clock is the same as that shown in the timing chart shown in FIG. 11. The minute magnetic domain was formed to have a diameter of 0.4 micron.

The magneto-optical recording medium with the minute magnetic domains recorded as described above was subjected to reproduction as follows by using the apparatus shown in FIG. 14. As shown in the timing chart in FIG. 15, the intensity of the reproducing laser beam was modulated at a constant cycle in synchronization with the recording clock. The peak power (Pr) of the reproducing laser beam was 5.5 mW, the bottom power (PB) was 0.5 mW, and the peak duty ratio was set to be 33%. The reproducing magnetic field was the same as that in the thirteenth embodiment, which was modulated in synchronization with the reproducing clock for any one of the recorded magnetic domains as shown in FIG. 15. The intensity of the pulse-shaped magnetic field was 250 (Oe) (HE) in the recording direction in the vicinity of the center of the magnetic domain, and it was 150 (Oe) (HS) in the erasing direction. The duty ratio in the recording direction was 25%. The sample hold timing of the reproduced signal was coincident with the modulation timing of the magnetic field. As shown in FIG. 15, as for the timing of the reproducing magnetic field and the reproducing light beam, the fall of the reproducing light beam pulse was coincident with the fall of the reproducing magnetic field pulse. The duty ratio of the magnetic field was 25% in the recording direction during the reproduction. However, the duty ratio can be also changed within a range of 15 to 90% as explained in the sixth embodiment described above.

As clarified from the reproduction waveform (waveform reproduced with the pulse light beam and the pulse magnetic field) shown in FIG. 15, the reproduced signals were obtained independently from the minute magnetic domains respectively. For the purpose of comparison, FIG. 15 also shows a reproduced signal (signal reproduced with the DC light beam and the DC magnetic field) obtained when the reproduction was performed in the same manner as described above while applying the DC light beam having a laser power of 1.5 mW and the DC magnetic field of 200 (Oe) in the recording direction. In the case of the DC light beam and the DC magnetic field, the reproduced signal waveforms obtained from adjoining magnetic domains are continuous. FIG. 15 shows, at the lowermost part, the sample hold pulse in synchronization with the clock and the reproduced signal with the pulse magnetic field after the sample hold. In the embodiment of the present invention, it is possible to effectively avoid the inversion of magnetization at the portion of the magnetic domain-magnifying reproducing layer in which no transfer magnetic domain exists, by modulating the reproducing light beam. FIG. 16 shows the relationship of the error rate with respect to the recording mark length obtained in the case of the 1–7 modulation recording, with the comparison between a case based on the use of the pulse-shaped laser beam as the reproducing light beam and a case based on the use of the continuous light beam (DC light beam). According to the result shown in FIG. 16, it is understood that the error rate is improved when the reproduction is performed by using the pulse-shaped magnetic field.

Figure 47:
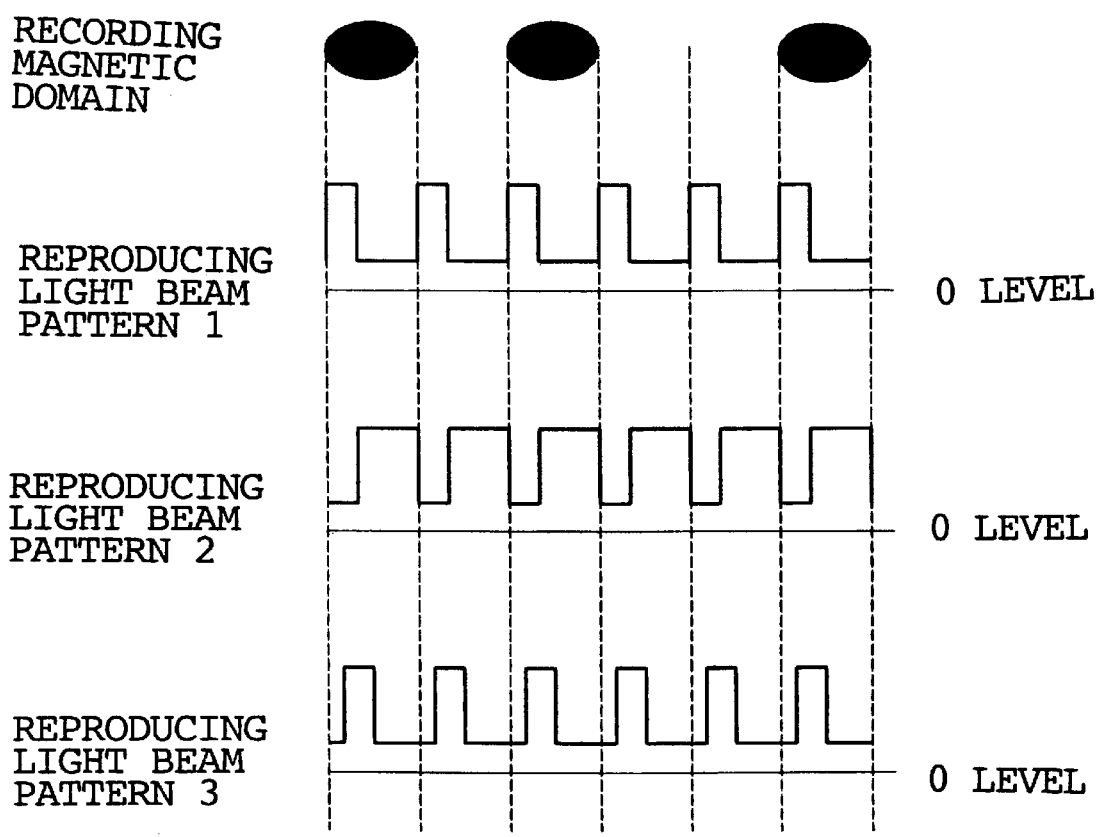
FIG. 47 shows various reproducing light beam pulse patterns capable of being used for a reproducing method according to a fourteenth embodiment of the present invention.

The timing and the duty ratio may be changed for the reproducing light beam pulse as shown in reproducing light beam patterns 1 to 3 in FIG. 47. Alternatively, the timing of the reproducing magnetic field pulse, the duty ratio, and the polarity of the reproducing magnetic field pulse may be changed as shown in FIG. 46 in the same manner as in the thirteenth embodiment. Any combination of any of the patterns shown in FIG. 47 and any of the patterns shown in FIG. 46 is available for the reproducing light beam pulse and the reproducing magnetic field pulse.

Figure 48:
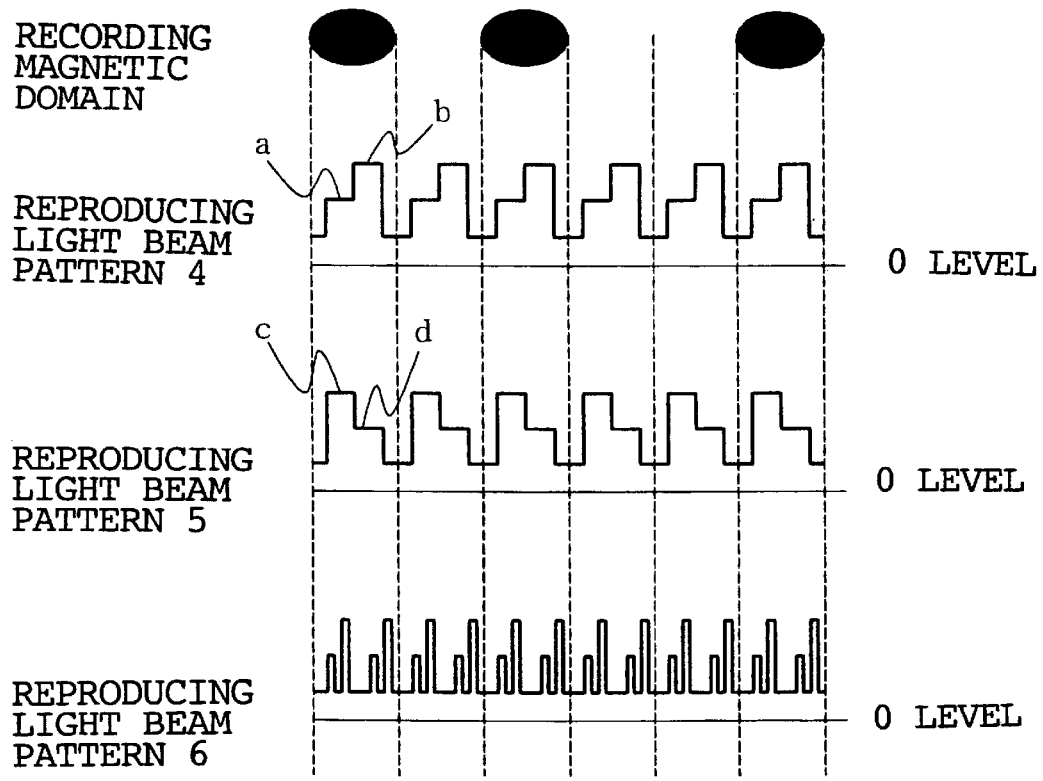
FIG. 48 shows various reproducing light beam multiple pulse patterns capable of being used for the reproducing method according to the fourteenth embodiment of the present invention.

In the fourteenth embodiment, the recording magnetic domain is reproduced by modulating the reproducing laser beam to have the binary value. However, when the reproducing laser beam is formed to have multiple pulses, then it is possible to more reliably control the process of the transfer and the magnification of the magnetic domain, and it is possible to stabilize the shape of the magnetic domain upon the magnification. An example of such a process is shown in FIG. 48. FIG. 48 shows the relationship between the recording magnetic domain and the reproducing light beam pattern. A method is provided, in which the magnetic domain is transferred, magnified, and reproduced by continuously radiating, in the pulse form, the reproducing power optimum for the transfer for the first auxiliary magnetic film 405 of the magneto-optical recording medium 411 shown in FIG. 40 and the reproducing power optimum for the magnification of the magnetic domain for the second auxiliary magnetic film 404. In other words, a method is shown, in which in the reproducing light beam patterns 4 and 5, the transfer is certainly performed at portions of "a" and "c", and the magnification is certainly performed at portions of "b" and "d" to stabilize the shape of the magnetic domain. The reproducing light beam pattern 4 is illustrative of the case in which the reproducing power suitable for the transfer is smaller than the reproducing power suitable for the magnification. The reproducing light beam pattern 5 is illustrative of the case which is opposite to the above.

Fifteenth Embodiment

Figure 49:
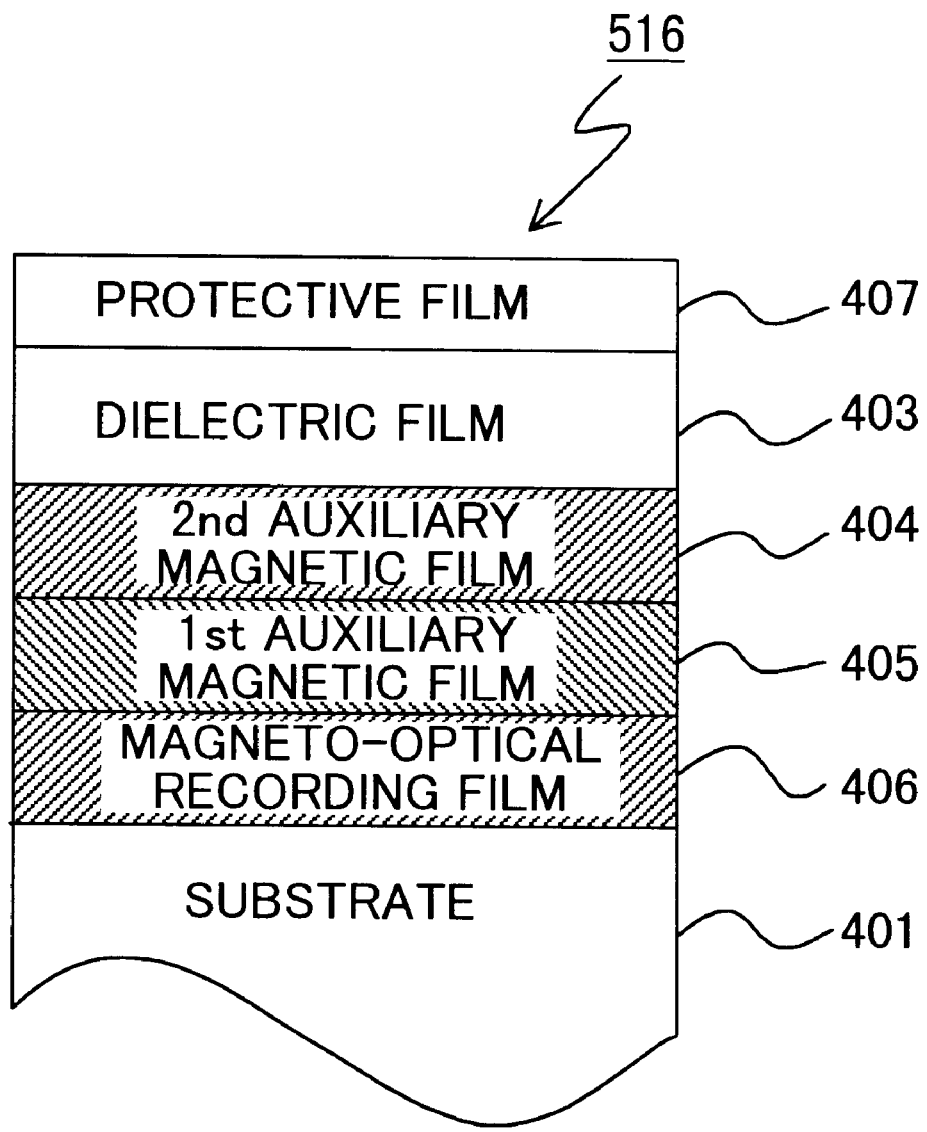
FIG. 49 shows a sectional view illustrating a stacked structure of a magneto-optical recording medium used in a fifteenth embodiment.

FIG. 49 shows a medium structure of a magneto-optical recording medium 516 to be preferably used for the recording and reproducing apparatus 101 shown in FIG. 10. The magneto-optical recording medium 516 has a successively stacked structure comprising, on a substrate 401, a magneto-optical recording film 406, a first auxiliary magnetic layer 405, a second auxiliary magnetic layer 404, a dielectric film 403, and a protective film 407. An adhesive layer such as a Cr layer may be formed between the magneto-optical recording film 406 and the first auxiliary magnetic layer 405. When the magneto-optical recording medium 516 is subjected to recording and reproduction, a magnetic field is applied, and a light beam is allowed to come into the magneto-optical recording medium 516 from the side of the protective layer 407 (second auxiliary magnetic layer 404)

not from the side of the substrate 401. Therefore, it is unnecessary to use a transparent material for the substrate 401. The substrate 401 may be composed of a metal material such as aluminum or other arbitrary opaque materials.

Figure 50:
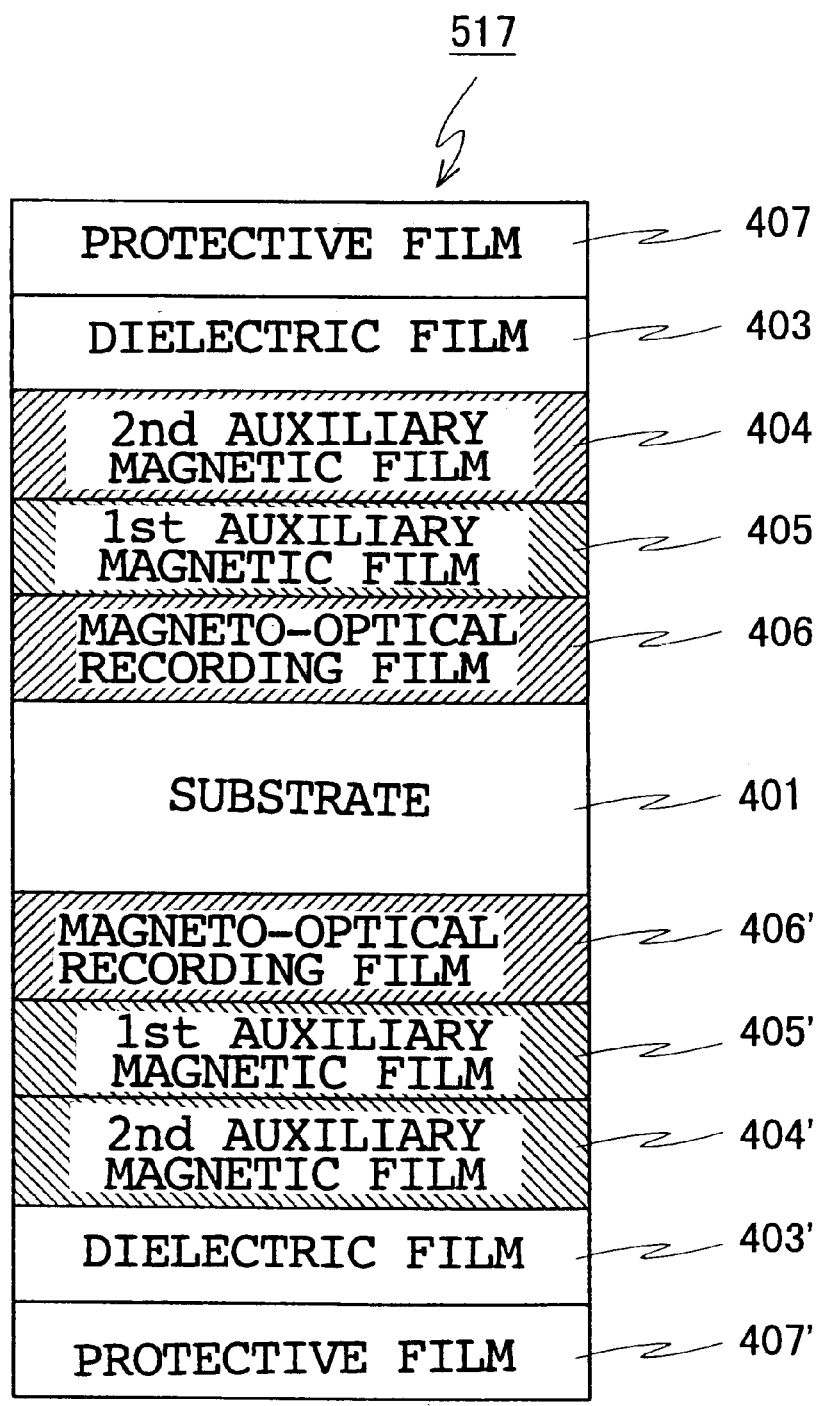
FIG. 50 shows a sectional view illustrating a stacked structure of a magneto-optical recording medium used in the fifteenth embodiment in which magnetic layers are stacked on both sides of a substrate.
Figure 51A:
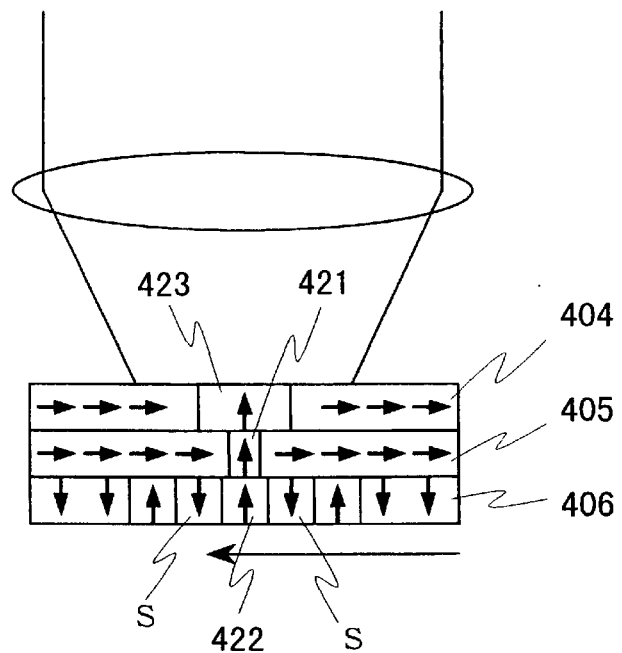
FIGS. 51A and 51B explain the principle of reproduction on the magneto-optical recording medium of the present invention which is rotated and moved with respect to the reproducing light beam.
Figure 51B:
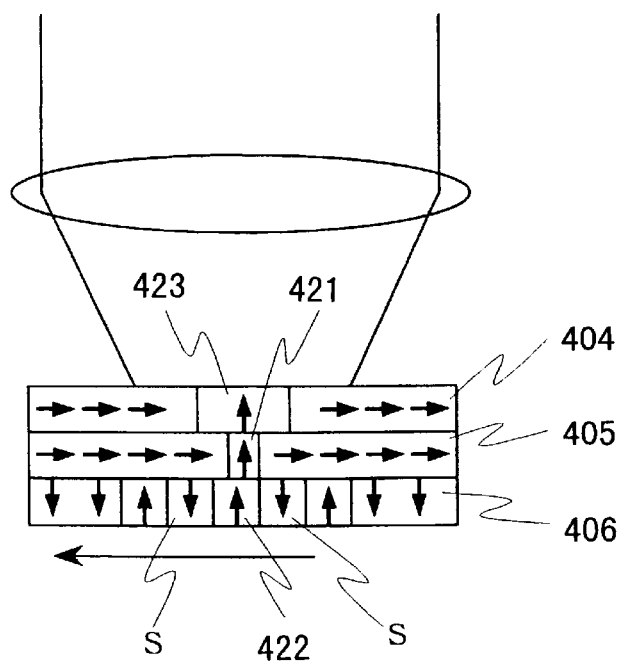
Figure 52A:
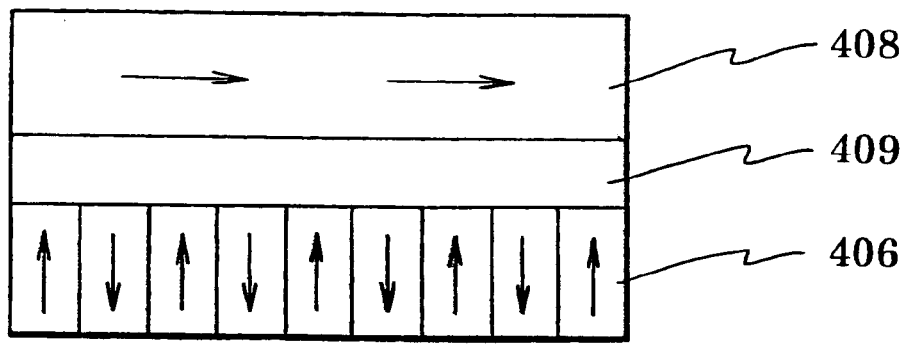
FIG. 52A conceptually shows magnetization states of respective layers before reproduction on a magneto-optical recording medium belonging to the second type of the present invention, and FIG. 52B conceptually shows magnetization states of the respective layers during reproduction on the magneto-optical recording medium.
Figure 52B:
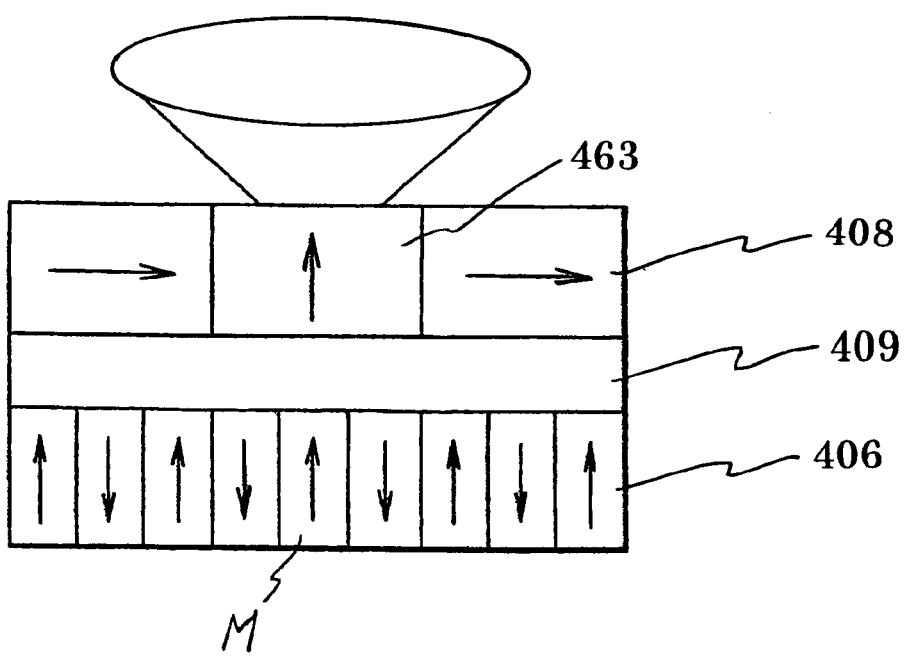

When the apparatus of the embodiment of the present invention is used, it is possible to perform reproduction on a magneto-optical recording medium 517 having a structure in which magneto-optical recording films 406, 406', first auxiliary magnetic layers 405, 405', second auxiliary magnetic layers 404, 404', dielectric films 403, 403', and protective films 407, 407' are successively stacked on both sides of a substrate 401 respectively as shown in FIG. 50. It is preferable that the substrate 401 of the magneto-optical recording medium 517 is composed of a material such as metal so that the recording or the reproduction on one of recording surfaces does not affect the recording and the reproduction on the other recording surface.

The magneto-optical recording medium, on which the recording can be performed on the both sides, has a recording density which is twice as compared with the conventional magneto-optical recording medium. Especially, when the magneto-optical recording medium, on which the recording can be performed on the both sides, is subjected to recording and reproduction by using the recording and reproducing apparatus having the structure as shown in FIG. 32, the magneto-optical recording medium is reversed every time when the recording or the reproduction is performed for one side. Therefore, the recording and reproducing apparatus allows the creation of the magneto-optical recording medium having the large capacity as shown in FIG. 50. The arrangement of the magneto-optical head, in which the magnetic field and the light beam are applied in the identical direction, can be also applied to the recording and reproducing apparatus shown in FIG. 14.

Sixteenth Embodiment

In the embodiment described above, the recording signal is recorded on the magneto-optical recording medium by using the magneto-optical modulation system. However, the recording can be also performed by using the magnetic field modulation system. When the recording is performed in accordance with any one of the recording systems, it is preferable that the recording magnetic domain is formed so that the length of the magnetic domain in the track width direction (direction perpendicular to the track direction) is longer than the length in the track direction, as for the shape of the shortest magnetic domain (magnetic domain having the shortest length in the track direction). More preferably, a configuration is desirable, in which the rear part of the magnetic domain is concave toward the inside of the magnetic domain with respect to the movement direction of the recording medium. The shortest magnetic domain as described above is preferably exemplified by crescent-shaped magnetic domains as shown in FIG. 34A and rectangular magnetic domains as shown in FIG. 34B. Besides, arrow-shaped or arrow wing-shaped magnetic domains, in which the arrow is directed in a direction opposite to the disk rotation direction, are also preferred as the shape of the shortest magnetic domain. When recording is performed with the magnetic domain formed such that the length of the magnetic domain in the widthwise direction of the track is longer than the length in the linear direction, it is effective to use the magnetic field modulation recording system. The configuration of, for example, the arrow wing-shaped magnetic domain can be adjusted by changing the configuration of the groove and the land of the substrate.

The shape of the magnetic domain as described above facilitates magnification of the magnetic domain transferred from the reproducing layer because of the following reason. For example, it is assumed that the crescent-shaped magnetic domains shown in FIG. 34A are subjected to recording in the recording layer of the magneto-optical recording medium of the present invention. When the magneto-optical recording medium is subjected to reproduction, the magneto-optical recording medium is heated by the reproducing light beam, and the crescent-shaped magnetic domains are transferred to the reproducing layer by the aid of the magnetostatic coupling or the exchange coupling. In the reproducing layer, the portion corresponding to the center of the reproducing light beam spot (or its backward portion) has a high temperature. Thermodynamically, the magnetization wall between the magnetic domains is rather stable at a high temperature. Therefore, a stable state is given when the concave portion of the crescent-shaped magnetic domain is moved toward its backward high temperature portion (the central portion of the circle having the common circular arc with the crescent). The magnetization wall is stable when its length is short. Therefore, a stable state is given when a half moon-shaped or semicircular magnetic domain is provided as if the concave portion of the crescent-shaped magnetic domain is expanded, because the magnetization wall is short. Therefore, the magnetic domain is easily magnified on the reproducing layer, in accordance with the temperature distribution and the configuration of the magnetic domain as described above. Further, the crescent-shaped magnetic domain or similar one is preferred because of the following reason. Considering the leak magnetic field or the magnetic field leakage directed from the recording magnetic domain toward the reproducing layer, the leak magnetic field from the crescent-shaped recording magnetic domain is maximized at the portion corresponding to the center of the crescent (the central portion of the circle having the common circular arc with the crescent), in the reproducing layer located over the crescent-shaped magnetic domain. Therefore, the magnetic domain transferred to the reproducing layer can be easily magnified by the aid of the leak magnetic field.

The magneto-optical recording media according to the fifth to seventh aspects have been specifically explained above with reference to the embodiments. However, the present invention is not specifically limited thereto. For example, various materials, which have the function of the present invention, can be used as the materials for constructing the magneto-optical recording medium. An arbitrary intermediate layer may be allowed to intervene at an arbitrary position, for example, over and under the auxiliary magnetic layer and over and under the magneto-optical recording layer. The information is recorded in accordance with the magneto-optical recording system in the thirteenth and third embodiments. However, the present invention is not limited thereto. It is also possible to use the optical modulation system and the magnetic field modulation system. The present invention is effective for the magneto-optical recording medium of the land-groove type, the medium having the structure in which the width of the land is narrower than the groove. That is, in the present invention, the magnetic domain, which is transferred to the reproducing layer, can be magnified. Therefore, even when the minute magnetic domain is recorded on the land having the narrow width, it is possible to perform reproduction at high C/N.

Seventeenth Embodiment

This embodiment is illustrative of specified embodiments of the medium belonging to the magneto-optical recording medium according to the eighth aspect of the present invention, and the reproducing method for performing reproduction by using the medium described above while changing the reproducing laser beam in a pulse form. A medium having a structure shown in FIG. 53 is used as the magneto-optical recording medium.

[Production of Magneto-optical Recording Medium of Eighth Aspect]

Figure 53:
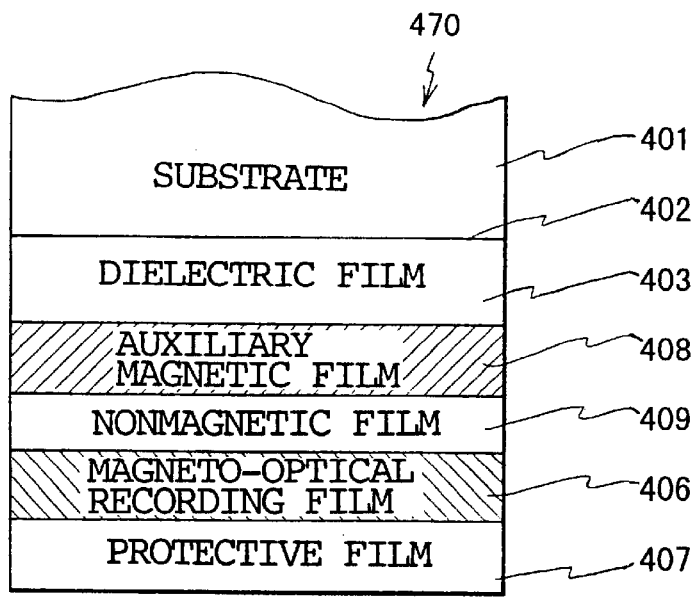
FIG. 53 conceptually shows a stacked structure of a magneto-optical recording medium according to the eighth aspect.
Figure 54:
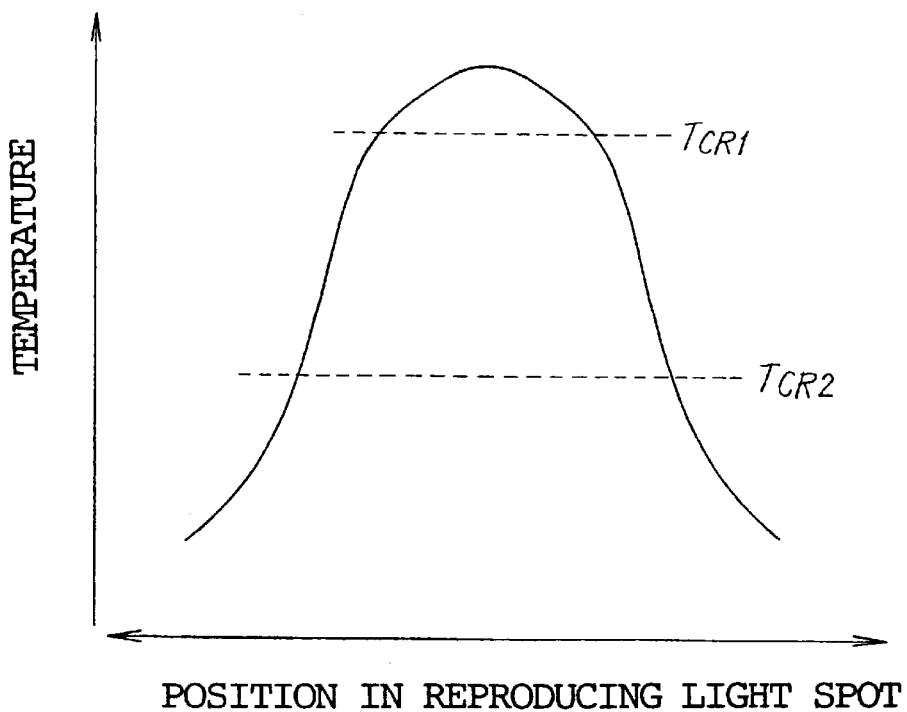
FIG. 54 shows a graph illustrating a temperature profile of a reading section when the magneto-optical recording medium according to the eighth aspect is irradiated with the reproducing light beam.
Figure 55:
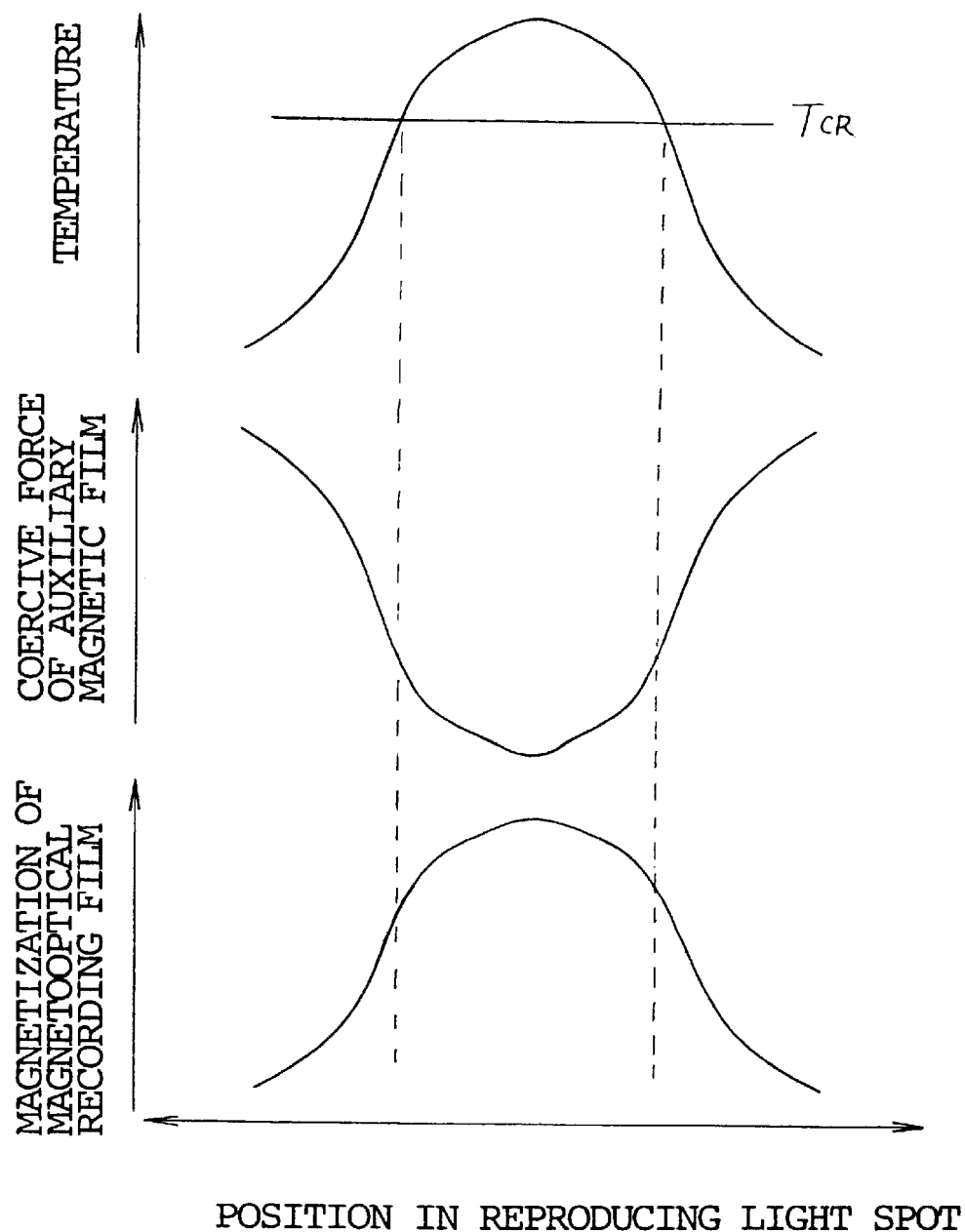
FIG. 55 shows a graph illustrating profiles of the temperature and the coercive force of an auxiliary magnetic film of the magneto-optical recording medium according to the eighth aspect, and a profile of magnetization of a magneto-optical recording film.

A glass substrate was used as a transparent substrate 401 of the magneto-optical recording medium 470 shown in FIG. 53. A transparent resin film 402, onto which a preformat pattern is transferred, is formed on one surface of the glass substrate. A dielectric film 403 is composed of SiN, and it is formed to have a film thickness for causing multiple interference with the reproducing laser beam so that the apparent Kerr rotation angle is increased. An auxiliary magnetic film 408 is composed of a ferri-magnetic amorphous alloy GdFeCo comprising rare earth and transition metals. The auxiliary magnetic film 408 exhibits the in-plane magnetic anisotropy at a temperature from room temperature to a certain critical temperature TCR not less than room temperature, and it exhibits the perpendicular magnetic anisotropy at a temperature not less than TCR. A non-magnetic film 409 is composed of SiN, and it is inserted to magnetostatically couple the auxiliary magnetic film 408 and a magneto-optical recording film 406. The magneto-optical recording film 406 is composed of a ferri-magnetic amorphous alloy TbFeCo comprising rare earth and transition metals, and it has the perpendicular magnetic anisotropy at a temperature from room temperature to the Curie temperature. A protective film 407 is composed of SiN, and it is provided to protect the thin films stacked between the substrate 401 and the protective film 407, from chemical harmful influences such as corrosion.

The dielectric film 403, the auxiliary magnetic film 408, the non-magnetic film 409, the magneto-optical recording film 406, and the protective film 407 were formed as films to have the following film thicknesses by means of continuous sputtering by using a magnetron sputtering apparatus respectively. The dielectric film 403 had a thickness of 60 nm, the auxiliary magnetic film 408 had a thickness of 60 nm, the non-magnetic film 409 had a thickness of 20 nm, the magneto-optical recording film 406 had a thickness of 50 nm, and the protective film 407 had a thickness of 60 nm.

The composition of TbFeCo for constructing the magneto-optical recording film 406 is $Tb_{21}Fe_{66}Co_{13}$ as represented by an atomic % ratio to exhibit a characteristic such that the magnetization component of the transition metal is more dominant than the magnetization component of the rare earth at a temperature from room temperature to the Curie temperature TC0=270° C. On the other hand, the composition of GdFeCo for constructing the auxiliary magnetic film 408 is $Gd_{28}Fe_{53}Co_{19}$ as represented by an atomic % ratio to exhibit, as a single layer film, a temperature-dependent characteristic of the Kerr rotation angle as shown in FIG. 56.

Figure 56:
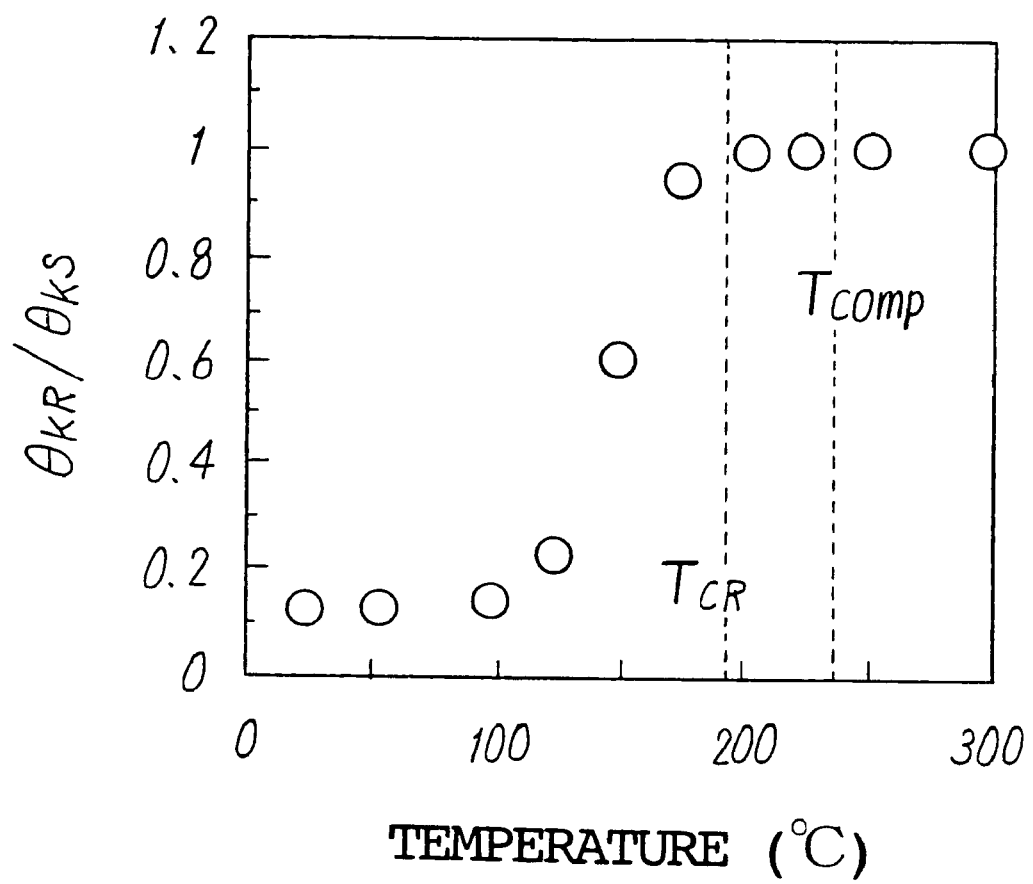
FIG. 56 shows a graph illustrating a temperature-dependent characteristic of the Kerr effect of an auxiliary magnetic film of the magneto-optical recording medium according to the eighth aspect produced in a seventeenth embodiment of the present invention.

With reference to FIG. 56, the horizontal axis denotes the temperature, and the vertical axis denotes the ratio $\theta_{KR}/\theta_{KR}$ of the remaining Kerr rotation angle $\theta_{KR}$ to the saturated Kerr rotation angle $\theta_{KS}$ of the GdFeCo auxiliary magnetic film 408 determined from the hysteresis of the Kerr rotation angle with respect to the temperature. According to this graph, the critical temperature TCR, at which the auxiliary magnetic film 408 is converted from the in-plane magnetizable film into the perpendicularly magnetizable film, is about 200° C. The auxiliary magnetic film 408 has a Curie temperature Tc of not less than 300° C., and it has a compensation temperature Tcomp between room temperature Troom and the Curie temperature, in which Tcomp is about 230° C. The following relationship is given concerning the critical temperature TCR, the compensation temperature Tcomp, and the Curie temperature Tc of the auxiliary magnetic film 408, and the Curie temperature TC0 of the magneto-optical recording film 406. Troom<TCR<Tcomp<TC0<Tc. By satisfying this condition, it is extremely easy to perform reproduction by using the power-modulated pulse light beam as described later on.

The reproducing method as explained in the description of the principle of the present invention with reference to FIG. 57 is executed by using the magneto-optical recording medium 470 having the structure as described above.

[Preparatory Experiment for Determining Intensity of Reproducing Laser Pulse]

In the reproducing method of the present invention, the recording magnetic domain is magnified to perform reproduction by using the pulse light beam obtained by power-modulating the laser power to have the high power Pr2 and the low power Pr1. Accordingly, a preparatory experiment is firstly performed to determine the optimum laser powers of Pr2 and Pr1 for reproducing data recorded on the magneto-optical recording medium 470. In this preparatory experiment, a magneto-optical drive comprising an optical system having a laser beam wavelength of 680 nm and a numerical aperture of 0.55 is used to radiate recording and reproducing laser beams onto the side of the substrate 401 (side of the auxiliary magnetic film 408). A continuous light beam is used as the reproducing laser beam as described later on. The reproducing laser beam is changed to have various powers to observe respective reproduced signal waveforms.

A laser beam having a recording power of 4.5 mW was modulated with a cycle of 640 ns and a pulse width of 213 ns at a linear velocity of 5.0 m/s for a track disposed at a radius of 40 mm of the previously initialized magneto-optical recording medium 470 to perform optical modulation recording while applying a recording magnetic field of 500 Oe. Accordingly, recording marks each having a length of about 1.6 μm were continuously recorded at a pitch of 3.2 μm on the track.

Subsequently, the track recorded with the recording marks was subjected to reproduction with continuous light beams having various reproducing powers Pr. In order to determine the optimum modulation condition for the reproducing power, the value of the power Pr of the continuous light beam was changed to be at five levels, i.e., Pr=1.0 mW, 1.5 mW, 1.9 mW, 2.0 mW, and 2.1 mW to determine reproduced signals respectively. No magnetic field was actively applied to the magneto-optical recording medium 470 during the reproduction. However, a leakage magnetic field (about 800 Oe), which leaked from the actuator of the optical head, was generated in the recording direction.

Figure 58A:
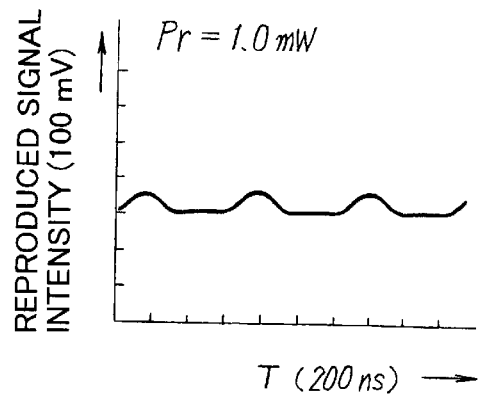
FIGS. 58A to 58E show graphs illustrating reproduced signal waveforms observed on an oscilloscope when the magneto-optical recording medium obtained in the seventeenth embodiment of the present invention is subjected to reproduction with continuous light beams having various reproducing powers.

FIGS. 58A to 58E show reproduced signal waveforms obtained when the recording track of the magneto-optical recording medium 470 was subjected to reproduction with the respective reproducing powers Pr as described above. In this experiment, the reproduced signal waveform itself was subjected to triggering to observe the waveform by using an oscilloscope. FIG. 58A shows a reproduced signal waveform obtained for the reproducing light power Pr=1.0 mW, from which it is understood that the reproduced signal arises corresponding to the pattern of the recording mark. On the graph, the base line indicates an erased state, and the rising peak signal indicates a recording state. The amplitude between the recording state and the erased state was 50 mV.

Figure 58B:
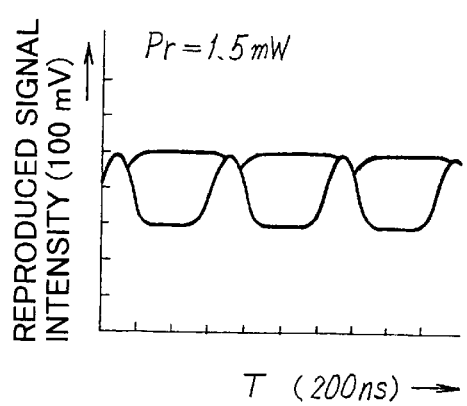

When the reproducing light power was increased to Pr=1.5 mW, the signal amplitude was increased to about 200 mV as shown in FIG. 58B. According to the waveform shown in FIG. 58B, it is understood that the adjoining peak signals are continuous on the side of the recording state in a part of the area of the waveform.

Figure 58C:
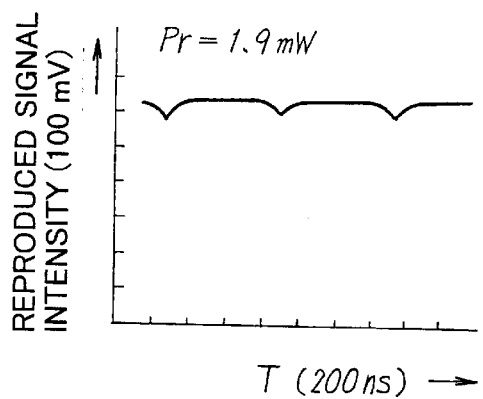
Figure 58D:
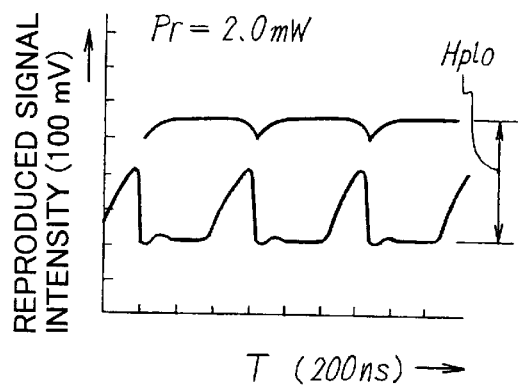
Figure 58E:
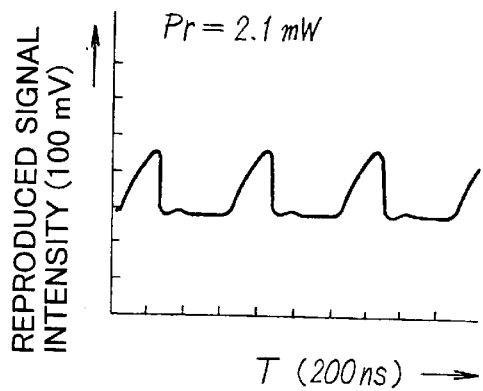

FIG. 58C shows a reproduced signal waveform for the reproducing power of Pr=1.9 mW, indicating that the peak signals are completely continuous on the side of the recording state (at an upper portion in the drawing). This result demonstrates that the magnetic domain is magnified in the auxiliary magnetic film as described later on, and the magnified magnetic domain undergoes movement on the track in accordance with the scanning for the track with the reproducing light spot. When the reproducing light power is further increased to Pr=2.0 mW, the peak signals having been continuous begin to be discontinuous as shown in FIG. 58D. In this case, the amplitude Hplo between the connected portion of the peak signal and the base line was about 350 mV. When the reproducing light power was further increased up to Pr=2.1 mW, the peak signal is completely discontinuous as shown in FIG. 58E, giving a waveform corresponding to the recording mark pattern. In FIG. 58E, the amplitude between the recording state and the erased state was 200 mV.

Figure 59A:
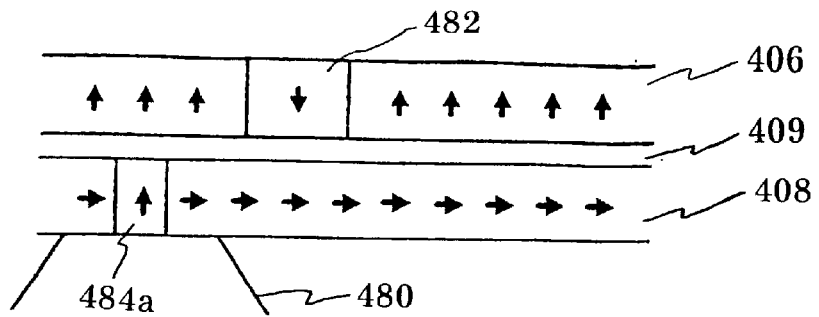
FIGS. 59A to 59C conceptually illustrate magnetization states of the respective layers of the magneto-optical recording medium when the signal waveform shown in FIG. 58A is obtained.
Figure 59B:
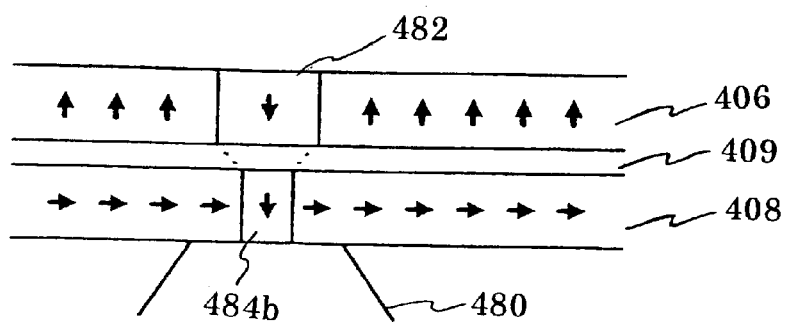

The magnetization states of the auxiliary magnetic film 408 and the magneto-optical recording film 406 stacked with the non-magnetic film 409 intervening therebetween, which are given when the reproduced signal waveforms shown in FIGS. 58A to 58E are obtained, will be explained with reference to conceptual drawings shown in FIGS. 59 to 61. FIG. 59 shows a situation in which the signal waveform shown in FIG. 58A is obtained (reproducing light power Pr=1.0 mW), illustrating the relationship between the reproducing light spot 480 and the directions of magnetization of he auxiliary magnetic film 408 and the magnet-optical recording film 406 irradiated with the reproducing light spot 480. At first, the auxiliary magnetic film 408, which is irradiated with the reproducing light spot 408 as shown in FIG. 59A, exhibits perpendicular magnetization in an area in which its temperature is raised to be not less than the critical temperature TCR. The magnetization of the magneto-optical recording film 406 is transferred to an area 83a of the auxiliary magnetic film by the aid of the magnetostatic coupling. As shown in FIG. 59B, when the reproducing light spot 480 is disposed just under a magnetic domain (recording magnetic domain) 482 in which the magnetization of the recording magnetic domain 482 is transferred to the auxiliary magnetic film 408 by the aid of the magnetostatic coupling. In this case, the reproducing light power Pr is 1.0 mW which is low. Therefore, only the central portion of the auxiliary magnetic film 408 within the light spot 480, i.e., only the area 484b has the temperature which exceeds the critical temperature TCR. The transferred area 483b of the auxiliary magnetic film 408 is not magnified to be larger than the width of the recording magnetic domain 482. Accordingly, as shown in FIG. 58A, the reproduced signal intensity is small. When the reproducing light spot 480 passes over the recording magnetic domain 482, a transferred area 483c has the same direction of magnetization as that of the magnetic domain in the magneto-optical recording film 406 located just thereover, as a result of transfer from the magnetic domain in the magneto-optical recording film 406 located just thereover.

Figure 60A:
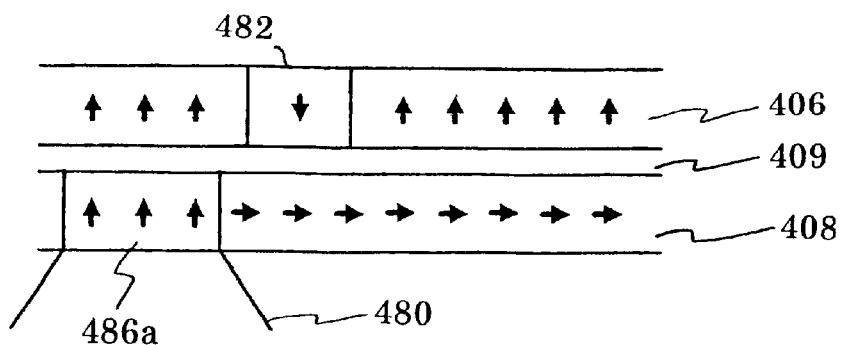
FIGS. 60A to 60C conceptually illustrate magnetization states of the respective layers of the magneto-optical recording medium when the signal waveform shown in FIG. 58C is obtained.
Figure 60B:
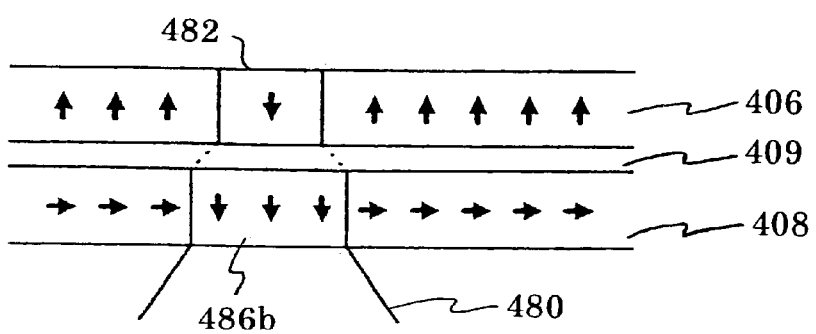

FIG. 60 shows a situation in which the signal waveform shown in FIG. 58C is obtained (reproducing light power Pr=1.9 mW), illustrating the relationship between the reproducing light spot 480 and the directions of magnetization of the auxiliary magnetic film 408 and the magneto-optical recording film 406 irradiated with the reproducing light spot 480. In this case, the reproducing light power is 1.9 mW which is relatively large. Therefore, as shown in FIG. 60A, an entire area 486a within the spot in the auxiliary magnetic film 408 irradiated with the reproducing light spot 480 has a temperature raised to be not less than the critical temperature TCR, giving perpendicular magnetization. The magnetic domain in the magneto-optical recording film 406 is transferred to the area 486a by the aid of the magnetostatic coupling effected by the magneto-optical recording film 406. When the reproducing light spot 480 is subjected to scanning to locate the reproducing light spot 480 just under the recording magnetic domain 482 as shown in FIG. 60B, the magnetization of the recording magnetic domain 482 is transferred. In this case, the area 486b of the auxiliary magnetic film 408, which is heated to a temperature not less than the critical temperature TCR, has its width larger than the recording magnetic domain 482. Accordingly, the recording magnetic domain 482 is transferred while being magnified in the auxiliary magnetic film 408. The large signal waveform is obtained owing to the magnification of the magnetic domain. After the reproducing light spot 480 passes over the recording magnetic domain 482, the area 486c maintains the same magnetization state as that of the area 486b. Therefore, the waveform, in which the reproduced signal peaks are continuous as shown in FIG. 58C, is obtained.

Figure 59C:
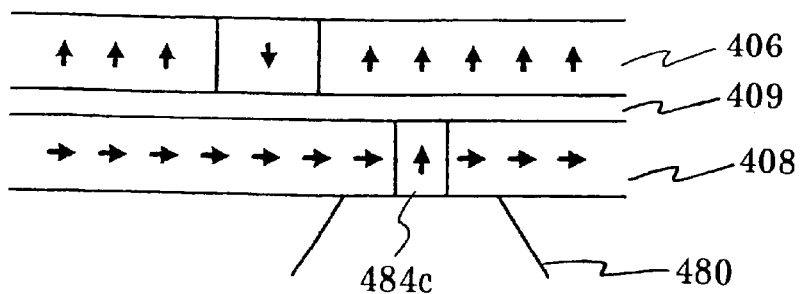
Figure 60C:
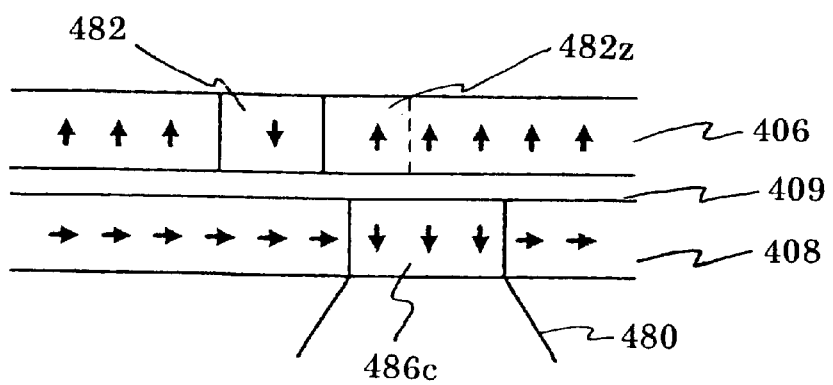

In the case of the situation shown in FIG. 60, the area 486c maintains the same magnetization state as that of the area 486b after the reproducing light spot 480 passes over the recording magnetic domain 482. A phenomenon arises, in which the light spot draws the recording magnetic domain which is transferred to the auxiliary magnetic layer to be subjected to the magnetic domain transfer and the magnetic domain magnification. The reason for this phenomenon is considered to be as follows. The temperature of the auxiliary magnetic layer 408 is raised to be not less than the critical temperature by being irradiated with the reproducing laser beam, and the auxiliary magnetic layer 408 is converted into the perpendicularly magnetizable film having the coercive force Hc in the perpendicular direction. During the reproduction, the auxiliary magnetic film 408 is applied with the external magnetic field Hex (in the recording direction, i.e., in the downward direction in this embodiment) which is caused by the leakage magnetic field, for example, from the actuator of the optical head, and the static magnetic field Hs which is generated from the magnetization of the magneto-optical recording film 406 at a temperature not less than the critical temperature of the auxiliary magnetic film 408. The applied magnitude is Hex+Hs (when the magnetization of the recording magnetic domain is in the downward direction) or Hex−Hs (when the magnetization of the recording magnetic domain is in the upward direction) depending on the direction of the magnetization of the magneto-optical recording film 406. If the absolute value of Hc is larger than the absolute value of (Hex+Hs) or the absolute value of (Hex−Hs) concerning the magnitude of the combined magnetic field of the external magnetic field Hex and the static magnetic field Hs and the coercive force Hc of the auxiliary magnetic film 408, the magnetization formed in the auxiliary magnetic film 408 is maintained as it is. As shown in FIG. 60C, the magnetic domain, which is once transferred to the auxiliary magnetic film, does not cause reinversion even when the reproducing spot proceeds to the area in which no recording magnetic domain exits in the magneto-optical recording film 406. Hc is the coercive force in the perpendicular direction, obtained when the auxiliary magnetic film 408 is in the perpendicular magnetization state. In the case of the situation shown in FIG. 59, Hc of the auxiliary magnetic film is lower than that in FIG. 60, because the temperature of the auxiliary magnetic layer subjected to transfer by the low reproducing power is relatively low. Accordingly, the magnetic domain transferred to the auxiliary magnetic film 408 causes reinversion when the reproducing spot proceeds to the area in which no recording magnetic domain exists in the magneto-optical recording film 406 (FIG. 59C).

Figure 61A:
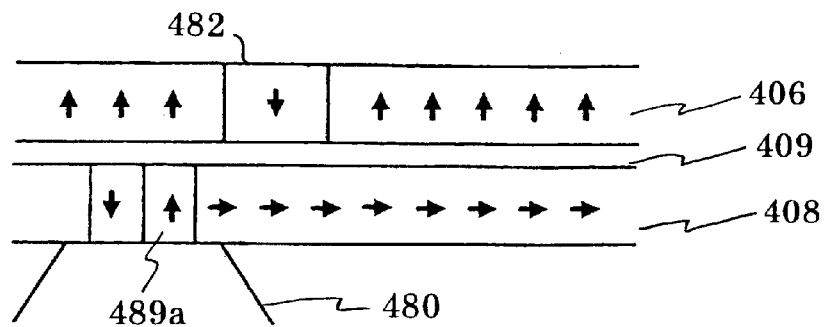
FIGS. 61A to 61C conceptually illustrate magnetization states of the respective layers of the magneto-optical recording medium when the signal waveform shown in FIG. 58E is obtained.
Figure 61B:
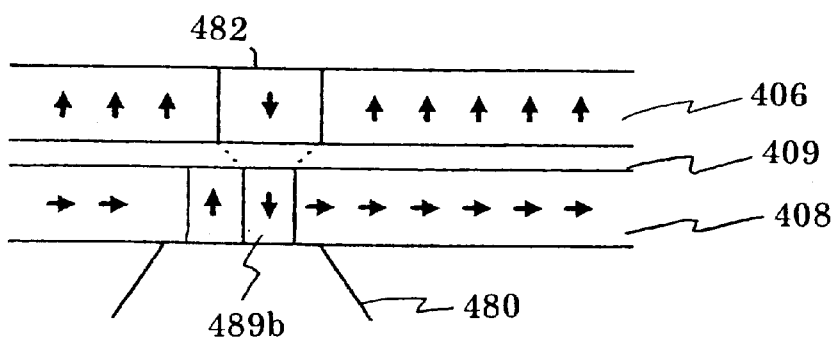
Figure 61C:
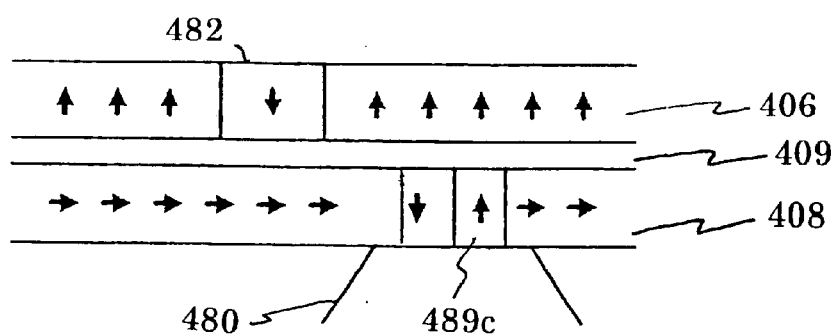

FIG. 61 shows a situation in which the signal waveform shown in FIG. 58E is obtained (reproducing light power Pr=2.1 mW), illustrating the relationship between the reproducing light spot 480 and the directions of magnetization of the auxiliary magnetic film 408 and the magneto-optical recording film 406 irradiated with the reproducing light spot 480. In this case, the reproducing light power is 2.1 mW which is large. Therefore, a front portion area 489a within the spot in the auxiliary magnetic film 408 irradiated with the reproducing light spot 480 has a temperature raised to be not less than the critical temperature TCR, giving perpendicular magnetization, and it is subjected to magnetic domain transfer of the magnetic recording layer 406 located just thereunder. However, the central portion and the back portion within the spot are heated intensely as compared with the front portion to exceed the compensation temperature Tcomp of the auxiliary magnetic film 408. Therefore, it is considered that a state is given, in which the magnetization is inverted (detailed reason for inversion of magnetization will be described later on in the specified embodiment of the second reproducing method). Accordingly, as shown in FIG. 61A, only the area A 489a, which is disposed at the front portion of the auxiliary magnetic film within the reproducing light spot 480, has the magnetization in the upward direction, and the central portion and the back end portion have the magnetization in the downward direction.

Subsequently, when the track is subjected to scanning with the reproducing light beam so that the spot 480 is located just under the recording magnetic domain 482, the magnetization of the recording magnetic domain 482 is transferred to only the area 489b having the relatively low temperature disposed at the front portion of the auxiliary magnetic film 408. Therefore, no magnetic domain magnification occurs. It is impossible to obtain the signal as shown in FIG. 12C having the large reproduced signal intensity. When the reproducing light spot 480 passes over the recording magnetic domain 482, the transfer area 489c includes the magnetization having the same direction as that of the magnetic domain in the magneto-optical recording film 406 disposed just thereover and the inverted magnetic domain thereof in a mixed manner by the aid of the magnetostatic coupling effected by the magneto-optical recording film 406.

In the case of the situation shown in FIG. 60 (FIG. 58C), the reproduced signal intensity is increased, because the magnetic domain magnification occurs in the auxiliary magnetic film 408 as described above. The magnetic domain 486b, which is magnified from the recording magnetic domain 482, is moved together with the reproducing light spot 480 while being magnified. However, in the situation shown in FIG. 60C, when the center of the reproducing light spot 480 is located just under a magnetic domain 484 adjacent to the recording magnetic domain 482, it is necessary to avoid the phenomenon in which the magnified magnetic domain is drawn by the light spot, in order to reproduce the magnetization of the magnetic domain 484 by the aid of the auxiliary magnetic layer 408. That is, it is necessary to erase the magnified magnetic domain 486c of the recording magnetic domain 482 and transfer the magnetization of the magnetic domain 484 to the auxiliary magnetic layer 408 followed by magnification.

On the other hand, as shown in FIG. 59 (corresponding to FIG. 58A) and FIG. 61 (corresponding to FIG. 58E) respectively, when the reproducing power Pr is relatively small (reproducing light power Pr=1.0 mW), and when the reproducing power Pr is relatively large (reproducing light power Pr=2.1 mW), the magnetic domain 484b (489b) transferred from the recording magnetic domain 482 is extinguished after the reproducing light spot 480 passes over the recording magnetic domain 482. That is, the phenomenon, in which the magnified magnetic domain is drawn, does not take plate. Therefore, if the reproducing light beam to be used is a pulse light beam which is power-modulated at a reproducing clock cycle or at a cycle of an integral multiple thereof between the reproducing light power Pr=1.9 mW at which the magnetic domain magnification occurs and the reproducing light power Pr=2.1 mw (or 1.0 mW) at which the magnetic domain magnification does not occur, the magnetic domain can be magnified, and then the magnified magnetic domain can be extinguished when the center of the reproducing light spot is moved from the recording magnetic domain in the magneto-optical recording film 406 onto the adjacent recording magnetic domain.

According to the result of the preparatory experiment described above, if the reproducing laser beam is applied as the pulse light beam which is intensity-modulated between Pr =1.9 mW as shown in FIG. 58C and Pr=2.1 mW as shown in FIG. 58E, the reproduced signal is detected as a difference between the reproduced signal intensities obtained as shown in FIG. 58C and FIG. 58E. The difference is considered to correspond to Hplo=350 mV shown in FIG. 58D, suggesting that the reproduction can be performed with an amplitude which is larger than the amplitudes obtained in FIGS. 58A and 58E. Therefore, in the following experiment of reproduction based on the use of the reproducing light pulse, the high power Pr2 is set to be Pr2=2.1 mW, and the low power Pr1 is set to be Pr1=1.9 mW.

[First Reproducing Method on Magneto-optical Recording Medium With Power-modulated Pulse Light Beam]

After the magneto-optical recording medium 470 produced in this embodiment was initialized, a laser beam having a recording power of 6.3 mW was modulated with a cycle of 320 ns and a pulse width of 53.3 ns to perform optical modulation recording with a recording magnetic field of 500 Oe, at a linear velocity of 5.0 m/s for a track disposed at a radius of 40 mm. This corresponds to a condition in which recording marks of about 1.6 µm were continuously recorded at a pitch of 3.2 µm.

Figure 62:
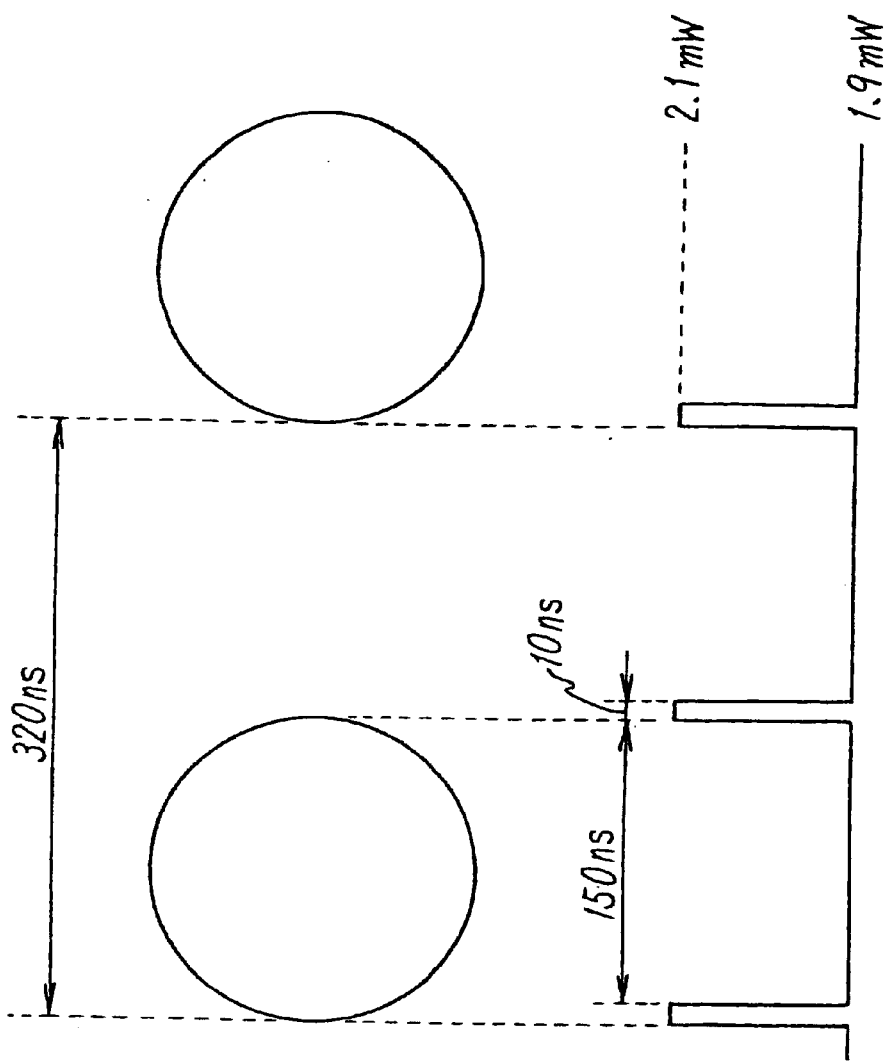
FIG. 62 shows timing for irradiating recording marks with the reproducing pulse light beam modulated to have reproducing powers Pr1 and Pr2 determined in a preparatory experiment performed in the seventeenth embodiment.

The recording track of the magneto-optical recording medium 470 thus subjected to the recording is irradiated with the power-modulated pulse laser having the reproducing light laser powers of Pr2=2.1 mW and Pr1=1.9 mW as determined by the preparatory experiment so that reproduction is performed. As shown in FIG. 62, the reproducing laser pulse was adjusted to give Pr2=2.1 mW in a pulse width of 10 ns starting from the front end of the recording mark, and Pr1=1.9 mW in a pulse width of 150 ns following thereafter. No magnetic field was actively applied during the reproduction. However, a leakage magnetic field (about 80 Oe) was generated in the recording direction from the actuator of the optical head.

Figure 63:
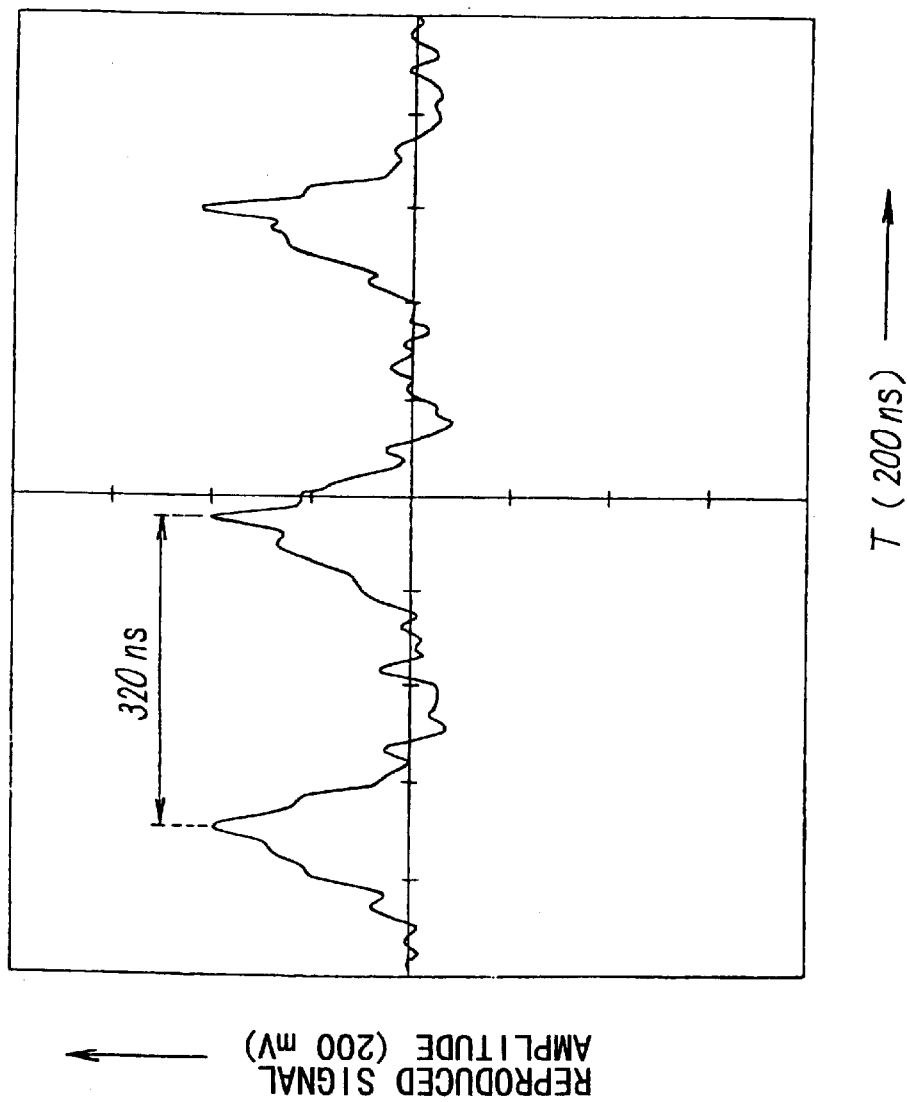
FIG. 63 shows a graph illustrating a reproduced signal waveform obtained by performing reproduction by using the reproducing pulse light beam shown in FIG. 62.

An obtained reproduced signal waveform is shown in FIG. 63. The obtained reproduced signal had an amplitude of about 220 mv corresponding to the recording marks. When the mark pattern recorded under the same condition was subjected to reproduction with continuous light beams having constant reproducing powers of Pr=1.0 mW and Pr=2.1 mW, the amplitudes were 100 mV and 170 mV respectively. According to these results, it is understood that the reproduction with the reproducing light beam which is power-modulated to have the pulse form makes it possible to magnify and transfer the recording magnetic domain in a form of being synchronized with the reproducing clock and extinguish the magnified magnetic domain immediately thereafter, and the reproduction can be performed with higher C/N when the magnetic domain is magnified.

In this embodiment, the respective pulse laser intensities, i.e., the high power Pr2=2.1 mW and the low power Pr1=1.9 mW were selected. The low power pulse was used to generate the magnified magnetic domain, and the high power pulse was used to extinguish the magnified magnetic domain. However, the high power pulse may be Pr2=1.9 mW to generate the magnified magnetic domain, and the low power pulse may be Pr1=1.0 mW to extinguish the magnified magnetic domain. The illustrative case shown in FIG. 57 used to explain the principle is representative of the latter case. The pulse width ratio between the high power pulse and the low power pulse, i.e., the duty is not limited to those shown in FIGS. 57 and 62. The duty may be appropriately changed in order to obtain an enhanced reproduced signal.

The magneto-optical recording medium produced in the seventeenth embodiment may comprise a heat control layer having an appropriate heat conductivity disposed on the protective film of the magneto-optical recording medium, in order to give a desired shape for the temperature profile of the medium obtained when the reproducing light beam is radiated, or in order to decrease the linear velocity dependency of the temperature profile. Further, in order to obtain a better reproducing CN ratio, it is also allowable to add, between the dielectric film 403 and the auxiliary magnetic film 408, a reproducing magnetic film which is a perpendicularly magnetizable film at a temperature not less than room temperature in which the Kerr rotation angle θk is not less than θk of the auxiliary magnetic film at the maximum arrival temperature of the medium when the reproducing light beam is radiated.

Eighteenth Embodiment

[Second Reproducing Method on Magneto-optical Recording Medium of Ninth Aspect With Power-modulated Pulse Light Beam]

In the foregoing embodiment of the reproducing method, the leakage magnetic field generated from the magnetic head during reproduction is applied to the magneto-optical recording medium. In this embodiment, reproduction is performed while actively applying a DC magnetic field in the same direction as the magnetization direction of the recording magnetic domain. Reproduction was performed in this embodiment by modulating the laser beam intensity as well in order to realize magnification and extinguishment of the transferred magnetic domain.

Figure 64:
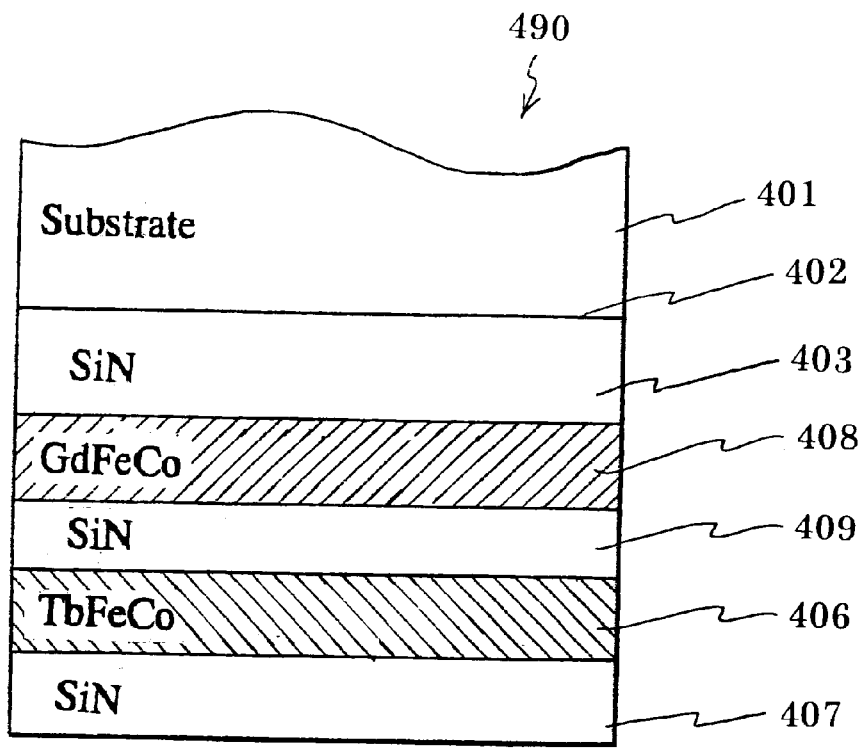
FIG. 64 conceptually shows a stacked structure of a magneto-optical recording medium according to the ninth aspect.

At first, explanation will be made for a magneto-optical disk according to the ninth aspect used in this embodiment. As shown in FIG. 64, the magneto-optical disk 90 comprises, on a polycarbonate substrate 401 in a stacked manner, a dielectric layer 403 composed of SiN, a reproducing layer (auxiliary magnetic film) 408 composed of a GdFeCo alloy, a non-magnetic layer 409 composed of SiN, a recording layer (magneto-optical recording film) 406 composed of a TbFeCo alloy, and a protective layer 407 composed of SiN. The TbFeCo recording layer 406 and the GdFeCo reproducing layer 408 are coupled magnetostatically with the non-magnetic layer 409 interposed therebetween. The GdFeCo reproducing layer 408 is a magnetic film which is an in-plane magnetizable film at room temperature and which is changed into a perpendicularly magnetizable film when the temperature exceeds a critical temperature Tcr. The GdFeCo reproducing layer 408 used in this embodiment has a critical temperature Tcr of 175° C. and a Curie temperature Tc of 340° C. The GdFeCo reproducing layer 408 has a compensation temperature Tcomp=240° C. between the critical temperature Tcr and the Curie temperature Tc. The TbFeCo recording layer 406 has its Curie temperature Tco of 270° C. and its compensation temperature Tcomp' of not more than room temperature. That is, there is given the relationship of Troom<Tcr<Tcomp<Tco<Tc. The relationship concerning the temperatures has been explained with reference to FIG. 66.

When the reproduction is performed for the recording signal recorded in the recording layer 406 of the magneto-optical recording medium 490 as described above, the reproducing power is modulated to have the two powers in synchronization with the reproducing clock or the integral multiple thereof (recording clock or the integral multiple thereof), as explained concerning the principle of the reproducing method of the present invention. The reduction and the extinguishment of the magnified magnetic domain may occur at any one of the low power and the high power as described above. However, in this embodiment, the reproducing light beam to transfer and magnify the magnetic domain was modulated to have the low power, and the reproducing light beam to reduce or extinguish the magnified magnetic domain was modulated to have the high power. The power levels are applied when the recording track is subjected to scanning while irradiating the magneto-optical disk with the reproducing light beam.

An optical head having a wavelength of 680 nm and a numerical aperture of the lens of 0.55 was used as a light source for performing recording and reproduction. Recording was performed on the magneto-optical disk 490 shown in FIG. 64 by using the light pulse intensity modulation method. Recording was performed under a condition of a linear velocity of 5 m/s, a recording cycle of 320 ns, a recording laser power of 7.5 mW, a pulse width of 53.3 ns, and a recording magnetic field of 500 Oe. Recording magnetic domains of 0.8 μm were subjected to recording at intervals of 0.8 μm corresponding to data including, for example, 1 and 0. The magnetic domains subjected to recording are shown in FIG. 65A together with the recording signal.

The recording magnetic domains were subjected to reproduction under the following reproducing condition. The linear velocity was 5.0 m/s. The reproducing laser power was modulated to have two power levels of 1.5 mW as the low power Pr1 to magnify the magnetic domain, and 3.5 mW as the high power Pr2 to reduce (or extinguish) the magnetic domain. A timing signal for the reproducing light power is shown in FIG. 65B. The modulation cycle for the reproducing power was 160 ns. Radiation was performed for 150 ns at the low power Pr1, and radiation was performed for 10 ns at the high power Pr2. A constant direct current magnetic field was used as the reproducing magnetic field, which was applied at about 80 Oe in the recording direction. This magnetic field may be substituted with the leakage magnetic field from the objective lens actuator as in the first reproducing method (seventeenth embodiment).

Figure 65:
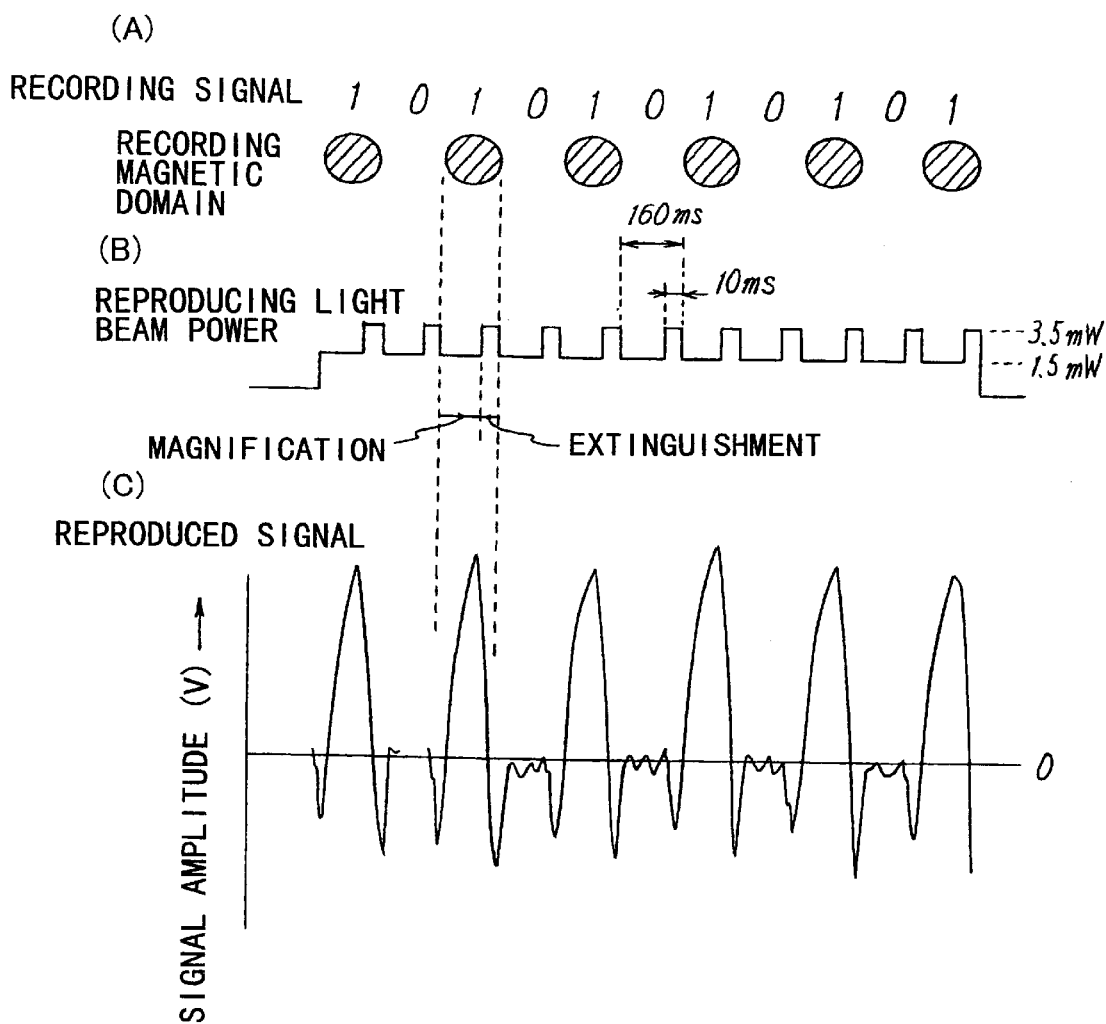
FIG. 65 shows a timing chart illustrating the principle of the reproducing method on the magneto-optical recording medium according to the present invention.

FIG. 65C shows an obtained reproduced signal waveform. It is understood from this reproduced signal waveform that the signal is enhanced only at portions at which the recording magnetic domain exists, and the signal is not enhanced at portions at which the recording magnetic domain does not exist. This fact means that the recording magnetic domain is transferred and magnified in the reproducing layer only when the reproducing light beam makes scanning for the portion of the recording track at which the recording magnetic domain exists. The reproduced signal was obtained in accordance with the magnetically induced super resolution mode. That is, the reproduced signal was amplified to have the magnitude which was about 1.5 times the reproduced signal obtained by reproduction without magnifying the magnetic domain subjected to the magnetic domain transfer. The amplifying effect on the reproduced signal was remarkably effective for further minute recording magnetic domains. Even when minute magnetic domains of not more than 0.4 µm were subjected to recording, it was possible to obtain a reproduced signal output of 80% (ratio to the saturated amplitude) with respect to the saturated amplitude (difference between the reproduced signal obtained when all magnetization in the reproducing layer was in the downward direction and the reproduced signal obtained when all magnetization in the reproducing layer was in the upward direction).

Figure 66:
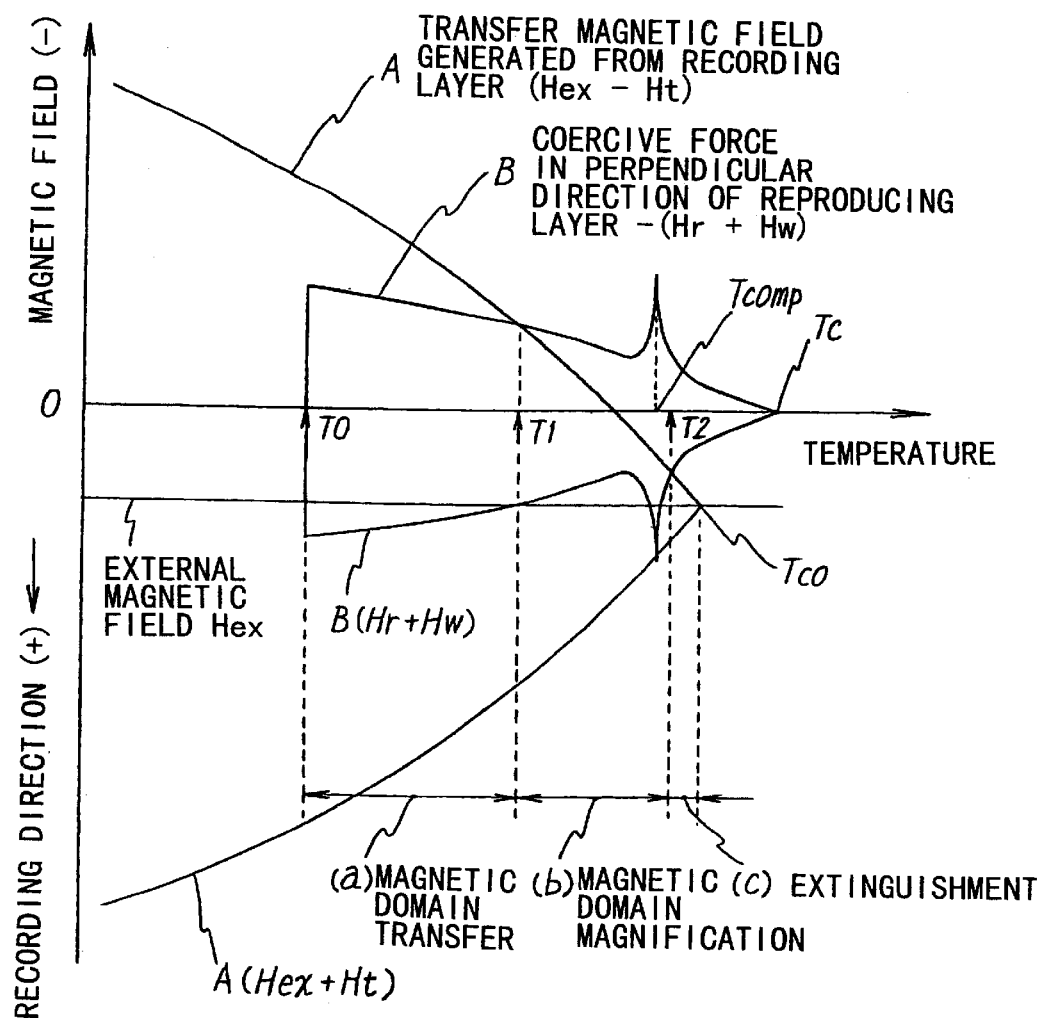
FIG. 66 shows the magnetic temperature characteristic concerning the magneto-optical recording layer and the magneto-optical reproducing layer of the magneto-optical recording medium according to the ninth aspect.
Figure 68A:
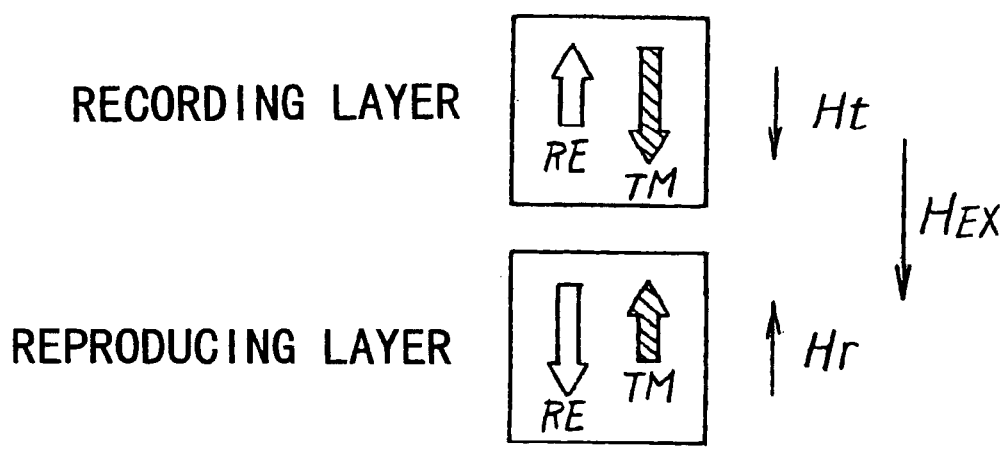
FIG. 68A shows the sub-lattice magnetization of the reproducing layer at a temperature less than the compensation temperature.
Figure 68B:
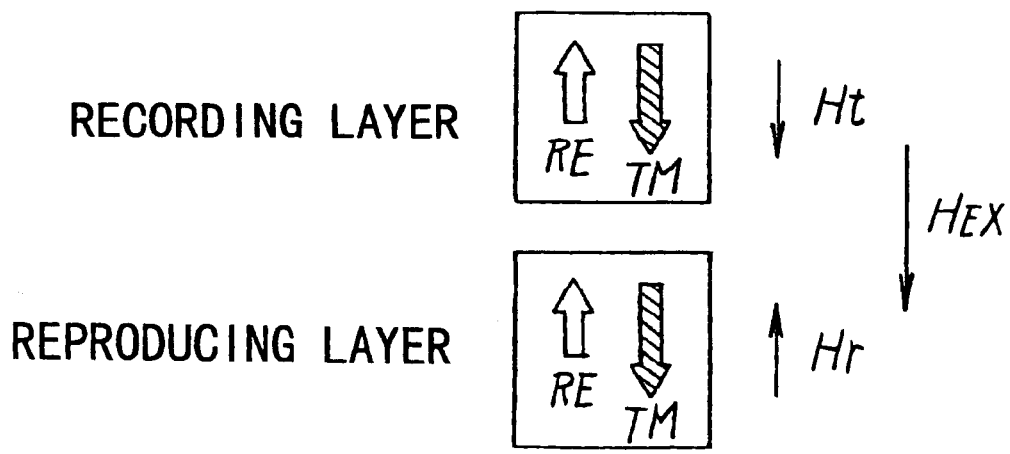
FIG. 68B shows the sub-lattice magnetization of the reproducing layer at a temperature above the compensation temperature.

The reproducing condition in this embodiment may be explained as follows in relation to FIG. 66 used to explain 31 the principle. That is, the reproducing layer is heated by the low power Pr1 of the power-modulated reproducing light beam to be in the temperature areas (areas (a) and (b)) shown in FIG. 410 in which the magnetic domain transfer and the magnetic domain magnification are caused, i.e., up to Tcr= 175° C. to Tcomp=240 ° C. The recording layer is heated by the high power Pr2 to be in the temperature area (area (c)) shown in FIG. 66 in which the magnetic domain extinguishment is caused, i.e., from a temperature exceeding Tcomp (240° C.) to Tco=270° C. The direct current magnetic field of about 80 Oe applied in the recording direction allows the magnetic temperature curves A and B to be disposed so that the relationship as shown in FIG. 66 is given. That is, the relationship between the magnetic temperature characteristic of the magneto-optical disk used in this embodiment and the applied direct current magnetic field satisfies the following requirements (3) and (4). The requirements necessary for the reproducing method described in this embodiment will be enumerated below. The magnetic characteristics of the reproducing layer and the recording layer of the magneto-optical recording medium used in this embodiment satisfy the following requirements (1) and (2) as described above.

(1) The reproducing layer, which is magnetized in the film surface direction at least at room temperature, has the compensation temperature Tcomp between the Curie temperature Tco and the critical temperature Tcr to cause magnetization in the perpendicular direction.

(2) The Curie temperature Tco of the recording layer exists between the compensation temperature Tcomp of the reproducing layer and the Curie temperature Tco of the reproducing layer.

(3) The magnetic temperature curve A and the magnetic temperature curve B intersect at a point (T1) between room temperature and the compensation temperature Tcomp of the reproducing layer under the condition in which the external magnetic field Hex is applied in the recording direction.

(4) The magnetic temperature curve A and the magnetic temperature curve B intersect at a point (T2) between the compensation temperature Tcomp of the reproducing layer and the Curie temperature Tco of the recording layer.

In this embodiment, the foregoing requirements (1) to (4) are satisfied by constructing the magneto-optical disk with the specified materials shown in FIG. 64 described above, and applying the DC magnetic field=80 Oe in the recording direction. However, arbitrary combinations may be used provided that the magneto-optical recording medium comprising the materials and the stacked structure and the magnitude of the external magnetic field applied during the reproduction are capable of satisfying the requirements (1) to (4). The direction of the DC magnetic field applied during the reproduction is not limited to the recording direction, which may be the erasing direction.

In the reproducing method of the present invention, the process of (a) magnetic domain transfer, (b) magnetic domain magnification, and (c) extinguishment of transferred magnetic domain is executed by modulating the reproducing light power intensity under the DC magnetic field. The period of time, in which the process is carried out, depends not only on the magnetic characteristics of the recording layer and the reproducing layer but also on the temperature rising velocity and the heat transfer velocity between the respective layers concerning, for example, the recording layer, the reproducing layer, the non-magnetic layer, the dielectric layer, and the protective layer, as well as other stackable magnetic layers, non-magnetic layers, and substrates. The velocities can be controlled by appropriately changing, for example, the stacked structure, the thickness, and the thermal conduction characteristics of the materials for constructing the layers. Accordingly, it is possible to respond to a desired reproducing access velocity.

It is preferable that the dielectric layer and the non-magnetic layer, which adjoin the reproducing layer (auxiliary magnetic layer), have appropriate degrees of thermal insulation properties. However, the degree of the thermal insulation property can be appropriately adjusted in relation to the thermal characteristics obtained by combining the access velocities upon recording and reproduction, the magnitude of the linear velocities upon recording and reproduction on the recording medium, and the thermal conduction characteristics of the reproducing layer and the recording layer.

The foregoing embodiment is illustrative of the structure in which the reproducing layer (auxiliary magnetic layer) of the magneto-optical recording medium is interposed by the dielectric layer and the non-magnetic layer. However, a magnetic member having magnetic anisotropy in the in-plane direction may be stacked in contact with the reproducing layer (auxiliary magnetic layer). It is desirable that the magnetic anisotropy in the in-plane direction is dominant in the magnetic member up to its Curie temperature, and the Curie temperature is approximately equal to the Curie temperature of the reproducing layer. When such a magnetic member is stacked in contact with the reproducing layer, it is possible to suppress occurrence of the Bloch line in the transferred magnetic domain during the reproduction, and it is possible to reduce the noise during the reproduction owing to its suppressing action. Those usable as materials for such a magnetic member include, for example, Pt-Co alloys such as Pt—Co alloys containing 25 atomic % of Co and GdFeCo alloys. Such a magnetic member may be stacked to make contact with any one of the upper and lower sides of the reproducing layer.

In the twelfth embodiment, recording is performed by using the magneto-optical modulation system in which the polarity of the applied magnetic field is modulated in conformity with the recording signal while radiating the pulse light beam. In the seventeenth and twenty-first embodiments, recording is performed by using the optical modulation system in which light intensity is modulated in conformity with the recording signal while applying the DC magnetic field. However, it is allowable to use any one of the magnetic field modulation recording system, the optical modulation recording system, and the optical magnetic field modulation system based on the use of the ordinary DC light beam.

Nineteenth Embodiment

[Magneto-optical Recording Medium According to Tenth Aspect and Third Reproducing Method on Magneto-optical Recording Medium With Power-modulated Pulse Light Beam]

In the foregoing embodiment of the reproducing method, the leak magnetic field, which is generated from the magnetic head during reproduction, is applied to the magneto-optical recording medium. On the other hand, reproduction is performed in this embodiment while actively applying a DC magnetic field in the same direction as the magnetization direction of the recording magnetic domain. Reproduction was performed in this embodiment by modulating the laser beam intensity as well in order to realize magnification and extinguishment of the transferred magnetic domain.

Figure 69:
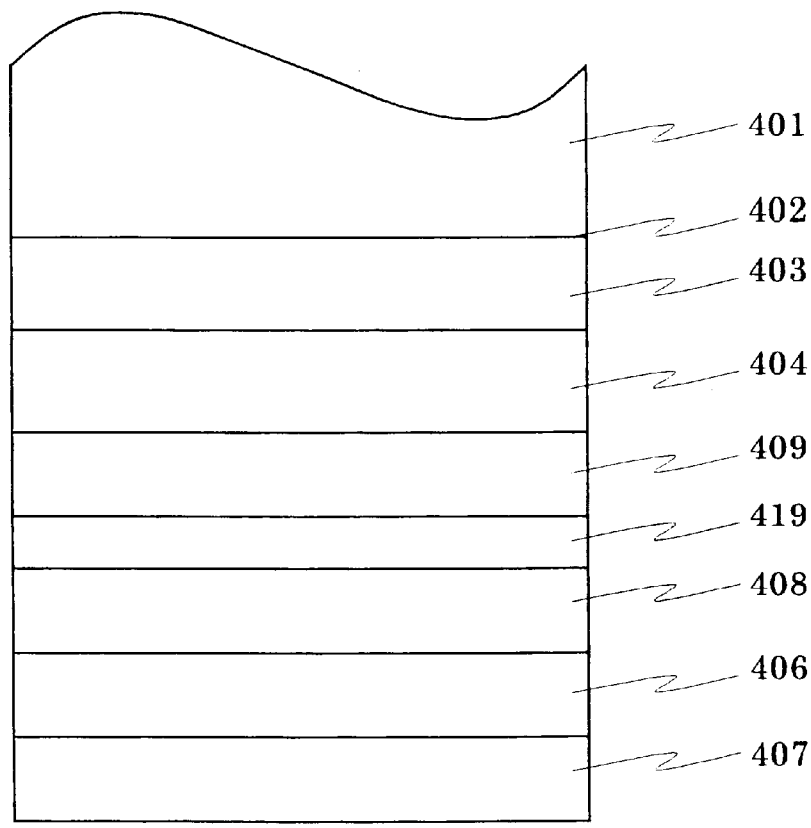
FIG. 69 shows a sectional view conceptually illustrating a stacked structure of a magneto-optical recording medium according to the tenth aspect.

At first, explanation will be made for a magneto-optical disk used in this embodiment. As shown in FIG. 69, the magneto-optical disk comprises, for example, in a stacked manner on a surface of a polycarbonate substrate 401 formed with a preformat pattern 402, a dielectric layer 403 composed of SiN, a reproducing layer (second auxiliary magnetic film) 404 composed of a GdxFeyCoz alloy, a non-magnetic layer 409 composed of SiN, a magnetic layer (first auxiliary magnetic film) 408 composed of a GduFev-Cow alloy, a recording layer (magneto-optical recording film 406) 406 composed of a TbFeCo alloy, and a protective layer 407 composed of SiN. The TbFeCo recording layer 406 and the GdxFeyCoz alloy reproducing layer 404 are magnetostatically coupled to one another through the non-magnetic layer 409 and the magnetic layer (first auxiliary magnetic film) 408 composed of the GdxFeyCoz alloy. The magnetic material, which is used for the GdxFeyCoz reproducing layer 404, which resides in the in-plane magnetization at room temperature, and which causes transition into the perpendicularly magnetizable film at a temperature exceeding the critical temperature Tcr2, is used by selecting the optimum numerical values of the element ratio x, y, z of the alloy. The magnetic material, which is used for the magnetic layer (first auxiliary magnetic film) 408 composed of the GduFevCow alloy, which is the perpendicularly magnetizable film at room temperature, and which causes transition into the in-plane magnetizable film at a temperature exceeding the critical temperature Tcr1, is used by selecting the optimum numerical values of the element ratio u, v, w of the alloy. The critical temperature Tcr2 is close to the critical temperature Tcr1. The reproducing layer (second auxiliary magnetic film) 404 and the magnetic layer (first auxiliary magnetic film) 408 composed of the GduFevCow alloy are set to give the mutually cooperative relationship when the recording information on the magneto-optical recording film 406 is reproduced. That is, the reproducing laser beam is radiated onto the reproducing layer (second auxiliary magnetic film) 404, the temperature of the reproducing layer (second auxiliary magnetic film) 404 is increased, and the temperature exceeds the critical temperature Tcr2 to cause the transition to the perpendicular magnetic domain. After that, the recording magnetic domain signal in the magneto-optical recording film 406 is transferred to the reproducing layer (second auxiliary magnetic film) 404, and it is immediately magnified. On the other hand, the magnetic layer (first auxiliary magnetic film) 408 causes the transition from the perpendicular magnetization to the in-plane magnetization immediately after the recording magnetic domain signal is transferred to the reproducing layer (second auxiliary magnetic film) 404, giving rise to the magnetic wall with respect to the perpendicular magnetic field to intercept the magnetic noise. Therefore, it is necessary that the magnetic layer (first auxiliary magnetic film) 408 is operated at the optimum timing after the operation of the reproducing layer (second auxiliary magnetic film) 404. The timing directly relates to the magnitude of the value of time difference ΔT between Tcr2 and Tcr1.

Figure 70:
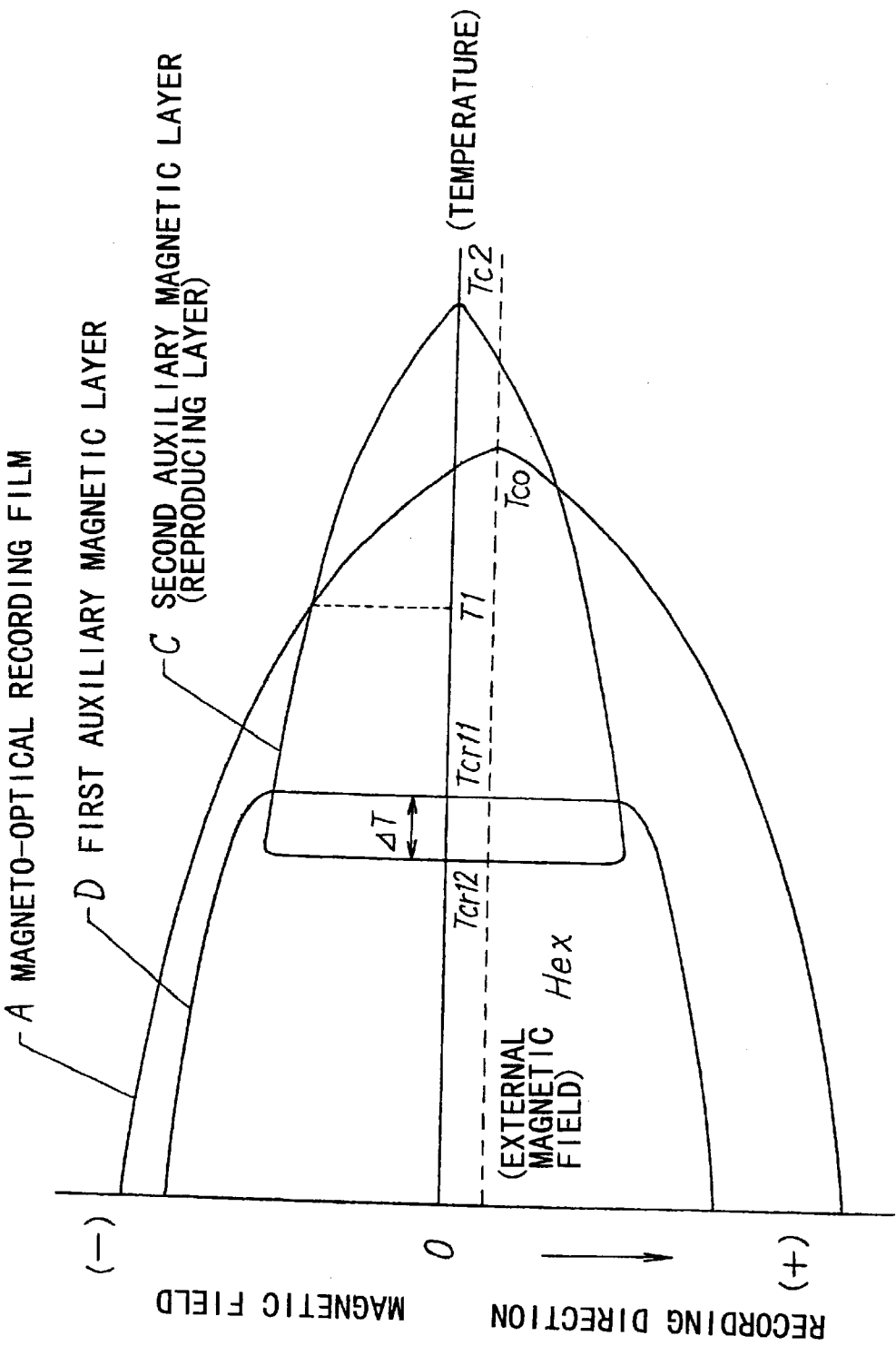
FIG. 70 shows the magnetization temperature characteristic concerning the magneto-optical recording layer, the auxiliary magnetic layer, and the magneto-optical reproducing layer of the magneto-optical recording medium of the present invention.
Figure 71A:
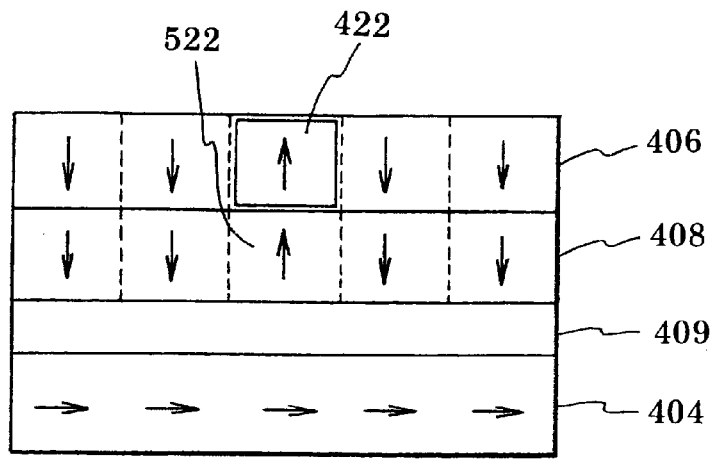
FIG. 71A conceptually shows magnetization states of respective layers before reproduction on a magneto-optical recording medium according to the tenth aspect, FIG. 71B conceptually shows magnetization states of the respective layers at the initial stage during reproduction on the magneto-optical recording medium, and FIG. 71C conceptually shows magnetization states of the respective layers at the last stage during reproduction on the magneto-optical recording medium.
Figure 71B:
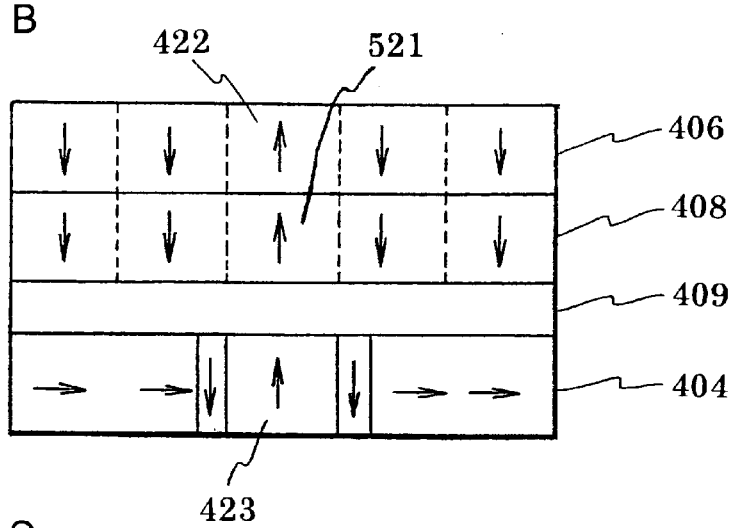
Figure 71C:
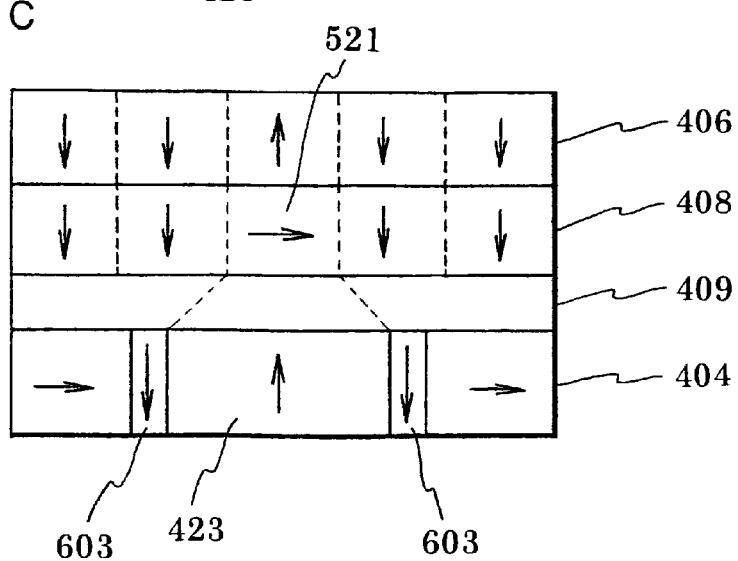
Figure 72:
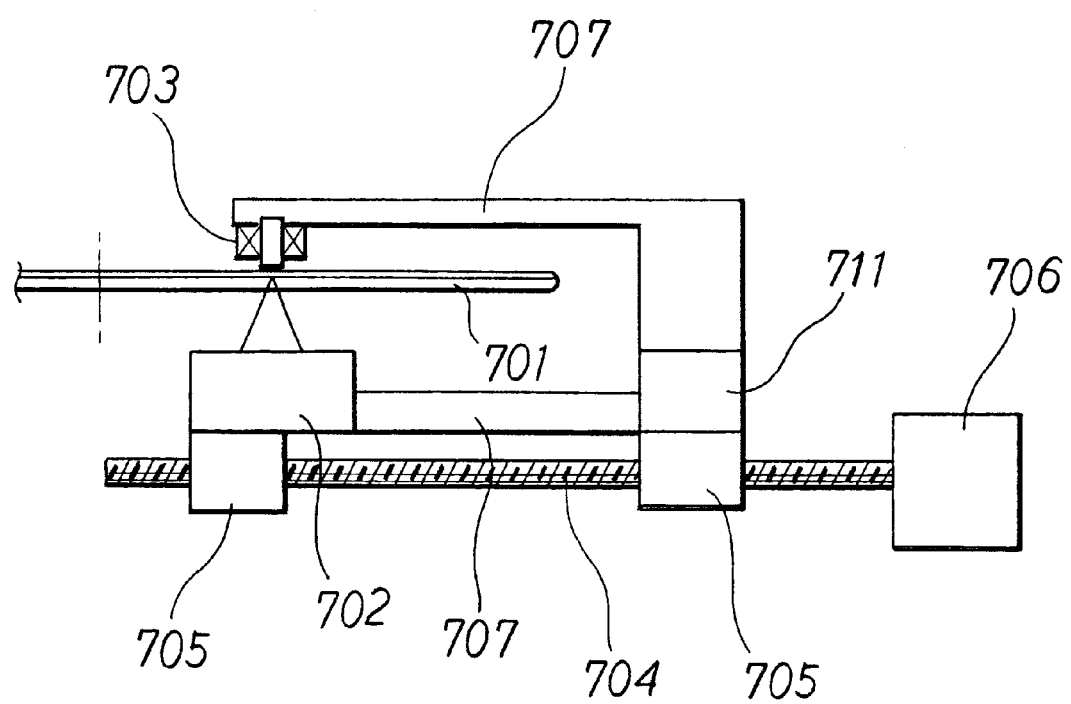
FIG. 72 shows a sectional view illustrating an arrangement of a head of a conventional magneto-optical recording and reproducing apparatus.
Figure 73:
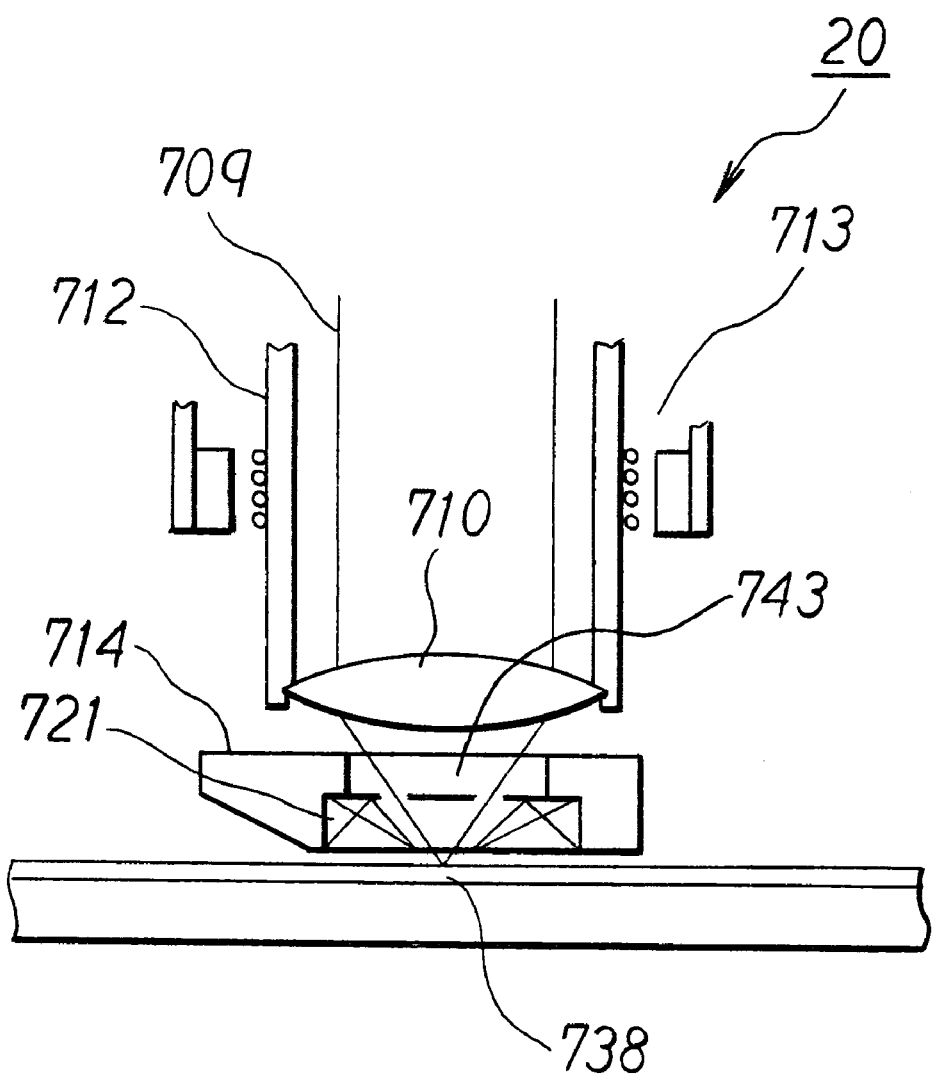
FIG. 73 shows a sectional view illustrating an arrangement of a head of a conventional magneto-optical recording and reproducing apparatus.

In order to set the optimum ΔT, selection and combination are performed with the types of materials for the reproducing layer (second auxiliary magnetic film) and the types of materials for the magnetic layer (first auxiliary magnetic film) 408. In this embodiment, the reproducing layer 404 of the GdxFeyCoz alloy and the GduFevCow alloy were practically combined. The GdxFeyCoz alloy was used for the reproducing layer 404 having the critical temperature Tcr2 of 175° C. and the Curie temperature Tc of 340° C. The reproducing layer 404 of the GdxFeyCoz alloy have a compensation temperature Tcomp=240° C. between the critical temperature Tcr2 and the Curie temperature Tc2. The TbFeCo recording layer 406 was used, which had its Curie temperature Tc of 270° C. and its compensation temperature Tcomp' of not more than room temperature. That is, there is given a relationship of Troom<Tcr2<Tcomp<Tco<Tc2. The temperature relationship among them has been explained with reference to FIG. 70.

When the recording signal, which is recorded in the recording layer 406 of the magneto-optical disk as described above, is reproduced, the reproducing power is modulated to have the two types of powers in synchronization with the reproducing clock or the multiple integral thereof (recording clock or the multiple integral thereof), as having been explained in the principle of the reproducing method according to the present invention described above. The reduction and the extinguishment of the magnified magnetic domain occur with any of the low power and the high power as described above. However, in this embodiment, the reproducing light beam was modulated to have the low power in order to transfer and magnify the magnetic domain, and the reproducing light beam was modulated to have the high power in order to reduce or extinguish the magnified magnetic domain. The power levels are applied during the scanning over the recording track while irradiating the magneto-optical disk with the reproducing light beam.

Twentieth Embodiment

[Magneto-optical Recording Medium of Ninth Aspect and Fourth Reproducing Method on Magneto-optical Recording Medium With Power-modulated Pulse Light Beam and Alternating Magnetic Field]

In the nineteenth embodiment, reproduction was performed while applying the DC magnetic field. On the other hand, in this embodiment, an alternating magnetic field is applied during reproduction in place of the DC magnetic field. That is, in this embodiment, in order to reliably execute the magnification and the extinguishment of the transferred magnetic domain, the laser beam intensity is modulated in synchronization with the reproducing clock, as well as the reproduction is performed by applying the alternating magnetic field in synchronization with the reproducing clock. The apparatus shown in FIG. 14 can be used to record and reproduce information.

Figure 82:
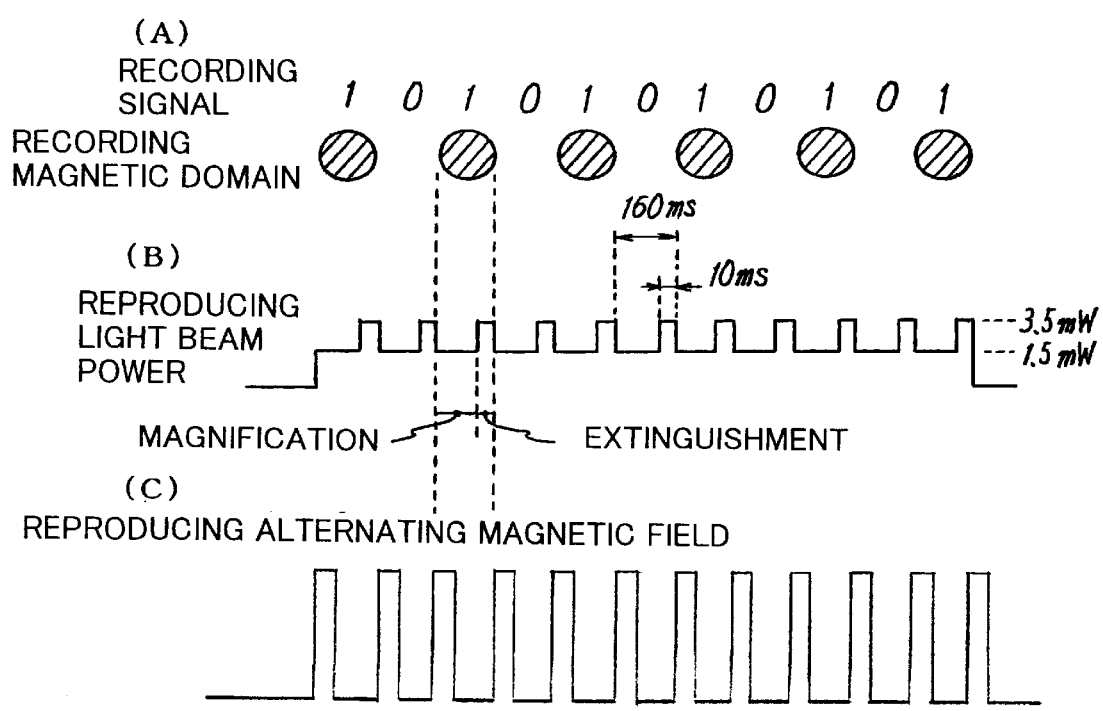
FIG. 82 shows a modulation pattern of the reproducing light beam and an alternating pattern of the reproducing magnetic field used in the reproducing method in the twentieth embodiment.
Figure 83:
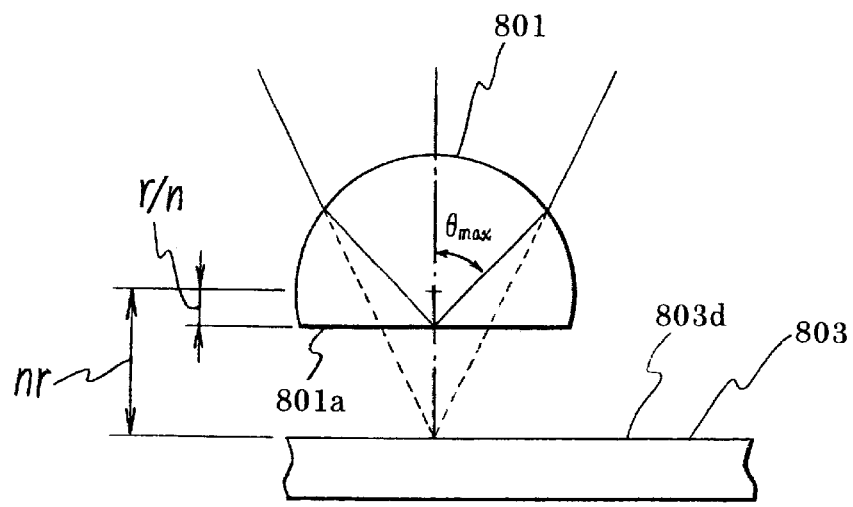
FIG. 83 conceptually illustrates the principle of image formation of an optical element used for the magneto-optical head according to the present invention.

The recording magnetic domains, which follow the recording signals as shown in FIG. 82A, are formed on the magneto-optical recording medium according to the ninth aspect in the same manner as in the eighteenth embodiment. The reproduction can be performed by modulating the reproducing light beam power (FIG. 82B) in the same manner as in the eighteenth embodiment except that the alternating magnetic field as shown in FIG. 82C is applied in synchronization with the reproducing clock.

The reproducing magnetic field can be modulated in synchronization with the reproducing clock for each of the magnetic domains one by one recorded as in the fourth embodiment. The intensity of the pulse-shaped magnetic field may be, for example, 150 (Oe) (HE) in the recording direction in the vicinity of the magnetic domain center, and 250 (Oe) (HS) in the erasing direction. The duty ratio in the recording direction may be, for example, 25%. As described above, i) the transfer of the magnetic domain in the information-recording layer to the reproducing layer (or the auxiliary magnetic layer), ii) the magnification of the transferred magnetic domain, and iii) the reduction or extinguishment of the magnified magnetic domain can be performed more reliably not only by optically modulating the reproducing light beam power in synchronization with the reproducing clock but also by alternating the reproducing magnetic field in synchronization with the reproducing clock. Further, it is easy to find out the best condition in which the operations of i) to iii) are effected reliably by appropriately controlling the modulation timing (or duty) of the reproducing light beam power and the application timing of the alternating magnetic field. Thus, it is possible to widen the margin for the reproducing condition.

Twenty-first Embodiment

Figure 74:
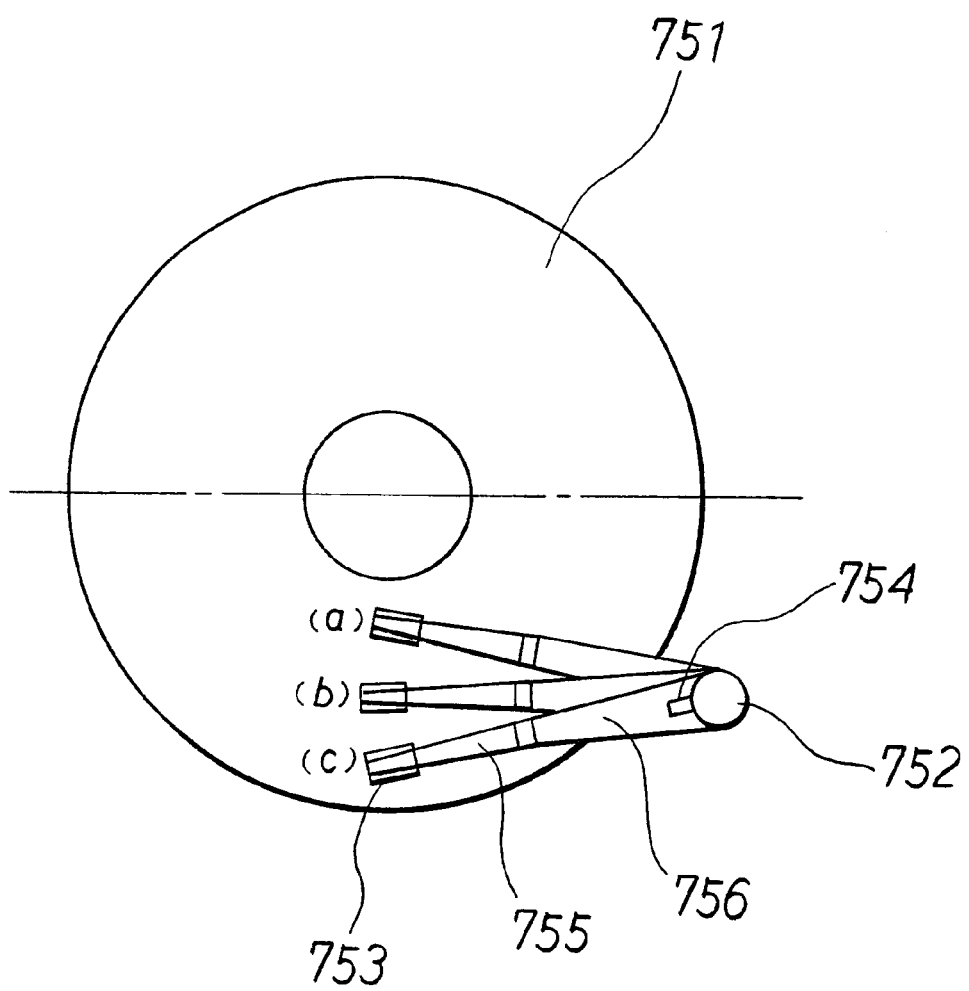
FIG. 74 shows a plan view illustrating an embodiment of a magneto-optical recording and reproducing apparatus according to the present invention.

This embodiment illustrates an exemplary structure of the optical head and components disposed in the vicinity thereof, of the reproducing apparatus for the magneto-optical recording medium according to the present invention. FIG. 74 shows a swing arm 756 which is installed with a magneto-optical head (optical head) 753 at its tip. A first end of the swing arm 756 is rotatably supported by a rotary shaft 752. The magneto-optical head 753 is fixed to a second end by the aid of a suspension 755.

The swing arm 756 makes rotation about the center of the rotary shaft 752 to move to positions over recording areas (a), (b), (c) in the radial direction of the disk-shaped recording medium (magneto-optical disk) 751, being capable of make access to magnetization information recorded in these areas. The magneto-optical head 753 includes an objective lens which is carried on a slider. This structure will be described later on. When the recording medium 751 is rotated, the magneto-optical head 753 is maintained at a predetermined position over the recording medium 751 in accordance with the floating action of the slider. A laser beam window 754, which is used to feed the laser beam to the magneto-optical head 753, is formed in the rotary shaft 752.

Figure 75:
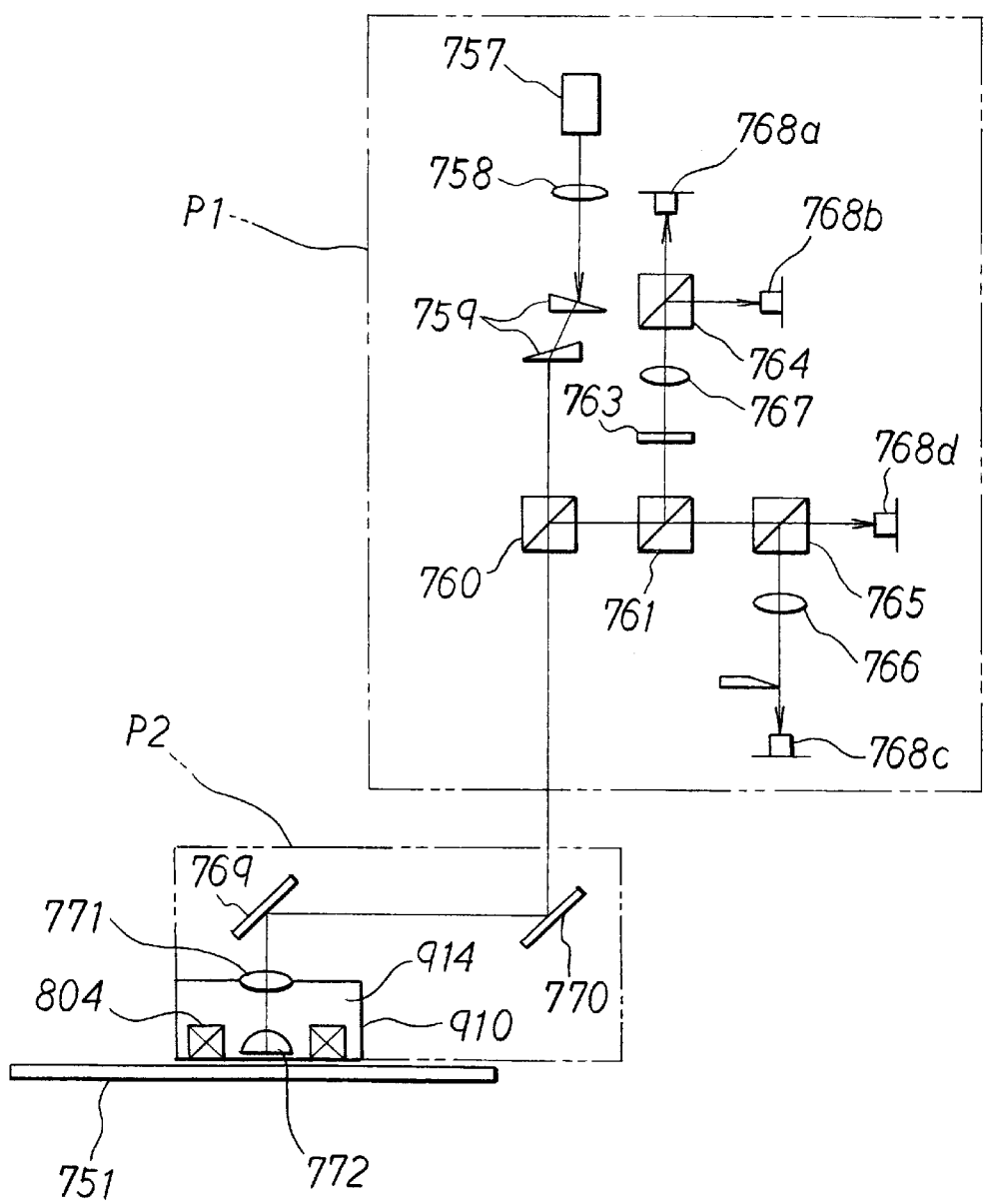
FIG. 75 schematically shows an optical system of the apparatus shown in FIG. 74.

With reference to FIG. 75, explanation will be made for an optical system for irradiating the recording medium 751 with the reproducing light beam and detecting the reflected light beam therefrom. The optical system comprises a fixed optical system P1 and a movable optical system P2, wherein the fixed optical system P1 is provided with a laser light source 757 as a reproducing light source and a detection system for detecting the light reflected by the recording medium 751, and the movable optical system P2 is movable together with the swing arm 756.

The fixed optical system P1 is provided fixedly to an unillustrated magneto-optical recording and reproducing apparatus (magneto-optical drive). The fixed optical system P1 comprises the laser light source 757, magneto-optical signal detectors 768a, 768b, a tracking signal detector 768d, and a focus signal detector 768c. The laser beam from the laser light source 757 passes through a collimator lens 758 and a prism 759, and it is directed toward the movable optical system P2. The reproducing light beam, which is reflected from the recording medium 751, is deflected by a beam splitter 760, and it is divided by the beam splitter 761 into light beams in perpendicular two directions. The first reproducing light beam, which is divided by the beam splitter 761, is further divided by a beam splitter 765 into light beams. One of them passes through a lens 766, and it comes into the focus signal detector 768c. The other comes into the tracking signal detector 768d. The second reproducing light beam, which is divided by the beam splitter 761, passes through a wavelength plate 763 and a lens 767, and it is further divided by a beam splitter 764 into light beams in perpendicular two directions. The light beams come into the magneto-optical signal detectors 768a, 768b respectively.

The movable optical system P2 comprises a mirror 770 which is arranged on the rotary shaft 752 described above, a light-collecting lens 771 which is provided in the slider 914 of the magneto-optical head 910 (753), a hemispherical solid immersion lens 772 which is used as an objective lens, and a magnetic coil 804 which is disposed therearound. The light-collecting lens 771 and the solid immersion lens 772 are arranged so that their optical axes are coincident with each other. A circular opening, which is disposed about the center of the optical axis, is formed in the slider so that the light beam, which is transmitted through the solid immersion lens 772, is successfully transmitted through the slider 914.

The laser beam, which is fed from the fixed optical system P1, is deflected by the mirror 770 installed on the rotary shaft 752 of the swing arm 756 and the mirror 769 provided on the slider 914 in the movable optical system P2, and it radiates the recording medium 751 by the aid of the light-collecting lens 771 and the solid immersion lens 772.

The solid immersion lens 772 may be constructed as follows. That is, the bottom surface (surface opposed to the magneto-optical disk 751) of the solid immersion lens 772 may be coated with a light-transmissive protective film such as TiN (titanium nitride), SiN (silicon nitride), and $SiO_2$ (silicon oxide). In addition to the protective film, the solid immersion lens 772 may be coated by sputtering with a highly hard crystalline carbon coating layer of amorphous carbon or DLC (diamond like carbon).

Figure 80:
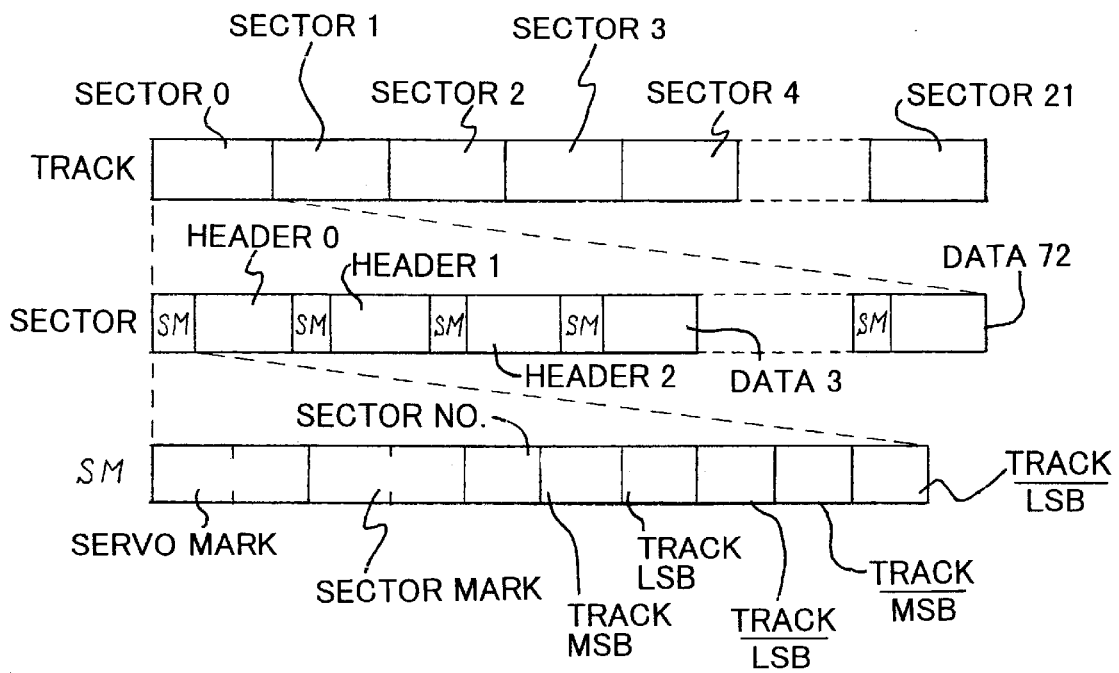
FIG. 80 shows an arrangement of tracks/sectors of a magneto-optical disk used in a twenty-first embodiment.
Figure 81:
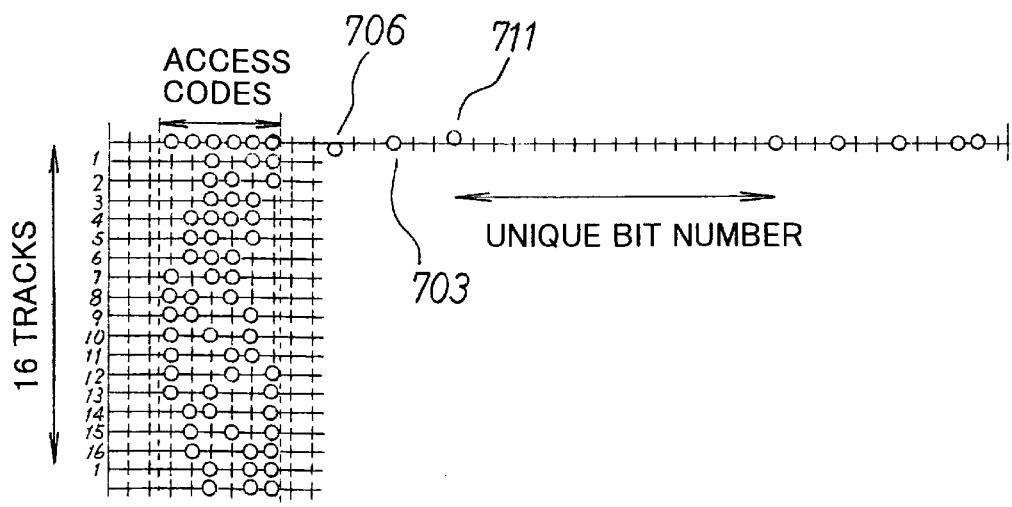
FIG. 81 shows an arrangement of a prepit pattern formed on the track of the magneto-optical disk used in the twenty-first embodiment.

Various preformat pits are formed on the substrate of the magneto-optical disk 751. The servo pit is formed in a wobble form, and it is detected in accordance with the sample servo system. FIG. 80 shows an exemplary structure of the track and the sector of the recording medium 751. FIG. 81 shows an exemplary arrangement of prepits formed on the track. The reflected light beam from the pits is detected by the tracking signal detector 768d and the focus signal detector 768c of the fixed optical system P1 to perform the tracking and the focus control.

The magneto-optical recording medium described in any one of the first to nineteenth embodiments may be used as the magneto-optical disk 751. The reproducing mechanism including the optical head and the swing arm described in this embodiment can be used in place of the optical head and the magnetic head or the magneto-optical head of the recording and reproducing apparatuses shown in FIGS. 14 and 32. By doing so, it is possible to further realize a compact size and a light weight of the recording and reproducing apparatus shown in the fourth and fifth embodiments. Further, it is possible to perform the recording and the reproduction at a high density by adopting the solid immersion lens.

Twenty-second Embodiment

Figure 76:
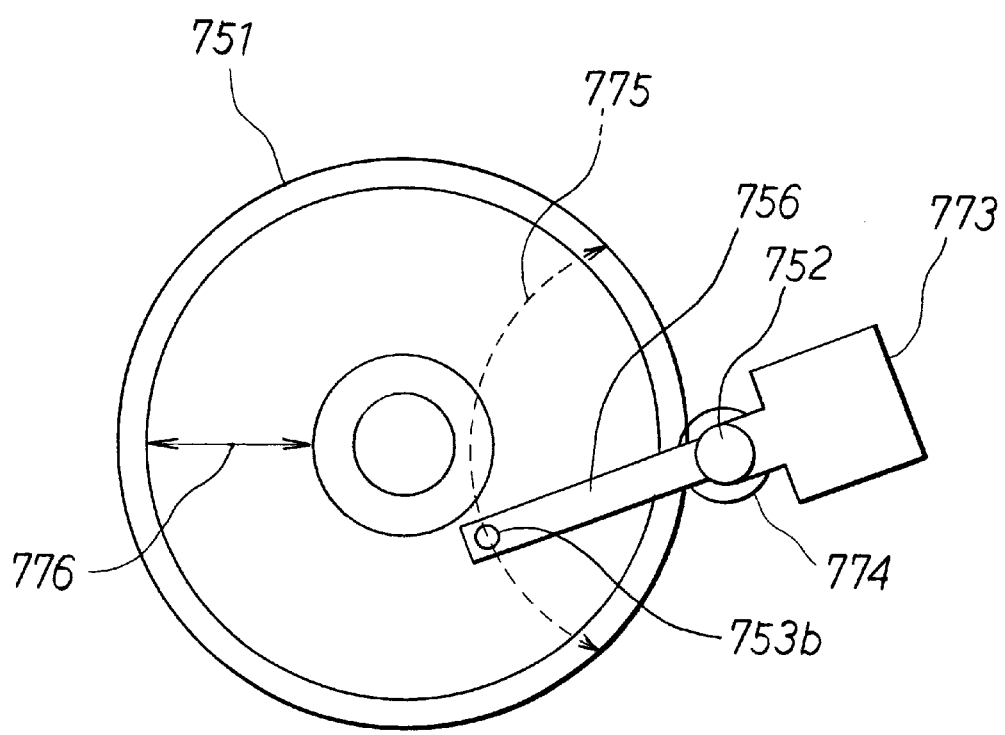
FIG. 76 shows a plan view illustrating another embodiment of a magneto-optical recording and reproducing apparatus.

This embodiment illustrates an example of the recording and reproducing apparatus which is provided with a swing arm having a structure different from that of the swing arm described in the twenty-first embodiment. The swing arm 756 shown in FIG. 76 is different from the swing arm described in the twenty-first embodiment in that an anchor arm 773 is provided at an end disposed on the side opposite to the side on which a magneto-optical head 753b is provided with respect to a rotary shaft 752 of the swing arm. The swing arm 756 allows the magneto-optical head 753b attached to its tip to make access to a recording area 776 by moving the magneto-optical head 753b over a recording medium 751 along a locus as shown by a broken line in FIG. 76.

Figure 77:
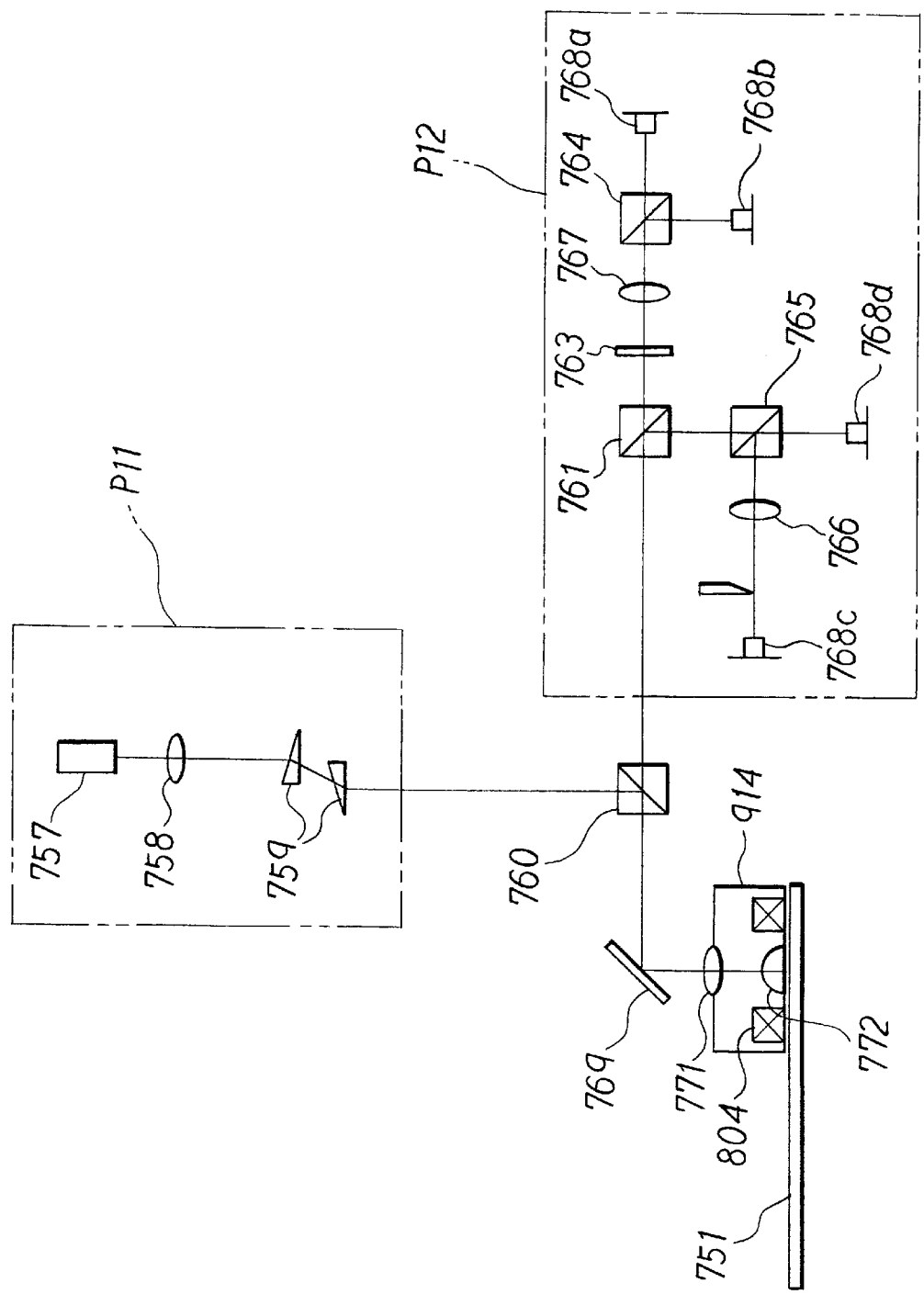
FIG. 77 schematically shows an optical system of the apparatus shown in FIG. 76.

FIG. 77 shows a block diagram illustrating the entire optical system of the recording and reproducing apparatus based on the use of the swing arm 756. This optical system uses optical elements similar to the respective optical elements of the optical system shown in FIG. 75 However, in this embodiment, the fixed optical system P1 shown in FIG. 75 is further divided into an optical system P11 and an optical system P12. The optical system P11 includes a laser light source 757, a collimator lens 758, and a prism 759, and it is fixed to the recording and reproducing apparatus in the same manner as the fixed optical system P1 in the twenty-first embodiment. On the other hand, the optical system P12 comprises, for example, magneto-optical signal detectors 768a, 768b, a focus signal detector 768c, a tracking signal detector 768d, and optical elements for directing the reproducing light beam to the foregoing components. The optical system P12 is accommodated in the anchor arm 773.

A mirror 769, a light-collecting lens 771, a solid immersion lens 772, a magnetic coil 804, and a slider 914 for carrying these components are provided on the tip of the swing arm 765. In this embodiment, a beam splitter 760 for directing the reflected light beam from the recording medium 751 toward the optical system P12 is provided on the rotary shaft 752 of the swing arm 756.

Figure 78:
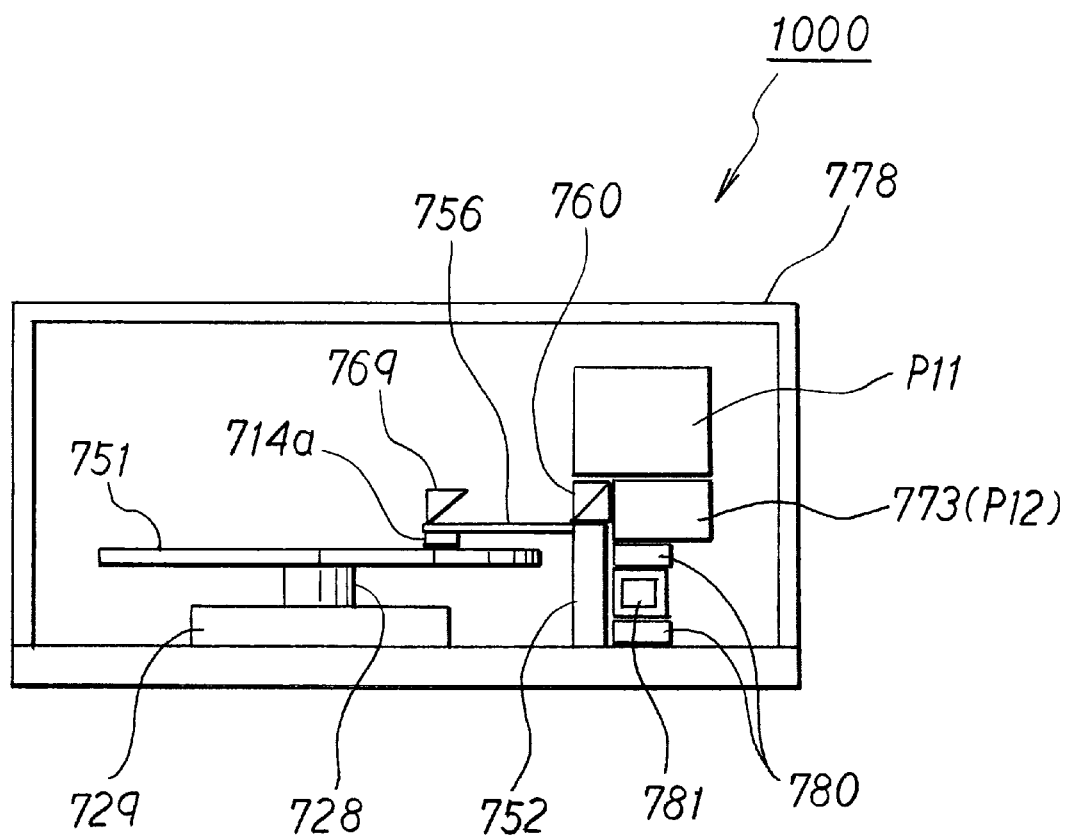
FIG. 78 shows a side view illustrating the magneto-optical recording and reproducing apparatus according to the present invention.
Figure 79:
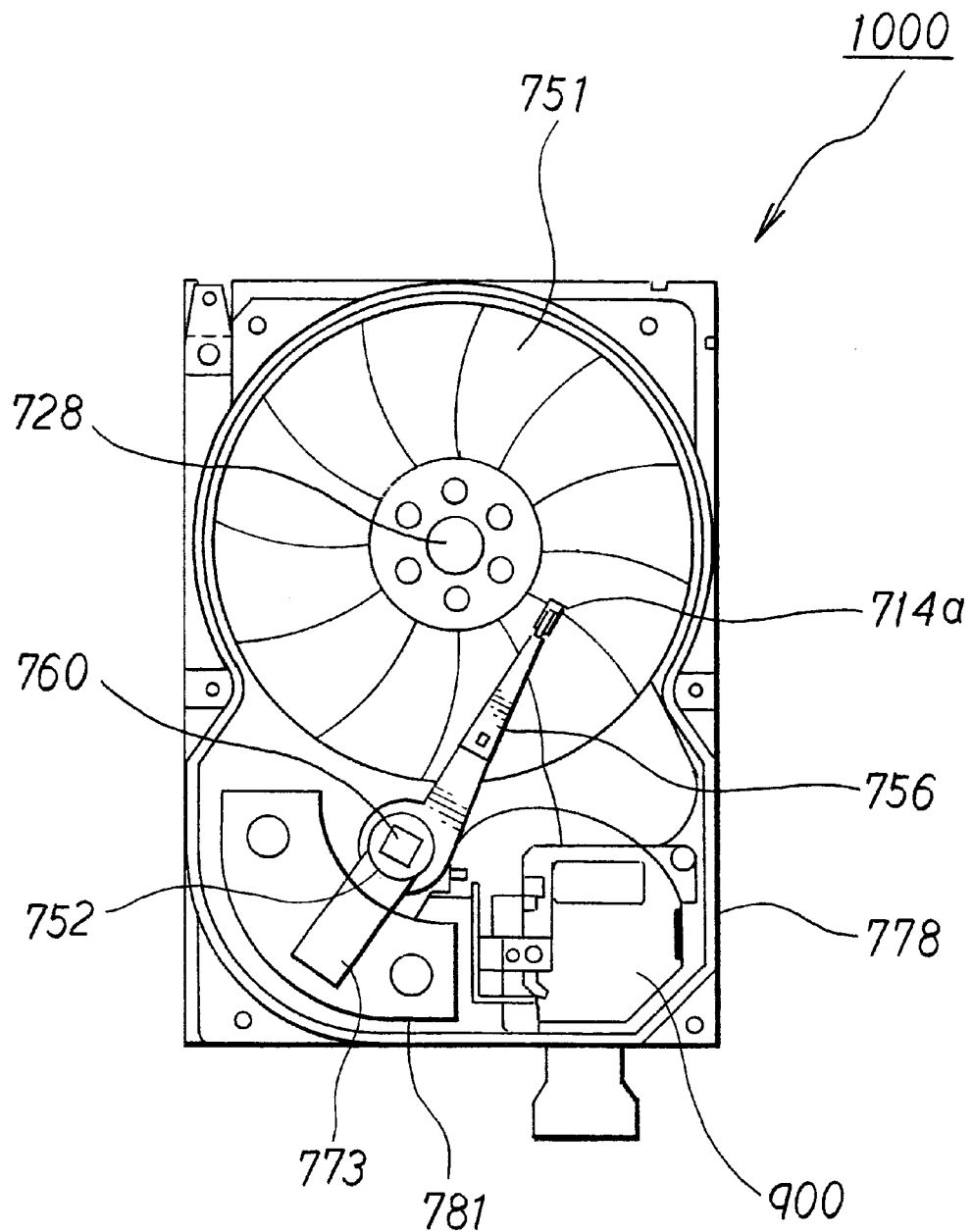
FIG. 79 shows a plan view illustrating the magneto-optical recording and reproducing apparatus according to the present invention.

FIGS. 78 and 79 show a schematic side view and a top view of a recording and reproducing apparatus 1000 into which the swing arm 756 shown in FIG. 76 and the optical system shown in FIG. 77 are incorporated, respectively. The optical system P11 is fixed to a casing 778 over the rotary shaft 752 and the beam splitter 760. A motor 729 for rotating the recording medium 751 is installed to the bottom of the casing. The recording medium 751 is installed to a spindle 728. A pair of magnets 780 are installed under the anchor arm 778 and on the bottom of the casing. A coil 781 is provided between the magnets 780. The rotation of the driving shaft 752 of the swing arm is controlled by the repulsive force between the magnets 780 and the coil 781. Those disposed on the side of the slider 714a of the swing arm are constructed to have the weight balanced with the weight of those disposed on the side of the anchor arm 773 with the rotary shaft 752 intervening therebetween. The signal processing system shown in FIG. 32 is accommodated in the control unit 900 to control the power and the modulation timing of the reproducing light beam and the intensity and the application timing of the reproducing magnetic field. Any one of the magneto-optical recording media described in the first to nineteenth embodiments may be used as the magneto-optical disk 751 as the recording medium to be used for this embodiment.

Twenty-third Embodiment

Figure 84:
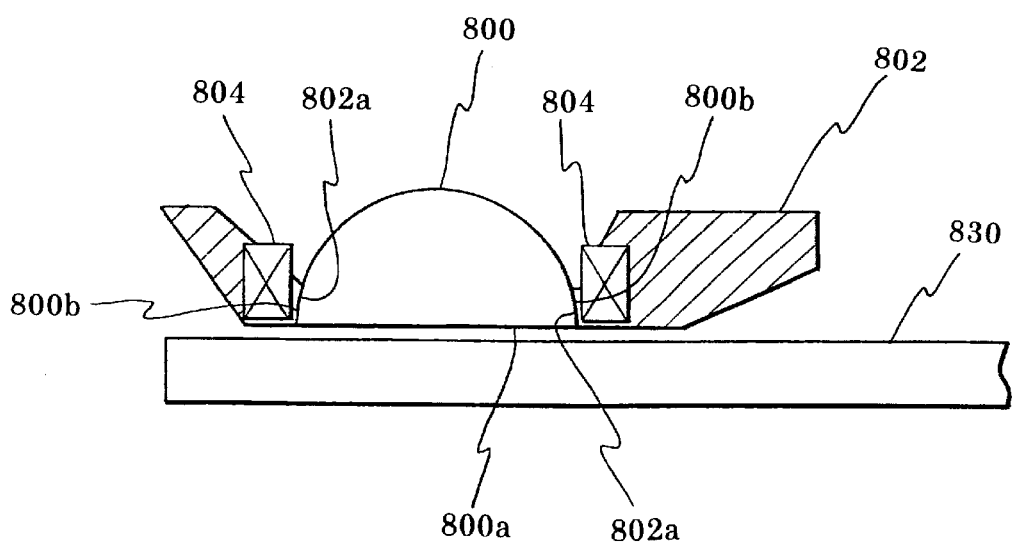
FIG. 84 shows a sectional view illustrating a magneto-optical head comprising a solid immersion lens and a magnetic coil provided on a slider in which the solid immersion lens is used for the optical element shown in FIG. 83, wherein the solid immersion lens and the magnetic coil are contained in the slider.

FIG. 84 shows exemplary structures of the slider 714a and the solid immersion lens 772 of the recording and reproducing apparatuses described in the twenty-first and twenty-second embodiments. A magneto-optical recording medium, in which a transparent protective film (with a thickness within a range of 10 nm to 3000 nm) is formed on the reproducing light beam-incoming side of the magneto-optical recording medium described in any one of the first to nineteenth embodiments, can be used as a disk-shaped recording medium 830.

FIG. 84 shows a sectional view as obtained when the magneto-optical head is cut in the longitudinal direction of the slider 802 (714a). The illustrated floating type magneto-optical head comprises, on the slider 802, a solid immersion lens 800 and a magnetic coil 804 for applying an external magnetic field. A through-hole 802a, which has approximately the same diameter as the outer circumference of the oil 800, is formed through the slider 802. The solid immersion lens 800 is fitted to the through-hole 802a as shown in FIG. 84. A light-outgoing plane 802a of the solid immersion lens 800 is positioned at the same height as that of the bottom surface of the slider. The magnetic coil 804 is embedded at a position over the through-hole 802a of the slider 802 to surround the outer circumference 800b of the solid immersion lens 800. The slider 802 is connected to an actuator (not shown) of the main magneto-optical recording and reproducing apparatus body by the aid of an unillustrated plate spring support mechanism owing to such a plate spring support mechanism, the light-outgoing surface 800a of the solid immersion lens 800 is arranged in a floating manner in parallel to the magneto-optical recording medium 51 closely within the attenuation distance of the evanescent light with respect to the magneto-optical recording medium 751 when the slider 802 is allowed to float. In this structure, the recording laser beam, which is radiated from the position over the solid immersion lens 800, is transmitted through the solid immersion lens 800, and it is collected on the magneto-optical recording medium 751 to form, on the magneto-optical recording medium 751, a spot which is smaller than the theoretical minimum spot radius in the air. The small spot is formed in accordance with the same principle as that of the liquid immersion lens, when a member, which has a refractive index n larger than the refractive index of the air, is used for the solid immersion lens 800, and the light is collected in the solid immersion lens 800. When information is recorded, the magneto-optical recording medium 751 is subjected to the radiation of the laser beam and the application of the magnetic field by the magnetic coil 804 in accordance with the controlled laser beam radiation timing and the magnetic field application timing corresponding to the information to be inputted.

Twenty-fourth Embodiment

Figure 85:
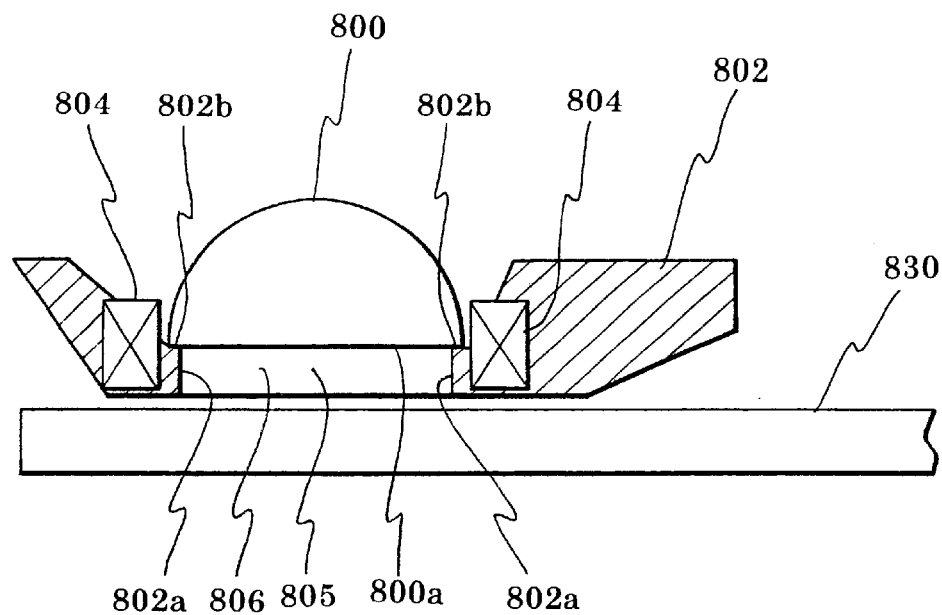
FIG. 85 shows a sectional view illustrating a magneto-optical head in which the solid immersion lens shown in FIG. 83 is carried on the slider, and the magnetic coil is contained in the slider.

FIG. 85 shows a magneto-optical head having a structure different from that of the twenty-third embodiment. A solid immersion lens 810 is carried on the slider 802 shown in FIG. 84. For this arrangement, a portion 105 of the slider 802, at which the solid immersion lens 810 is installed, is formed with a member, for example, glass for transmitting the laser beam. The solid immersion lens 810 is fixed to a lens-carrying section 802b disposed outside the laser beam-transmitting member 106. A magnetic coil 804 is contained in the slider 802 in the same manner as in the twenty-third embodiment.

Twenty-fifth Embodiment

Figure 86:
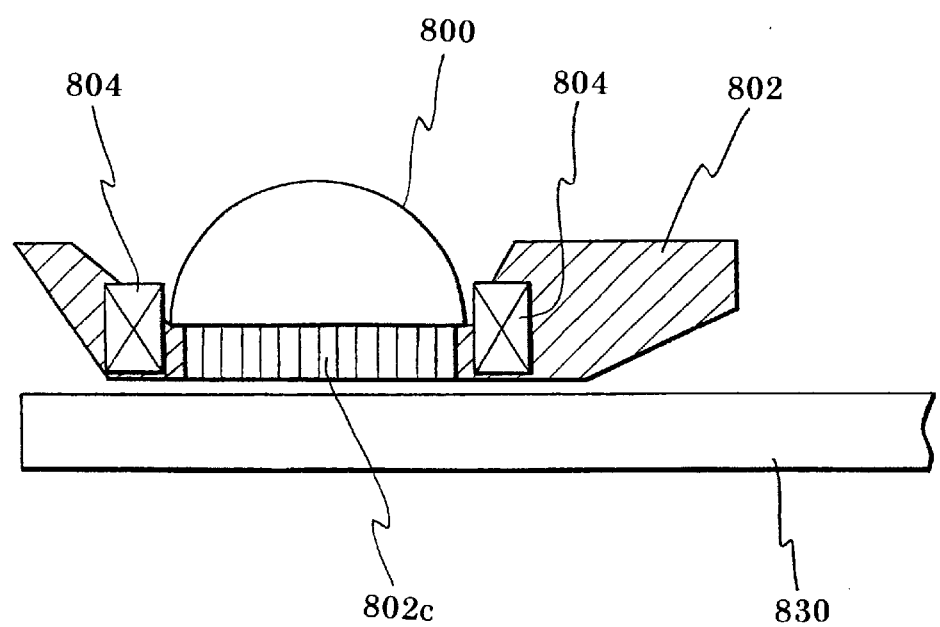
FIG. 86 shows a sectional view illustrating a magneto-optical head, in which a magnetic material for transmitting the laser beam is arranged at a portion at which the solid immersion lens is installed in the magneto-optical head shown in FIG. 85.

A floating type magnetic head shown in FIG. 86 is composed of a magnetic core 802c in place of the laser beam-transmitting member 806 of the floating type magneto-optical head shown in FIG. 85. It is desirable that the magnetic core 802c is composed of a material which transmits the laser beam, which has a small coercive force, and which has a large saturation magnetic flux density. It is preferable to use, for example, transparent ferrite, yttrium iron garnet, and rare earth metal iron garnet. The magnetic core 802c is easily magnetized by an external magnetic field applied by a magnetic coil 804. Therefore, it is possible to converge the magnetic flux to a position under a solid immersion lens 800. Accordingly, it is easy to control the magnetic flux applied to the magneto-optical recording medium 830.

Twenty-sixth Embodiment

A floating type magneto-optical head shown in FIG. 87 has a structure in which a magnetic coil 804 similar to the magnetic coil 804 shown in FIG. 85 is incorporated under a solid immersion lens 800. The magnetic coil 804 is jointed to a light beam-outgoing plane 800 of the solid immersion lens 800. In this structure, the magnetic coil 804 is arranged at a position at which the light flux outgoing from the solid immersion lens 800 is not intercepted. In this embodiment, the magnetic coil 804 is arranged at the position close to the magneto-optical recording medium 830 as compared with the light beam-outgoing plane 800a of the solid immersion lens 800. Therefore, it is preferable that the magnetic coil is thin as far as possible. For example, it is preferable to use a film-shaped magnetic coil 831 having an annular coil as shown in FIG. 88A and a film-shaped magnetic coil 832 having a rectangular coil as shown in FIG. 88B.

Twenty-seventh Embodiment

Figure 89:
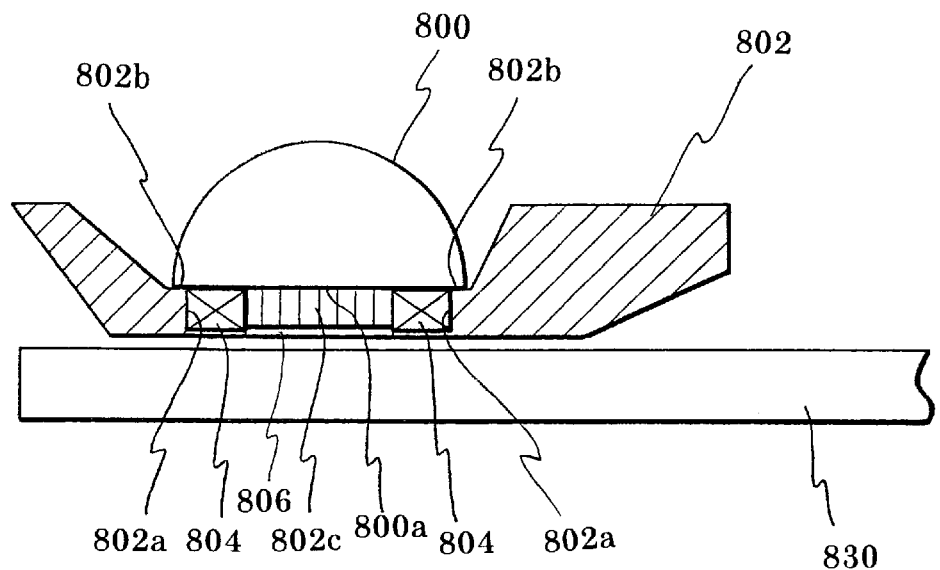
FIG. 89 shows a sectional view illustrating a magneto-optical head in which a magnetic core for transmitting the laser beam is arranged at a portion at which the solid immersion lens of the magneto-optical head shown in FIG. 87 is installed.

FIG. 89 shows a structure of a magneto-optical head including a magnetic core 802c provided over a portion of the laser beam-transmitting member 806 of the floating type magneto-optical head shown in FIG. 87. The floating type magneto-optical head shown in FIG. 89 has the magnetic core 802c which is provided inside the magnetic coil 804 and between the solid immersion lens 800 and the magneto-optical recording medium 830. The magnetic coil 802c is composed of a magnetic material which transmits the laser beam, in the same manner as shown in FIG. 86 owing to such a structure, the floating type magneto-optical head is constructed such that the spot radius is decreased on the magneto-optical recording medium 830. Further, the magnetic field to be applied to the magneto-optical recording medium 830 is controlled stably and easily.

Twenty-eighth Embodiment

Figure 90:
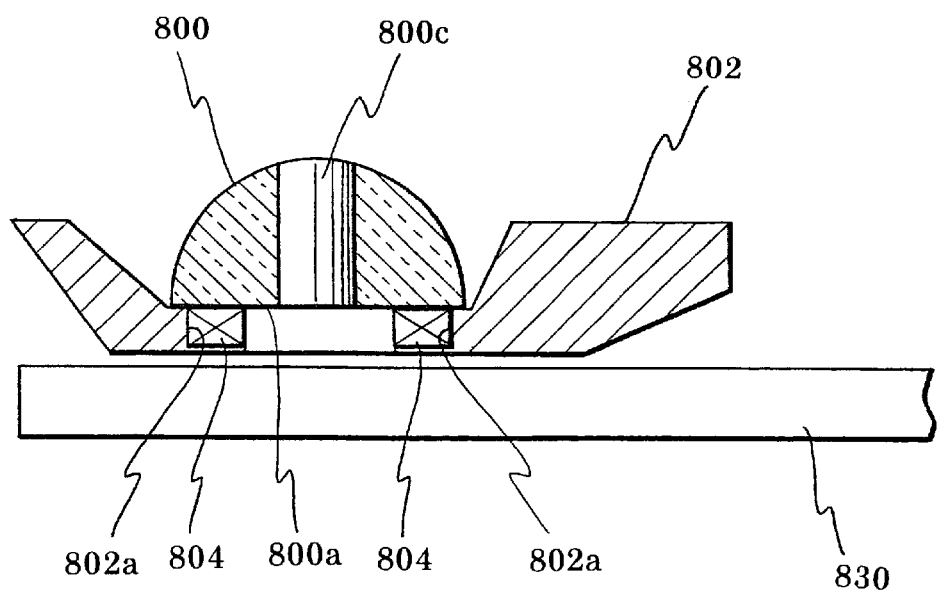
FIG. 90 shows a sectional view illustrating a magneto-optical head concerning the magneto-optical head shown in FIG. 88, in which a magnetic core for transmitting the laser beam is formed at a portion in the vicinity of the center perpendicular to the laser beam-outgoing plane of the solid immersion lens.

FIG. 90 relates to the structure of the floating type magneto-optical head shown in FIG. 88, illustrating a case in which at least a part of the solid immersion lens 800 is composed of a laser beam-transmitting magnetic material, for example, transparent ferrite. As for the solid immersion lens 800, only the portion 800c, which is disposed in the vicinity of the center perpendicularly to an outgoing plane 800a of the laser beam to be radiated, is made of the magnetic material. According to this structure, the magnetic core 802 is unnecessary for the magneto-optical head shown in FIG. 86 or FIG. 89. When such a solid immersion lens 800 is used, it is possible to narrow the spacing distance between the magneto-optical recording medium 830 and the magnetic coil 804. The positioning accuracy is further improved for the external magnetic field, and it is possible to simplify the structure of the magneto-optical head. The solid immersion lens 800 as described above can be formed by firstly polishing and processing the glass to form a lens part with an opening formed at a central portion of a hemispherical glass member, and then filling the opening with the magnetic material, for example, by means of the sputtering or the vapor deposition method.

Twenty-ninth Embodiment

Figure 91:
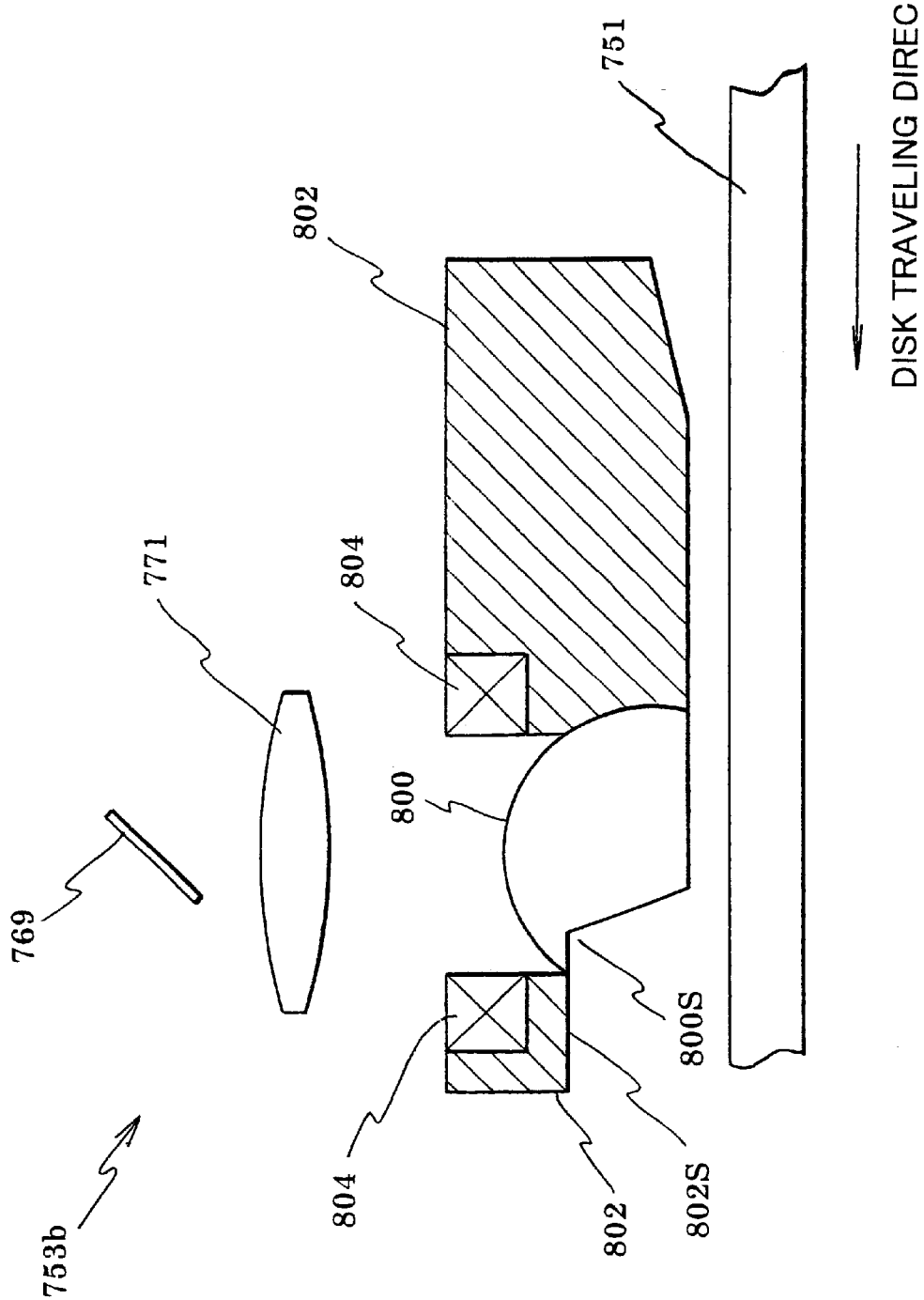
FIG. 91 shows a sectional view illustrating an embodiment of the magneto-optical head provided for the magneto-optical recording and reproducing apparatus of the present invention.

FIG. 91 shows an embodiment of the magneto-optical recording and reproducing apparatus in which a solid immersion lens 800 formed with a floating type slider is used for a magneto-optical head. FIG. 91 depicts a magneto-optical disk 751 and the entire magneto-optical head section. An objective lens 771 is attached to an unillustrated objective lens-driving unit. The solid immersion lens 800, the slider 802, a magnetic coil 804, and a mirror 769 are integrated into one unit to construct a magneto-optical head section 753b. The magneto-optical head section 753b is installed and fixed to a tip of a swing arm of the magneto-optical recording and reproducing apparatus. Those used for the magneto-optical head section of this embodiment have cutouts 802S, 800S which are formed at a part of the sliding surface of the slider 802 and at a part of the sliding surface of the solid immersion lens 800 respectively. Floating grooves, which are used to allow the magneto-optical head to float, are formed at the cutouts 802S, 800S. The other parts of the magneto-optical recording and reproducing apparatus are constructed in the same manner as in the other embodiments.

Thirty Embodiment

Figure 92:
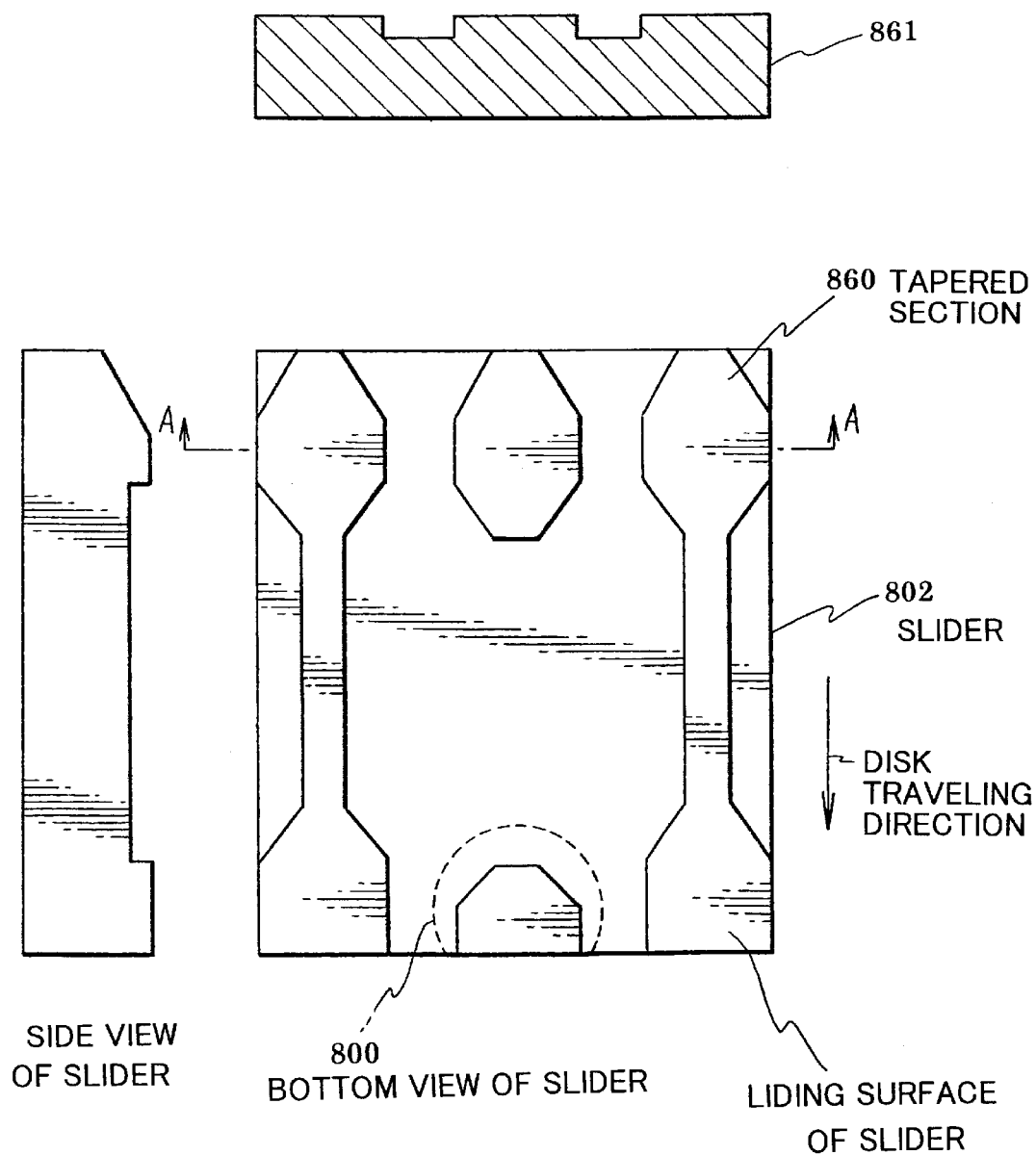
FIG. 92 shows a plan view illustrating an embodiment of a slider of the magneto-optical head provided for the magneto-optical recording and reproducing apparatus of the present invention.

FIG. 92 shows the shape of floating grooves which are used to allow the magneto-optical head section of the swing arm to float and which are formed on the sliding surface of the slider 802 of the magneto-optical head section installed and fixed to the tip of the swing arm 756 of the magneto-optical recording and reproducing apparatus. FIG. 92 shows a slider cross section 861 of the slider 802, a tapered section 860, and the position of installation of the solid immersion lens 800. The other parts of the magneto-optical recording and reproducing apparatus are constructed in the same manner as in the other embodiments.

INDUSTRIAL APPLICABILITY

As explained above, the reproducing method and the reproducing apparatus of the magneto-optical recording medium according to the present invention is expected to construct the magneto-optical recording and reproducing system which makes it possible to perform the next generation super high density recording. Especially, the magneto-optical recording media according to the first to tenth aspects are preferably constructed to magnify and reproduce the recorded minute magnetic domain. When the reproduction is performed on the magneto-optical recording medium as described above in accordance with the reproducing method of the present invention, it is possible to reliably perform the respective processes of i) transfer of the minute magnetic domain from the information-recording layer (magneto-optical recording film) to the reproducing layer (auxiliary magnetic film), ii) magnification of the transferred magnetic domain, and iii) extinguishment of the magnified magnetic domain. Therefore, it is possible to individually reproduce the minute magnetic domains with the increased reproduced signal intensity and with high C/N.

The magneto-optical recording and reproducing apparatus of the present invention is the apparatus which is extremely effective for the magneto-optical recording and reproducing method in which the alternating magnetic field and the power-modulated reproducing light beam are applied to the magneto-optical recording medium. Further, the apparatus adopts the magneto-optical head which makes it possible to apply the reproducing light beam and the reproducing magnetic field in the identical direction. Therefore, it is possible to realize a compact size and a light weight of the reproducing apparatus. Further, the magneto-optical head is attached to the tip of the swing arm. Therefore, it is possible to make access to a desired area of the magneto-optical recording medium more quickly. The movement, the scanning, and the access of the magneto-optical head can be performed in the narrow space parallel to the plane of the magneto-optical disk. Accordingly, it is possible to obtain the compact reproducing apparatus. When the solid immersion lens is used for the magneto-optical head, it is possible to perform the recording and the reproduction at the super high density. The magnetic coil is arranged around or inside the solid immersion lens to construct the magneto-optical head. Accordingly, it is possible to construct the magneto-optical head having the extremely small size, and it is possible to reduce the contact between the head and the recording medium. Especially, the reproducing apparatus of the present invention is extremely useful as the apparatus for performing reproduction on the magneto-optical recording medium according to each of the first to tenth aspects, i.e., the magneto-optical recording medium to perform the respective processes of i) transfer of the minute magnetic domain from the information-recording layer (magneto-optical recording film) to the reproducing layer (auxiliary magnetic film), ii) magnification of the transferred magnetic domain, and iii) extinguishment of the magnified magnetic domain.

What is claimed is:

1. A reproducing apparatus for performing reproduction on a magneto-optical recording medium having an information recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at one end of the swing arm;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information recording layer to the reproducing layer and magnify the transferred magnetic domain so that information is reproduced from the magnified magnetic domain in the reproducing layer, the apparatus being used to perform reproduction on a magneto-optical recording medium comprising, on a substrate, an information-recording layer, and a reproducing layer capable of magnifying and reproducing a magnetic domain transferred from the information-recording layer, by applying an external magnetic field having a polarity identical with that of magnetization of the magnetic domain, wherein the information-recording layer has a thickness h which satisfies h/d>0.5 for a radius d of a minimum magnetic domain which has been recorded.

2. A reproducing apparatus for performing reproduction on a magneto-optical recording medium having an information recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at one end of the swing arm;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information recording layer to the reproducing layer and magnify the transferred magnetic domain so that information is reproduced from the magnified magnetic domain in the reproducing layer, is the apparatus being used to perform reproduction on a magneto-optical recording medium comprising a first auxiliary magnetic film and a second auxiliary magnetic film as a reproducing layer provided in this order on a magneto-optical recording film as an information-recording layer, wherein each of the first auxiliary magnetic film and the second auxiliary magnetic film is composed of a magnetic material which causes transition from in-plane magnetization to perpendicular magnetization when a temperature exceeds a critical temperature, and the magnetic material satisfies a relationship of room temperature <TCR2<TCR1<Tco, Tc1, Tc2 concerning respective Curie temperatures Tco, Tc1, Tc2 of the magneto-optical recording film, the first auxiliary magnetic film, and the second auxiliary magnetic film and respective critical temperatures TCR1, TCR2 of the first auxiliary magnetic film and the second auxiliary magnetic film.

3. A reproducing apparatus for performing reproduction on a magneto-optical recording medium having an information recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at one end of the swing arm;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information recording layer to the reproducing layer and magnify the transferred magnetic domain so that information is reproduced from the magnified magnetic domain in the reproducing layer, the apparatus being used to perform reproduction on a magneto-optical recording medium comprising an auxiliary magnetic film as a reproducing layer which causes transition from an in-plane magnetized film to a perpendicularly magnetized film when a temperature exceeds a critical temperature, a magneto-optical recording film as an information-recording layer, and a non-magnetic film formed therebetween, wherein the magneto-optical recording film and the auxiliary magnetic film have such magnetic characteristics that a relationship of room temperature <TCR<TCO, TC is satisfied provided that Curie temperatures of the magneto-optical recording film and the auxiliary magnetic film are TCO and TC respectively, and the critical temperature of the auxiliary magnetic film is TCR.

4. A reproducing apparatus for performing reproduction on a magneto-optical recording medium having an information recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at one end of the swing arm;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information recording layer to the reproducing layer and magnify the transferred magnetic domain so that information is reproduced from the magnified magnetic domain in the reproducing layer, the apparatus being used to perform reproduction on a magneto-optical recording medium comprising, on a substrate, a magneto-optical recording film as an information-recording layer having perpendicular magnetization, an auxiliary magnetic film as a reproducing layer to cause transition from an in-plane magnetized film to a perpendicularly magnetized film when a temperature exceeds a critical temperature Tcr, and a non-magnetic film intervening therebetween, wherein a relationship of room temperature <Tcr<Tcomp<Tco<Tc holds concerning a Curie temperature Tco of the magneto-optical recording film and a Curie temperature Tc and a compensation temperature Tcomp of the auxiliary magnetic film, and wherein under a condition in which an external magnetic field Hex is applied to the magneto-optical recording medium, a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

5. A reproducing apparatus for performing reproduction on a magneto-optical recording medium having an information recording layer and a reproducing layer, the reproducing apparatus comprising:

a magnetic head which applies a reproducing magnetic field to the magneto-optical recording medium;

an optical head which radiates a reproducing light beam onto the magneto-optical recording medium;

a swing arm which is rotatable about a swing shaft and which supports the optical head at one end of the swing arm;

a clock generator which generates a reproducing clock; and an optical head control unit which controls the optical head to radiate reproducing light beams which are power-modulated to have at least two types of light power Pr1 and light power Pr2 on the basis of the reproducing clock, wherein:

the light beam having one power of the light powers Pr1, Pr2 is used to transfer a magnetic domain in the information recording layer to the reproducing layer and magnify the transferred magnetic domain so that information is reproduced from the magnified magnetic domain in the reproducing layer, the apparatus being used to perform reproduction on a magneto-optical recording medium having a structure comprising a first auxiliary magnetic film, a non-magnetic film, and a second auxiliary magnetic film as a reproducing layer which are successively stacked on a magneto-optical recording film as an information-recording layer, wherein the magneto-optical recording film, the first auxiliary magnetic film, and the second auxiliary magnetic film have such magnetic characteristics that a relationship of room temperature <TCR12<TCR11<TCO, TC1, TC2 is satisfied provided that Curie temperatures of the magneto-optical recording film, the first auxiliary magnetic film, and the second auxiliary magnetic film are TCO, TC11, and TC12 respectively, and critical temperatures of the first auxiliary magnetic film and the second auxiliary magnetic film are TCR11 and RCR12 respectively.

6. A reproducing method for performing reproduction on a magneto-optical recording medium comprising an information-recording layer and a reproducing layer, the reproducing method comprising:

irradiating the magneto-optical recording medium with a reproducing light beam which is power-modulated to have at least two types of light powers Pr1 and Pr2 while applying an alternating magnetic field so that the reproducing light beam of at least one of the powers Pr1 and Pr2 is used to transfer a recording magnetic domain in the information-recording layer to the reproducing layer, and the transferred magnetic domain is magnified to reproduce information recorded on the magneto-optical recording medium, wherein the magneto-optical recording medium is a magneto-optical recording medium comprising a first auxiliary magnetic film and a second auxiliary magnetic film as a reproducing layer provided in this order on a magneto-optical recording film as an information-recording layer, wherein each of the first auxiliary magnetic film and the second auxiliary magnetic film is composed of a magnetic material which causes transition from in-plane magnetization to perpendicular magnetization when a temperature exceeds a critical temperature, and the magnetic material satisfies a relationship of room temperature <TCR2<TCR1<Tco, Tc1, Tc2 concerning respective Curie temperatures Tco, Tc1, Tc2 of the magneto-optical recording film, the first auxiliary magnetic film, and the second auxiliary magnetic film and respective critical temperatures TCR1, TCR2 of the first auxiliary magnetic film and the second auxiliary magnetic film.

7. A reproducing method for performing reproduction on a magneto-optical recording medium comprising an information-recording layer and a reproducing layer, the reproducing method comprising:

irradiating the magneto-optical recording medium with a reproducing light beam which is power-modulated to have at least two types of light powers Pr1 and Pr2 while applying an alternating magnetic field so that the reproducing light beam of at least one of the powers Pr1 and Pr2 is used to transfer a recording magnetic domain in the information-recording layer to the reproducing layer, and the transferred magnetic domain is magnified to reproduce information recorded on the magneto-optical recording medium, wherein the magneto-optical recording medium is a magneto-optical recording medium comprising an auxiliary magnetic film as a reproducing layer which causes transition from an in-plane magnetized film to a perpendicularly magnetized film when a temperature exceeds a critical temperature, a magneto-optical recording film as an information-recording layer, and a non-magnetic film formed therebetween, wherein the magneto-optical recording film and the auxiliary magnetic film have such magnetic characteristics that a relationship of room temperature <TCR<TCO, TC is satisfied provided that Curie temperatures of the magneto-optical recording film and the auxiliary magnetic film are TCO and TC respectively, and the critical temperature of the auxiliary magnetic film is TCR.

8. A reproducing method for performing reproduction on a magneto-optical recording medium comprising an information-recording layer and a reproducing layer, the reproducing method comprising:

irradiating the magneto-optical recording medium with a reproducing light beam which is power-modulated to have at least two types of light powers Pr1 and Pr2 while applying an alternating magnetic field so that the reproducing light beam of at least one of the powers Pr1 and Pr2 is used to transfer a recording magnetic domain in the information-recording layer to the reproducing layer, and the transferred magnetic domain is magnified to reproduce information recorded on the magneto-optical recording medium, wherein the magneto-optical recording medium is a magneto-optical recording medium comprising, on a substrate, a magneto-optical recording film as an information-recording layer having perpendicular magnetization, and an auxiliary magnetic film as a reproducing layer to cause transition from an in-plane magnetized film to a perpendicularly magnetized film when a temperature exceeds a critical temperature Tcr with a non-magnetic film intervening therebetween, wherein a relationship of room temperature <Tcr<Tcomp<Tco<Tc holds concerning a Curie temperature Tco of the magneto-optical recording film and a Curie temperature Tc and a compensation temperature Tcomp of the auxiliary magnetic film, and wherein under a condition in which an external magnetic field Hex is applied to the magneto-optical recording medium, a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

9. A reproducing method for performing reproduction on a magneto-optical recording medium comprising an information-recording layer and a reproducing layer, the reproducing method comprising:

irradiating the magneto-optical recording medium with a reproducing light beam which is power-modulated to have at least two types of light powers Pr1 and Pr2 while applying an alternating magnetic field so that the reproducing light beam of at least one of the powers Pr1 and Pr2 is used to transfer a recording magnetic domain in the information-recording layer to the reproducing layer, and the transferred magnetic domain is magnified to reproduce information recorded on the magneto-optical recording medium, wherein the magneto-optical recording medium is a magneto-optical recording medium having a structure comprising a first auxiliary magnetic film, a non-magnetic film, and a second auxiliary magnetic film as a reproducing layer which are successively stacked on a magneto-optical recording film as an information-recording layer, wherein the magneto-optical recording film, the first auxiliary magnetic film, and the second auxiliary magnetic film have such magnetic characteristics that a relationship of room temperature <TCR12<TCR11<TCO, TC1, TC2 is satisfied provided that Curie temperatures of the magneto-optical recording film, the first auxiliary magnetic film, and the second auxiliary magnetic film are TCO, TC11, and TC12 respectively, and critical temperatures of the first auxiliary magnetic film and the second auxiliary magnetic film are TCR11 and RCR12 respectively.

10. A reproducing method for performing reproduction on a magneto-optical recording medium comprising an information-recording layer and a reproducing layer, the reproducing method comprising:

irradiating the magneto-optical recording medium with a reproducing light beam which is power-modulated to have at least two types of light powers Pr1 and Pr2 while applying an alternating magnetic field so that the reproducing light beam of at least one of the powers Pr1 and Pr2 is used to transfer a recording magnetic domain in the information-recording layer to the reproducing layer, and the transferred magnetic domain is magnified to reproduce information recorded on the magneto-optical recording medium, wherein the magneto-optical recording medium is a magneto-optical recording medium comprising a magneto-optical recording film having perpendicular magnetization as an information-recording layer, a first auxiliary magnetic film to cause transition from a perpendicularly magnetized film to an in-plane magnetized film when a temperature exceeds a critical temperature Tcr11, and a second auxiliary magnetic film to cause transition from an in-plane magnetized film to a perpendicularly magnetized film when a temperature exceeds a critical temperature Tcr12, which are arranged and formed in this order on a substrate, wherein the first auxiliary magnetic film and the second auxiliary magnetic film are made of magnetic materials so that their critical temperatures satisfy Tcr11>Tcr12.

11. The reproducing method according to claim 10, wherein a non-magnetic film is formed to intervene between the first auxiliary magnetic film and the second auxiliary magnetic film, and the magneto-optical recording film is located closely to a surface on a side opposite to a surface of the first auxiliary magnetic film for forming the nonmagnetic film.

12. The reproducing method according to claim 10, wherein a value of a temperature difference OT between the critical temperature Tcr12 of the second auxiliary magnetic film and the critical temperature Tcr11 of the first auxiliary magnetic film is a value which is set so that the first auxiliary magnetic film forms an in-plane magnetized film after a magnetic domain transferred to the second auxiliary magnetic film is reproduced.

13. An apparatus for performing reproduction on a magneto-optical recording medium having an information-recording layer and a reproducing layer the reproducing apparatus comprising:

a clock generator which generates a reproducing clock;

an optical head which radiates a reproducing light beam onto the magneto-optical recording medium;

a magnetic head which applies, as a reproducing magnetic field, an alternating magnetic field synchronized with the reproducing clock to the magneto-optical recording medium; and a swing arm which is rotatable about a swing shaft and which supports the optical head at one end of the swing arm, wherein a magnetic field of the alternating magnetic field, which has the same polarity as that of magnetization of a recording magnetic domain formed in the information-recording layer, is used to magnify a magnetic domain transferred from the information-recording layer to the reproducing layer, and a magnetic field of the alternating magnetic field, which has a polarity opposite to the magnetization of the recording magnetic domain, is used to reduce the magnified magnetic domain.

* * * * *